United States Patent
Lang et al.

(10) Patent No.: US 10,079,859 B2
(45) Date of Patent: *Sep. 18, 2018

(54) AUTOMATED AND ADAPTIVE MODEL-DRIVEN SECURITY SYSTEM AND METHOD FOR OPERATING THE SAME

(71) Applicants: Ulrich Lang, San Diego, CA (US); Rudolf Schreiner, Munich (DE)

(72) Inventors: Ulrich Lang, San Diego, CA (US); Rudolf Schreiner, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,975

(22) Filed: Dec. 29, 2016

(65) Prior Publication Data

US 2017/0126741 A1    May 4, 2017

Related U.S. Application Data

(63) Continuation of application No. 14/602,935, filed on Jan. 22, 2015, now Pat. No. 9,563,771.

(Continued)

(51) Int. Cl.
*G06F 21/57* (2013.01)
*H04L 29/06* (2006.01)
*G06F 21/60* (2013.01)

(52) U.S. Cl.
CPC ............ *H04L 63/20* (2013.01); *G06F 21/57* (2013.01); *G06F 21/604* (2013.01); *G06F 2221/034* (2013.01)

(58) Field of Classification Search
CPC ... G06F 21/57; G06F 21/604; G06F 2221/034
See application file for complete search history.

(56) References Cited

U.S. PATENT DOCUMENTS

| | | | |
|---|---|---|---|
| 9,043,861 B2 * | 5/2015 | Lang | H04L 63/0263 726/1 |
| 2009/0077621 A1 | 3/2009 | Lang et al. | |
| 2011/0093916 A1 | 4/2011 | Lang et al. | |

OTHER PUBLICATIONS

Karp et al., "From ABAC to ZBAC: Evolution of Access Control Models," HP Laboratories, http://hpl.hp.com/techreports/2009/HPL-2009-30.pdf, pp. 1-22 (2009).

(Continued)

*Primary Examiner* — Beemnet Dada
(74) *Attorney, Agent, or Firm* — Muncy, Geissler, Olds & Lowe, P.C.

(57) ABSTRACT

A system and method for managing implementation of policies in an information technologies system receives into a processor at least one policy function stored in at least one memory, receives into the processor a policy input indicating a high-level policy for the IT system, the policy input being compliant with the at least one policy function, based on the received policy input, automatically or semi-automatically generates via the processor a rule and/or configuration by replacing at least one policy function in the policy input with the at received least one policy function, the generated rule and/or configuration being compliant with the received policy input or replacing at least one value or value placeholder in the policy input with a corresponding value, and distributes the rule and/or configuration to the at least one memory of the IT system or another at least one memory to thereby enable implementation of the policies.

18 Claims, 70 Drawing Sheets

Related U.S. Application Data

(60) Provisional application No. 61/929,987, filed on Jan. 22, 2014, provisional application No. 62/050,051, filed on Sep. 12, 2014.

(56) References Cited

OTHER PUBLICATIONS

Giunchiglia et al., "RelBAC: Relation Based Access Control," IEEE SKG '08 Conf. Proc., pp. 1-13 (Aug. 2008).
Wikipedia, Graph (mathematics), http://en.wikipedia.org/wiki/Gragh_(mathematics), pp. 1-9 (Nov. 2014).
Wikipedia, Modeling language, http://en.wikipedia.org/wiki/Modeling_language, pp. 1-6 (2008).
Kirkpatrick et al., "Privacy-preserving Enforcement of Spatially Aware RBAC," IEEE Trans. on Dep. & Sec. Comp. (TDSC), pp. 1-14 (Jan. 2012).
Object Management Group, Model-Driven Architecture Guide, mda.omg.org, pp. 1-75 (2015).
Open Geospatial Consortium, Geospatial eXtensible Access Control Markup Language (GeoXACML) Version 1, pp. 1-55 (2011).

* cited by examiner

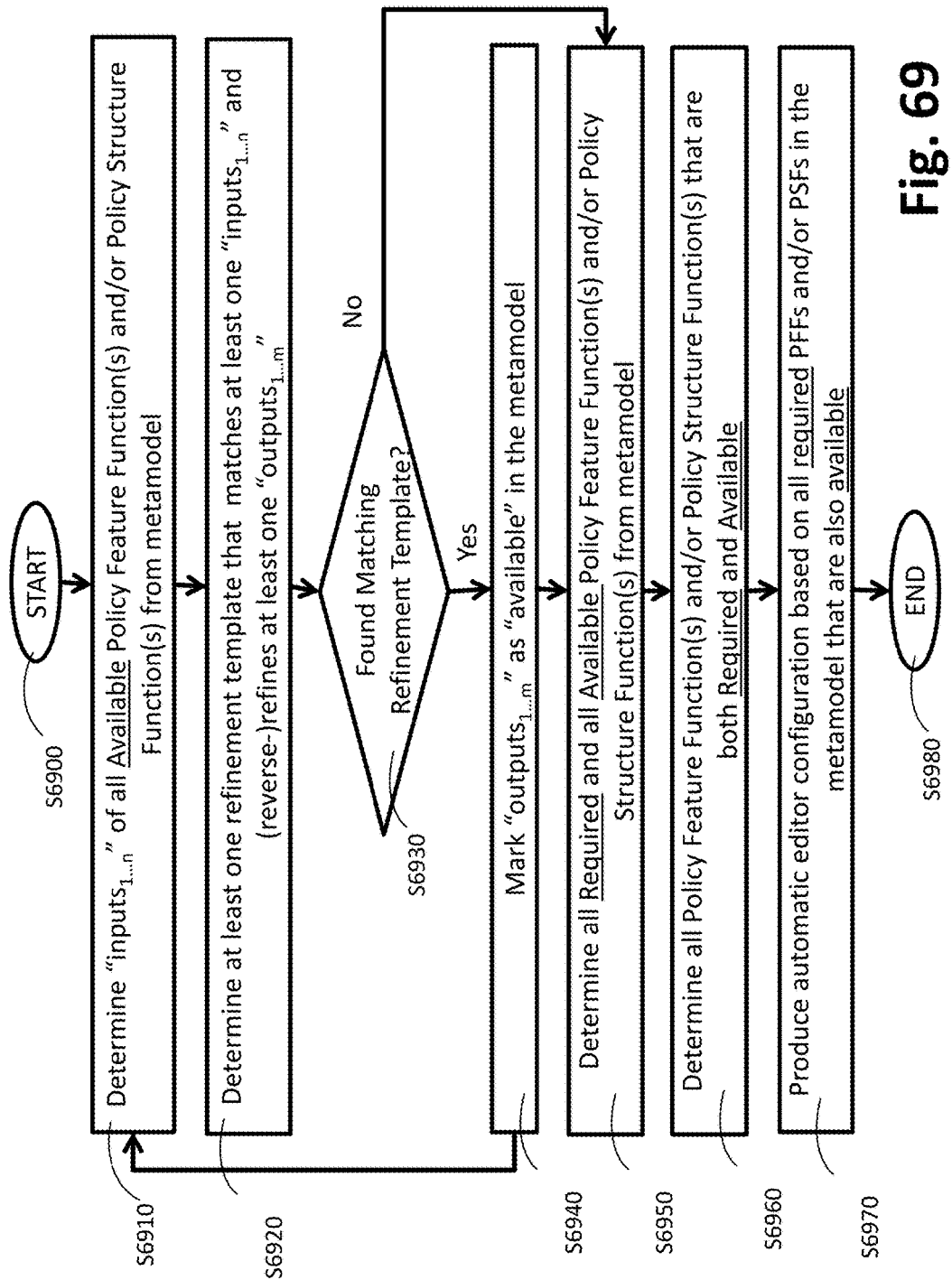

AUTOMATED AND ADAPTIVE MODEL-DRIVEN SECURITY SYSTEM AND METHOD FOR OPERATING THE SAME

CLAIM OF PRIORITY UNDER 35 U.S.C. § 119

The present application for patent is a continuation of U.S. application Ser. No. 14/602,935, which was filed on Jan. 22, 2015, which claims priority to Provisional Application No. 61/929,987 entitled "Method and System using Model-Driven Security for Trustworthiness-Based Access Control & Fine-Grained Redaction/Filtering" filed Jan. 22, 2014, and Provisional Application No. 62/050,051 entitled "Method and system for model-driven policy management, including proximity-based access control policy automation" filed Sep. 12, 2014, which are hereby incorporated by reference herein.

BACKGROUND OF THE INVENTION

Field of the Invention

The present application relates to security policies within a computing system, and more particularly to a method and system for managing security policies within an information technology (IT) system.

Description of Background Art

It is often difficult to manage security policies within a computing system. Numerous factors introduce complexities: Firstly, the IT environment is getting increasingly complex, with today's agile (i.e. dynamically changing), complex, interconnected Systems of Systems (SoS). Examples include Internet of Things (IoT), Machine-to-Machine (M2M), Service Oriented Architectures (SOA), Cloud computing. At the same time, some of these IT landscapes directly impact safety and security critical in the real (i.e. physical) world, rather than just being relevant to information collected/stored/processed. Information flowing through those systems needs to be protected, which is a highly complex endeavor. As a consequence, security needs to become more effective and reliable. Secondly, security policies need to capture increasingly more complex security requirements that are meaningful to business, and are often driven by compliance/accreditation requirements. Features of such advanced policies are that they involve policy rules that are numerous, complex, feature-rich (e.g. privacy), fine-grained, contextual/dynamic etc.

Most of the current status quo of security technologies fails to meet those requirements (i.e. to support today's IT landscapes and the management/enforcement of adequate security policies). "Blacklisting" and other approaches that focus on detecting and blocking/mitigating unwelcomed contents and access cannot implement the required security policies. On the other hand, "whitelisting" and other approaches that focus on only allowing appropriate contents and access are unmanageable using today's manual policy implementation approaches.

The world needs better policy management methods and systems that can manage meaningful policies, which are preventive (whitelisting), in a way that is manageable, and that supports IT agility, and that is repeatable/traceable/verifiable. US Patent Application Publication No. US 2009/0077621 to Lang et al. ("Method and system for managing security policies", which is incorporated by reference herein for its entirety, thereafter called "MDS patent") proposes security policies that include access permissions between different applications or programs, between applications and files, between users and applications and/or files and other access control functionality at various layers of the application or network (e.g., IP packet filters, middleware layer access control, application layer access control, information filtering), between Quality of Protection policies for confidentiality and integrity of communication using encryption or secure hash functions, or between security policies enforced within the application itself, e.g. at the generation of sets or subsets of data.

Furthermore, as explained in US Patent Application Publication No. US 2011/0093916 to Lang et al. ("Method and system for rapid accreditation/re-accreditation of agile it environments, for example service oriented architecture (soa)", which is incorporated by reference herein for its entirety, thereafter called "MDSA patent"), conventional accreditation methods (such as Common Criteria) are also inadequate for today's agile SoS, because they require too much manual effort, and also usually require a static SoS to be verified.

US Patent Application Publication No. US 2009/0077621 (and US Patent Application Publication No. US 2011/0093916) explains how a "model-driven security" (MDS) approach can be used to better manage security policies, i.e. to meet (some of) the abovementioned requirements.

However, while US Patent Application Publication No. US 2009/0077621 (and US Patent Application Publication No. US 2011/0093916) describes a broad set of embodiments for the method and system that can meet the abovementioned requirements, it is possible to implement various embodiments that can be further improved.

The below section introduces various subject areas that form relevant background for the present application.

Attribute-Based Access Control

The NIST 800-162 draft ("NIST Special Publication 800-162. Guide to Attribute Based Access Control (ABAC) Definition and Considerations (Draft)", 2013) defines Attribute-Based Access Control (ABAC) as "a logical access control methodology where authorization to perform a set of operations is determined by evaluating attributes associated with the subject, object, requested operations, and, in some cases, environment conditions against policy, rules, or relationships that describe the allowable operations for a given set of attributes."

In other words, ABAC uses attributes to describe all the entities considered for access control, and access control rules that describe access requests using attribute key-value pairs (or key-value-value triples in PBAC, as explained below) and associated calculation functions (e.g. equal, subset, less, greater, subset, relationship/distance/proximity etc.). In yet other words, attributes associated with a subject, context, action or resource are inputs into the decision of whether that subject may access a given resource in a particular way. And in yet other words, ABAC determines access (i.e., operations upon system objects) by matching the current value of subject attributes, object attributes, and environment conditions with the requirements specified in access control rules.

Policy rules and attributes are parts of ABAC. In ABAC, policy is the representation of rules or relationships that define (by comparing fetched attributes values with values stated in the policy, based on a calculation function) the set of allowable operations (actions) a subject may perform upon an object in permitted environment conditions. Policy rules specify which combinations of calculation results of attributes (types and values) of subjects, objects, operations (actions) and context will result in granting or denying a subject to execute an operation on an object in the given context.

An operation (action) is the execution of a function at the request of a subject upon an object (e.g. invoke, read, write, edit, delete, author, copy, execute, modify, etc.)

Attributes are characteristics that define specific aspects of the subject, object, environment conditions, and/or requested actions that are predefined and pre-assigned by an authority.

A subject is an active entity (generally an individual, process, or device) that causes information to flow among objects or changes the system state.

An object is a passive information system-related entity (e.g., devices, files, records, tables, processes, programs, networks, domains) containing or receiving information.

Context (environmental conditions) are dynamic factors, independent of subject and object, that may be used as attributes at decision time to influence an access decision (e.g. time, location, threat level, temperature, etc.)

Model-Driven Security (MDS)

This section presents an embodiment of model-driven security (MDS) as previously described in US 20090077621 A1.

Model-driven security is needed (and/or ABAC, RBAC etc.) for many systems because it: Simplifies policy authoring; makes policies more generic, human-understandable; reduces the gap between enterprise security policy and technical implementation; automates technical policy creation; reuses information from other stakeholders/sources; improves auditing and accreditation; reduces maintenance complexity; enables rule/attribute interoperability; and is based on proven model-driven concepts.

This model-driven security ("MDS") is used for policy automation (top-down), while the use of model-driven security for accreditation automation (bottom-up) is called "MDSA" and is described further below. The combination could be described as "security policy roundtrip engineering".

Model-driven security originates from research work since 2002 and is related to the well-accepted concepts of the OMG Model Driven Architecture (MDA). As an example implementation, full model-driven security has been implemented by the authors since 2002 in their OpenPMF product, which uses model-driven approaches (i.e. the top-down MDS part) to automate the process of translating human-understandable security & compliance requirements into the corresponding numerous and ever-changing technical authorization policy rules and configurations. This model-driven security policy automation approach forms for example a critical part of an effective least privilege implementation for agile IT landscapes.

MDS provides the means to specify security intent in some "undistorted" model and then use some kind of automatic (tool-supported) process to arrive ("top-down") at a protected IT landscape. The original term used by Object-Security for this is "model-driven security" ("MDS"). In other words, MDS transforms "undistorted" security policy models into the matching technical security implementation, esp. machine-enforceable access rules (and other policies).

Model driven security policy automation ("MDS") can be defined as follows: MDS is the tool supported process of modelling security requirements at a high level of abstraction, and using other information sources available about the system (ideally produced by other stakeholders). These inputs, which are expressed in Domain Specific Languages (DSL), are then transformed into enforceable security rules with as little human intervention as possible. MDS explicitly also includes the run-time security management (e.g. ABAC based), i.e. run-time enforcement of the policy on the protected IT systems, dynamic policy updates and the monitoring of policy violations.

FIG. 1 illustrates a general MDS approach in summary. The figure illustrates "model-driven security (MDS) policy automation" at a high abstraction level. A model-driven development process (including an application model 140, model transformations 150, and running applications 160) is depicted in the right half of the figure. Application Models (140), including application interactions, may be modelled using one of e.g.:

1) Model-driven service orchestration (or similar MDD) tools, which basically allow application modules to be "plugged together" in a drag-and-drop and plug-and-play fashion. The actual application is the integrated orchestration of those modules. The model-driven orchestration tool automatically deploys and integrates the modules as modelled; and 2) Middleware/asset/network mapping tools and the like can be used to automatically detect and generate a system description from the IT landscape.

The Model Transformations (150) generate the software (or interaction orchestration etc.) that matches the specification in the Application Model (140). This software is then executed at runtime, e.g. Running Applications (160).

The resulting application/system model provides valuable, reliable information about the application with its interactions to the model-driven security process, including a security metamodel or meta-model (metamodeling or meta-modeling) 110, a security model 111, a security (policy-generation) workflow (model transformation) 120, security rules 130, and enforcement points 170. It works as follows:

The first step of model-driven security policy automation involves metamodeling (110) and modeling (111) the features of the security policy using a Domain-Specific Language (DSL).

After that security policy can be modelled in the security model (111) using features specified in the metamodeled DSL. If necessary the policy-generation workflow (120) can be customized.

After that, in some implementations, the model-driven security component enforcement points (170) are installed into the runtime platforms that host the applications (160).

The model-driven security workflow (120) can then be executed to automatically generate fine-grained contextual technical security rules (130), taking into account various system and context information, including the application model (140) used to build the running applications (160) using model transformations (150).

Inputs:

Examples of MDS inputs are:

(1) Functional inputs, which provide useful information sources about the system that needs to be protected include for example: Service/component models/metamodels, service interaction models/metamodels, workflow models/metamodels, deployment models/metamodels, asset/network mapper tool feeds, Enterprise Architecture Framework models/metamodels, software source code, manual inputs, attributes information sources etc. It is also possible to combine various inputs into the same model (e.g. role tags in class diagrams or context policies in BPMN), or separate input models for security and system functionality can be provided;

(2) Security inputs, such as for example: Security policy and privacy models, and metamodels, security tags in (functional) models, hand-coded policy rules (in a policy editor), security attribute information from Policy Information Points (PIPs) etc.; and (3) Other Non-Functional Inputs, for Example about Quality of Service (QoS)

Transformations:

MDS model transformations turn the inputs into the outputs. A trivial policy example would be "Interactions in the component deployment model are interpreted as explicit granted access". Roles are only used to split up interfaces into subsets of operations, in order to minimize privileges. From these transformation inputs, MDS then generates a number of explicit access rules that allows the identity of the modelled invoker to access the modelled invocation target. The advantage of this approach is that basic security policies for distributed component applications can be automatically generated without any human interaction or any security-related tags in the models. OpenPMF MDS model transformations use rule templates (implemented in Eclipse, which includes a modelling framework that can be used for transformations, including for example EMF, OAW, MWE, Xtext, Xpand etc.) It is important to see that the customer who uses the MDS tool (in this case OpenPMF) will not see any of the model transformation complexity once the MDS tool is installed and configured. All they will see is a development/modelling GUI with some extra features and menu items for the model transformation.

Output:

The MDS output is a number of technical security rules (e.g. ABAC rules, RBAC configuration files or IP layer filter lists) and other configuration files (e.g. command lines for application start up) for all parts of the application and security infrastructure that reflect the high-level input security requirements at a low level of abstraction and that can be enforced or implemented within the actual system.

The technical security rules are then automatically pushed into the policy enforcement points for enforcement, and policy incidents are monitored.

Whenever applications change (esp. the integration), the technical security rules can be automatically re-generated.

MDS has a number of benefits when used correctly, including: reduces manual administration, reduces security risks, increases assurance, simplifies/automates policy authoring & maintenance, reduces the gap between enterprise security/privacy policy and technical implementation, helps save cost, IT agility, reduces complexity, supports rich application security policies, and more.

Model-Driven Security Accreditation (MDSA) (Enforcement-to-Model Verification)

This section presents an embodiment of model-driven security (MDS) as previously described in US Patent Application Publication No. US 2011/0093916 A1, which is incorporated into the present application by reference.

The purpose of this model-driven security approach is to correlate the inverse direction ("bottom-up"), where "undistorted" models are specified for checking, verification and/or compliance, certification & accreditation purposes: The correspondence between security characteristics of the actual IT landscape with the specified compliance/accreditation models is verified. The original term used by ObjectSecurity for this is "model-driven security accreditation" ("MDSA"). In other words, MDSA analyses and documents the traceable correspondence between technical security implementation, security policy models, and "undistorted" accreditation models.

Model-Driven Security Accreditation Automation ("MDSA") automates the analysis of traceable correspondence between technical security policy implementation (e.g. ABAC) and the information assurance requirements captured in "undistorted" requirements models (e.g. Common Criteria, control objectives). MDSA also documents "supporting evidence" for accreditation based on various information (esp. design-time system/security models, system/security artefacts, system/security model transformations, and runtime system/security incident logs). Furthermore, MDSA enables the automated change detection and analysis to determine whether the accreditation is still valid. MDSA also acts as a decision support tool.

FIG. 2 illustrates general MDSA implementation by ObjectSecurity. The figure illustrates "model-driven security accreditation (MDSA) automation" at a conceptual level. The model-driven application integration process is again depicted on the right side of the figure, which includes an application model 240, model transformations 250, and running applications 260, analogous to the application 140, model transformations 150, and running applications 160, and the "model-driven security policy automation" process, which was described in the previous section is depicted on the left side of the figure, which includes security metamodel 210, security model 211, security workflow (model transformations) 220, (security rules) 230, enforcement points 270 (analogous to security metamodel 110, security model 111, security workflow (model transformations) 120, security rules 130, enforcement points 170 in FIG. 1). The MDSA process, which includes accreditation metamodel 280, accreditation model 285, accreditation workflow (model transformations) 290, and accreditation evidence report 295, is the difference from the MDS approach shown in FIG. 1:

The first step of MDSA involves metamodeling (280) the features of the accreditation model in a Domain Specific Language (DSL), and then and modelling (285) the accreditation (or compliance) requirements using that DSL. If necessary the "accreditation/compliance supporting evidence" generation workflow (290) can be customized.

After that, the model-driven accreditation workflow (290) is executed to automatically generate an accreditation/compliance supporting evidence report (295). The workflow basically reads, analyses and correlates information from the various models (system integration model, the security policy requirements model/metamodel, the accreditation/compliance requirements model/metamodel), various workflows (application generation, policy rule generation, and its own evidence generator), various outputs (information about integrated running applications, incidents, generated policy rules etc.), as well as system and context information.

The automatically generated output is a full correlation analysis of all the analyzed inputs, to either help demonstrate accreditation/compliance, or to point out flaws/vulnerabilities/errors etc.

One feature of MDSA is that whenever applications or security policies change, the accreditation/compliance evidence report can be automatically re-generated and compared for differences (based on change policies that specify allowable change paths).

MDSA was originally invented for automating large parts of the compliance and assurance accreditation management processes (e.g. Common Criteria) to achieve reduced cost/effort, and increased reliability/traceability. MDSA automatically analyses and documents two main compliance aspects including whether or the actual security of the "system of systems" at any given point match with the stated requirements (correspondence analysis), and whether or not any changes to the system of systems impact the current accreditation (change analysis).

MDSA has a number of benefits, including: enabling agile/shortened accreditation of policies & enforcement (PBAC, ABAC, RBAC etc.), cost savings, automation, traceability etc. MDSA's potential challenges & Considerations include the (now) blurred boundaries between design & accreditation time vs. runtime, resistance to change, political challenges, training requirements etc.

Proximity-Based Access Control (PBAC)

In PBAC, proximity in general includes the following general concepts:

The proximity aspect (attributes) considered, which is the attribute(s) used to express proximity. For example, time, place, causation, influence, order, occurrence, or relation. A critical requirement for proximity attributes is that they are within a space where a notion of distance exists.

The distance function between two or more proximity attributes. In mathematics, a metric or distance function is a function that defines a distance between elements of a set. A set with a metric is called a metric space. A metric induces a topology on a set but not all topologies can be generated by a metric. A topological space whose topology can be described by a metric is called "metrizable". Graphs and graph theory can also be used to describe distances (e.g. number of hops across a directed graph).

PBAC is defined as an approach where information provided to a subject is determined need-to-know based on proximity attributes. It is an access control mechanism that will dynamically adjust data access for individuals based on proximity profiles, i.e. their proximity to others, organizations, devices, and/or information in terms of attributes (e.g. location, mission, assignment) derived from existing sources. For example, the closer something/someone is in proximity to the requestor, the more important it is to that person and the more details the requestor will need about it. Access to information is granted to be need-to-know based on the proximity of a subject (user acting using a device, or a device acting on its own) to the requested information based on relevant criteria ("proximity attributes"). Proximity can be based on for example geo-location, spatial proximity (i.e., physical location), organizational proximity (e.g., relationships in the chain of command), operational proximity (e.g., supported/supporting units, common missions), social proximity, business process proximity etc. For example, a team leader for a first responder team responding to an accident may want to gain insight into data from other teams at a shared geographic area (spatial proximity) in order to increase logistical efficiencies, better understand what other teams are planning or doing (organizational proximity) in order to coordinate better, or obtain assessments and other information developed by a supported already-deployed team (operational proximity) in order to plan more effectively.

There are also two additional proximity-based access control approaches, which can be seen as subcategories of PBAC and can be implemented using PBAC:

(1) Proximity-Based Information Provisioning ("PBAC-IP"): This approach does not only determine access based on proximity, but additional inference is used to determine what information is most important based on proximity. This can help focus users' attention by inferring what might be useful based on the proximity profile. This is a useful side benefit in a highly dynamic environment. When implemented, PBAC-IP may result in information to be (1) pushed to users when relevant, (2) pushed to users when relevant if they previously subscribed to the information feed, or (3) determine the information released to the user when the user pulls information.

(2) Spatial Proximity-Based Device Access ("PBAC-DA"): In this approach, access to a device is granted based on the physical proximity of a subject (usually human users) to that device. This use case is discussed in depth in the academic literature (esp. in relation to RBAC) and seems to be the prevailing definition of PBAC in the academic literature. This PBAC use case is for example proposed for automatic granting of access to systems in a medical emergency room scenario, based on who is in proximity of a device.

SUMMARY OF THE INVENTION

An embodiment of the present invention is directed to a method of managing implementation of policies in an information technologies system including receiving into a processor at least one policy function stored in at least one memory, receiving into the processor a policy input indicating a high-level policy for the IT system, the policy input being compliant with the at least one policy function, based on the received policy input, automatically or semi-automatically generating via the processor a rule and/or configuration by replacing at least one policy function in the policy input with the at received least one policy function, the generated rule and/or configuration being compliant with the received policy input or replacing at least one value or value placeholder in the policy input with a corresponding value, and distributing, via the processor, the rule and/or configuration to the at least one memory of the IT system or another at least one memory to thereby enable implementation of the policies.

Another embodiment of the present invention is directed to an information technologies (IT) policy management system including at least one memory that stores at least one policy function, and a processor that is configured to receive the at least one policy function, the at least one refinement template, and the at least one available policy function from the at least one memory, receive a policy input indicating a high-level policy for the IT system, the policy input being compliant with the at least one policy function, based on the received policy input, automatically or semi-automatically generates a rule and/or configuration by replacing at least one policy function in the policy input with the at received least one policy function, the generated rule and/or configuration being compliant with the received policy input or replacing at least one value or value placeholder in the policy input with a corresponding value, and distributes the rule and/or configuration to the at least one memory of the IT system or another at least one memory to thereby enable implementation of the policies.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present application will become more fully understood from the detailed description given hereinbelow and the accompanying drawings which are given by way of illustration only, and thus, are not limitive of the present application, and wherein:

FIG. 6 illustrates a screen capture of a policy editor with machine-enforceable rule editing features according to an embodiment.

FIG. 58 illustrates a PBAC refinement template metamodel of an example scenario according to an embodiment.

FIG. 69 illustrates a flow chart of "Determine Refinement Chains for Policy Feature Functions and Policy Structure Functions" (step 6623 in FIG. 66) and "Configure High Level Security Policy Editor (step S6627 in FIG. 66) according to an embodiment.

DETAILED DESCRIPTION

Figure 1:
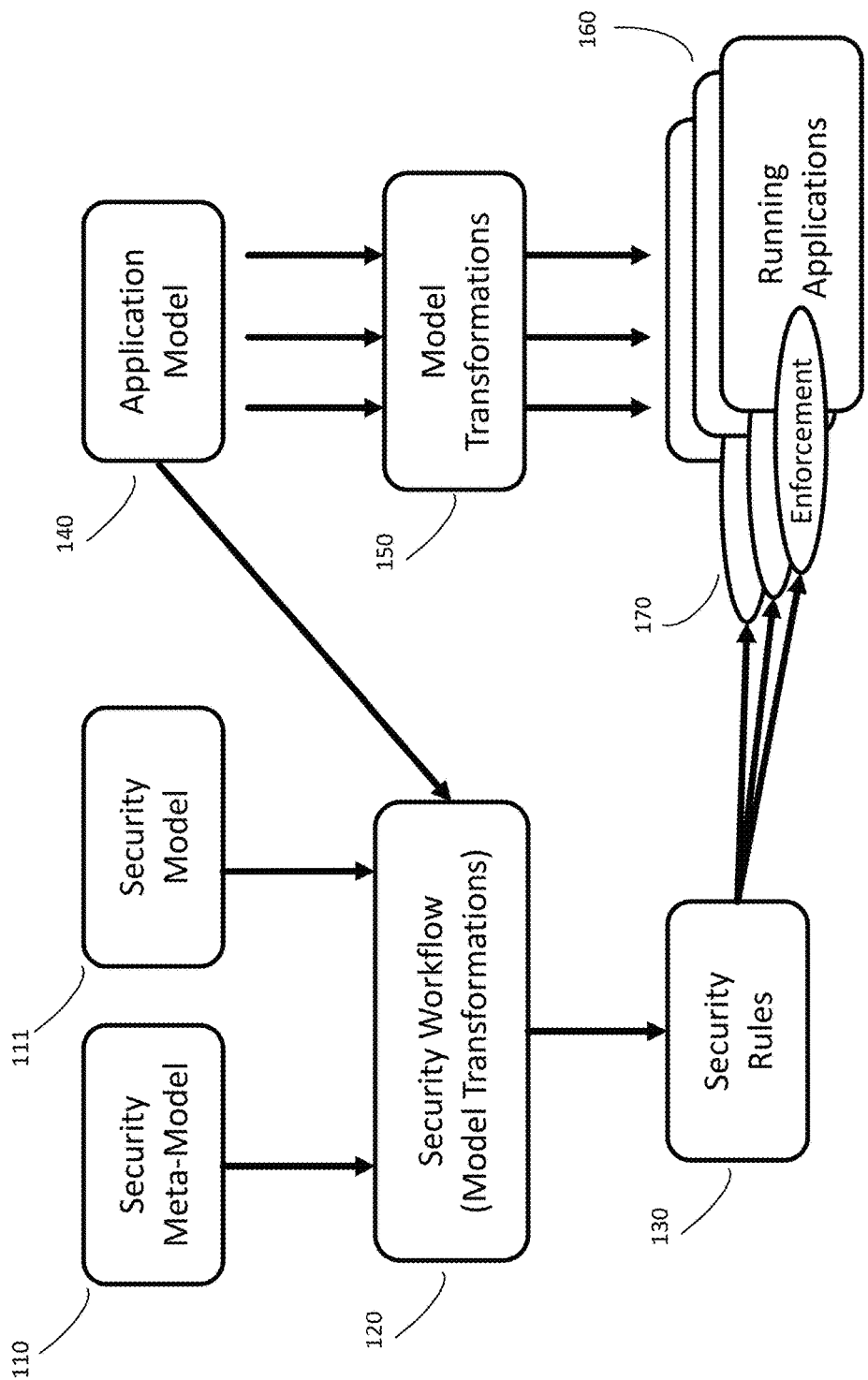
FIG. 1 illustrates a block diagram describing operation of a model-driven security system according to an embodiment of the MDS Patent.
Figure 2:
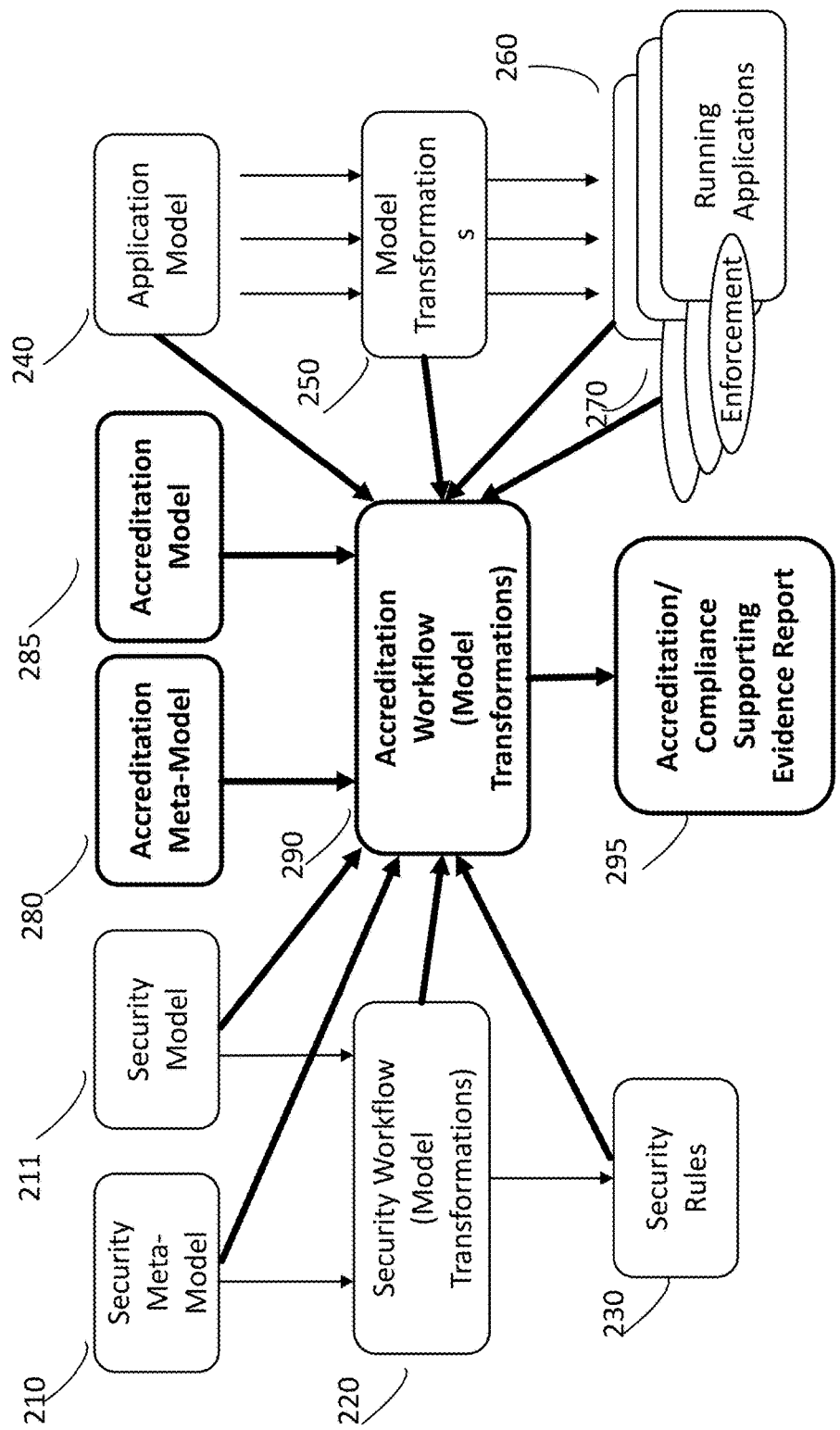
FIG. 2 illustrates a block diagram describing operation of a model-driven security accreditation system according to an embodiment of the MDSA Patent.

The present application includes numerous aspects that allow the implementation of an MDS System (a model-driven security system that includes MDS and MDSA) that meets numerous useful requirements, some of which include:

1. Flexibility, Broad Applicability:
   more flexible in terms of supported Policy Function Features (PFF), including attributes, calculations, and other services (e.g. mapping services)—as the present application involves: metamodeling; PFF refinement, optionally automatically matched (e.g. for attributes and rule elements); metadata (or meta-data), and plug & play replaceability of PFF (e.g. attribute/calculation/mapper services) etc.
   more flexible in terms of supported policies and policy rules as the present application involves: Policy Structure Features (PSF), including e.g. policies, rules, and rule elements; PSF refinement, optionally automatically matched; metamodeling etc.
   more flexible editor, which will (optionally) automatically adjust the available choices (e.g. policy rule elements, attributes) based on the metamodels and metadata
   flexible configuration of other security components (possibly on several layers of the technology stack of a Protected SoS node) than the PDPs and PEPs of the MDS System.
   flexibility with respect to the kinds of policies supported. The MDS System can be used to manage many non-functional system properties, including (but not limited to) security (including access control), safety, quality (esp. quality of service, robustness), efficiency and performance (esp. availability), audit and control, compliance/accreditation etc.

2. Expressiveness, Broad Applicability, Relevance
   Support for advanced security policies with non-conventional (RBAC, ABAC, IBAC etc. are conventional) features, policies, policy rules, policy rule elements, attributes, calculation functions, and results. Examples include proximity-based access control (PBAC), device or software process health based attribute based access control (PHABAC), Vector-Based Access Control (VBAC), Relationship-Based Access Control (RsBAC), Cross-Layer Access Control (XLAC), RAdAC, ZBAC etc. Embodiments of the present application for PBAC, PHABAC, VBAC, RsBAC, XLAC, as well as ABAC and RBAC, are presented.
   Support for policies based on risks/threats 3. Automation, Adaptivity
   Support for automated editor configuration (as discussed above)
   For "attribute refinement" (an example of "PFF refinement"), automatic matching of available attribute, calculation, and mapping services (three examples of PFFs) with required attribute, calculation, and mapping services, using the metamodel and metadata
   For "rule refinement" (an example of "PSF refinement"), automatic matching of available policies, rules or rule elements (three examples of PSFs) with required policies, rules or rule elements, using the metamodel and metadata.
   Support for semi-automated (assisted) or automated policy management, e.g. based on behavioral analysis, rule analysis, etc.

4. Extensibility/Reuse
   Support for flexible addition/modification of PFFs (e.g. attribute services, calculation services, mapping services), using service metamodels and service metadata; resulting in flexible/automatic modification of PFF refinement (e.g. attribute refinement)
   Support for addition/modification of policy refinement templates, rule refinement templates, rule element refinement templates etc. (three examples of PSF refinement templates) and templates for attribute refinement, calculation result refinement, mapping refinement etc. (three examples of PFF refinement templates); resulting in flexible/automatic modification of refinement.
   Reusing such services and templates as much as possible when calculating refinements (both PFF and PSF).
   Flexible addition/modification of Policy Decision Points (PDP) and Policy Enforcement Points (PEP), and other MDS System components.

5. Effectiveness
   Support for security decisioning/enforcement using other security technology components than the PDPs/PEPs of the present application.
   Support for decisioning/enforcement across multiple such other security technology components (for access control policies, called "cross-layer access control", XLAC, in this specification 6. Usability/Manageability/Simplification (Reduced Complexity)

Automatic presentation of the desired/required (e.g. simplest, most generic/human-centric) policy authoring options in the self-configuring editor; using automatic PFF/PSF (e.g. attribute/rule) refinement Automatic refinement to technically enforced rules and configurations 7. Traceability, Reduced Error Potential, Facilitated/Faster C&A/Compliance Provide a basis for automatic, traceable analysis and evidence generation as to whether the enforced policy matches with Certification & Accreditation (C&A) or compliance requirements. This is viable because of automated refinement processes and associated metamodels & metadata (described in the MDSA patent).

Aspects/Components of the MDS System

The MDS System according to the present application includes the following aspects, each of which will be discussed hereinafter:

Technical components and component configurations

Policy Editor Details (incl. automatic editor configuration)

Proximity-Based Access Control (PBAC), Relationship-Based Access Control (RsBAC), and Vector Based Access Control (VBAC)

"Other Security Components" configuration, such as Cross Layer Access Control (XLAC)

Policy functions such as Attribute Refinement (an example of a policy feature functions)

Policy functions such as Rule Refinement (an example of a policy structure functions)

Predictive assistance for policy authoring

Risk and attack detection

Automatic detection of systems

Automatic system configuration and integration of services

MDS for graph databases

Access control based on device/process "health" ("PHA-BAC")

Cryptographic protection of sources (e.g. attributes)

Finer-Grained Resource Labels

Redaction & Filtering

Business Process Model (BPM) based rules

History based policies and attributes

Selective distribution of rules

Numerous examples

TERMINOLOGY

The following terms are used in this specification as follows:

"MDS System": This term may be used to describe the system configured using some or all of the various components according to some or all of the presented configurations of the present application.

"Protected SoS": This term may be used to describe the System of Systems (SoS) that is protected using the MDS System according to the present application. In some embodiments, the Protected SoS may be a networked, interconnected system or application landscape with Policy Enforcement Point (CMP-PEP) components installed at some layer of the technology stack on each node of the Protected SoS. A "Protected SoS node" may be one system or application of the overall Protected SoS.

"Component", "Configuration": Components may be the architectural feature set components (prefix "CMP-") that can be selected for the MDS System. Each component can be its own physical device (e.g. a processing device with connectivity to the other components, for example across a network). A component can also be a piece of software residing on its own processing device, or several components residing on the same processing device, or one component can be distributed across several processing devices. For consistency, the different feature sets of components may simply be referred to in a generalized form as "components", and the communications between components may be referred to in a generalized form as "information flows" (e.g. transmitted across a networking device, transmitted by a processor within one computing device). Configurations (prefix "CFG-") may be interconnected configurations of Components. The disclosure of this application is not limited to exactly the described components. Rather, components may be defined with respect to their features, rather than their particular incarnation. In other words, described components can be combined into compounded components, or can be split into smaller sub-components. Therefore, many different physical implementations of the present application may be possible, and the present application does not limit the way it is implemented (as long as the present application is at least partly executed by a machine). Configurations may be architectural configurations for some or all of the components described. Therefore many different physical implementations of the embodiments according to the present application may be possible, and this application does not limit the way the embodiments may be implemented as long as the MDS System is partially or fully executed by a processing device. The configurations may not limit the order of the information flows between components, as long as the information is produced and made available by components by the time it is consumed by the receiving component. In other words, those skilled in the art may consider that numerous orderings of detailed steps through the embodiments of the present application may be possible, as long as the overall information flows between the components occur. These configurations can be seen as categories of particular embodiments of the present application. It is also noted that the presented configurations of the embodiments of the present application are therefore not just one specific embodiment each, but many potential embodiments with the described features, actions, inputs, outputs etc.

"Policy Feature Function" (PFF), available policy feature function, required policy feature function, policy feature function refinement, policy feature function refinement template: Policy Feature Function may refer to certain policy features characterized by their portion in the metamodel and/or metadata. Policy feature functions form parts of policies. Policy feature functions may include, but are not limited to, attribute source services CMP-ASS, calculation services CMP-CS, and mapping services CMP-MS (described below). Policy feature functions are for example used by the MDS System to determine one or more refinement chains, and to generate policy rules and/or configurations. "Available policy feature functions" are policy feature functions that are machine-enforceable (i.e. implemented/supported by the MDS System). For example, an existing mapping service that can be called by a PDP to map an attribute to another attribute may be called an "available policy feature function". "Required policy feature functions" are policy feature functions that are either desired policy feature functions in the policy editor, or required input(s) into other policy function features. Policy feature function refinement transforms one or more policy feature functions into one or more policy feature functions using one or more policy feature functions refinement template. PFFs are for example used (e.g. by CMP-AEC) for configuring selectable policy choices in the policy editor: Examples of selectable PFFs are for example all "available PFFs", or all "required PFFs" that are at the same time "available PFFs" (the latter may be a subset of the former).

"Policy Structure Function" (PSF), available policy structure function, required policy structure function, policy structure function refinement, policy structure function refinement template: Policy Structure Function may refer to certain policy features characterized by their portion in the metamodel and/or metadata. "Available policy structure functions" (i.e. machine-enforceable) may be hard-coded in the MDS System. Available "policy structure functions" may be the basic machine-enforceable policy and rule structure (e.g. Policy Definition Language, PDL). For example, basic available "policy structure functions" for a rule element would be (in pseudo-notation): "(input_attribute <calculation_function> comparison_value)==Boolean", "(input_attribute1, input_attribute2, <calculation_function>proximity_comparison_value) ==Boolean"). For example, basic available "policy structure functions" for a rule would be (in pseudo-notation): (rule_element1)=TRUE: ALLOW", "(rule_element1) AND (rule_element2)==TRUE: (ALLOW, DENY, LOG)" etc. For example, basic available "policy structure functions" for policies would be "(try rule1); if no match try next rule; if no rules matched, apply default rule (deny)", "interactions coded in application software: ALLOW". "Policy structure functions" are used by the MDS System to determine one or more (policy/rule/rule-element) refinement chains, and to generate policy rules and/or configurations. "Policy structure functions" are also used to configure the policy editor. "Policy structure functions" may include, but are not limited to policy structure, policy rule structure, policy element structure. "Required policy structure functions" are policy structure functions that are either desired policy structure functions in the policy editor, or required input(s) into other policy structure features, mappers, calculations etc. Policy structure function refinement transforms one or more policy structure functions into one or more policy structure functions using one or more policy structure functions refinement template. PSFs are for example used (e.g. by CMP-AEC) for configuring selectable policy choices in the policy editor: Examples of selectable PSFs are for example all "available PSFs", or all "required PSFs" that are at the same time "available PSFs" (the latter may be a subset of the former).

There can also be mapper services for PSFs, analogously to mapper services for attributes and calculations: The difference is that PSF mapper services take PSFs (e.g. rule elements) as inputs and return different PSFs. PSF mappers may for example assist in carrying out PSF refinement (effectively implementing a PSF refinement template) or policy decision-making (effectively refining a PSF into a decision, e.g. TRUE/FALSE).

"Policy Function": This term is used as an umbrella term for Policy Feature Functions and Policy Structure Functions. The difference between PFFs and PSFs can be characterized in lay terms in the following example: Suppose a policy consists of one rule, which consists of one simple rule element and an action (in pseudo-notation):

IF (requestor.identiy=="Ulrich Lang") then ALLOW".

The PFFs in this policy rule are "requestor.identity" (which may be obtained from an attribute service CMP-ASS), the calculation function "==" (equals) (which may be a built-in standard string comparison function, the result value "Ulrich Lang" (in this case a string of characters), and an "ALLOW" action. It is noted that, depending on the flexibility regarding actions (and calculations), it may also be possible to interpret actions and standard calculations as PSFs.

The PSF in this policy is the policy itself (not depicted), its rule structure:

IF<rule element>==TRUE: <action>

And its rule element structure within the rule (here only one simple rule element consisting of attribute, calculation, and value):

IF (<attribute><calculation><value>)==TRUE then <action>"

As can be intuitively seen, PSFs pertain to certain policy features related to the structure of policies (e.g. policies, rules, rule elements), while PFFs pertain to certain policy features that may be inserted into the "placeholders" (e.g. attributes, calculations, mappings, result values, actions) in the structural features.

Both PFFs and PSFs can be refined using mapping services (CMP-MS) and/or refinement templates. In an embodiment, PFFs are often refined using mapping services, while PSFs are often refined using templates. It is noted that mapping services and/or refinement templates can also map or refine, respectively, combinations of PFFs and PSFs (e.g. mapping both PSF and PFFs of an input into a PSF/PFF output).

It is noted that the term policy function is not limited to rules but may for example also include configurations (related to CMP-OSC).

"Attribute Refinement" (an example of "Policy Feature Function Refinement", which refines at least one PFF to at least one other PFF) may refer to the semantically correct mapping of attributes to other attributes, for example from identities to roles, or vice-versa. Such attribute refinement can be carried out by a Mapping Service (CMP-MS) (which may be characterized by a "refinement template"). One purpose of attribute refinement is to transform between "available attributes" (i.e. which machines can obtain and calculate policy decisions) and "required attributes" (i.e. which users wish to use for authoring policies)—or vice-versa. Attribute refinement steps (and thus mapping services) can be layered (into one or more refinement chains) to allow for flexibility, reuse and replaceability—for example, from geolocation to country, and then from country to power block (USA, EU etc.). Mapping services can be automatically and flexibly stacked and configured based on security policy models and other information source models (e.g. city neighborhood—to—polygon mappers). In addition, mapping services may associate the information they provide with decision operations, ensuring a correct handling of information semantics. It is noted that other services such as calculation services may also be refined in the same way (although semantically and syntactically matching calculation services inputs and outputs may be more complex).

It is noted that the term "services" may be used broadly to describe certain components of the MDS System that can provide/implement functionality and may be flexibly added, replaced, modified, removed etc. In some cases, "services" are externally provided components, while in other cases, services are internally provided (e.g. a CMP-PEP stripping attributes out of the request message and passing them on to CMP-PDP; or e.g. a rule element decision-making service as part of CMP-PDP). Examples include attribute services, calculation services, mapper services, rule element evaluation services etc.

Generally, a purpose of PFF and PSF refinement is to transform—potentially in iterations (refinement "chains", "paths", "layers") between available PFF/PSF and required PFF/PSF, respectively. The transformation is done by using a PFF or PSF refinement template that transform input PFF/PSF into output PFF/PSF. Several refinement templates can be stacked if the inputs of each layer match with the output of the next refinement template used in the refinement chain.

In an embodiment, refinement chain(s) (e.g. of attributes, using one or more mapping services) can be stored as a refinement template (e.g. attribute refinement template) for use during rule generation (or configuration generation) and automatic editor configuration. In lay terms, for example, all refinement chains determined by analyzing information about attribute services and mapper services captured in the metamodel can be written back into the metamodel as (potentially new) attribute refinement templates. Or, for example, all refinement chains determined by analyzing information about the chain of matching inputs and outputs of all refinement templates (e.g. PFF/PSF refinement templates) can be written back into the metamodel as (potentially new) refinement templates. This is facilitates for example the optimized generation of machine-enforceable rules and/or configurations.

In an embodiment the results of a refinement chain calculation are stored, e.g. by marking PFF/PSF (e.g. attribute) as "available" because a refinement chain from a PFF/PSF (that was not "available") to another "available" PFF/PSF has been calculated, thus making the previously not "available" PFF/PSF "available". This facilitates for example the automatic editor configuration with available (or available and at the same time required) PFFs/PSFs. It is noted that combinations of templates and/or "available" markings/associations can be used.

"Calculation Refinement", "Mapper Refinement" (examples of "Policy Feature Function Refinement", see below). "Calculation Refinement" may refer to the semantically and syntactically correct mapping of calculations to other calculations, using a refinement template. This may involve refining the calculation result value(s) using calculation refinement template(s). In some cases, this may involve refining all of the calculation's inputs (e.g. input attribute(s)) and outputs (e.g. calculation result(s)). Similarly, "mapper refinement" may refer to the semantically and syntactically correct mapping of mappings to other mappings, using a refinement template.

"Metamodel" (or "Meta-model") may define the language and processes from which to form a model. Metamodeling may be the construction of a collection of "concepts" (things, terms, etc.) within a certain domain. A model may be an abstraction of phenomena in the real world. A metamodel may yet be another abstraction, highlighting properties of the model itself. Meta-models may be closely related to ontologies. Both are often used to describe and analyze the relations between concepts, and to express additional semantics of existing information. The metamodel may capture the semantic relationships between policies and their constituent parts, including (but not limited to) attributes/ mappers/calculations, and mapping templates (policies, rules, rule elements etc.). There are many ways to structure the metamodel to best meet the requirements. For the sake of simplicity, the present patent application inclusively uses the term "metamodel" to avoid listing many overlapping terms that have a similar purpose. The use of this term does not limit the application to the use of one particular kind of metamodeling approach (e.g. the Object Management Group's). Also, similar information modeling concepts such as ontologies, semantic web, semantic wiki, semantic databases etc. can be used, as long as syntax and semantics can be flexibly captured. To make the document more readable, all these approaches are collectively referred to as "metamodel". A metamodel in the MDS System may include some or all of the information required for the MDS System's components to work, for example: entities and their semantic associations for: PFFs (e.g. attributes, calculations, mappers, actions etc.), PSFs (e.g. policy structure, rule structure, rule element structure etc.), "available" associations for PFFs and/or PSFs (e.g. indicating machine-enforceability), "required" associations for PFFs and/or PSFs (e.g. indicating selectability in the editor, input into calculation functions etc.), refinement templates (e.g. transformation templates, associations between PFFs/PSFs), metadata references, metadata itself, semantic descriptors, associations between information elements etc.

It is noted that metamodels are themselves models—the term metamodel signifying that the model describes another model (in the present application, the term model is simply used to refer to information, i.e. any kind of information can be considered a model). In lay terms, one exemplary way to understand and implement the CMP-MMR metamodel and model repository could be simply as an "information repository" that holds various information entities as well as relationships that signify certain semantics about (and between) those information entities.

"Metadata" (or "Meta-data"): In this application, the term "metadata" may be used to refer to information about individual services (including for example attributes, mappers and calculations). It is noted that many different standards and approaches could be used to capture metadata, and this application is not limited to one particular metadata standard. In some embodiments, metadata mainly concerns the syntactic and technical integration information about services, such as the service's network location, application interface, supported data types etc. An example of service metadata is the W3C's Web Service Definition Language (WSDL) standard and another example is Object Management Group's Interoperable Object Reference, or IOR). In some embodiments, the metadata can also specify the service semantics in terms of the metamodel. Metadata could be provided by each service directly (as is the case with WSDL & IORs) and (potentially automatically) collected centrally, or could be captured centrally for all services by an administrator. The end result is the same, which is that there is a metadata information repository that describes the syntactic/integration information for all available services in relation to the semantic metamodel. It is noted that metadata and metamodels, and other relevant information stored the MDS System can be stored (in any suitable data structure, e.g. modeling tools, relational/triple-store/graph databases, files etc.) together, or in any combination of separate storages.

"High-level policy", "Undistorted": In the more advanced configurations of the MDS System, policies may be authored at a high-level model layer, based on the language (Domain-Specific Language, DSL) defined in the metamodel. These high-level policies may be expressed using entities (concepts, words, policy elements, attributes etc.) that are based on how humans think about the policy, rather than how the MDS System ultimately enforces them. In particular, high-level policies are expressed "undistorted", i.e. independent from the underlying technical details of the Protected SoS, MDS System, attributes etc. The OMG consortium's MDA (omg.org/mda) calls this "undistorted by idiosyncrasies of the technology platform or platforms on which it will be implemented". Attributes used to express high-level policies may be called "high-level" attributes, and the same term "high-level" can be used for all PFFs/PSFs, e.g. for "high-level policies".

"Low-Level", "machine-enforceable" "Policy", "Rules", "Rule Elements": In the more advanced configurations of the MDS System, authored high-level policies may be automatically transformed into the matching low-level rules (low-level policies), using model-driven security. Low-level policies are characterized by the fact that they may be machine-enforceable by the MDS System runtime. Low-level policies often include individual policy rules, which are made up of rule elements that are combined (using e.g. AND, OR), and if the entire rule evaluates "TRUE", the stated action is carried out (e.g. ALLOW, DENY, LOG). Attributes used to express low-level policies are called low-level attributes.

A policy function may be called machine-enforceable (a term related to "available") if it can be implemented/supported by the MDS System, for example by CMP-ASS, CMP-MS, CMP-CS, CMP-PDP, CMP-MDS etc. A policy function may be called "directly machine-enforceable", meaning the MDS System can decide/enforce the policy function without executing a refinement process (e.g. by obtaining attributes from a CMP-ASS). A policy function may also be called "refined machine-enforceable", meaning the MDS System can decide/enforce the policy function only by refining the policy function to another directly machine-enforceable policy function. A policy function may also be called "not machine-enforceable" if it may be refined machine-enforceable, or not refined machine-enforceable, but not directly machine-enforceable.

"Available", "Required" (e.g., "available attributes", "required attributes", "available calculations", "required calculations", "available mappings", "required mappings", "available policy feature functions", "required policy feature functions", "available policy structure functions", "required policy structure functions"): Available and required attributes may be categorized in the metamodel. Available attributes are attributes that are available to the MDS System (e.g. at runtime decision-making or at rule generation time). For example, an attribute is available if an attribute service provides attribute values, or if one or more mapping services yield a mapped attribute based on an attribute provided by an attribute service CMP-ASS (described below). Required attributes may be attributes that policy authors wish to author policies with. In many cases, required attributes are the highest level (i.e. most abstract/generic/undistorted) attributes available, either directly if they are not refined, or the highest mapping if they are a refined attribute. In other cases, all available attributes (direct and all layers of all available refinements) are required attributes. In an embodiment, the attributes made available in the policy editor are the intersection of required and available attributes, i.e. only the ones policy authors are interested in authoring policies with, but of those only the ones that are actually available (directly or mapped). The terms "available" and "required" are used in a similar fashion for calculations: Available calculations are calculations that are available to the MDS System, and required calculations may be calculations that policy authors wish to author policies with. The terms "available" and "required" are also used in a similar fashion for the umbrella term "policy feature functions": Available policy feature functions are calculations that are available to the MDS System, and required policy feature functions may be policy feature functions that policy authors wish to author policies with.

The terms "available policy structure function" (e.g. "available rule elements", "available rules", "available policies") and "required policy structure function" (e.g. "required rule elements", "required rules", "required policies") may be analogous to available/required attributes, but related to policy structure function (PSF) refinement and templates. For example: available rule elements (a PSF example) may be all rule elements directly available by the MDS System (i.e. can be used in machine-enforceable rules), and all mapped rule elements made available by mapping templates (for which all attributes are also available, and can thus also be used in machine-enforceable rules); required policy rule elements (a PSF example) may be the rule elements policy authors actually want to author policies with, such as the most mapped/generic/undistorted rule elements, or all rule elements on all layers.

"Rule Refinement" (an example of "Policy Structure Function Refinement", which refines at least one PSF to at least one other PSF) may refer to the semantically correct mapping of, for example, policies, rules, and/or rule elements (i.e. parts of rules) to other policies, rules, and/or rule elements (examples of PSFs). For example, a rule "requestor is within a percentage proximity of the resource" (assuming it is not readily machine-enforceable) could be refined to a machine-enforceable rule using a "rule refinement template". For example, the requestor's task's temporal proximity is within 24 h of the resource's timestamp". A rule refinement template may refine an input into an entirely different output, e.g. one input rule element into several output rule element (e.g. "proximity percentage" to time window and operational task proximity"). A rule refinement template may also refine a policy into a completely different rule or rule element (e.g. "only allow the interactions explicitly specified in the functional model" gets refined into individual access rules between MDS System nodes.

"Refinement", "Refinement Paths": Refinement templates in general (e.g. for PFFs and PSFs) may be stacked into refinement chains if each template's outputs match the inputs of the next template in the refinement chain. In an embodiment, refinement template chains end with available PFFs and/or PSFs as outputs (e.g. machine-enforceable rule elements, attributes, calculations etc.), and as the chain of refinement templates is traversed, at the other end have desired PFFs and/or PSFs as inputs (e.g. high-level policy), e.g. "required" PFFs and/or PSFs. This way, the refinement template chain (which may be automatically constructed by CMP-MMR or CMP-MDS can be used to trefine the inputs (e.g. high-level policy) into outputs (e.g. machine-enforceable rules).

It is noted that refinement chain(s) may be determined on-the-fly by CMP-MDS during rule generation, or may be pre-determined (by CMP-MMR or CMP-MDS) prior to rule generation and e.g. stored as new refinement template options (e.g. in the metamodel). Such stored refinement template paths can be used for automatic editor configuration and/or rule generation.

The present application describes several feature components of MDS System embodiments (i.e., CMP-ASS, CMP-CS, CMP-MS, CMP-MMR, CMP-MDR, CMP-PAP, CMP-PDP, CMP-PEP, CMP-PE, CMP-AEC, CMP-RSC, CMP-MDS, CMP-PSV, CMP-OSC, CMP-FDS, CMP-PMR, CMP-PPG, and CMP-RAA), which can be interconnected in various configurations. Not all components need to be present in the MDS System, and in fact the selection of MDS System components to be implemented depends on the desired features.

The present application is not limited to exactly the described boundaries between components. Rather, components may be defined with respect to their features, rather than their particular incarnation. In other words, described components can be combined into compounded components, or can be split into smaller sub-components. Therefore, many different physical implementations of the present application may be possible, and the present application does not limit the way it is implemented (as long as the present application is at least partly executed by a machine).

Each component can be its own physical device (e.g. a general-purpose or dedicated/embedded computing device with connectivity to the other components, for example across a network). A component can also be a piece of software residing on its own computing device, or several components residing on the same computing device, or one component can reside across several computing devices.

In general, any device, capable of implementing a finite state machine that is in turn capable of implementing the abovementioned features of the components of the MDS System, can be used to implement the components of the MDS System. Processors may include any kind of device and/or combination of devices that can implement the invention, including but not limited to, for example, microprocessors, FPGAs, electronic circuits, etc. Furthermore, it is noted that "memory" or "storage device" may include any machine-readable medium, including for example hard disk, volatile memory, solid state memory, a remotely accessed networked processing device, hard-coded information stored in software and/or hardware etc.

Figure 63:
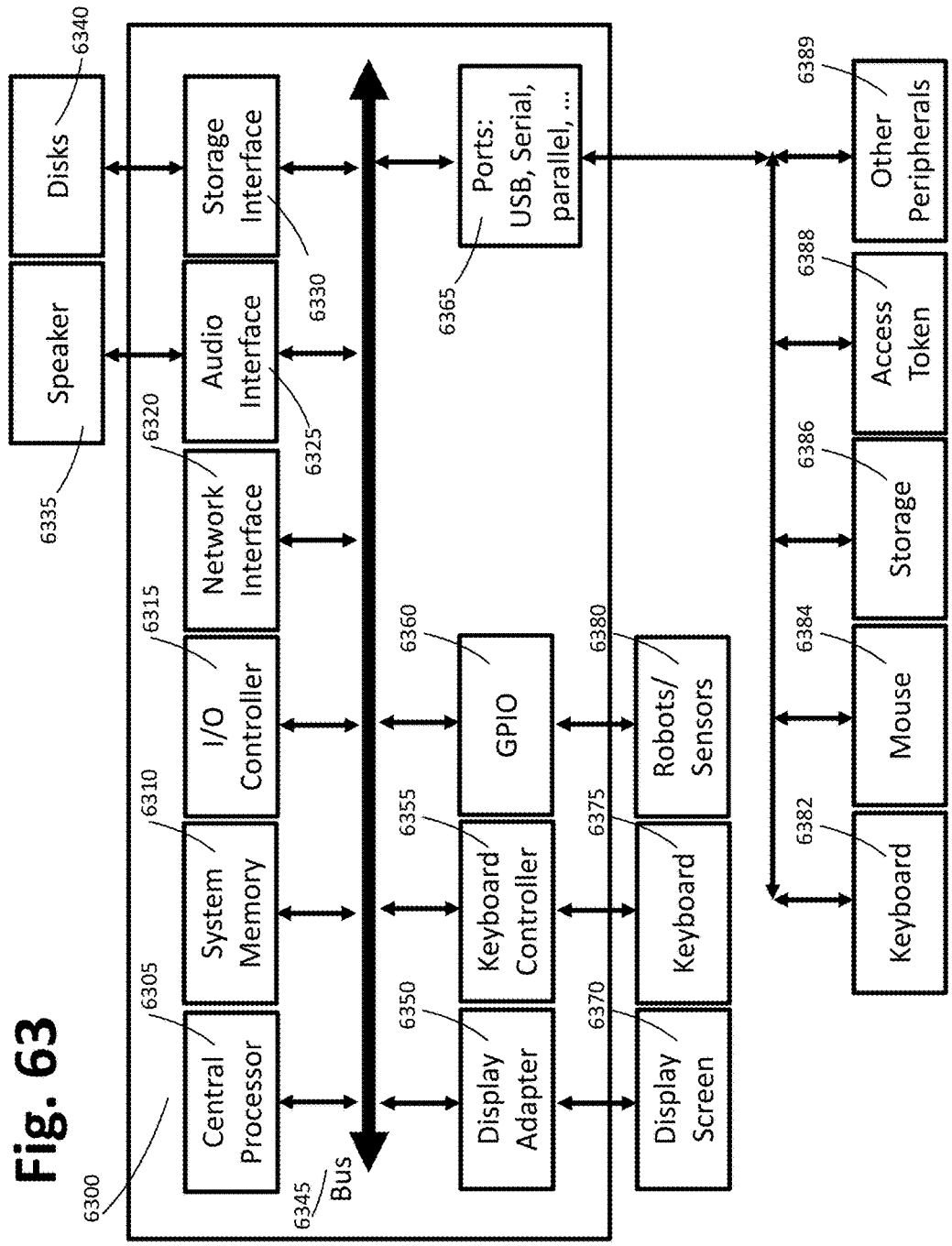
FIG. 63 illustrates a block diagram of a processing device according to an embodiment.

For example, a processing device, distinct hardware circuits, or a special purpose processing device: Each of the units and elements of the various exemplary embodiments of the MDS System outlined in the present application can be implemented as portions of one or more suitable programmed processing device. In the various exemplary embodiments outlined in the present application, combinations or parts of MDS System components can be implemented using a programmed processing device. Such a processing device can be small and with minimal features (e.g. Raspberry Pi™), e.g. for implementing embedded devices or Internet of things (IoT) devices. FIG. 63 is a block diagram illustrating an example of a processing device 6300 which may be used as an embodiment of the present patent application. The components of the MDS System can be implemented as system 6300. For example, system 6300 may be implemented as part of server device, client device, or gateway device. In one embodiment, system 6300 may include a memory, a second interface to receive data from one or more other processing systems 6300 that implement other MDS System components. Note again that a system 6300 can implement a single MDS System component, several MDS System components, or parts of one or more MDS System components. Referring to FIG. 63, system 6300 includes a bus 6345 to interconnect subsystems of system 6300, such as a processor 6305, a system memory 6310 (e.g., RAM, ROM, etc.), an input/output controller 6315, and maybe a network interface 6220, a speaker 6335 (connected via audio interface 6325), a storage interface 6330 connecting storage disks 6340 (e.g. hard drive, solid state drive, CD, DVD, floppy), a display screen 6370 via display adapter 6350, a keyboard 6375 (interfaced with a keyboard controller 6355), electronics (e.g. robots, sensors and actuators) 6380 via General Purpose I/O (GPIO) 6360, and ports 6365 (e.g., USB, parallel, serial, SD Card slot, FireWire) that connect devices such as keyboard 6382, mouse 6384, storage devices 6386, security access tokens 6388, and other peripherals (e.g. USB storage, modems) 6389. Furthermore, bus 6345 allows data communication between central processor 6305 and system memory 6310. System memory 6310 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with processing device 6300 are generally stored on and accessed via a medium readable by the processing device, such as a hard disk drive (e.g., fixed disk, floppy disk, optical drive 6340), or other storage medium. Storage interface 6330, as with the other storage interfaces of processing device 6300, can connect to a standard medium readable by a processing device for storage and/or retrieval of information, such as a fixed disk drive 6340. Fixed disk drive 6340 may be a part of processing device 6300 or may be separate and accessed through other interface systems (e.g. other processing devices 6300 via network interface 6320, or storage 6386 interconnected via ports 6365, e.g., USB). Network interface 6320 may provide a connection to other remote processing device 6300. Network interface 6320 may provide such connection using wireless techniques, including digital cellular telephone connection, a packet connection, digital satellite data connection or the like. Network interface 6320 may provide such connection using a fixed network (e.g. Ethernet).

The functionality of components stored in memory 6310 can be processed by a central processing unit 6305, abovementioned physically distinct hardware, or other any known or later-developed devices or systems for processing component functionality. Alterable portions of the memory 6310 may be, in various exemplary embodiments, implemented using static or dynamic RAM. However, the memory can also be implemented using a media executable by a processing device, such as a floppy disk and disk drive, a writable or rewritable optical disk, disk drive, such as a hard disk drive, flash memory or the like. The generally static portions of the memory may, in various exemplary embodiments, be implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like. The I/O Controller 6315 may be any known or later-developed device or system (e.g. a chip, an expansion card, or a stand-alone device) for connecting the units and elements of the various exemplary embodiments of components with a peripheral device. This may be a link between two parts of a processing device or a controller on an external device that manages the operation of (and connection with) that device. The bus 6345 may be any known or later-developed device or system for connecting the units and elements of the processing device 6300.

Many other devices or subsystems (not shown) may be connected in a similar manner (e.g., document scanners, digital cameras and so on). Conversely, all of the devices shown in FIG. 63 need not be present to practice the techniques described herein. The devices and subsystems can be interconnected in different ways from that shown in FIG. 63. The operation of a processing device such as that shown in FIG. 63 is readily known in the art and is not discussed in detail in this application. Code to implement the gateway operations described herein can be stored in storage media readable by a processing device such as one or more of system memory 6310, or a disk 6340. The operating system provided on processing device 6300 may be MS-DOS®, MS-WINDOWS®, OS/2®, UNIX®, Linux®, or another known operating system.

Alternatively, each of the units and elements of the various exemplary embodiments of the MDS System outlined in the present application can be implemented as physically distinct hardware circuits within an ASIC, or using FPGA, a PLD, a PLA or a PAL, or using discrete logic elements or discrete circuit elements. For example, each MDS System component can be implemented using a separate FPGA board, or a separate chip (hardware circuit), which may for example be useful for high-assurance implementations of the MDS System.

Each of the units and elements of the various exemplary embodiments of the MDS System outlined in the present application can also be implemented using a special purpose processing device, a programmed microprocessor or microcontroller and peripheral integrated circuit elements, and ASIC or other integrated circuit, a digital signal processor, a hardware electronic or logic circuit, such as a discrete element circuit, a programmable logic device (e.g. Arduino), such as PLD, PLA, FPGA or PAL, or the like.

Moreover, the various exemplary embodiments of the MDS System outlined in the present application and/or each of the various units and elements discussed above can each be implemented as software routines, managers, objects etc. executing on a programmed processing device, a special purpose processing device, a microprocessor or the like. In this case, the various exemplary embodiments of the MDS System and/or each or the various units and elements discussed above can each be implemented as one or more routines embedded in the communication network, as a resource residing on a server, or the like. The various exemplary embodiments of the MDS System and the various units and elements discussed above can also be implemented by physically incorporating the MDS System device into software and/or a hardware system, such as the hardware and software system of a web server or a client device.

Users interact with the user-facing components (esp. CMP-PE, but also admin interfaces to most other components) via e.g. a display screen, keyboard, mouse, touch screen, sensors/actuators. In the processing device 6300 shown in FIG. 63, a display screen 6370 (e.g. touch screen), keyboard 6375 or 6383, mouse 6384, speech interface via speaker and microphone (e.g. Apple Siri, Amazon Echo), and other USB controllers (e.g. virtual reality goggles, robotic sensors/actuators, printers) are usually available. Systems with distinct hardware circuits and special purpose processing devices often have more specific user-facing features, such as Light Emitting Diodes (LEDs) or lights, small LCD displays (e.g. Parallel Alphanumeric 16×2 LCD Display for Arduino, 2.8" display with 320×240 16-bit color pixels and a resistive touch overlay for Raspberry Pi), or audio controls (e.g. speech recognition).

The MDS System components can be interconnected in various configurations (e.g. the presented configurations CFG-1-CFG-11) to implement architectural embodiments of the MDS System. Depending on which MDS System components are implemented as distinctive devices, there can be communication links between the implemented components. For example, the arrows depicted in FIGS. 9-19 illustrate some of the communication links between the depicted components. Communication links may be any known or later-developed devices or systems for connecting the MDS System components.

If one or more components, or parts of a component, is implemented using the processing device 6300, communication links between MDS System components implemented using other processing devices 6300 can be network connections via the network interface 6320. Communication links via network interface 6320 may be a direct cable or bus connection, a connection over a wide area network or local area network, a connection over an intranet, a connection over the Internet, or a connection over any other distributed processing network. Further, it should be appreciated that communication links via network interface 6320 can be wireless connections over a network. The network can be a local area network, a wide area network, an intranet, the Internet, or any other known or later-developed other distributed processing and storage network or communication mechanism. If distinct hardware circuits or a special purpose processing device has a network interface, such a network interface be used to implement communication links between MDS System components.

If one or more components, or parts of a component, is implemented using a processing device 6300, communication links between MDS System components on that processing device 6300 can be implemented via the bus 6345 (e.g. connecting attached devices), via the system memory 6310 (e.g. communicating via shared memory), or via the disk storage 6340 (e.g. communicating via shared data, such as files or databases). If one or more components, or parts of a component, is implemented using distinct hardware circuits, circuit board traces with an agreed protocol (e.g. serial encoding) can be used to implement communication links between components (e.g. different hardware chips on the same circuit board).

The particular form each of the circuits and elements of the various exemplary embodiments of the MDS System outlined in the present application will take is a design choice and will be obvious and predictable to those skilled in the art.

Therefore, many different physical implementations of the embodiments according to the present application may be possible, and this application does not limit the way the embodiments are implemented. The configurations may not limit the order of the information flows between components, as long as the information is produced and made available by components by the time it is consumed by the receiving component. In other words, those skilled in the art may consider that numerous orderings of detailed steps through the embodiments of the present application may be possible, as long as the overall information flows between the components occur. These configurations can be seen as categories of particular embodiments of the present application. It is also noted that the presented configurations of the embodiments of the present application are therefore not just one specific embodiment each, but many potential embodiments with the described features, actions, inputs, outputs etc.

Technical Components and Component Configurations

This section introduces various components of the present application. The terms "component" and "information flow" have already been defined above in the "Terminology" section. Many embodiments of the present application can be constructed using various configurations of numerous technical/architectural components. The following describes 17 technical/architectural components that interact according to 11 preferred embodiments (configurations of those components). It is noted that not all components or configurations need to be part of the embodiments according to the present application, but that permutations of subsets may also be considered as part of the embodiments of the present application.

The following components are described in the following:

COMPONENT "CMP-ASS": Attribute Source Services (PIPs)
COMPONENT "CMP-CS": Calculation Services
COMPONENT "CMP-MS": Mapping Services (Attribute Refinement)
COMPONENT "CMP-MMR": Metamodel & Model Repository
COMPONENT "CMP-MDR": Metadata & Service Metadata Repository
COMPONENT "CMP-PAP": Policy Access Point (PAP) (Policy Rule Repository)
COMPONENT "CMP-PDP": Policy Decision Point (PDP)
COMPONENT "CMP-PEP": Policy Enforcement Point (PEP)
COMPONENT "CMP-PE": Policy Editor
COMPONENT "CMP-AEC": Automated Editor Configuration (Model-Driven Security)
COMPONENT "CMP-RSC": Automatic MDS Runtime System Configuration (Model-Driven Security)
COMPONENT "CMP-MDS": MDS Access Rule Generation (Model-Driven Security)
COMPONENT "CMP-PSV": Policy & MDS System Verification (Model-Driven Security Accreditation)
COMPONENT "CMP-OSC": Other Technology Component Security Configuration
COMPONENT "CMP-FDS": Functional Description Sources
COMPONENT "CMP-PMR": Policy Monitoring Point (central incident collector/aggregator)
COMPONENT "CMP-PPG": Predictive (Assisted) Policy Generation
COMPONENT "CMP-RAA": Risk and Attack Detection/Analysis/Prediction COMPONENT "CMP-ASS" (Attribute Source Services (also sometimes called Policy Information Points (PIPs)): These architectural components, which may be categorized as an example of a "Policy Feature Function" (PFF), provide attribute values. It can be implemented as a standalone data source service that takes a request—usually from a CMP-PDP—(e.g. get current time) and provide a result (e.g. current time). Many of the most important attributes, however, are extracted from the access request, e.g. request message context, the accessor network session & security session, the request message context etc. In such cases, the attribute service acts rather an interface to the attribute "extractor" (e.g. by an ABAC system) from the message. For example, the accessor user role attribute service provides the accessor role as a result. Attribute sources have a certain interface (i.e. how to technically connect to it), a data type (i.e. how is the attribute value syntactically constructed), and semantics (i.e. what does the meaning of the attribute value signify). Ideally attribute sources are reused, and are maintained by other stakeholders that have to maintain the relevant information anyway. This helps offload some of the complexities of managing the MDS System, helps minimize duplicate effort, and minimizes the error risk because those other stakeholders are likely more qualified in managing those information sources anyway. For example, HR systems manage often job roles, ERP systems often manage tasks etc.

COMPONENT "CMP-CS" (Calculation Services): In general, calculation services, which may be categorized as an example of a "Policy Feature Function" (PFF), may calculate some operation(s) on one or more input attributes and a result comparison value. Calculation services can provide calculation specific operators if the semantics of the calculation(s) required specific operators. In PBAC embodiments specifically discussed later, these architectural components provide distance results between two provided attribute values, potentially using mathematical functions (e.g. geometric), or internally drawing on other calculation data sources (e.g. an org chart graph, criminal social network graph etc.). Ideally such calculation sources are reused, and are maintained by other stakeholders that have to maintain the relevant information anyway. This helps offload some of the complexities of managing the MDS System, helps minimize duplicate effort, and minimizes the error risk because those other stakeholders are likely more qualified in managing those information sources anyway. For example, logistics systems may already manage the information required to calculate business process proximity.

Calculation services may have a certain interface (i.e. how to technically connect to it), a data type (i.e. how is the attribute value syntactically constructed), and semantics (i.e. what does the meaning of the attribute value signify). In general (beyond PBAC), calculation services differ from mapping services (CMP-MS) in that they may also offer calculation specific operators. In an embodiment, the operators can be specified (in the policy rule) as an additional input into the calculation. Mapping services, in contrast, take usually one attribute and return another mapped attribute (or several input attributes are turned into other attributes). Embodiments such as the authors' OpenPMF technology have numerous standard operators built in (e.g. equality, greater-than, less-than etc.). As a complex example, a temporal proximity calculation service could support many complex calculation specific temporal logical operators, such as "the first time window must start prior to the second time window, and the time windows must overlap less than the specified hours".

COMPONENT "CMP-MS" (Mapping Services (for "attribute refinement", also sometimes called "transformers")): These architectural components, which may be categorized as an example of a "Policy Feature Function" (PFF), may map a provided attribute's values to another (usually related) attribute's value, potentially using mathematical functions (e.g. geometric), or internally drawing on other calculation data sources (e.g. an org chart graph, criminal social network graph etc.). As an example, street addresses can be mapped to geospatial location by a mapper service. Mapper services also may have a certain interface (i.e. how to technically connect to it), a data type (i.e. how is the attribute value syntactically constructed), and semantics (i.e. what does the meaning of the attribute value signify).

Ideally mapping sources are reused, and are maintained by other stakeholders that have to maintain the relevant information anyway. This helps offload some of the complexities of managing the MDS System, helps minimize duplicate effort, and minimizes the error risk because those other stakeholders are likely more qualified in managing those information sources anyway. For example, project management systems may already manage information used to map identities to associated tasks.

In this application, the term "attribute refinement" (which is an example of a PFF refinement) may refer to the semantically correct mapping of attributes to other attributes, for example from identities to roles, or vice-versa. Such attribute refinement can be carried out by a Mapping Service (CMP-MS). One purpose of attribute refinement is to transform between "available attributes" (i.e. which machines can obtain and calculate policy decisions) and "required attributes" (i.e. which users wish to use for authoring policies)—or vice-versa.

Attribute refinement steps (and thus mapping services) can be layered to allow for flexibility, reuse and replaceability—for example, from geolocation to country, and then from country to power block (USA, EU etc.). Mapping services can be automatically and flexibly stacked and configured based on security policy models and other information source models (e.g. city neighborhood—to—polygon mappers). In addition, mapping services may associate the information they provide with decision operations, ensuring a correct handling of information semantics.

It is noted that it is possible to interpret calculation services CMP-CS as attribute mapping services, and vice-versa. Both (which are examples of PFFs) take some input attribute(s) and provide some output(s) that are compared to a result comparison value using some operator that is supported for the attribute types and/or result values. One differentiator is that calculation services can provide their own set of operators used by the CMP-PDP to decide the rule element with the calculation service.

It is noted that the present application is not limited to mapping services for attributes, but may include other mapping services between PFFs (and/or PSFs), e.g., example, calculation mappers, mapper mappers, etc.

COMPONENT "CMP-MMR" (Metamodel & Model Repository): This architectural component provides the "semantic glue" between the various information, components, services etc. (esp. PFFs/PSFs such as attribute source services, attribute mappers, and calculation services). It may process and store a metamodel (or other suitable data structure) to achieve this purpose. One main purpose of the metamodel is to facilitate the matching selection of inputs and outputs of PFFs/PSFs (e.g. attributes, mappers, and calculations) based on their semantics. The metamodel and model form a vital input into CMP-MDS, the automatic MDS system configuration, and the automatic policy editor configuration.

Figure 3:
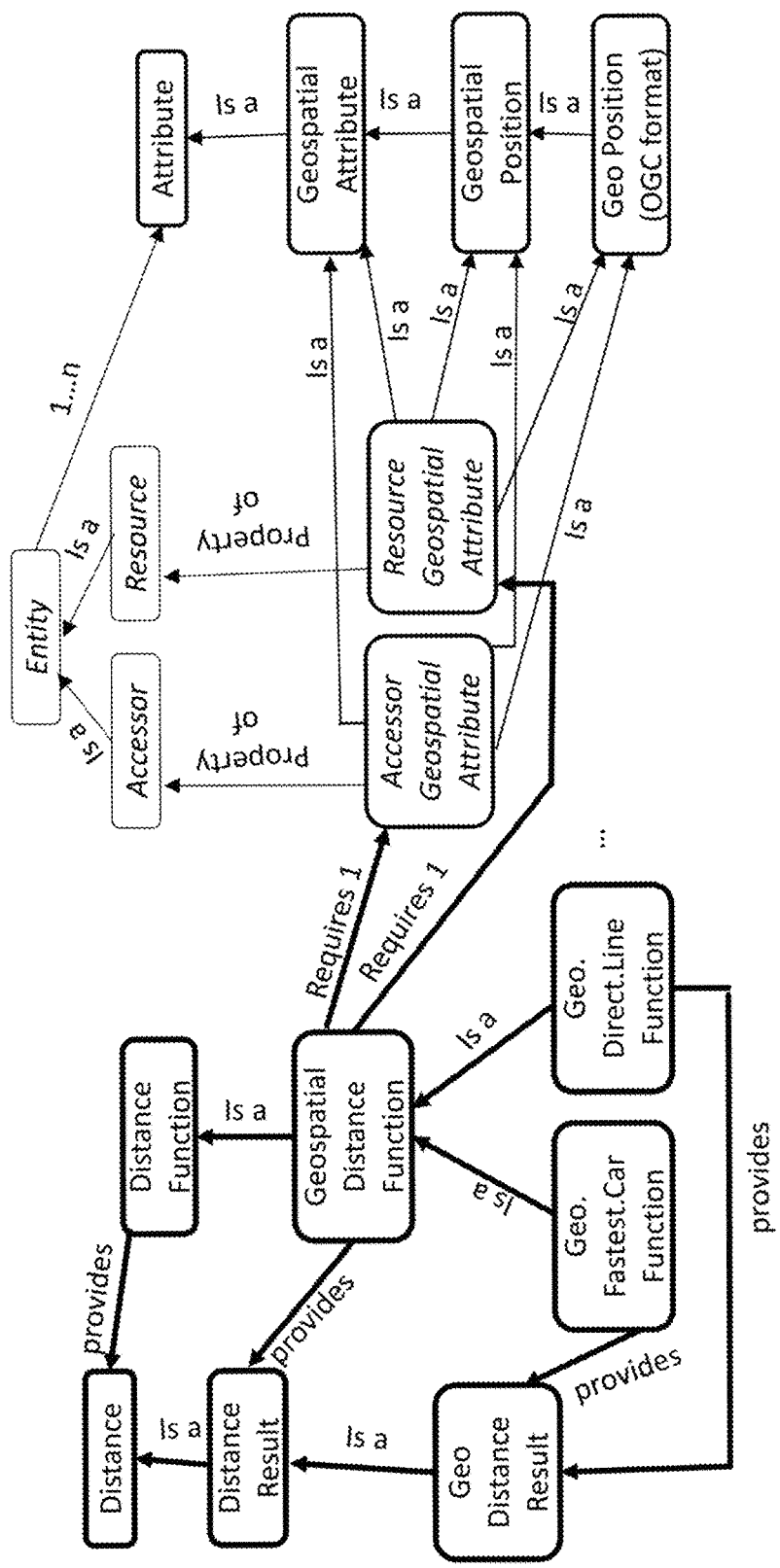
FIG. 3 illustrates a partial metamodel sketch of a model-driven security system according to an embodiment.
Figure 4:
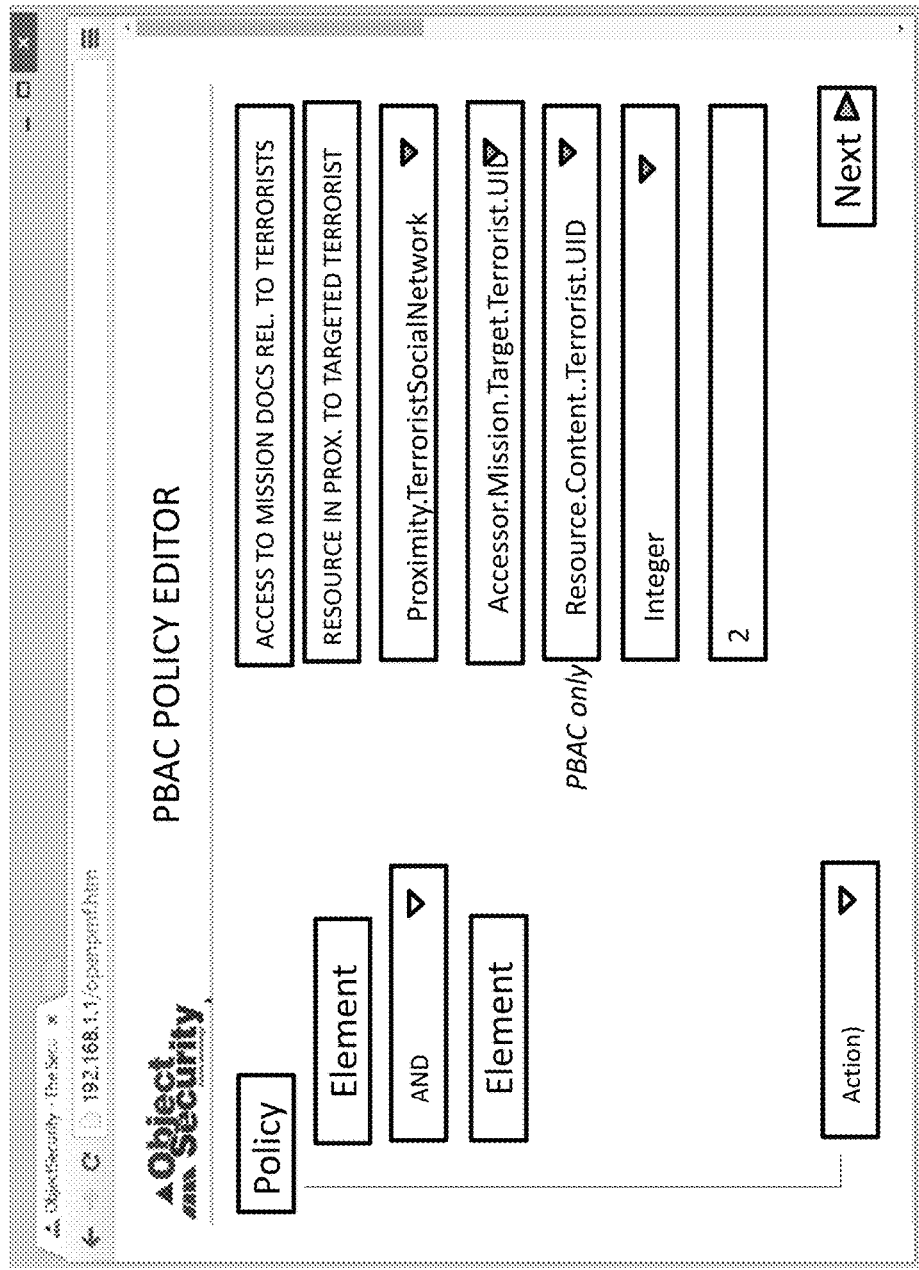
FIG. 4 illustrates a screen capture of a policy editor with pull-down menus according to an embodiment.
Figure 5:
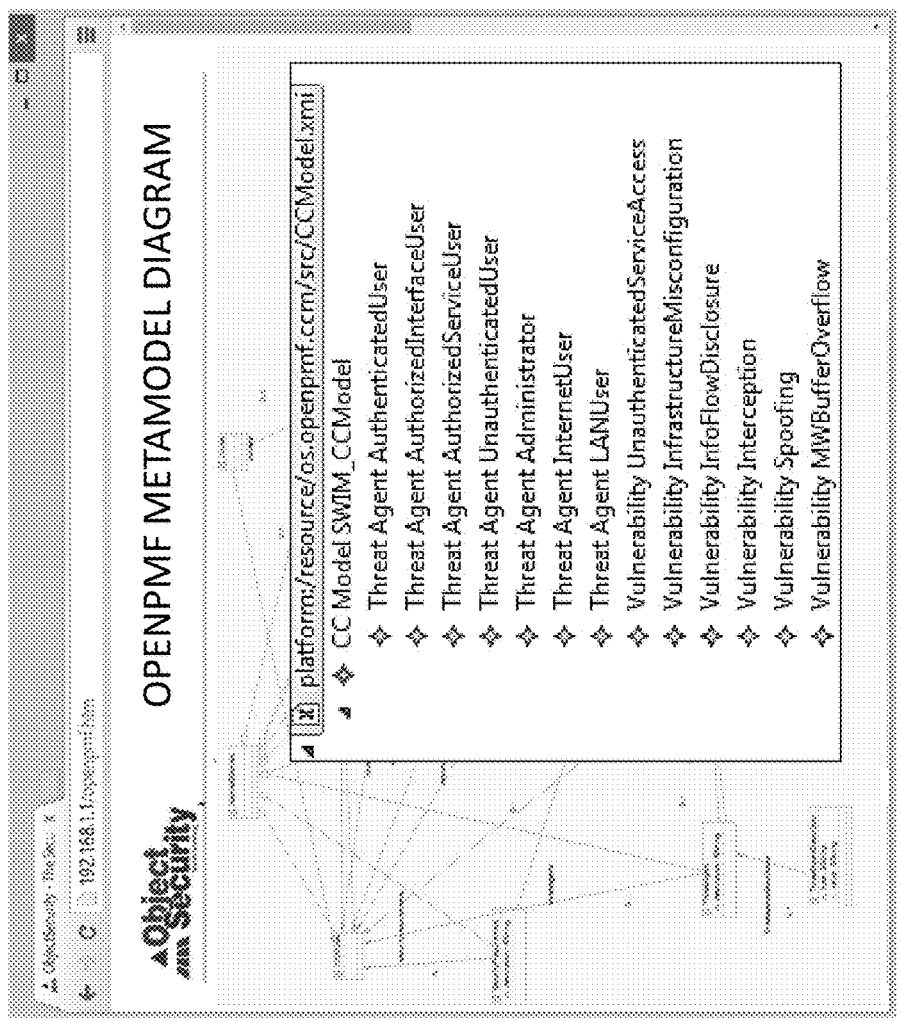
FIG. 5 illustrates a screen capture of a policy editor with policy metamodel/model editing features according to an embodiment.
Figure 7:
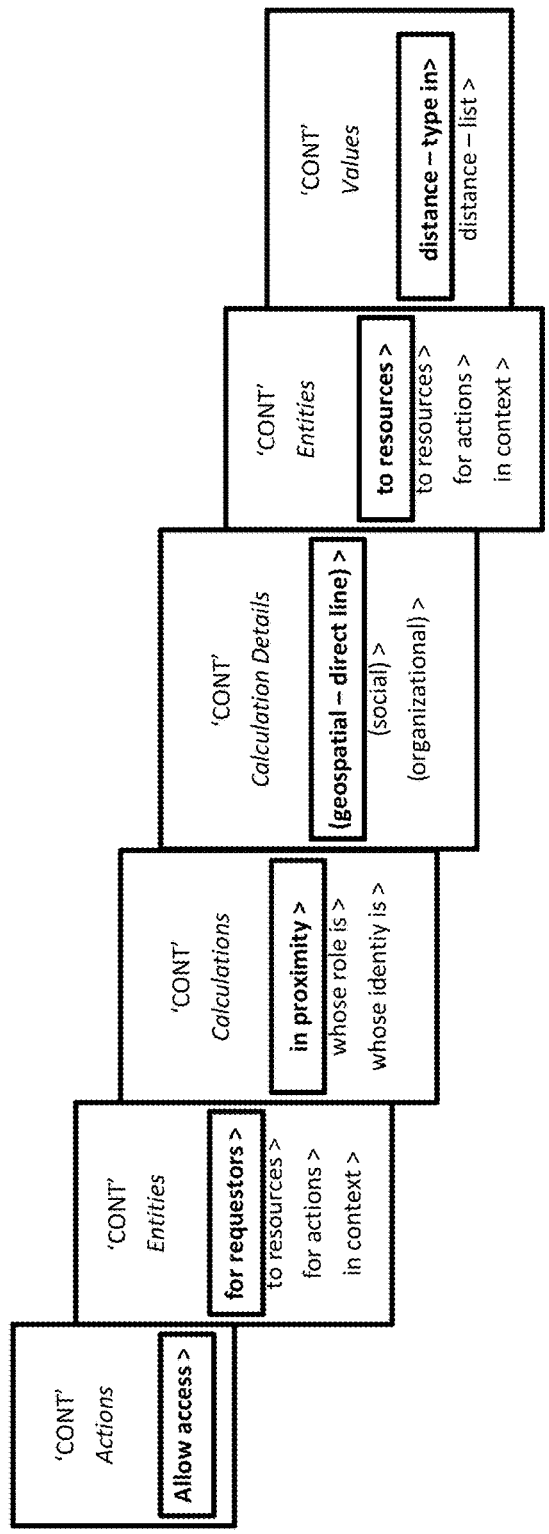
FIG. 7 illustrates a depiction of a policy editor with non-menu-based natural language editing features according to an embodiment.

FIG. 3 (which is explained further below) illustrates an exemplary block diagram of an (intuitive, but imprecise) metamodel sketch which captures the available PFFs attributes, mappers, and calculations in relation to the semantics defined by the metamodel (different line thicknesses and fonts are used to illustrate different semantic parts of the model). It is noted that this metamodel sketch is by no means complete—the metamodel may capture many other kinds of information used in the MDS System, for example required PFFs, available PSFs, and available PSFs, references to metadata, metadata itself, refinement templates, mapping information, refinement chain(s) (paths) etc.

In one embodiment, the metamodel needs to be manually specified and potentially manually extended if new e.g. policy elements or services (e.g. attribute, calculations, mappers etc.) become available. However, if the metamodel is based on a well-structured "bootstrap metamodel" that is known system-wide and potentially extensible, the extension points should be semantically evident. This enables the MDS system to automatically add/modify/remove information about parts of policies (e.g. PFFs and PSFs) or services in the semantically correct nodes of the model. For example, if a new geospatial attribute becomes available for an accessor, its related metamodel portion will specify which elements of the bootstrap metamodel it inherits (e.g. "geospatial accessor attribute", depending on how the metamodel is exactly structured). In such embodiments, each service component (e.g. for PFFs and/or PSFs)—for example attributes, calculations, mappers—may provide their own portion of the metamodel to the central metamodel repository, which initially only includes a basic structuring of data and semantics to "bootstrap" the metamodel, and which adds discovered/provided new portions of the metamodel to the basic bootstrap metamodel, thus automatically extending the metamodel as new service components (e.g. for PFFs and PSFs) are added to the MDS System, and removing entities from the metamodel as service components (e.g. for PFFs and PSFs) are removed from the MDS System.

The metamodel and the model could for example be captured, stored, and processed in e.g. Eclipse EMF using e.g. the MOF or e.g. Ecore meta-metamodel standards, and made persistent using e.g. OMG XMI.

COMPONENT "CMP-MDR" (Metadata & Service Metadata Repository): In this application, the term "metadata" is used to refer to information about individual services (which for example provide PFFs and PSFs, including e.g. attributes, mappers and calculations). One main purpose of the metadata is to allow the technically matching selection of inputs and outputs of services (e.g. PFF/PSF) based on their syntax. In some embodiments, the metadata can also specify the service semantics in terms of the metamodel (such metamodel fragments may be inserted into the metamodel).

In some embodiments, the metadata and repository also form a vital input into the automatic MDS System (e.g. PBAC) system component configuration, including MDS System's runtime, MDS system's model transformation engine etc. It may also form a vital input into the automated configuration of security features (and other features) of underlying technology components, such as operating systems, virtual machines, network interfaces, middleware, applications, databases etc.

Metadata could be provided by each service (e.g. PFF/PSF) directly (as is the case with WSDL & IORs) and collected centrally, or could be captured centrally for all services by an administrator. The metadata may be automatically generated (as is the case for e.g. WSDLs & IORs) or manually specified. The relation to the semantic metamodel may need to be manually specified for each service (e.g. PFF/PSF), for example by the individual service provider or by the MDS System integrator).

It is noted that many different standards and approaches could be used to capture metadata, and this application is not limited to one particular metadata standard. In some embodiments, metadata mainly concerns the syntactic and technical integration information about services, such as the service's network location, application interface, supported data types etc. An example of service metadata is the WSDL standard and another example is OMG IOR. The metadata could for example be captured, stored, transferred, and processed in e.g. Eclipse using e.g. EMF and e.g. XMI.

The end result is the same, which is that there is a "metadata repository" that describes the syntactic/integration information for all available services (e.g. PSF/PFF) in relation to the semantic metamodel. It is noted that both the metadata and the metamodel could be stored together, or separately.

COMPONENT "CMP-PAP" (Policy Access Point (PAP)): A Policy Access Point (CMP-PAP) component is simply a policy rule repository, which holds machine-enforceable rules and transmits them to the PDPs where the rules are relevant. In an embodiment of the MDS System, the PAP receives (potentially, but not necessarily, all) the machine-enforceable ("low-level") policy rules from the MDS transformation engine, which generates the low-level rules from high-level policies using MDS (described in the background section and in the present application). It is noted that a PAP can in some embodiments also hold specific configurations and code for other security components ("CMP-OSC", described below). It is noted that the definition of PAPs in this MDS System is not limited to ABAC, or a particular ABAC architecture (described in the background section, e.g. OASIS XACML PAPs)—CMP-PAPs can hold any machine-enforceable policy rules, configurations, and even code.

COMPONENT "CMP-PDP" (Policy Decision Point (PDP)). The purpose of CMP-PDPs is to make access decisions. Most access control systems have some sort of PDP feature that determines whether access should be granted or not.

The acronym PDP is commonly used for ABAC systems. A primary role of this example of a PDP is (especially in ABAC) to—based on technical access control rules it has received—parse the rule (made up of PSFs), fetch attribute values (an example of values of PFFs), calculate the relation of those attribute values with the values in the policy using a calculation service (an example of values of PFFs), and finally make the stated decision. ABAC explicitly works like this, but most access control models (often more implicitly) do the same. The PDP functionality is usually (e.g. in ABAC) triggered by a PEP. PEPs and PDPs can be collocated. It is noted that the PDP in this application is not limited to ABAC, or a particular ABAC architecture. Numerous ways of making access decisions may be possible. Examples include role-based, identity-based, authorization token based (e.g. ZBAC), capability based, multi-level security (MLS), direct configuration of security features of underlying technology components such as operating systems, virtual machines, network interfaces, middleware, databases, applications etc.

In most embodiments, the PDP may need to in some way have access to PFFs, in particular calculation functions and the required matching attribute sources (and maybe mapper services). Some examples are presented: In the most basic architecture configurations, the PDP is shielded from the attribute complexities, and simply evaluates a tuple (<calc_fn>, <value>)—the calculation function itself obtains the attribute values. In conventional architecture configurations, the PDP fetches one attribute value for each policy element, invokes a calculation function, and compares the calculation result with the comparison value in the policy—a triple (<attr>, <calc_fn>, <value>). In PBAC embodiments, PDPs need to support policies based on quadruples (<attr1>, <attr2>, <calc_fn>, <value>), i.e. calculate the distance value (result) between two attributes attr1 and attr2 using the define calculation function. In the other, more elaborate architecture configurations below, the PDP acts as a central hub that processes the access rule, fetches attribute values, calls attribute mappers, calls calculation functions, compares the calculation result with the value in the policy, and grants/denies access.

It is noted that this application is not limited to the presented examples, and in many embodiments, PDPs may decide policy elements using PDP-internal or external attribute services, calculation services, mapping services, and other templates. While in some definitions, PDPs do not themselves obtain attributes (e.g. in (e.g. OASIS XACML, this may be done by a "Context Handler"), the present application does not distinguish such components (this functionality implemented together with the PDP or separately). Therefore, conceptual PDP components in this specification obtain information and make decisions.

It is noted that the access rules processed by the PDP need to be machine-enforceable ("available"), i.e. manifested by some technical implementation of PFFs (e.g. attribute sources, calculations, results, mappers etc.) and/or PSFs (e.g. rule element structure, rule structure, policy structure).

COMPONENT "CMP-PEP" (Policy Enforcement Point (PEP)): PEPs usually enforce the access decision, and often also trigger the access decision-making (and often fetch some attributes, e.g. from the message context). In most access control systems, the PEPs act as guards interposed in the access path, which can intercept access requests and trigger the PDP functionality. After the PDP has reached an access decision, the PEP enforces that decision by either allowing or denying the access request (and/or maybe triggering other actions such as logging, filtering/redaction etc., potentially based on specific policies such as logging policies).

It is noted that PEPs in this application are not limited to ABAC, a particular ABAC architecture, access control policies or security policies.

As stated above, PEPs and PDPs can be collocated. In many use cases, there are many PEPs collocated with the protected resources (in a single logical or physical device) or at other strategic locations (e.g. perimeter), acting as an access control proxy.

COMPONENT "CMP-PE" (Policy Editor): The policy editor architectural component allows users to manage (author etc.) policies. A critical feature of the policy editor (in more advanced architectures) is often to be flexible and extensible with respect to PFFs and PSFs, such as policies, calculations, attributes, mappers, policy structure, rule structure, rule element structure; and to dynamically configure the layout and available choices based on input from CMP-AEC (described below).

This can be implemented in numerous ways, e.g. using pull-down menu wizards, constrained (e.g. menu-based) languages, models (textual or graphical) etc.

FIG. 4, FIG. 5, FIG. 6, and FIG. 7 depict various exemplary configurations and screenshots to illustrate a few possible concrete editor embodiments that could be selected to implement the embodiments of the present application.

Many different editor visualizations and design details may be possible (examples depicted above), including embodiments where the editor meets one or more of the following features:

1) The policy editor may allow specification of high-level policy rules using the semantic and syntactic constructs that match the metamodel (see below) of the "high-level policy" (as defined in the MDS patent). In lay terms, the editor must support the authoring of high-level policies.

2) The policy editor may "constrain" the possible editing choices, by only offering "available" semantic and syntactic constructs, i.e. supported by the underlying metamodel and/or metadata, and the services that provide PFFs/PSFs. In lay terms, the editor must only allow the authoring of supported high-level policies (i.e. for which "low-level rules"—as defined in the present application and in the MDS patent—can be generated and machine-enforced.

3) The policy editor may dynamically adjust dependent on the supported semantic and syntactic constructs (discussed below in the "Automated Editor Configuration" section), e.g. PFFs and PSFs.

4) The policy editor may "constrain" the possible editing choices, by only offering "required" semantic and syntactic constructs (e.g. PFFs and PSFs) that are also "available". In lay terms, the editor only offers features that are defined as desired or needed ("required"), and that can at the same time be machine-enforced (i.e. often a subset of "available").

5) The policy editor may allow the raw editing of policies, for example: editing of high-level policy models and the metamodels in CMP-MMR directly; or editing of the machine-enforceable rules in CMP-PAP directly.

COMPONENT "CMP-AEC" (Automated Editor Configuration): The policy editor may only provide the selection of actually available PFFs and PSFs, for example attributes (& mapped attributes), calculations, and distance values. The policy editor may only provide the selection of required PFFs and PSFs that are at the same time actually available PFFs and PSFs.

In basic embodiments, this may be easy to implement for a static, fixed set of hard-wired PFFs/PSFs, e.g. calculations and attributes (in one embodiment).

In other more advanced embodiments, a more elaborate implementation may be needed if PFFs/PSFs, e.g. calculations and attributes, are not fixed/hard-wired, and if flexible extensibility has to be supported. In this case, either ongoing manual maintenance is required, or the editor can be configured using model-driven approaches. In the more advanced configurations described below, the metamodel and metadata allow the automatic determination of which PFFs/PSFs, e.g. calculations and attributes, are available (and which, in some embodiments, are also required at the same time) and can be chained together, and should be selectable to express policies. It also allows the automatic determining of the allowable types for result values (which is an example of PFFs).

For example, the illustrative diagrams showing example approaches in the CMP-PE section above can could implemented in a way that auto-configures (using CMP-AEC) the editor based on the metadata/metamodel.

COMPONENT "CMP-RSC" (Automatic Runtime System Configuration of the MDS System): In some embodiments, the metamodel and metadata, together with the policy (model) specified by the user, and the functional system description provided by CMP-FDS (see below) may allow the MDS System to automatically configure the MDS System's runtime (components and configurations).

In embodiments where a functional system description is available, the MDS System can automatically determine the location of PEPs (CMP-PEPs) and PDPs (CMP-PDPs), and can determine the automatic generation of infrastructure specific access rules from generic security policies (as described in the MDS patent).

In embodiments where a functional system description is unavailable, some manual work may still be necessary, because the location of CMP-PDPs and CMP-PEPs may need to be manually determined and configured.

In many embodiments, the orchestration of PFFs (e.g. attribute source services, mapper services, and calculation services), and their interaction with the PDPs can be fully automated because both the semantics and syntax of every PFF service input and output are captured in the metamodel and metadata.

COMPONENT "CMP-MDS" (Model-Driven Security Policy Automation): This model-driven security policy automation component may automatically generate the required technical security rules (esp. access control rules). In certain embodiments, CMP-MDS uses the MDS methods and systems described in the background section (and the MDS Patent) and in the present application, and may form a part of more elaborate MDS (e.g. PBAC) architectures. This process is enabled by the metamodels stored in CMP-MMR, the metadata stored in CMP-MDR, and the policy model (created from the user's selection) stored in CMP-MMR and/or CMP-PE, and other information sources.

Depending on the available "other information sources" (e.g. functional system descriptions, generic requirements models, compliance/accreditation models, PFFs/PSFs etc.), CMP-MDS can bridge a potentially significant gap between the user-facing (via the CMP-PE editor component) generic (high-level) security requirements and the matching technical, specific (low-level) security rules, e.g. access rules decided by CMP-PDPs and enforced by CMP-PEPs.

COMPONENT "CMP-PSV" (Model-Driven Security Accreditation/Compliance (MDSA)): This component may analyze all available models and metamodels, and—in many embodiments based on verification requirements model—may produce a verification result. This component can be executed when the Protected SoS is deployed (e.g. for certification & accreditation such as Common Criteria), or can be executed continually at runtime (e.g. to detect compliance/non-compliance on an ongoing basis for rapid re-accreditation). In many embodiments, model-driven algorithms can check traceability from requirements to enforcement, correct traceability of information flows within the MDS System, traceability of runtime incidents to requirements models etc. In many embodiments, CMP-PSV also detects changes to the Protected SoS or the requirements models, and produces supporting evidence for manual accreditation/re-accreditation. The functionality of this component has been described in the background section and the MDSA Patent.

COMPONENT "CMP-OSC" (Other Technology Component Security Configuration): This component may allow the configuration of other security configurations via a model-driven refinement process based on the methods employed by the CMP-MDS component (for security rule generation). The difference is that instead of rules for CMP-PDPs, CMP-OSC can generate specific configurations for "other security components" (OSC), which often require custom configuration files, configuration commands, source code, binary code etc. This CMP-OSC component may closely interact with CMP-MDS, and in many embodiments CMP-MDS feeds directly into CMP-OSC, which further processes the outputs of CMP-MDS and distributes/configures them within the "other technology component". In other words, in some embodiments, CMP-OSC carries out methods similar to CMP-MDS to generate and distribute configurations, while in other embodiments, CMP-OSC informs CMP-MDS to generate configurations and CMP-OSC distributes those. In yet another embodiment, CMP-MDS autonomously generates the configurations and CMP-OSC distributes them. It is obvious that the described features can be distributed between CMP-MDS and CMP-OSC in various additional ways.

It is noted therefore that the present application is not limited to the generation of security rules (or, even more specifically, access rules)—instead, the present application can also generate specific configurations in the format required by an "other security component" (custom configuration files, configuration commands, source code, binary code etc.)

At the configuration stage, CMP-OSC can connect with the underlying other technology component(s) that will receive the generated security configuration(s). In some embodiments, this is for example done by a human configurer, an automated configuration script, or dynamically generated configuration based on e.g. a discovery service. CMP-OSC can be implemented with an "automatic discovery" feature that automatically detects which one of the security technologies for which CMP-OSC supports automatic (security) configuration are present across the deployed "system of systems", and then automatically configures the connection. As is known to those skilled in the art, many applications, infrastructure components, operating system features etc. can be detected (often remotely) if one knows what to look for.

Of course only technologies supported by CMP-OSC can be connected to. Examples of other security components that may be connected to include MS SharePoint, firewalls, IPS, operating systems (e.g. SELinux, MS Windows), SAP etc.

In an embodiment, CMP-OSC supports Microsoft Windows firewall: It configures firewall rules for each endpoint system firewall on each system that runs a to-be-protected application node. In this example, the configurations are intuitive: whenever CMP-MDS identifies that at least one interaction from one application node to another application node should occur, it will produce a network layer configuration for Microsoft Windows firewall that allows that network connection in the direction required. At the configuration stage, the CMP-OSC connector into Windows firewall is configured so that—during runtime—CMP-MDS & CMP-OSC can configure firewall configurations into Windows (e.g. using remote login and the "netsh" command, which allows setting specific firewall rules with the "remoteip" parameter). At launch-time, the administrator launches CMP-OSC (or CMP-OSC automatically launches), which—based on (1) earlier configuration, or (2) configuration (e.g. dynamic) now connects CMP-OSC with the underlying other technology component(s) that will receive the generated security configuration(s).

Figure 8:
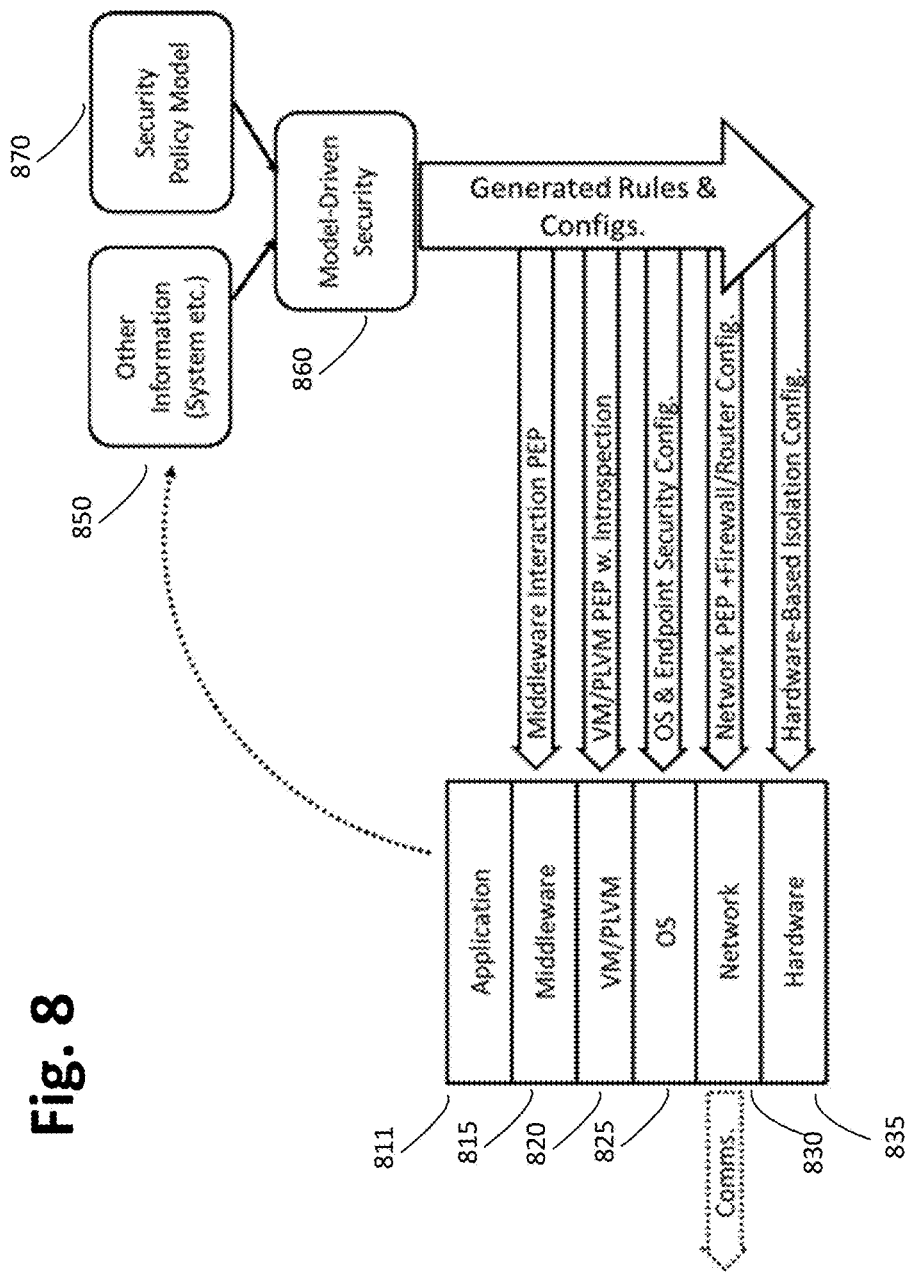
FIG. 8 illustrates a block diagram of Cross-Layer Access Control (XLAC) according to an embodiment.

In an embodiment of the present application, CMP-OSC can be implemented to achieve "Cross-Layer Access Control" (XLAC). As depicted in FIG. 8, XLAC enforces access control at more than one layers of the technology stack on each Protected SoS node (and optionally infrastructure nodes). CMP-MDS (860) and CMP-OSC (not depicted) use models in CMP-MMR (870) and, if applicable, CMP-MDR (not depicted) and CMP-FDS (850), to automatically generate technical configurations for the numerous supported software and hardware layers, including (but not limited to): applications (810), middleware (815), virtual machines (820), including Process Level Virtual Machines (PLVMs), operating systems (OS) (825), cryptosystems (810 815, 820, 825, 830, 835), logging/monitoring systems, networks (830), and hardware (835) (e.g. hardware separation). XLAC has a number of benefits, including: Enabling security enforcement that is more robust, more consistent, higher assurance, more manageable, and based on reusing existing security components. It is noted that while the acronym XLAC implies access control, the application is not restricted to access control policies. It is obvious to anyone skilled in the art that the XLAC approach can be broadly used to enforce other policies, including security policies, availability policies (QoS, throttling), auditing policies, etc.

COMPONENT "CMP-FDS" (Functional Description Sources): This component can provide a "functional system description", i.e. information about the functional features of the Protected SoS, to the MDS System. Examples of such information include software application interfaces, network addresses, instance identifiers, application information, network topology information, system/application interaction information, interaction sequence information, etc. A comparable specific example would be a complete UML specification of an application and its deployment.

In various embodiments, this component may be needed for CMP-MDS, for example in cases where policies relate to functional aspects of the Protected SoS (e.g. network information flows, IT assets/systems/applications etc.). For example, a functional system description may be needed to be able to generate (by CMP-MDS) rules that pertain to applications, programmed interactions, workflows etc. It may also be needed to generate "infrastructure rules", which are rules that control information flows of infrastructure technologies in the Protected SoS (e.g. naming services, registries) with other infrastructure technologies and/or applications. For example, many platform software technologies (e.g. web app servers, CORBA, DDS, DNS etc.) need to have certain communications enabled (e.g. to a name service) by "allow" rules in order to function. Assuming those infrastructure technologies are inferable from the functional system description, infrastructure specific refinement templates can generate specific infrastructure rules, effectively enabling (e.g. allowing) the infrastructure communications of those infrastructure (e.g. ObjectSecurity OpenPMF has infrastructure rule generation templates for various middleware platforms).

Furthermore, in various embodiments, this component may be needed for CMP-RSC, which in various embodiments configures the MDS System's runtime based on a functional system description. This component may also be needed for CMP-OSC, which in various embodiments configures the MDS System's connections to other security components based on a functional system description.

A functional system description may be a principal aspect of many security policies. While today's access control systems frequently appear to work without mentioning any system aspects (e.g. by only talking about accessing users and data resources), there are in fact a lot of implicit system aspects involved in making such policies work. For example: Where is sensitive data stored? Where should the CMP-PEPs be installed? Where should the CMP-PDPs be installed? etc.

In an embodiment, the functional system description for MDS ideally comes from an explicitly specified model, which is ideally specified and maintained by other stakeholders (e.g. developers, SOA architects etc.). For example, application/system Unified Modeling Language (UML) model, Business Process Modeling Notation (BPMN) model etc. However, explicitly specified models for the functional system description are often not available.

Therefore, in another embodiment where no explicit system description is available, it may be possible to automatically determine a functional system description using mechanisms such as asset monitoring, network monitoring etc. This automatic detection of the functional system description is described further below.

The use of functional models has several potential benefits:
   It allows the automatic deployment of the MDS System runtime components (esp. CMP-PDPs, CMP-PEPs, which could be collocated on each Protected SoS node);
   It enables the support of asset-specific security policies by the MDS System (e.g. "anyone from a TS compartment system can access only another TS compartment system").
   It allows the expression of information flow-specific access policies (e.g. "anyone from a TS compartment system can access only another TS compartment system and only through an encrypted connection coming from the intranet").

Figure 67:
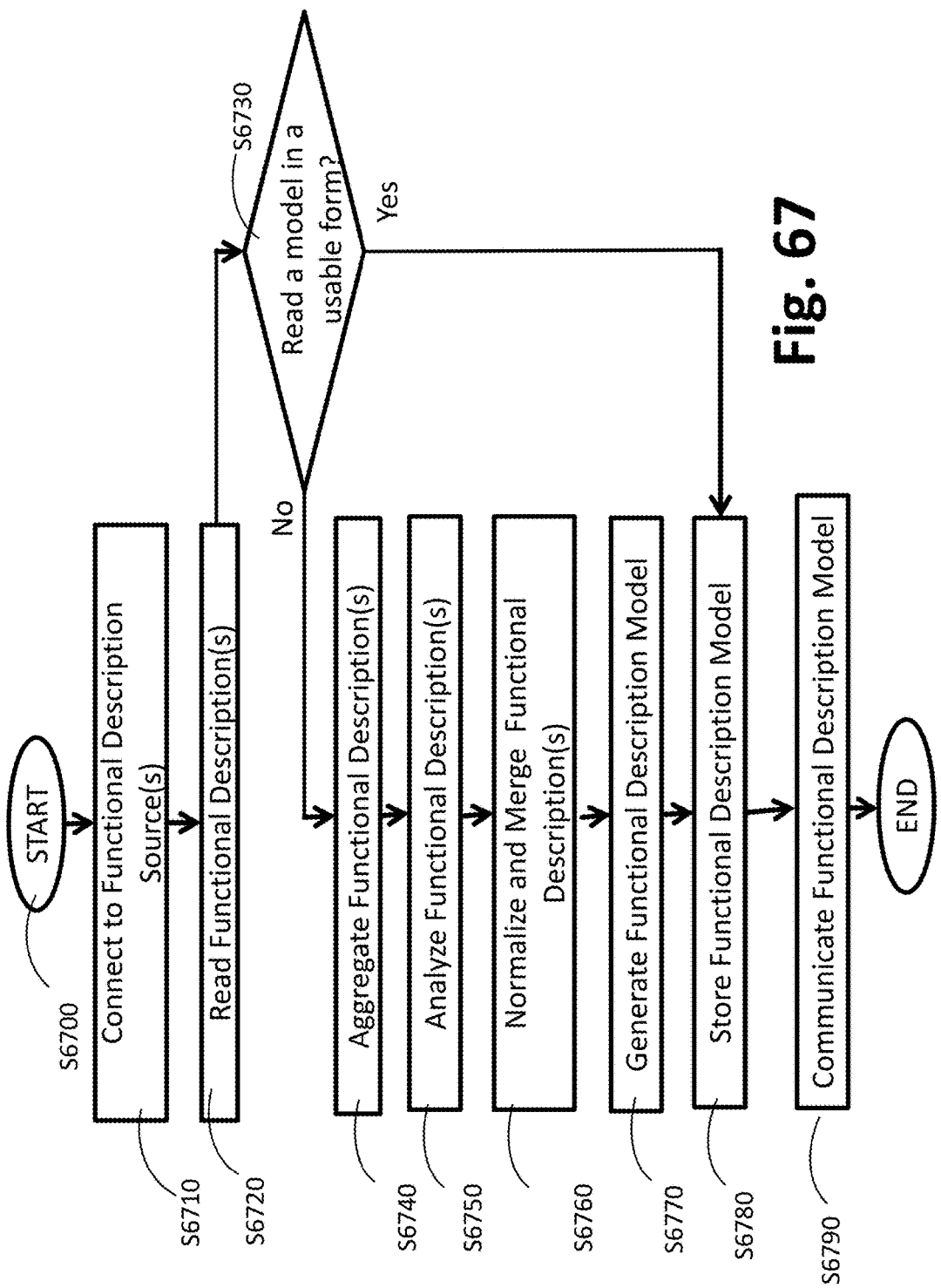
FIG. 67 illustrates a flow chart of functional system description component (CMP-FDS) according to an embodiment.

FIG. 67 illustrates a flowchart the operation of CMP-FDS according to an embodiment: The operation starts (S7600) when explicitly or implicitly triggered (e.g. during rule generation), or may start at periodic intervals, or may execute continuously (i.e. starts again whenever it ends). CMP-FDS (if necessary) connects to the functional description source(s) (S6710). These sources can for example be explicitly configured, automatically discovered etc. Examples of sources include: software models from MDD/MDE tools; models from BPMS tools; automatically detected system and information flow information from e.g. asset monitoring systems, network mapping tools, discovery services (e.g. OMG DDS discovery service); and discovery of supported other security components (to be configured by CMP-OSC). Next, CMP-FDS reads one or more functional description(s) from the sources (S6720), e.g. by reading a storage device, interacting with a system that contains the functional description(s). If the read source(s) are in a readily usable form (S6730), e.g. if it is a manually specified model of the Protected SoS obtained from e.g. a model-driven development or integration/orchestration tool, it will store the functional description model (S6780), and (e.g. when requested by CMP-MDS) distribute the functional description model (S6790). If the read source(s) are not in a directly usable form (S6730), e.g. read from asset monitoring systems, network mapping tools, discovery services, CMP-FDS aggregates the (potentially different kinds of) functional description(s) (S6740), then analyzes the functional description(s) depending on the specifics of the functional description(s) (S6750) to identify which information in the functional description(s) are correlated (e.g. pertain to the same Protected SoS node, pertain to the same interactions etc). It then normalizes and merges the functional description(s) (S6760) in accordance with their correlation, resulting in one functional description that includes the relevant information from the functional description(s) read in step S6720. From this information, CMP-FDS generates (S6770) a functional description model in a form that can be used by the other components of the MDS System (e.g. CMP-MDS, CMP-RSC, CMP-OSC, CMP-PSV etc.). Finally, CMP-FDS stores the functional description model (S6780) to a storage device, and communicates it (S6790) (push or pull) to other components of the MDS System. It is noted that the described operation only illustrates an exemplary operation of CMP-FDS, and that many other similar operations can be implemented (e.g. different order of steps) to achieve an equivalent effect.

COMPONENT "CMP-PPG" (Predictive (Assisted) Policy Generation): This component may create policies for a Protected SoS automatically based on the analysis of existing historic or current information sources, and offer them to the policy authors as potential policy options. The algorithms employed by CMP-PPG can be based on predictive analytics approaches, a scientific field known to anyone skilled in the art.

It is noted that in most embodiments of the present application, this feature may be intended to assist manual policy authoring, or to semi-automate policy authoring, rather than to completely automate policy authoring.

It is also noted that some of the analysis features provided by this component can also be used for statistical purposes (e.g. access statistics, incident statistics, emergent properties etc.).

In one embodiment, predictive (assisted) policy generation is executed prior to runtime of the Protected SoS: CMP-PPG analyzes the available data sources (esp. the ones found in CMP-FDS, CMP-MMR, CMP-MDR, PFFs such as CMP-ASS/CS/MS, PSFs, CMP-PSV), and uses predictive analytics approaches (e.g. analyzing past behavior) to determine potential policies that the policy author may want to enforce in future.

For example, interactions defined in the functional system description (CMP-FDS) can be correlated with information from user login rights on various nodes, and with attributes associated with users. In addition, for example, mining of attributes and mappings to find associations between actors and resources can further provide useful information. Moreover, correlating all information sources with the metamodels and metadata stored in CMP-MMR and CMP-MDR can provide additional information, esp. about how information is related. The predictive modeling algorithm can then (to some extent) predict which access policies (and other policies) may be reasonable to ensure the Protected SoS (the to-be-protected system of systems) functions as specified, while minimizing apparently undesirable information flows and accesses.

As a trivial example, if the functional system description defines an interaction between two nodes, then it is potentially safe to assume that some kind of access policy should be defined that allows the information flow, but potentially only in circumstances "guessed" (by CMP-PPG) by analyzing the various data sources.

It is noted that in many such embodiments, such automatically generated policies are often not readily fit for purpose, and may be partly or completely incorrect. Therefore, one purpose of CMP-PPG is to present those suggested policies and policy changes to the policy author to assist the authoring of the intended policies.

In another embodiment, predictive (assisted) policy generation is executed at runtime. One use of CMP-PPG is the analysis of the data sources available in the present application at runtime over a period of time, which is used for "learning", for example which behaviors, accesses, or information flows are normal, and which accesses are abnormal. In such an embodiment, a policy may be already authored and enforced, and alerts are produced. During the learning period, CMP-PPG (continually or in batch) analyzes information available from CMP-FDS, CMP-MMR, CMP-MDR, CMP-ASS/CS/MS, CMP-PSV, CMP-PMR etc. Predictive analytics approaches (a scientific field known to anyone skilled in the art) are used to determine potential policies that the policy author may want to enforce in future.

In this embodiment, the collected alerts form a critical part of the predictive policy generation. For example, if an interaction between two nodes is specified in the functional system description, and is attempted numerous times, but is blocked every single time, then potentially a policy rule is required that allows the interaction in certain circumstances. The predictive analytics engine can for example analyze the exact timing, nature, context, frequency etc. of each of the blocked access requests, to determine whether there is a pattern. CMP-PGG can then generate a matching potential access rule and present it with supporting information to the policy author. In summary, if anything gets blocked that looks like (to the analytics engine) it should not be blocked, a potential rule could be generated and suggested to the policy author.

In yet another embodiment, CMP-PPG may go even further by analyzing the data being requested and provided. For example, if sensitive data (e.g. payment information, or personal identifiable information, PII) can be found in transmitted data, CMP-PPG can analyze existing policies and data sources and attempt to determine whether this information flow is intended or not. If successful, CMP-PPG can propose a matching policy to the policy author. If not successful, CMP-PPG can still propose a policy that allows the information flow together with supporting information that informs the policy author that this information flow is (for example) happening. The policy author can then decide whether an explicit policy should be added to allow this information flow, or whether it should be blocked going forward. In summary, if anything is allowed that looks like (to the analytics engine) it should be blocked or allowed, a potential matching rule could be generated.

Yet another embodiment facilitates predictive (assisted) policy simplification. CMP-PPG may analyze how policies are enforced at runtime, and use predictive analytics approaches to determine whether a set of policies could be collectively described by a more intuitive, more generic, and/or simpler policy. In an embodiment, CMP-PPG's analytics feature attempts to "reverse-refine" policy rules, i.e. try to find more undistorted policies for sets of authored policies. It can use CMP-MDS's PSF refinement templates (e.g. rule refinement templates), as well as PFF refinement (e.g. attribute refinement) information from CMP-MMR, and other available information: During rule generation, CMP-MDS uses refinement templates to generate detailed rules (and maybe configurations) from generic, undistorted policies; CMP-PPG can try to traverse the template in the opposite direction: If a policy is found, the "merging" (or, for example, generalization) of rules (and maybe configurations) can be presented to the policy author for verification and/or modification.

As an example of access control, if the policy author manually authored numerous "allow" rules between nodes of the "system of systems", and the analytics engine determines that an unqualified "allow" rule exists exactly for each interaction defined in the functional system description, then it can propose a (high-level) policy "allow all interactions defined in the functional system description" instead of the numerous rules.

In yet another embodiment, for risk based predictive (assisted) rule generation, CMP-PPG may use predictive analytics to predicts the risk involved in certain accesses (e.g. determined by the sensitivity of the information disclosed, or the criticality of the asset etc.), and propose rules to mitigate those risks. For example, if—through analysis of available data sources (e.g. CMP-FDS, CMP-MMR, CMP-MDR, CMP-ASS/CS/MS, CMP-PSV, CMP-PMR etc.)— the predictive analytics engine determines very broad access to very critical, sensitive, or regulated assets, it can propose policies that restrict access (e.g. by only specifically granting access to the granted access requests that were observed at runtime, and blocking all others).

COMPONENT "CMP-RAA" (Risk and Attack Detection/Analysis/Prediction): Related to risk assessment (e.g. how likely a user or node is going to be used/involved in an attack), CMP-RAA may use predictive analytics approaches to assess the risk of suspicious behavioral patterns for users/systems/etc. (similar to the ones used for e.g. risk assessment in the insurance industry).

In an embodiment, for attack detection and prediction, CMP-RAA can use well-known "Attack Tree Analysis" (ATA) approaches, for example, to determine whether certain behaviors are signs of emerging or ongoing suspicious behaviors, attacks, risks etc. In this embodiment, CMP-RAA includes attack tree models that capture how known attack patterns unfold. Based on this model, CMP-RAA generates the required number of alerting policy rules (potentially using features from CMP-MDS) and distributes them to CMP-PAP for distribution to CMP-PDPs. The resulting runtime alerts (in addition to other alerts produced by CMP-PDP) are used by CMP-RAA to determine whether any of the steps in any attack trees occur, and to track behaviors through attack trees to find emerging attacks. For example, a policy could state "all requestors are only granted access to resources as long as they are not detected suspicious actors in an attack tree for two consecutive steps in the attack tree". This kind of policy may for example require certain information storage (such as e.g. CMP-ASS attribute source services which are populated by CMP-RAA), that for example contain a list of currently suspicious actors with information about how many consecutive steps in an attack tree have been detected, and supporting information (e.g. which attack tree).

In another embodiment, well-established techniques for "cognitive modeling" may be used to model attack behaviors, to determine whether certain behaviors (determined by CMP-RAA through alerts, as in the previously described embodiment) are signs of an emerging or ongoing suspicious behaviors, attacks, risks etc.

In yet another, simpler embodiment, attack prediction can be based on simpler deciding factors, such as the frequency and nature of alerts/incidents. For example, certain (e.g. frequent) patterns of blocked access requests from certain nodes and/or users, and the implications of the attempted access, can be used by CMP-RAA to predict that an attack is in progress.

In yet another embodiment, CMP-RAA may interact with CMP-PDPs at decision-making time (e.g. through alerts via CMP-PMR) on an ongoing basis to determine whether there are any suspicious patterns or inconsistencies in the attributes fetched for the access decision. For example, if the requestor provides the geospatial position of the requestor's device as part of the request, and the device's geospatial location does not match with the requestor's task's geography, then this could for example be interpreted as a suspicious inconsistency. Similarly, if the provided device geo-location moves inconsistency (e.g. suddenly moves halfway around the globe within a few seconds), then this could be interpreted as a suspicious inconsistency In yet another embodiment, health-based access control (described in the PHABAC access control embodiment in the present application) can be used to detect attacks as they unfold.

It is noted that the present application is not limited to the examples provided, and many established techniques used by e.g. banks, insurances, telecoms, and others can be applied here.

Also it is noted that some of the features provided by this component can also be used for statistical purposes, e.g. access statistics, incident statistics, emergent properties etc.

Architectural Embodiments ("Configurations")

Embodiments of the MDS System may be configured using some or all of the components described above. The following describes numerous embodiments built from useful combinations of the functional components described above. The present application is not limited to the presented embodiments, as many other configurations made up some or all of the components are possible.

The terms "component" and "information flow" have already been defined in the "Terminology" section. To someone skilled in the art it is obvious that many different physical implementations of the MDS System are possible, and this application does not limit the way it is implemented (as long as the MDS System is at least partly executed by a machine). It is noted that the configurations do not limit the order of the information flows between components, as long as the information is produced and made available ("information flow") by components by the time it is consumed by the receiving component. In other words, it is obvious to anyone skilled in the art that numerous orderings of detailed steps through the MDS System are possible, as long as the overall information flows between the components occur. These configurations can be seen as categories of particular embodiments of the MDS System. It is noted that the presented configurations of the MDS System are therefore not just one specific embodiment each, but many potential embodiments with the described features, actions, inputs, outputs etc.

In the following discussion, the embodiments described first are very simple, while embodiments described later are increasingly more flexible, feature-rich, but also more complex. While there are many configurations, the following discussion only presents some exemplary MDS System configurations, and does not focus on architectural combinations with a bad benefit/complexity ratio (i.e. ones that are likely to be not useful) or may not aid the understanding of the present application.

It is noted that while the following embodiments are discussed in the context of access control policies, the MDS System is by no means limited to access control policies (or proximity-based access control), or even security policies. Far from it, many other policies can be managed and enforced using the MDS System, e.g. for other security (message protection, non-repudiation, monitoring, auditing etc.), QoS, availability, load balancing, throttling, information distribution, data analytics etc.

Figure 19:
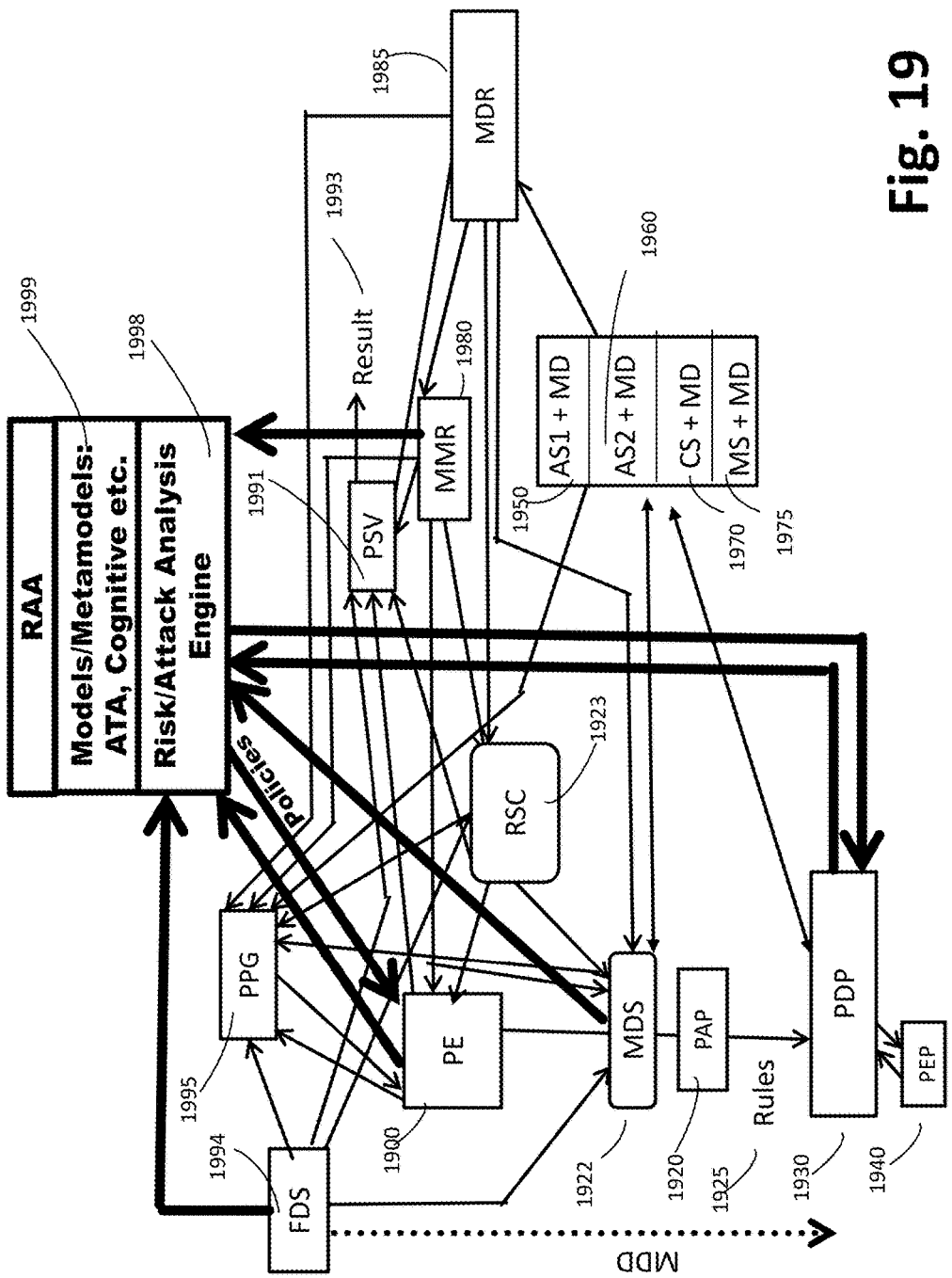
FIG. 19 illustrates a block diagram of a configuration (CFG-11) of the MDS System according to an embodiment.

An embodiment (configuration CFG-11), which includes all components and features of the MDS System, is depicted in FIG. 19. However, the following discussion starts with the description of a basic configuration embodiment and then increasingly adds more components to aid the understanding of how the various components of CFG-11 interact to provide a highly useful MDS System.

Figure 9:
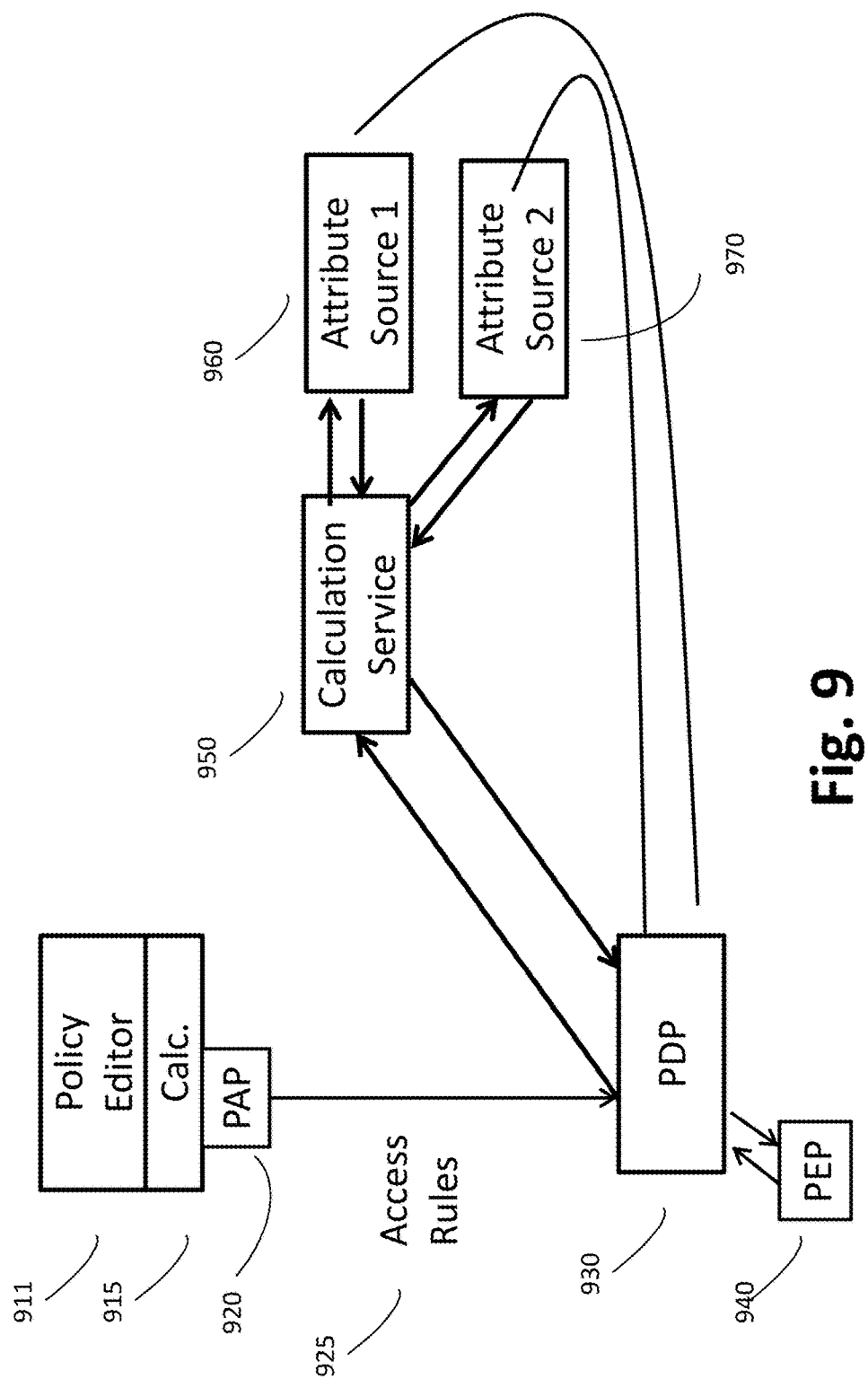
FIG. 9 illustrates a block diagram of a configuration (CFG-1) of the MDS System according to an embodiment.

Configuration CFG-1: FIG. 9 illustrates configuration CFG-1. Features of configuration CFG-1 can be summarized as "Combined Calculation Services & (Fixed) Attribute Services". A fixed set of calculation services CMP-CS (950) is available, and calculation services CMP-CS hide the attribute sources (960, 970) from the CMP-PDP. Only fixed attribute services CMP-ASS developed together (i.e. hardwired) with the calculation services CMP-CS are supported. In this basic configuration, it is not necessary to select attribute sources for calculation in the policy editor, because attribute sources CMP-ASS are hardwired into the calculation services CMP-CS and hidden from the CMP-PDP. FIG. 9 (CFG-1) depicts an embodiment where a calculation service (950) calculates a result from two attribute services (960, 970), for example a distance calculation service for proximity-based access control (PBAC).

Other calculation services CMP-CS that take a different number of attribute sources CMP-ASS to calculate a result are possible in CFG-1 but are not depicted.

Also it is noted that—for all configurations—attribute sources CMP-ASS may not have to be separate services in the sense of distinct software components, or distinct hardware nodes. Instead, they are conceptual feature components. For example, CMP-ASS can be built into calculation services CMP-CS, or even into the policy decision points CMP-PDP or CMP-PEP. The analogous applies to calculation services CMP-CS (and e.g. mapper services CMP-MS), which could be built into the policy decision points CMP-PDP or CMP-PEP. For example, CMP-PEPs could obtain attribute values from the underlying system (e.g. intercepted messages), and pass them to CMP-PDP, which uses built-in calculation functions (e.g. numerical operators, string comparisons) to compare the obtained attribute value with the result specified in the policy rule. In this example, there are no distinctly separate services for CMP-ASS and CMP-CS, but CMP-PEP and CMP-PDP include the CMP-ASS/CMP-CS functionality.

Figure 6:
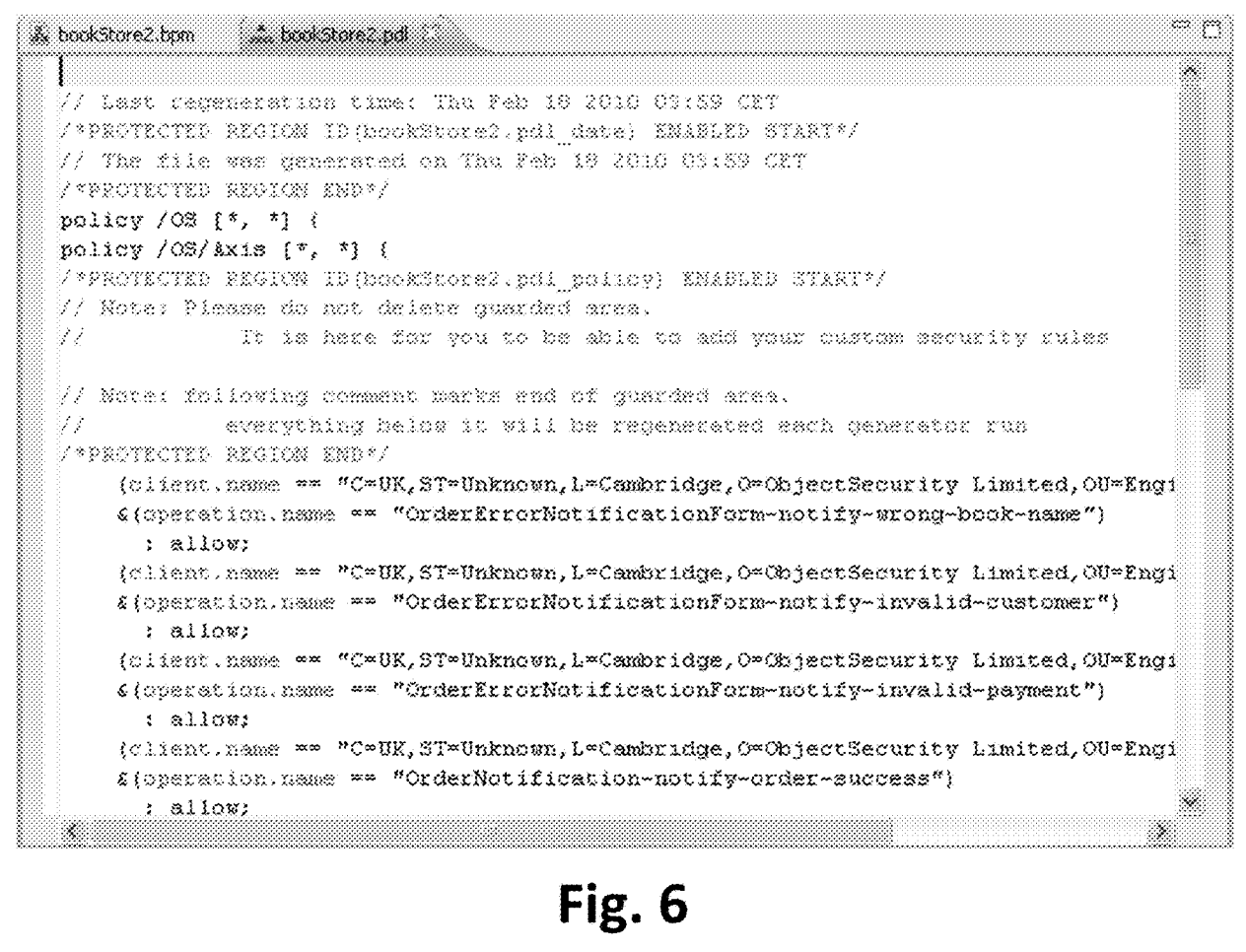

In this category of embodiments, the calculations available in the policy editor (911) are manually configured (i.e. no CMP-AEC). Machine-enforceable rules are edited in the policy editor (an example is depicted in FIG. 6, showing ObjectSecurity OpenPMF's PDL editor), and no model-driven security CMP-MDS is used to automate technical rule generation. Instead of attributes, the policy is expressed using the available calculation(s) (915) provided by calculation service (CMP-CS) (950)—in other words, policies are not expressed using attributes, because attributes are fixed to each calculation. The rules are then stored in PAP (CMP-PAP) (920). CMP-PAP then distributes the access rules (925) to at least one PDP (CMP-PDP) (930). Runtime security enforcement is usually triggered by PEP (CMP-PEP) (940), which queries a local or remote CMP-PDP (930) for a security policy decision, and enforces the result.

The MDS System's runtime system integration may be done manually (i.e. no CMP-RSC) and statically hard-wired.

While CFG-1 is easy to implement, it offers little policy expressiveness, and little flexibility/extensibility without modifying and redeploying the MDS System.

Figure 10:
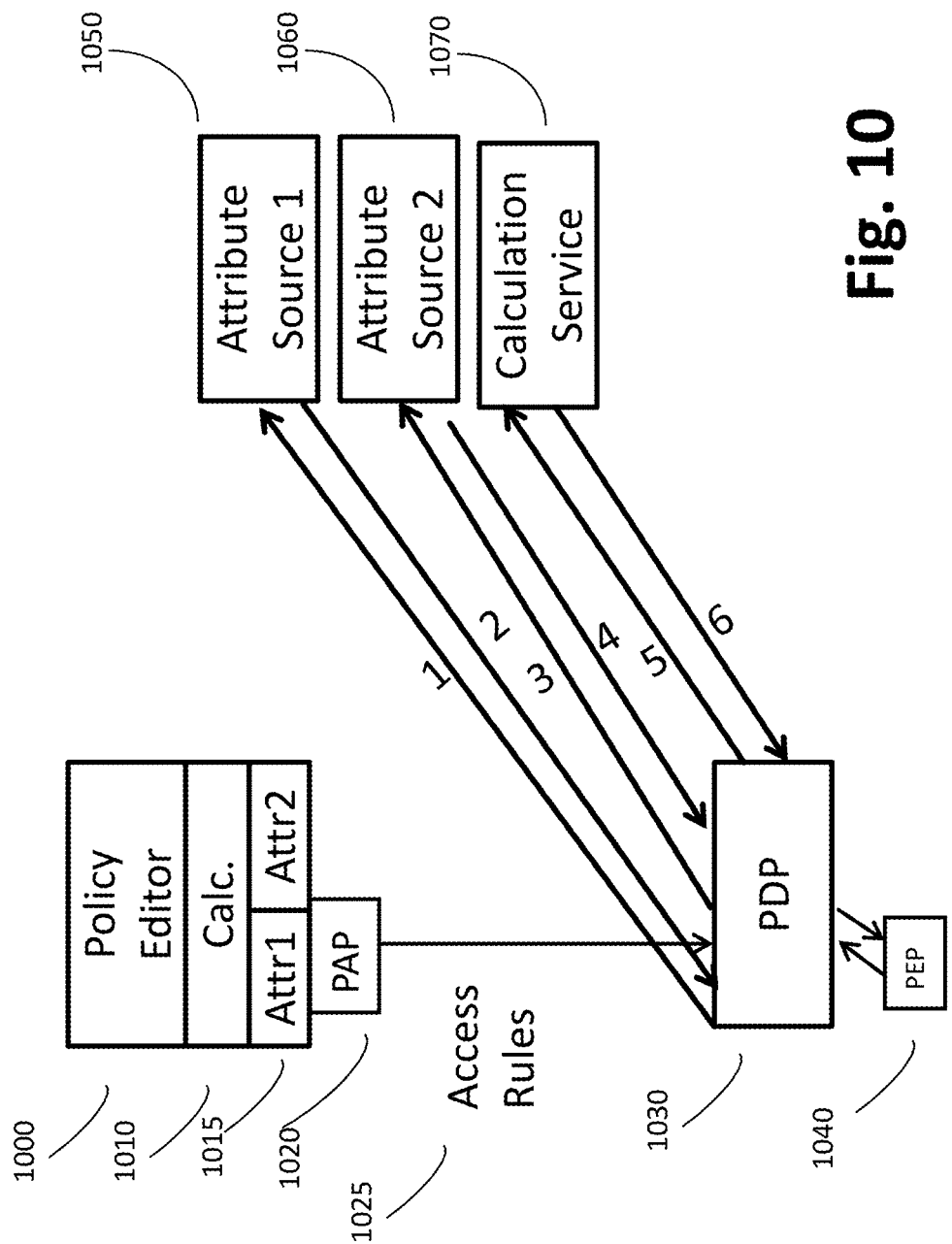
FIG. 10 illustrates a block diagram of a configuration (CFG-2) of the MDS System according to an embodiment.

Configuration CFG-2 is depicted in FIG. 10. Its basic features can be summarized as "Calculation Services Separate from Attribute Services, But Implemented Together". In this embodiment, a fixed set of calculation services CMP-CS (1070) and a fixed set of attribute services CMP-ASS (1050, 1060) are available. As opposed to CFG-1, calculation services CMP-CS are implemented separate from attribute services CMP-ASS. However, only pre-determined attribute services CMP-ASS developed specifically (i.e. hard-wired) for use with the calculation services CMP-CS are supported. Several attribute services CMP-ASS can be available for each calculation CMP-CS, and it may be necessary to select the desired attribute sources (1015) for each calculation (1010) in the policy editor (1000). The numbered arrows illustrate a possible interaction sequence example, where in steps 1 and 2 CMP-PEP (1030) first obtains an attribute value from Attribute Source 1 (1050), then in steps 3 and 4 obtains an attribute value from Attribute Source 2 (1060), and then in steps 5 and 6 provides both obtained attribute values to the Calculation Service (1070), which provides the result (e.g. proximity between the two attribute values). As in CFG-1, CMP-PAP (1020) distributes the access rules (1025) to the CMP-PDPs (1030), and runtime decisions are triggered by CMP-PEP's (1040) queries to CMP-PDP, and subsequent enforcement of the decision.

In this category of embodiments, like in CFG-1, the calculations available in the policy editor are manually configured (i.e. no CMP-AEC). Machine-enforceable rules are edited in the policy editor (an example is depicted in FIG. 6, showing ObjectSecurity OpenPMF's PDL editor), and no model-driven security CMP-MDS is used to automate technical rule generation. The MDS System's runtime system integration is done manually (i.e. no CMP-RSC) and statically hard-wired.

In one embodiment, calculation services and attribute services are implemented together by the same stakeholder team.

While CFG-2 is easy to implement, it offers little policy expressiveness, and little flexibility/extensibility without modifying and redeploying the MDS System.

Figure 11:
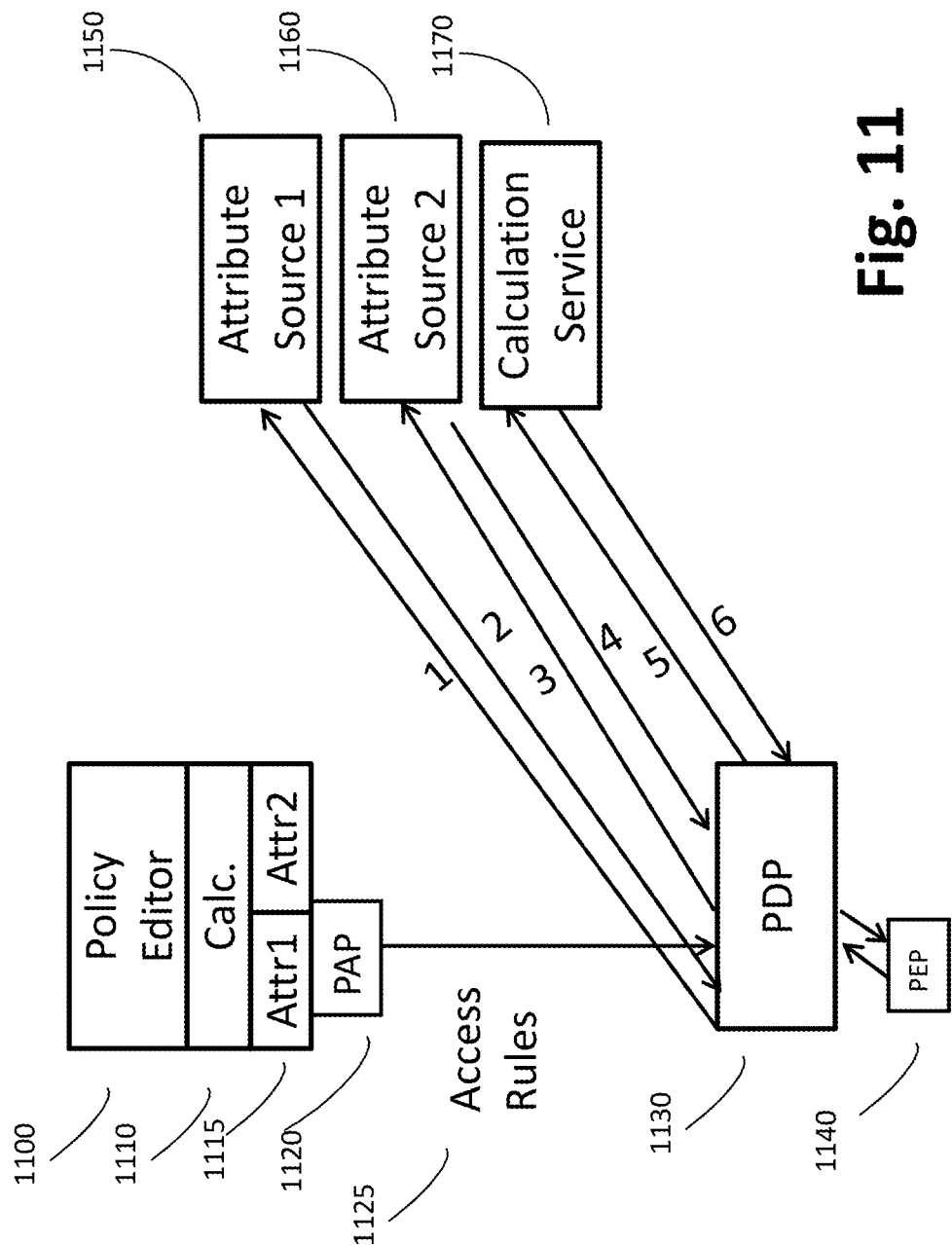
FIG. 11 illustrates a block diagram of a configuration (CFG-3) of the MDS System according to an embodiment.

Configuration CFG-3 is depicted in FIG. 11. Its features can be summarized as "Calculation Services Separate from Attribute Services, Implemented Separately". This category of architectural configurations implements the same quite basic architecture as CFG-1/CFG-2, where a fixed set of calculation services and a fixed set of attribute services are available. However, the difference is that in one embodiment, calculation services and attribute services are implemented separately by potentially different stakeholders, which increases flexibility, but also increases complexity.

Like CFG-2, calculation services CMP-CS (1170) are implemented separate from attribute sources (CMP-ASS) (1150, 1160). However, only pre-determined attribute services CMP-ASS developed specifically (i.e. hard-wired) for use with the calculation services CMP-CS are supported. Different from CFG-2, several attribute services CMP-ASS can be available for each calculation CMP-CS, and it may be necessary to select the desired attribute sources for each calculation in the policy editor.

In this category of embodiments, like in CFG-2, the calculations (1110) and attributes (1115) available in the policy editor (1100) are manually configured (i.e. no CMP-AEC). Machine-enforceable rules are edited in the policy editor (an example is depicted in FIG. 6, showing Object-Security OpenPMF's PDL editor), and no model-driven security CMP-MDS is used to automate technical rule generation. The MDS System's runtime system integration is done manually (i.e. no CMP-RSC) and statically hard-wired.

As in CFG-2, CMP-PAP (1120) distributes the access rules (1125) to the CMP-PDPs (1130), and runtime decisions are triggered by CMP-PEP's (1140) queries to CMP-PDP, and subsequent enforcement of the decision. Additionally, the exemplary interaction sequence (steps 1 to 6) is as has been described for CFG-2.

In one embodiment, calculation services and attribute services are implemented together by the same stakeholder team.

While CFG-3 is easy to implement, it offers little policy expressiveness, and little flexibility/extensibility without modifying and redeploying the MDS System.

Figure 12:
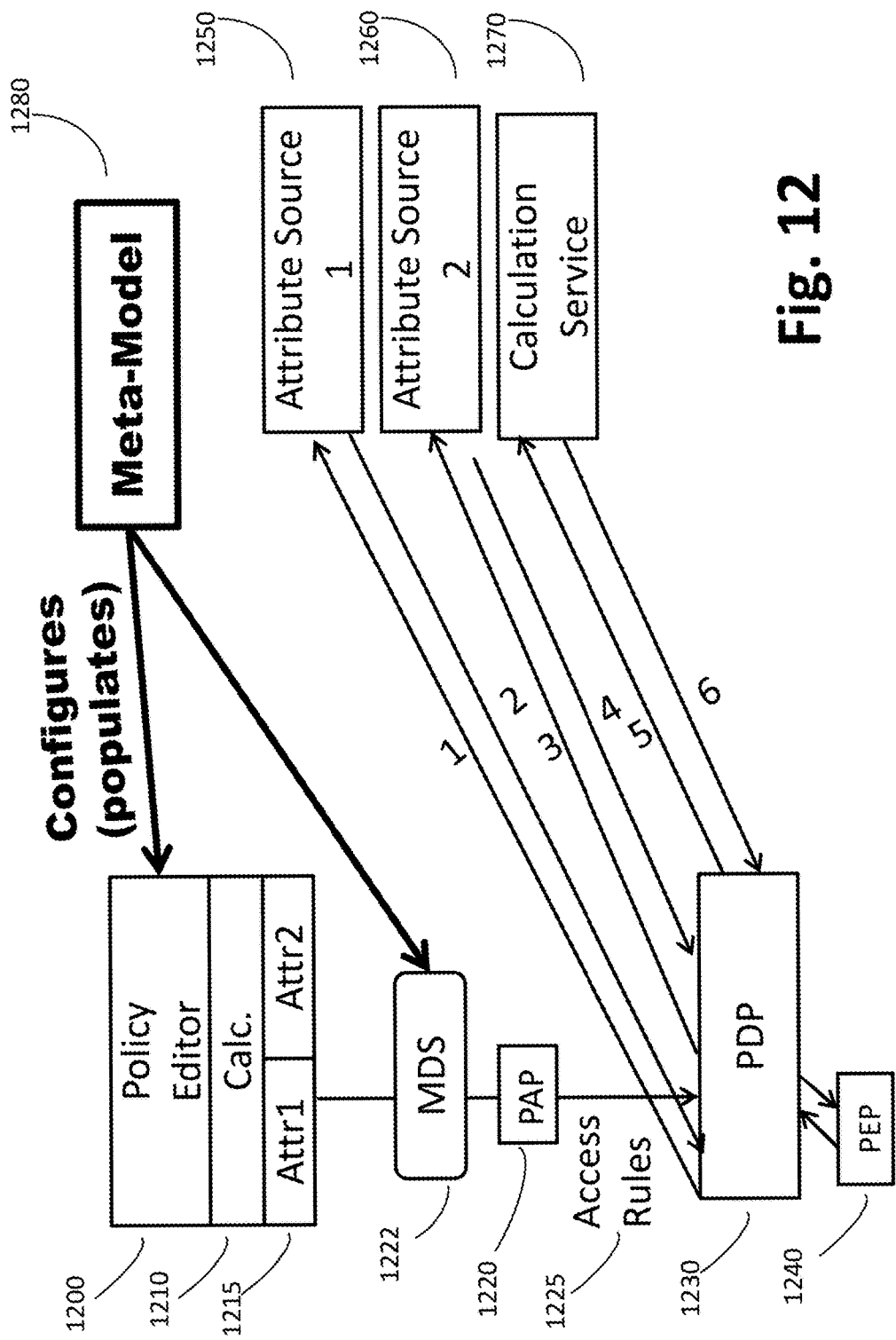
FIG. 12 illustrates a block diagram of a configuration (CFG-4) of the MDS System according to an embodiment.

Configuration CFG-4 is depicted in FIG. 12. Its features can be summarized as "Metamodel+Calculation Services Separate from Attribute Services". This configuration differs from the configurations described so far in that it includes a metamodel/model repository component CMP-MMR (1280). CMP-MMR holds a metamodel (or other suitable data structure) that captures the semantics of the inputs and outputs of the available attribute (1250, 1260) and calculation (1270) services. The calculations and attributes available in the policy editor are automatically configured (by CMP-AEC) flexibly and extensibly through the metamodel. CMP-MMR (or CMP-PE) may also hold the policy specified via the policy editor (e.g. as a model of the metamodel). This configuration provides editor (1200) flexibility.

Machine-enforceable rules are generated by CMP-MDS (1222) from the policy model (and metamodel) (1280) using model-driven security approaches.

The MDS System's runtime integration is done manually and statically hard-wired (e.g. using API keys, OMG IORs etc.), i.e. not automated using CMP-RSC for MDS System runtime integration.

As in CFG-3, CMP-PAP (1220) distributes the access rules (1225) to the CMP-PDPs (1230), and runtime decisions are triggered by CMP-PEP's (1240) queries to CMP-PDP, and subsequent enforcement of the decision. Additionally, the exemplary interaction sequence (steps 1 to 6) is as has been described for CFG-2.

This configuration provides a good level of flexibility, extensibility, and reuse.

Figure 13:
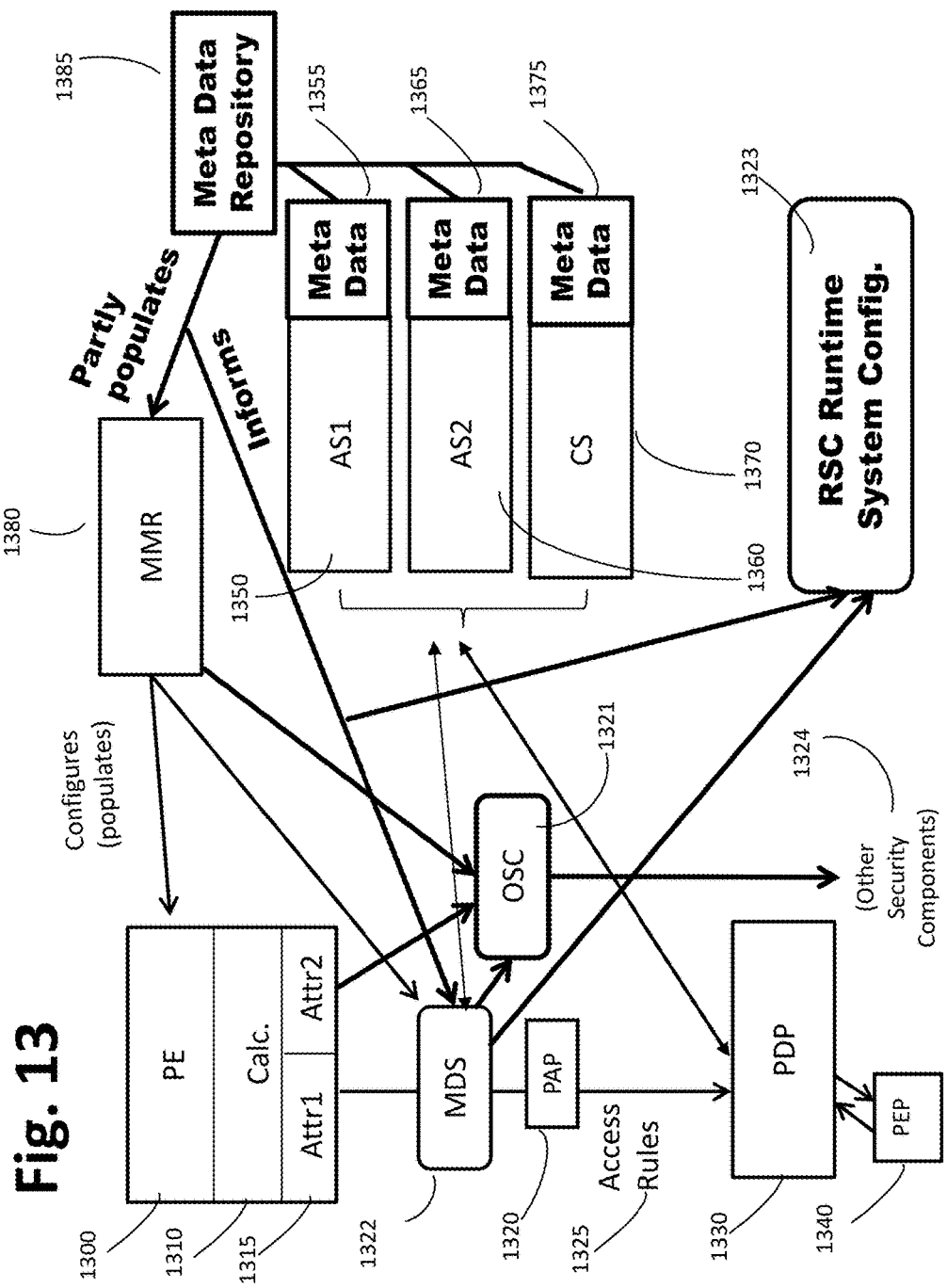
FIG. 13 illustrates a block diagram of a configuration (CFG-5) of the MDS System according to an embodiment.

Configuration CFG-5 is depicted in FIG. 13. Its features can be summarized as "Metadata+Metamodel & Calculation Services Separate from Attribute Services". Compared to CFG-4, this configuration includes additional metadata (1355, 1365, 1375) for each service (1350, 1360, 1370) that captures the syntax and integration information (integration interfaces, data types, network information, protocols etc.) of the inputs and outputs of the available services. In an embodiment, an attribute service CMP-ASS (1350) provides the geolocation of requestors in the Geography Markup Language (GML) standard notation. It provides metadata about its features to the metadata repository CMP-MDR (1385), including for example: network address (e.g. IP), server information (e.g. app server), supported communications protocols (e.g. SOAP), supported interfaces (e.g. "get_requestor_geolocation", supported formats (e.g. GML) etc.

In some embodiments, this configuration can automatically or semi-automatically pre-populate the metamodel (1380) from the service metadata received from the available services. In an embodiment with a requestor geolocation attribute service CMP-ASS, it can provide information that allows CMP-MMR to represent this service in the metamodel, including for example that the service is semantically associated with the bootstrap metamodel elements "attribute service", "requestor", "geospatial", "available attribute", "attribute" etc. This allows CMP-MMR to add a corresponding addition to the metamodel (potentially with a reference to the service's metadata). The metamodel element pertaining to a service (e.g. PFF/PSF) may include a reference to the associated metadata (or may even include the metadata itself).

Using this information in CMP-MMR and CMP-MDR, CMP-AEC automatically configures the policy editor (1300), which again provides calculations (1310) and attributes (1435), to offer available calculations (1370) and attributes (1350, 1360). Furthermore, CMP-RSC (1323) automatically configures the MDS System's runtime using the information from the metadata (1380) and metamodel (1385) repositories. The metadata repository (1380) is populated by attribute service (1350 and 1360) metadata (1355 and 1365), and calculation service 1370 metadata 1375). Such configurations can for example involve configuring connection information between components (e.g. connection settings, API keys, network sessions, cryptographic sessions etc.)

As in CFG-4, CMP-PAP (1320) distributes the access rules (1325) generated by CMP-MDS (MDS) (1322) to the CMP-PDPs (1330), and runtime decisions are triggered by CMP-PEP's (1340) queries to CMP-PDP, and subsequent enforcement of the decision. It is noted that—to aid readability—the exemplary interaction sequence (steps 1 to 6) as described for CFG-2 is implied, but has been simplified in the depiction, and already described parts of the drawings are also simplified.

This configuration also shows how CMP-OSC (1321) can tie into the MDS System to automatically generate a configuration for other security components and distribute them to those other security components (outside the MDS System). CMP-OSC may obtain information from CMP-PE (e.g. policy model, if not stored and provided by CMP-MMR), CMP-MMR (e.g. policy model, policy metamodel, references to OSC refinement templates, OSC refinement templates themselves, available/required OSC etc.), and CMP-MDS (e.g. refinement templates, generated intermediate or machine-enforceable rules etc.). CMP-OSC may work alongside CMP-MDS, as a post-processor of CMP-MDS, or independently of CMP-MDS.

This configuration provides a good level of flexibility, extensibility, and reuse.

Figure 14:
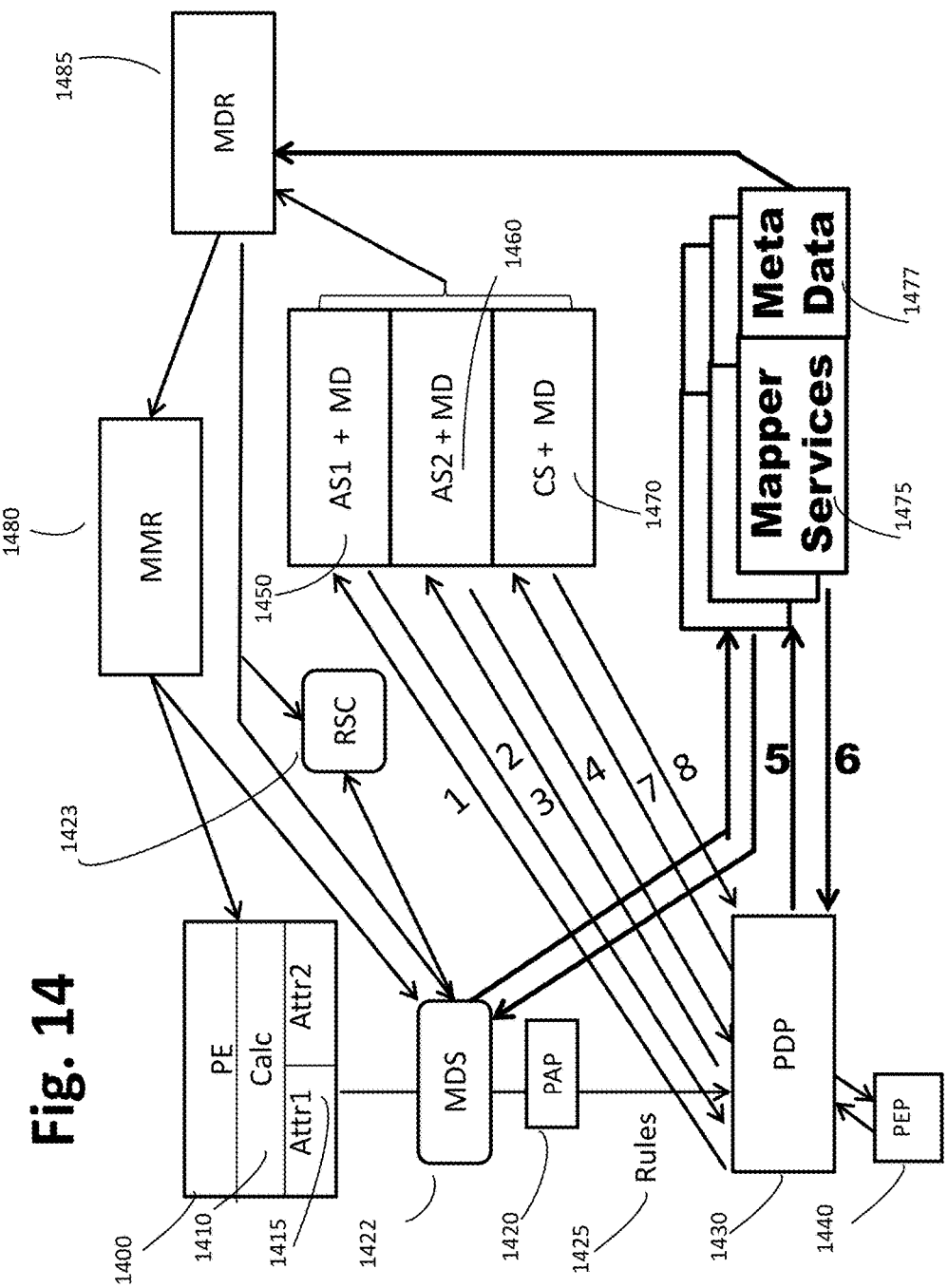
FIG. 14 illustrates a block diagram of a configuration (CFG-6) of the MDS System according to an embodiment.

Configuration CFG-6 is depicted in FIG. 14. Its features can be summarized as "Mappers+Metadata & Metamodel & Calculation Services Separate from Attribute Services". Compared to CFG-5, this configuration includes attribute Mapper Services CMP-MS (1475), to support "attribute refinement" (an example of PFF refinement) from available attributes to required attributes (PSF refinement can also be supported by mapper services). CMP-MS can also provide metadata (1477) about their features to CMP-MDR (1485), and subsequently to CMP-MMR (1480). Attribute refinement is used in several places in the architecture, in particular:

1) Firstly, to map attribute values between available attribute services (or other mapper services) and the attribute values required by a calculation service (e.g. postal address to geospatial location, or vice-versa).

FIG. 14 illustrates (esp. interaction steps 5+6) a particular embodiment where the mapper services (1475) (mappers) are flexibly used by the CMP-PDP (PDP) to map attributes before they are sent to the calculation service. It is noted that—in the example—the CMP-PDP (1430) first obtains the attribute values (interaction steps 1 and 2, and 3 and 4, in the example), then calls (step 5) the mapper services to obtain (step 6) the mapped attribute value(s), which is then passed to the CMP-CS (step 7) to obtain the calculation result (step 8).

2) Secondly, to map between attribute values selectable in the policy and the attribute values of available attribute services (or other mapper services). This is shown by the arrows going from/to the MDS box (CMP-MDS) in FIG. 14.

In this configuration, the attribute refinement, i.e. the integration of the mappers and attributes, is decided and configured manually.

Based on the mapper service's (1475) metadata (1477) and the metamodel (1480), the policy editor (1400), is automatically configured by CMP-AEC to offer the user a selection of mapped attributes as attribute sources (1415) for calculations (1410) provided by a calculation service CMP-CS (1470) (potentially in addition to the non-mapped original attributes (1450 and 1460) and their respective metadata (depicted as "MD").

It is noted that as with attribute services CMP-ASS and calculation services CMP-CS, mapping services CMP-MS do not have to be implemented as separate nodes, systems, applications etc. Instead, this component's features could be bundled with other components, e.g. CMP-MDS and/or CMP-PDP.

As in CFG-5, CMP-MDS (1422) generates access rules. CMP-PAP (1420) distributes these access rules (1425) to the CMP-PDPs (1430), and runtime decisions are triggered by CMP-PEP's (1440) queries to CMP-PDP, and subsequent enforcement of the decision. It is noted that—to aid readability—already described parts of the drawings are simplified (e.g. metamodel CMP-MMR 1480 and CMP-MDR 1485 are similar to meta-model CMP-MMR 1280 and meta data repository 1385). In the embodiment depicted in FIG. 14, CMP-RSC (1423) also automatically configures the MDS System's runtime (for example decision-making and enforcement, including connections between CMP-PAP and CMP-PDP(s), CMP-PDP(s) and CMP-PEP(s) etc.).

While this configuration introduces some additional complexity, it can significantly increase the flexibility of the MDS System, and can support bridging the semantic gap between authored policies and machine-enforceable rules/configurations. This is because it allows much more flexible "mix & match" of policy attributes, attribute sources CMP-ASS, and calculations CMP-CS.

Figure 15:
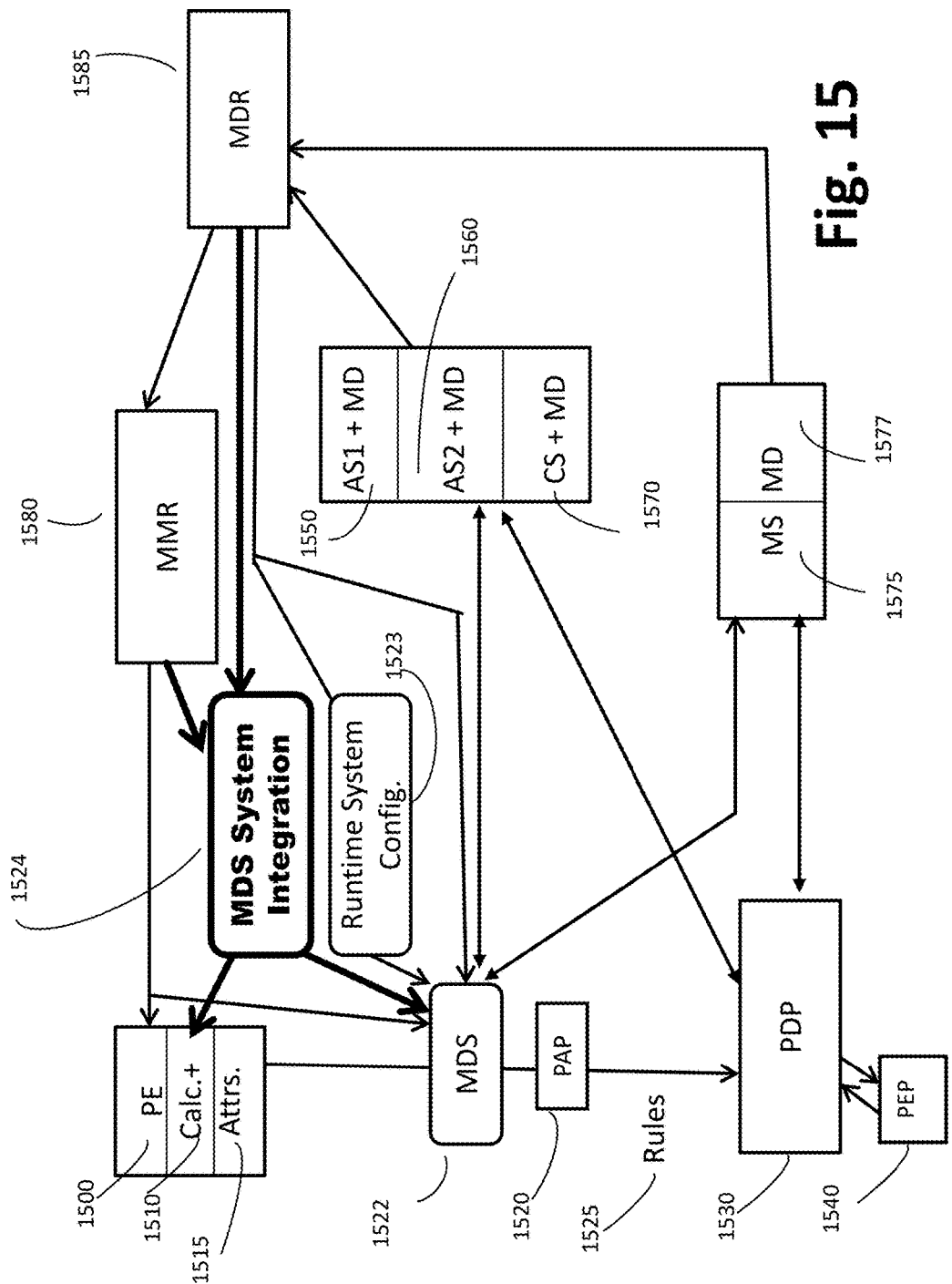
FIG. 15 illustrates a block diagram of a configuration (CFG-7) of the MDS System according to an embodiment.

Configuration CFG-7 is depicted in FIG. 15. Its features can be summarized as "Automated MDS System Integration+Mappers+Metadata+Metamodel+Calculation Services Separate from Attribute Services". Compared to CMP-6, this configuration additionally includes a feature of CMP-RSC, which uses a model-driven security process to automatically integrate the MDS System (in addition to CMP-RSC's MDS System's runtime (esp. decision-making and enforcement), as is done in CFG-5 and CFG-6). Using the metamodel, the metadata, the policy model (and the optional functional system description model used for technical rule generation), CMP-RSC's MDS Integration (1524) matches inputs and outputs to automatically or semi-automatically find a path (i.e. chain) from required (i.e. desired or needed) policy elements (i.e. PFFs and PSFs) via mappers to available attribute sources. In an embodiment, model/graph/tree searches are used to find relevant path(s) (these could be called "attribute refinement chains", an example of PFF refinement chains). In an embodiment, refinement templates are used to find relevant refinement paths (both for PFFs and PSFs).

The automatic integration of an MDS System embodiment has the following purposes:

Integrate the available PFFs/PSFs, e.g. attribute services CMP-ASS, mapper services CMP-MS, and calculation services CMP-CS, Configure the selectable calculations and attributes (mapped or not mapped) in the policy editor (done by CMP-AEC), Configure the MDS System's runtime components, including for example the decision-making/enforcement runtime CMP-PAP/PDP/PEP, attribute services CMP-ASS, mapper services CMP-MS, calculation services CMP-CS, the automatic technical rule generation CMP-MDS, underlying systems configuration generation, other security components CMP-OSC etc.

As in CFG-6, the policy editor CMP-PE (1500) is automatically configured based on the metamodels in CMP-MMR (1580) and metadata in CMP-MDR (1585), and offers policies based on calculations (1510) and attributes (1515). As in CFG-6, CMP-MDS (1522) generates access rules. CMP-PAP (1520) distributes these access rules (1525) to the CMP-PDPs (1530), and runtime decisions are triggered by CMP-PEP's (1540) queries to CMP-PDP, and subsequent enforcement of the decision. It is noted that—to aid readability—already described parts of the drawings are simplified. CMP-RSC (1523) also automatically configures the MDS System's runtime. This configuration CFG-6 also illustrates the case where CMP-MDS (1522) pre-calculates attribute values and calculation results at rule-generation time by querying attribute services (1550) and calculation services (1570). This configuration CFG-6 also illustrates the case where CMP-MDS (1522) does not pre-calculate attribute values and calculation results, and CMP-PDP (1530) queries attribute services (1550) and calculation services (1570) at decision-making time. Attribute services (1550 and 1560) and calculation services (1570) again provide their respective metadata (depicted as "MD") to the metadata repository CMP-MDR (1585).

This configuration implements a highly flexible, expressive, and automated MDS System that automatically integrates the MDS System based on the metamodel, metadata, the policy model (and optional other models such as the functional system description).

Figure 16:
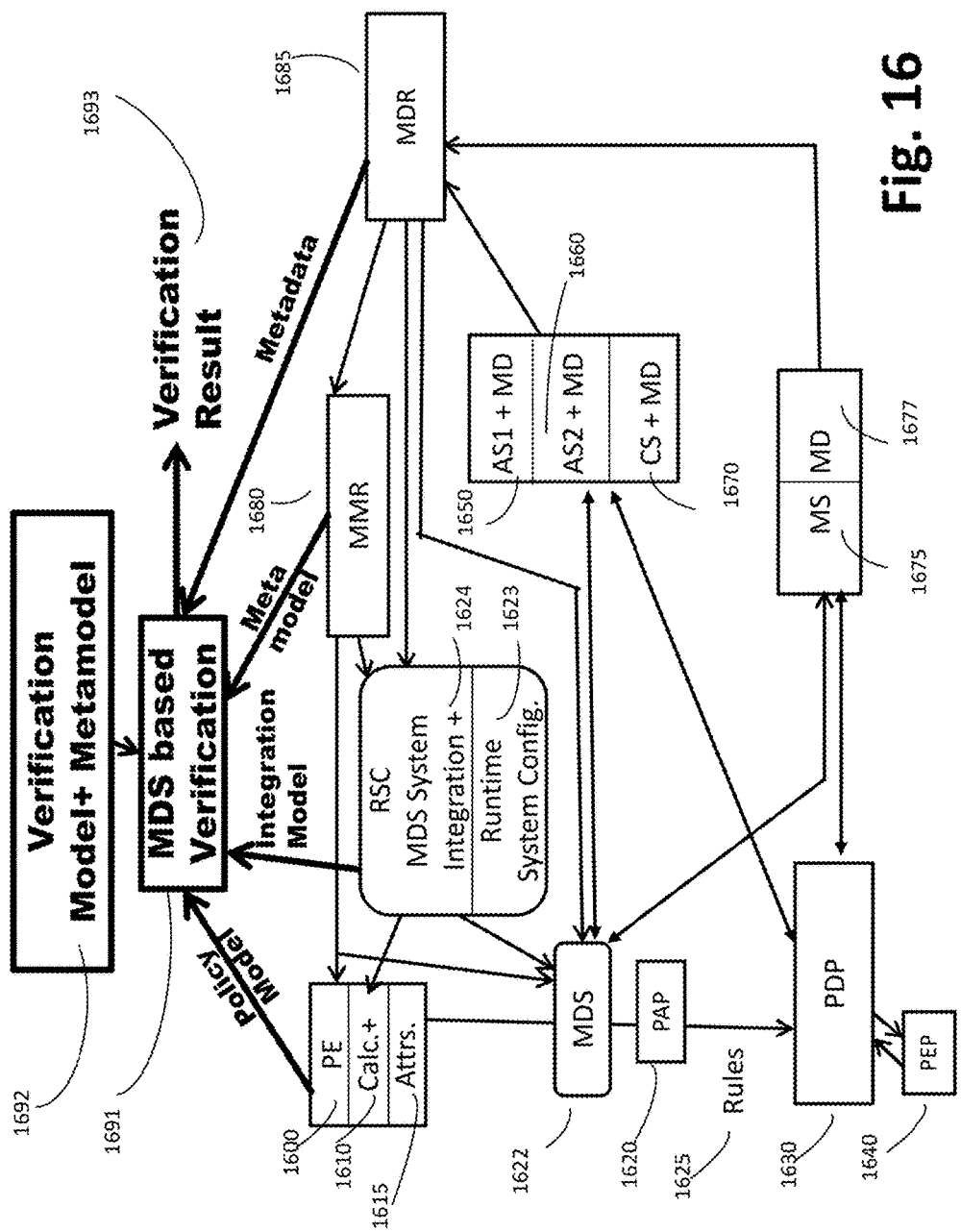
FIG. 16 illustrates a block diagram of a configuration (CFG-8) of the MDS System according to an embodiment.

Configuration CFG-8 is depicted in FIG. 16. Its features can be summarized as "Automatic Model Checking+Automated MDS System Integration+Mappers+Metadata+Metamodel+Calculation Services Separate from Attribute Services". Compared to CFG-7, this configuration implements an additional model-driven verification process similar to the one described in the background section and in the MDSA Patent. In an embodiment, this additional model-driven analysis and documentation process CMP-PSV (1691) essentially analyzes all the available models, including an additional verification requirements model and metamodel (1692), to create a verification result (1693) report (e.g. accreditation supporting evidence). The verification process can check for traceability between policies and attributes, check that certain invariants are preserved etc. It is noted that FIG. 16 displays a simplified version to aid readability: while it only shows four distinct inputs into the verification process (policy model, integration model, metamodel, and metadata), the MDSA Patent teaches numerous additional inputs, including incidents, functional system description, generated rules, model-driven development artifacts (models, transformations, software code) etc.

As in CFG-7, the policy editor CMP-PE (1600) is automatically configured based on the metamodels in CMP-MMR (1680) and metadata in CMP-MDR (1685), and offers policies based on calculations (1610) and attributes (1615). FIG. 16 again shows two exemplary attribute services CMP-ASS (1650 and 1660) and a calculation service CMP-CS (1670), and their respective metadata (depicted as "MD"), as well as a mapping service CMP-MS (1675) with its metadata "MD" (1677). As in CFG-7, CMP-MDS (1622) generates access rules. CMP-PAP (1620) distributes these access rules (1625) to the CMP-PDP(s) (1630), and runtime decisions are triggered by CMP-PEP's (1640) queries to CMP-PDP, and subsequent enforcement of the decision. It is noted that—to aid readability—already described parts of the drawings are simplified. As in CFG-7, CMP-RSC also automatically configures the MDS System using Runtime System Configuration CMP-RSC (1623) (for PAPs, PDPs, PEPs) and Runtime System Configuration CMP-RSC for MDS System integration (1624) (i.e. of other MDS System components).

This extensive architecture introduces very little additional complexity, while providing potentially great benefits, including (1) reducing error-potential, (2) enabling and/or (3) speeding up certification & accreditation (or regulatory compliance).

Figure 17:
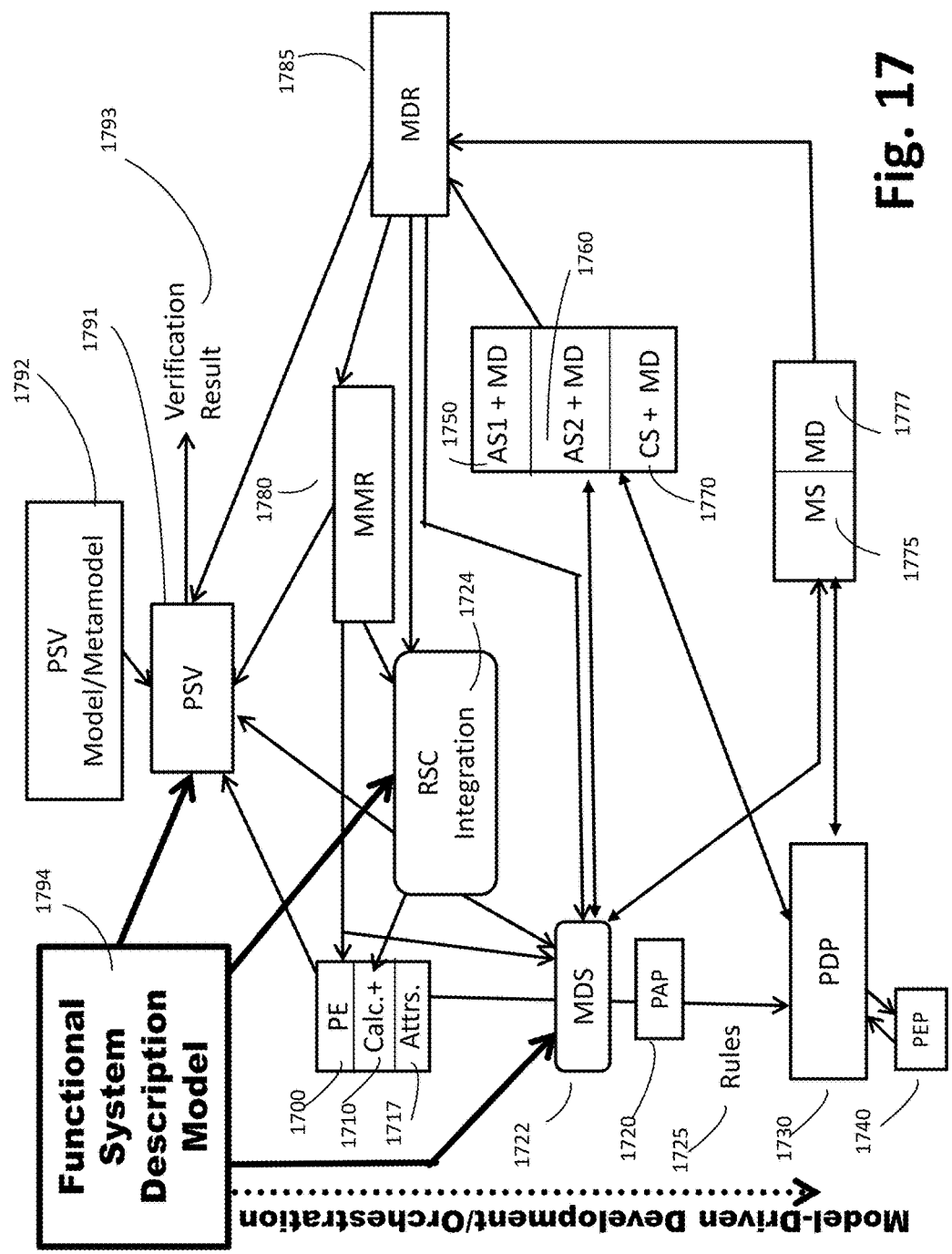
FIG. 17 illustrates a block diagram of a configuration (CFG-9) of the MDS System according to an embodiment.

Configuration CFG-9 is depicted in FIG. 17. Its features can be summarized as "Functional Model+Automatic Model Checking+Automated System Integration+Mappers+Metadata+Metamodel+Calculation Services Separate from Attribute Services". Compared to CFG-8, this configuration includes a functional system description provided by the CMP-FDS component (1794) to where needed in the MDS System, esp. the model-driven security component CMP-MDS (1722), CMP-RSC Runtime (1724) and MDS System (1725) configuration component, and the verification/documentation component CMP-PSV (1791). As described in the background section, model-driven security can provide high degree of policy automation for policies that relate to functional systems, such as information flows, IT assets (systems, applications etc.).

A functional system description may be an important aspect of many policies (incl. e.g. security). While some of today's access control systems frequently appear to work without mentioning any system aspects (e.g. by only talking about accessing users and data resources), there are in fact a lot of implicit system aspects involved in making such policies work. For example: Where is the data stored? Where should the CMP-PEPs be? Where should the CMP-PDPs be? Where does the "Target of Evaluation" specification for accreditation and security (e.g. Common Criteria) come from? The CMP-FDS component included in this configuration makes the functional system description explicit and available to the MDS System.

The use of functional models has several benefits within the MDS System:
- It allows the automatic deployment of the MDS System (e.g. CMP-PEPs/CMP-PDPs etc., especially for high-performance systems where CMP-PEPs and CMP-PDPs are collocated local to the protected resources).
- It allows the expression of asset-specific access policies (e.g. "anyone from a TS compartment system can access only another TS compartment system").
- It allows the expression of information flow-specific access policies (e.g. "anyone from a TS compartment system can access only another TS compartment system and only through an encrypted connection coming from the intranet").

In one embodiment, the functional system description for MDS comes from an explicitly specified model. This model is ideally specified and maintained by other stakeholders (e.g. developers, SOA architects etc., as depicted by the dotted arrow in FIG. 17), but can in some embodiments be specified/maintained by the MDS System user. CMP-FDS reads the function system description, reformats it into a format that can be consumed by CMP-MDS (e.g. model based on common metamodel) and makes it available to the rest of the MDS System.

In another embodiment, where no explicit functional system description is available, CMP-FDS automatically determines a functional system description of a deployed Protected SoS using information from a combination of IT landscape monitoring and management tools (well-known to anyone skilled in the art), such as: network topology mapping tools, network management tools, asset monitoring/management tools, information flow monitoring tools, discovery service tools and registries, user identity management tools, single sign-on tools, configuration management tools, application management tools, process orchestration tools (e.g. BPMS/BPEL web service orchestration tools), audit tools, monitoring tools, SIM/SIEM tools etc. In some cases, CMP-FDS's automatic detection feature needs to run for a while, while the deployed "system of systems" is in full operation, in order to "learn" which systems, interactions etc. happen. CMP-FDS "normalizes" all the different information from these various tools into a coherent form (e.g. a model such as UML) that includes all (esp. functional) aspects required by CMP-MDS during rule generation (and also during CMP-PSV during compliance automation). CMP-FDS structures this information in a form that matches with the metamodel of the functional system description in CMP-MMR. This is necessary so it can be used by CMP-MDS.

As in CFG-7, the policy editor CMP-PE (1700) is automatically configured based on the metamodels in CMP-MMR (1780) and metadata in CMP-MDR (1785), and offers policies based on calculations (1710) and attributes (1715). FIG. 17 again shows two exemplary attribute services CMP-ASS (1750 and 1760) and a calculation service CMP-CS (1770), and their respective metadata (depicted as "MD"), as well as a mapping service CMP-MS (1775) with its metadata (1777). As in CFG-7, CMP-MDS (1722) generates access rules. CMP-PAP (1720) distributes these access rules (1725) to the CMP-PDPs (1730), and runtime decisions are triggered by CMP-PEP's (1740) queries to CMP-PDP, and subsequent enforcement of the decision. It is noted that—to aid readability—already described parts of the drawings are simplified. As in CFG-7, CMP-RSC also automatically configures the MDS System using Runtime System Configuration CMP-RSC (1724) (for PAPs, PDPs, PEPs and for MDS System integration, i.e. of other MDS System components). The model-driven analysis and documentation process CMP-PSV (1791) analyzes all the available models, including an additional verification requirements model and metamodel (1792), to create a verification result (1793) report (e.g. accreditation supporting evidence).

Figure 18:
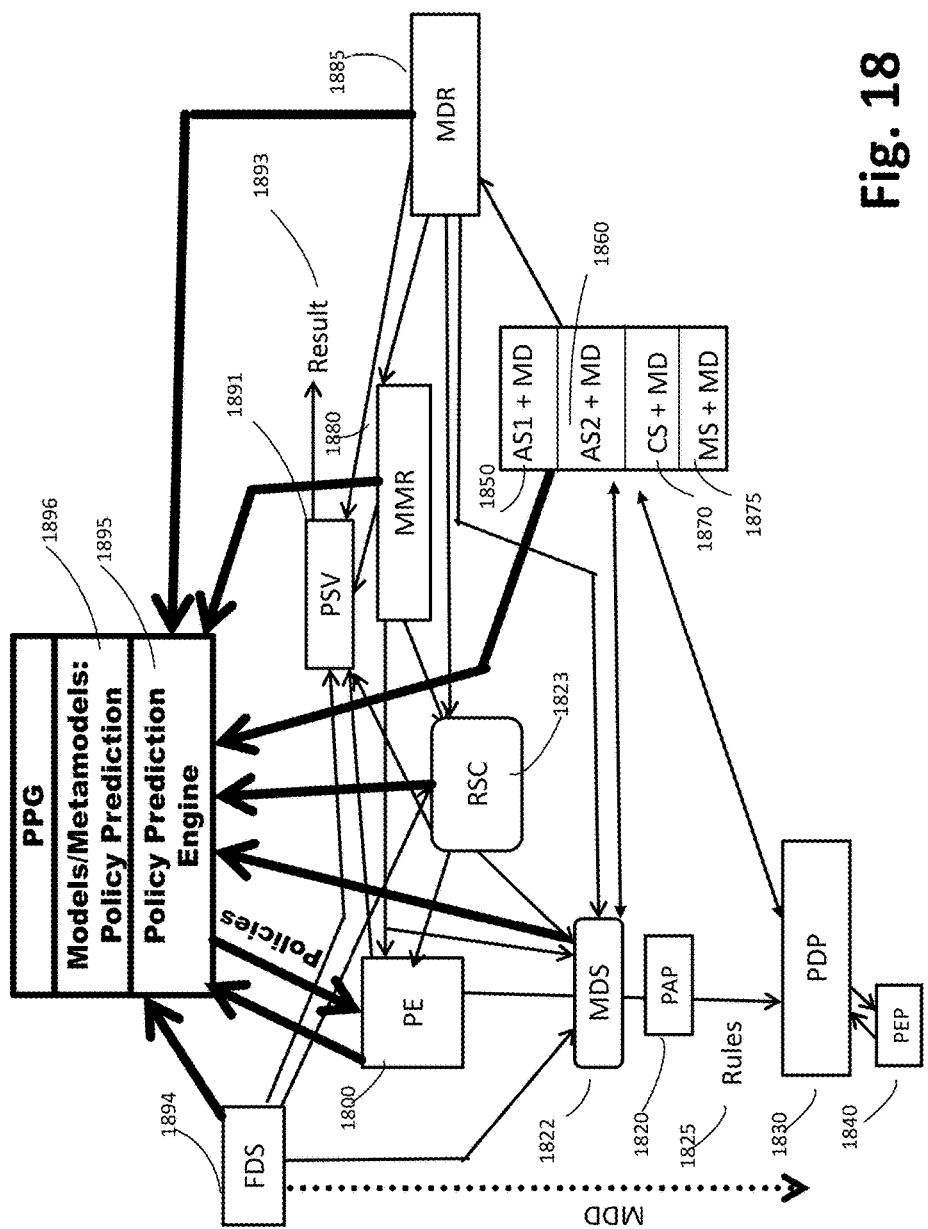
FIG. 18 illustrates a block diagram of a configuration (CFG-10) of the MDS System according to an embodiment.

Configuration CFG-10 is depicted in FIG. 18. Its features can be summarized as "(Assisted) Rule Generation+Functional Model+Automatic Model Checking+Automated System Integration+Mappers+Metadata+Metamodel+Calculation Services Separate from Attribute Services". In this configuration, the component CMP-PPG for Predictive (Assisted) Policy Generation, which includes models and metamodels for policy prediction (1896) and a policy prediction engine (1895), is added. CMP-PPG obtains various inputs, including (but not limited to): policies and CMP-PPG specific settings from CMP-PE (1800); functional description sources from CMP-FDS (1894); model transformation related information from CMP-MDS (1822); runtime system configuration related information from CMP-RSC (1823), available services (attribute services 1850 and 1860, calculation service 1870, and mapping service 1875, as well as their respective metadata (depicted as "MD"); metamodel from CMP-MMR (1880), metadata from CMP-MDR (1885), alerts from CMP-PDP (1830) and/or CMP-PMR etc. CMP-PPG's policy prediction engine (1895) analyzes these inputs and, based on policy prediction models and metamodels (1896), provides potentially useful policies to CMP-PE (1800). In CMP-PE, a human user can then (optionally) select, discard and/or fine-tune those predicted/suggested policies. Alternatively, in some embodiments, predicted/suggested policies may be automatically stored as part of the high-level policy (i.e. without human involvement).

As in CFG-7, the policy editor CMP-PE (1800) is automatically configured based on the metamodels in CMP-MMR (1880) and metadata in CMP-MDR (1885), and offers policies based on calculations and attributes (not depicted, assumed part of 1800). FIG. 18 again shows two exemplary attribute services CMP-ASS AS1/AS2 (1850 and 1860), a calculation service CMP-CS (1870), and a mapping service CMP-MS (1875), as well as their respective metadata (depicted as "MD"). As in CFG-7, CMP-MDS (1822) generates access rules. CMP-PAP (1820) distributes these access rules (1825) to the CMP-PDPs (1830), and runtime decisions are triggered by CMP-PEP's (1840) queries to CMP-PDP, and subsequent enforcement of the decision. It is noted that—to aid readability—already described parts of the drawings are simplified. As in CFG-7, CMP-RSC also automatically configures the MDS System using Runtime System Configuration CMP-RSC (1823) (for PAPs, PDPs, PEPs and for MDS System integration, i.e. of other MDS System components). As in CFG-8, the model-driven analysis and documentation process CMP-PSV (1891) analyzes all the available models, including an additional verification requirements model and metamodel (not depicted, part of 1891), to create a verification result (1893) report (e.g. accreditation supporting evidence). As in CFG-9, the functional system description model is provided by CMP-DFS (1894) to CMP-MDS (1822), CMP-RSC (1823), and CMP-PSV (1891).

The exact functionality of the CMP-PPG has already been presented in the description of the component CMP-PPG earlier in this document.

Configuration CFG-11 is depicted in FIG. 19. Its features can be summarized as "Risk and Attack Detection/Analysis/Prediction+(Assisted) Rule Generation+Functional Model+Automatic Model Checking+Automated System Integration+Mappers+Metadata+Metamodel+Calculation Services Separate from Attribute Services". In this configuration, the component CMP-RAA for Risk and Attack Detection/Analysis/Prediction, which includes models and metamodels (1999) and a risk/attack analysis engine (1998), is added.

CMP-RAA obtains various inputs, including (but not limited to): policies and CMP-RAA specific settings from CMP-PE (1900); functional description sources from CMP-FDS (1994); model transformation related information from CMP-MDS (1922); runtime incident and policy decision-making related information from CMP-PDP (1930); metamodel from CMP-MMR (1880) etc. CMP-RAA's risk/attack analysis engine (1998) analyzes these inputs and, based on risk models and metamodels 1999 (e.g. capturing Attack Tree Analysis (ATA) models or cognitive models), provides potentially useful risk-based policies to CMP-PE (1900). In CMP-PE, a human user can then (optionally) select, discard and/or fine-tune those predicted/suggested policies. Alternatively, in some embodiments, predicted/suggested policies may be automatically stored as part of the high-level policy (i.e. without human involvement). In some embodiments, CMP-RAA can also provide policies directly to CMP-PDP, CMP-MMR, and/or CMP-PE. It is noted that the exact functionality of the CMP-RAA has already been presented in the description of the component CMP-RAA earlier in this document.

As in CFG-7, the policy editor CMP-PE (1900) is automatically configured by CMP-AEC (not depicted) based on the metamodels in CMP-MMR (1980) and metadata in CMP-MDR (1985), and offers policies based on calculations and attributes (not depicted, assumed part of 1900). FIG. 19 again shows two exemplary attribute services CMP-ASS AS1/AS2 (1950 and 1960), a calculation service CMP-CS (1970), and a mapping service CMP-MS (1975), as well as their respective metadata (depicted as "MD"). As in CFG-7, CMP-MDS (1922) generates access rules. CMP-PAP (1920) distributes these access rules (1925) to the CMP-PDPs (1930), and runtime decisions are triggered by CMP-PEP's (1940) queries to CMP-PDP, and subsequent enforcement of the decision. It is noted that—to aid readability—already described parts of the drawings are simplified. As in CFG-7, CMP-RSC also automatically configures the MDS System using Runtime System Configuration CMP-RSC (1923) (for PAPs, PDPs, PEPs and for MDS System integration, i.e. of other MDS System components). As in CFG-8, the model-driven analysis and documentation process CMP-PSV (1991) analyzes all the available models, including an additional verification requirements model and metamodel (not depicted, part of 1991), to create a verification result (1993) report (e.g. accreditation supporting evidence). As in CFG-9, the functional system description model is provided by CMP-DFS (1994) to CMP-MDS (1922), CMP-RSC (1923), and CMP-PSV (1991). As in CFG-10, CMP-PPG (1995) analyzes inputs and, based on policy prediction models and metamodels (not depicted), provides potentially useful policies to CMP-PE (1900).

Overall Operation of the MDS System

Figure 65:
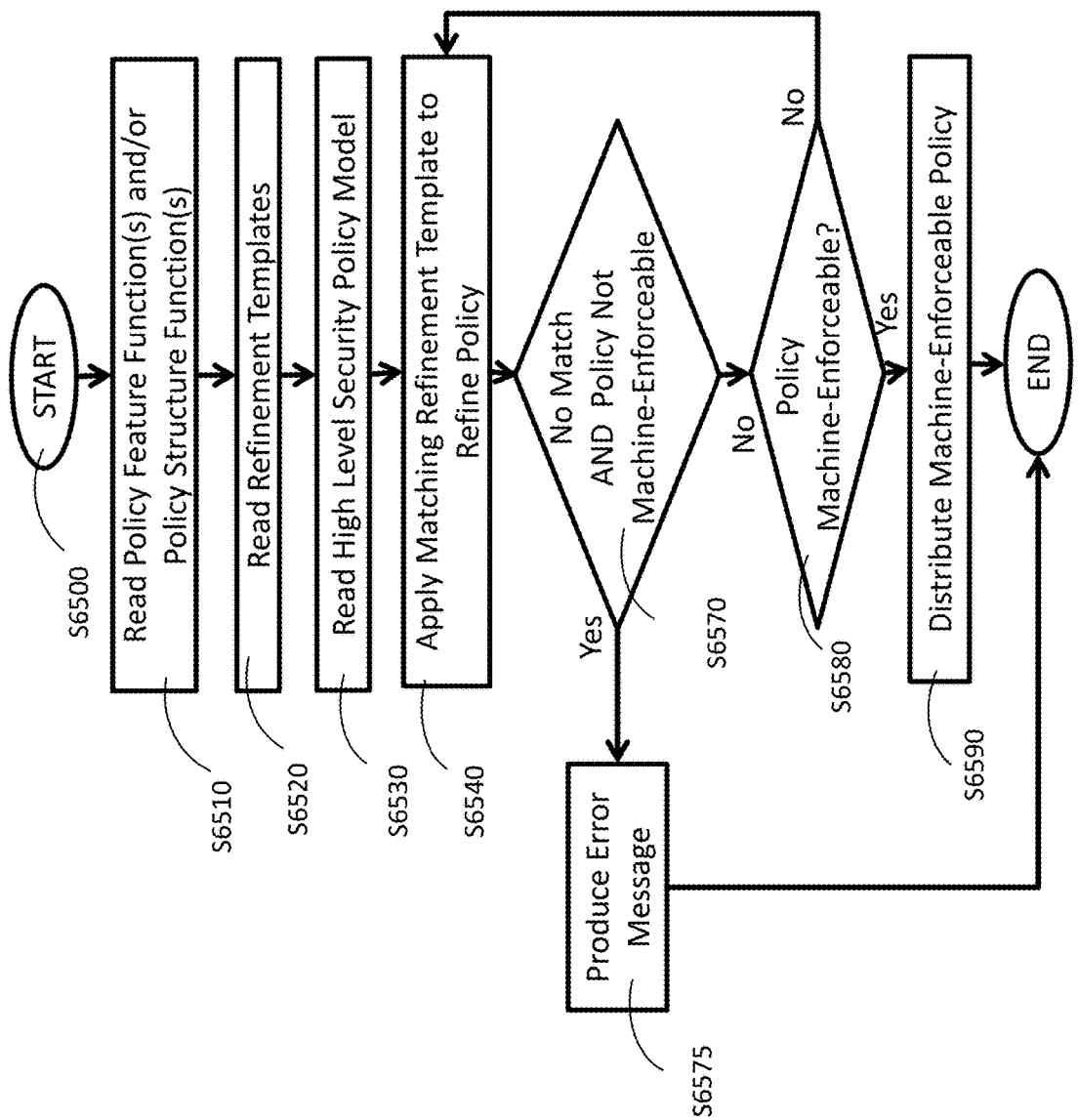
FIG. 65 illustrates a flow chart of the policy refinement and rule generation operation according to an embodiment.

Referring to FIG. 65, there is illustrated a generalized flow diagram of embodiments of the broad overall operation of the MDS System's model-driven policy rule generation (which may be implemented within the component CMP-MDS). It is noted that the terms used in the following description have been defined above in the terminology section of this specification.

In accordance with certain embodiments of the present patent application, when triggered (S6500) by trigger events (e.g. explicit user commands, deployment/launch of the Protected SoS), the MDS System first reads inputs about "Policy Feature Function(s) and/or Policy Structure Function(s)" (S6510) (abbreviated PFFs and PSFs, and may collectively be referred to as "policy functions") from a memory or storage device, a network location (push or pull), internal memory storage, hardcoded software etc. PFFs may for example include attribute services CMP-ASS, calculation services CMP-CS, mapping services CMP-MS, and other functions used to express and calculate policies (e.g. functional system description from CMP-FDS). Inputs about PFFs may include metamodel elements relating to the policy feature function (e.g. semantic information about what the service is/does, how it relates semantically to other metamodel elements etc.). Inputs about PFFs may also include metadata elements relating to the PFFs (e.g. syntactic information about data, communication protocols, interfaces etc.) Inputs about PFFs may also include bootstrap metamodel(s) and bootstrap metadata information. A PFF may itself provide the metamodel and metadata input pertaining to it (to CMP-MMR and CMP-MDS, respectively). Alternatively, an administrator may provide the metamodel and metadata input pertaining to it. Inputs about PFFs may include "available" PFFs (i.e. sources that provide/implement the feature, e.g. CMP-ASS, CMP-CS, CMP-MS, CMP-FDS). Inputs about PFFs may also include "required" PFFs (i.e. policy features that policy authors wish to author policies with, or that are inputs into calculations). In certain embodiments, the consolidated inputs about PFFs can be read from metamodel and metadata repositories (implemented by CMP-MMR and CMP-MDR, respectively), which implement the functionality of collecting and consolidating information about the MDS System's various policy feature functions. Inputs about PSFs may (similarly to PFFs) include information about policies, rules, and rule elements, including metamodel information, metadata information, bootstrap metamodel/metadata information, information about available PSFs, information about required PSFs etc.

Next, the MDS System reads refinement templates (S6520) from a storage device or a network location (push or pull). Refinement templates for policy function features may include PFF (e.g. attribute) refinement templates (expressing how attributes can be refined using mappers, e.g. between available and required attributes, in a single step or multiple chained steps, and/or in a one-to-one, many-to-one, one-to-many, or many-to-many relationship). Refinement templates may alternatively or additionally include PFF (e.g. calculation) refinement templates. Refinement templates may alternatively or additionally include functional system description (an example of a PFF) refinement templates. Refinement templates may alternatively or additionally include PSF (eg. policy/rule/rule element) refinement templates, for example expressing how policies, rules, and/or rule elements can be refined into rules/elements/configurations, e.g. between available and required policies/rules/elements, in a single step or multiple chained steps, and/or in a one-to-one, many-to-one, one-to-many, or many-to-many relationship). Refinement templates can therefore—provided input(s) and output(s) match—be stacked in a one-to-one, many-to-one, one-to-many, or many-to-many relationship, and refinement template input(s) can be refined into output(s) in a one-to-one, many-to-one, one-to-many, or many-to-many relationship. It is noted that refinement templates may not just refine into rules (used by CMP-PDP), but may alternatively or additionally refine into configurations for the MDS System (used by CMP-RSC) and/or into configurations for other security components (used by CMP-OSC). It is noted that some or all refinement templates may be built into the MDS System (e.g. hard-coded), rather than being read from storage or a network location. It is also noted that in most MDS System, at least one PFF/PSF needs to be available (i.e. supported) in order to be able to process/implement (e.g. decide) the policy.

Next, the MDS System reads the high-level security policy model (S6530) from storage or a network location (push or pull). The high-level security policy may be provided by a policy editor.

Next, the MDS System applies a matching refinement template to the input policy (policy input) in order to refine (S6540) the high-level policy. In the first step the policy input may be the high-level policy model.

The MDS System then determines (S6570) whether there is no matching refinement template and at the same time the policy is not machine-enforceable, and if so, produces an error message (S6575) (or action) because the high-level policy could not be refined into a machine-enforceable policy. If the MDS determined (S6570) that the condition "no matching refinement template and policy not machine-enforceable" is not true, it further determines (S6580) whether the policy is machine-enforceable, and if not, goes back to S6540 to apply further refinement templates to refine the policy. This loop is repeated (e.g. iteratively, recursively etc.) until either the policy is machine-enforceable, or no matching refinement template can be found and the policy is not machine-enforceable. If the policy is determined machine-enforceable at the "Policy machine-enforceable?" step (S6580), the policy is distributed (S6590) to CMP-PAP (in the case policy rules have been generated). Refinement templates may alternatively or additionally generate configurations (often as the last step in a refinement loop), such policies are distributed (S6590) to CMP-OSC and CMP-RSC.

It is evident to anyone skilled in the art of computer science that there are many ways of implementing checking whether there is a refinement template match, and checking whether the policy is machine-enforceable, with the same result, and that the presented flow diagram only illustrates one particular implementation. For example, the matching step (S6540) may iterate through all available combinations of refinement templates to determine a match, and set a variable if a match is found, which can be checked by the "no match and policy not machine-enforceable" determining step (S6570). Furthermore, a policy rule is machine-enforceable if an available, i.e. machine-enforceable, PFF (e.g. CMP-ASS, CMP-CS, CMP-MS) can be associated with every policy function feature in the policy, and an available, i.e. machine-enforceable, PSF (e.g. policy, rule, rule element) can be associated with every policy structure feature in the policy. Similarly, a configuration is machine-enforceable if every configuration feature can be associated with a supported configuration feature of other security components (cf. CMP-OSC) and/or the MDS System (cf. CMP-RSC).

Furthermore, it may be apparent to anyone skilled in the art that several of the steps can be reordered without affecting the functionality of the MDS System (for example, S6510, S6520, and S6530).

It is noted that the policy refinement step (S6540) may replace some high-level policy feature functions with references to the policy feature functions used for the refinement. For example, a high-level policy rule element "requestor-task==PII-relevant" (PII=Personal Identifiable Information), where "requestor-task" and "PII-relevant" are not available attributes (i.e. not directly machine-enforceable), could be refined to "(CMP-MS6(CMP-MS1(requestor.identity))==TRUE)" (this excerpt is taken from the privacy rule generation example described below in this specification. It shows that the refined rule contains references to available mapper services (CMP-MS6 and CMP-MS1) and an available attribute source (requestor.identity). It is noted that the analogous applies to policy structure functions in the policy refinement step.

It is noted that the policy refinement step (S6540) may replace some high-level policy feature functions with refined values to the policy feature functions used for the refinement. For example, consider a high-level policy element "requestor is within 1 mile of postal address XYZ", where postal address is not an available attribute, but the requestor's geolocation is an available attributes. In this case, if a mapping service from postal address to geospatial area is available, the refinement step (S6540) may directly replace the postal address with the corresponding geolocation, thus making a call to the mapping service at policy decision time unnecessary. It is noted that the analogous applies to policy structure functions in the policy refinement step. Furthermore it is noted that throughout this specification, the frequent plural use of the "refinement chains" does not always imply more than one chain, but may imply an unspecific number of chains. For example, it includes the cases where the described operation could calculate no refinement chain (e.g. if there are no matching inputs and outputs), one refinement chain (e.g. if there is one matching input(s) and output(s) combination for one stack of at least one refinement templates), or several refinement chains.

While FIG. 65 illustrates certain embodiments where the rule refinement/generation step (S6540) determines the refinement chains (i.e. the order in which one or more refinement templates are applied to refine high-level policy feature functions and policy structure functions) during the refinement of an actual high-level security policy. In certain other embodiments of the MDS System, refinement chains are determined before the refinement of an actual high-level security policy. This is particularly useful in cases where read policy feature functions and/or policy structure functions (S6510) and refinement templates (S6520) include information about both available and required policy feature functions and/or policy structure functions—in this case, the MDS System can use the "required" policy feature functions and/or policy structure functions in a high-level policy (S6540) and determine the refinement paths using the same algorithm described in steps S6570, S6575, and S6580. The output is a refinement path (i.e. chain) between each required and available policy feature functions and/or policy structure functions that can be stored and used directly during rule generation. It is obvious to anyone skilled in the art that the effect of pre-calculating refinement paths and applying them to policy refinement (rule generation) later is equivalent to calculating refinement paths during policy refinement (as depicted in FIG. 65).

Figure 66:
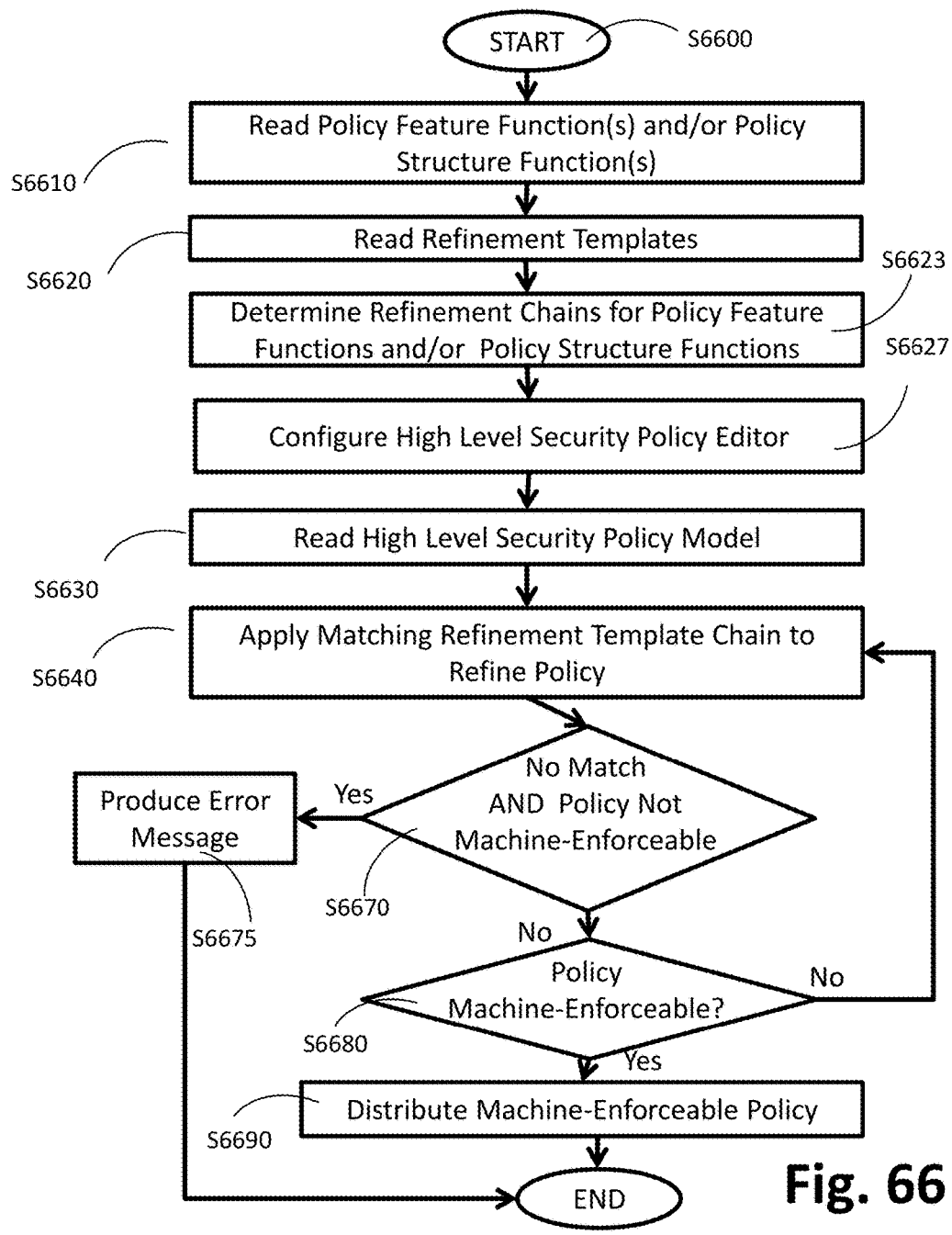
FIG. 66 illustrates a flow chart of the pre-calculated policy refinement, editor configuration, and rule generation operation according to an embodiment.

FIG. 66 depicts certain embodiments of the MDS System that include automatic configuration (implemented by CMP-AEC) of a high-level security policy editor (implemented by CMP-PE) with policy functions (including policy feature functions, policy structure features etc.) When the MDS System is triggered (S6600), it first reads policy feature function(s) and/or policy structure function(s) (S6610) and refinement templates (S6620)—similarly to the corresponding steps S6500, S6510, and S6520 in FIG. 65. After that, the MDS System determines (pre-calculates) refinement chains for policy feature functions and policy structure functions (S6623).

In cases where read inputs include "available"—but no "required"—policy feature functions inputs and/or policy structure functions inputs (S6610), the determining refinement chains step (S6623) traverses all possible combinations of matching refinement template (S6620) chains from any read "available" policy feature functions and policy structure functions (S6610). The MDS System then configures the high-level security policy editor (S6627) with all "available" and all refined policy feature functions and/or policy structure functions (from each refinement step, e.g. if a refinement chain applies (i.e. stacks) 3 refinement templates, there would be 3 refined policy feature functions and/or policy/rule/rule-elements) that are available (i.e. the one originally available, and one new one made available after each refinement template is applied).

In cases where read inputs include "available" and "required" policy feature functions and/or policy structure functions inputs (S6610), the determining refinement chains step (S6623) may traverse only all possible combinations of matching refinement chains between any read "available" and "required" policy feature functions and/or policy structure functions (S6610), by potentially chaining refinement templates (S6620). In other words, if only certain PFFs/PSFs are "required", the refinement only needs to calculate refinements (top-down) from those "required" PFFs/PSFs to "available" PFFs/PSFs. The MDS System then configures the high-level security policy editor (S6627) with only the "required" policy feature functions and/or policy structure functions for which a refinement chain has been determined to available policy feature functions and policy structure functions. The difference between the "available only" and "available and at the same time required" cases is that in the latter case, the policy editor will only offer the wanted and supported policy feature functions and/or policy structure functions, while in the former case, the policy editor will offer all supported policy feature functions and/or policy structure functions (even the ones that are not deemed useful by a human administrator, and/or the ones that are not required by any offered PFF, such as calculation function, or PSF, such as a rule element).

Next, the MDS System in FIG. 66 reads the high-level security policy model (S6627), e.g. from the configured high-level security policy editor, from storage, or from a network location. This step is similar to S6530 in FIG. 65. After that, the MDS System applies a matching refinement template chain to refine the policy (S6640). This step differs from S6540 in FIG. 65 in that a pre-calculated (in step S6623) complete chain for a policy feature functions and/or policy structure functions is applied. The MDS System then determines (S6670) if there is no match (i.e. no matching chain found) and the policy is not machine-enforceable. If yes, the MDS System produces an error message (S6675) or action. If no, the MDS System determines (S6680) whether the policy is machine enforceable, and if not, loops back (e.g. iteratively, recursively etc.) to S6640 to apply another matching refinement template chain to refine the policy. If yes, it has successfully refined the high-level policy into a machine-enforceable low-level policy (rules and/or configurations, as described in the FIG. 65 discussion), which it distributes (S6690) to CMP-PAP and/or CMP-OSC and/or CMP-RSC. As discussed for FIG. 65, the loop's checks can be implemented equivalently in many ways. It would also be possible to replace steps S6640, S6670, S6675, S6680, and S6690 by FIG. 65's S6540, S6570, S6575, S6680, and S6590, effectively only using the pre-calculation (S6623) for the policy editor configuration (S6627), but not reusing the pre-calculated refinement chains during rule generation (but rather calculating refinements without use of pre-calculated refinement chains during rule generation).

Figure 68:
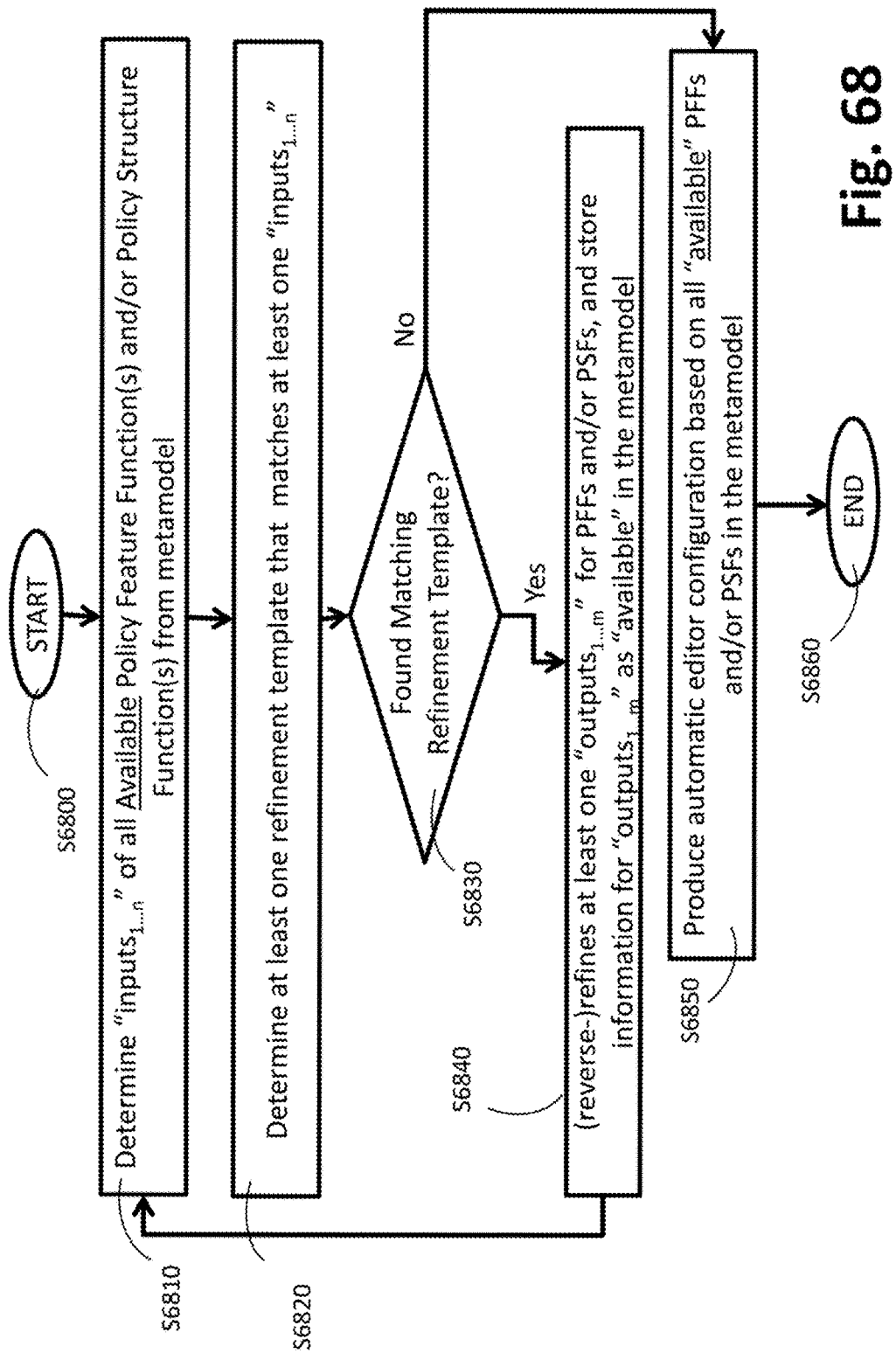
FIG. 68 illustrates a flow chart of "Determine Refinement Chains for Policy Feature Functions and Policy Structure Functions" (step 6623 in FIG. 66) and "Configure High Level Security Policy Editor (step S6627 in FIG. 66) according to an embodiment.

FIG. 68 and FIG. 69 illustrate embodiments of the detailed operation of "Determine Refinement Chains for Policy Feature Functions and/or Policy Structure Functions" (step S6623 in FIG. 66) and "Configure High Level Security Policy Editor (step S6627 in FIG. 66). Referring to FIG. 68, there is as flowchart illustrating the detailed operation of step S6623+S6627 in FIG. 66 that takes into account available PFFs/PSFs: When the operation is started (S6800), it determines (S6810) information about all available (i.e. supported by the MDS System, in a way that may be machine-enforceable) Policy Feature Function(s) (PFFs) and/or Policy Structure Function(s) (PSFs) from the metamodel (e.g. stored in CMP-MMR). These will be collectively referred to below as "$inputs_{1 \ldots n}$", meaning the collection of all supported machine-enforceable PFFs/PSFs inputs into the MDS System. This list of "$inputs_{1 \ldots n}$" initially may only include non-refined PFFs/PSFs (i.e. those directly supported by the various PFF/PSF services). Next, the operation determines (S6820) at least one refinement template that matches with at least one of the "$inputs_{1 \ldots n}$", and—if it found a matching refinement template (S6830)—applies this/those template(s) to produce (S6840) at least one refined PFF/PSF, i.e. (reverse-) refines at least one "$outputs_{1 \ldots m}$" for PFFs and/or PSFs. "$outputs_{1 \ldots m}$" (for PFFs and/or PSFs) may be considered outputs of refinement templates. Because this particular example refines bottom-up (i.e. starting from available PFFs/PSFs), the refinement direction may be called "reverse-refinement" (as opposed to refining a high-level policy top-down into machine-enforceable rules). However this is only a theoretical distinction, as the templates may be the same for refinement/reverse-refinement. Step S6840 also stores information about the "$outputs_{1 \ldots m}$" in the metamodel to characterize that these "$outputs_{1 \ldots m}$" are now also available. In lay terms, "$outputs_{1 \ldots m}$" are now also supported, because they can be mapped to supported (aka. "available") "$outputs_{1 \ldots m}$" via refinement template(s). The operation then loops (e.g. iteratively, recursively etc.) back to step S6810 to determine "$inputs_{1 \ldots n}$" of all available Policy Feature Function(s) and/or Policy Structure Function(s) from the metamodel. These "$inputs_{1 \ldots n}$" now include "$outputs_{1 \ldots m}$". The operation repeats the already-described loop S6810, S6820, S6830, S6840 for as long as a matching refinement template can still be found in step S6830. If no matching refinement template can be found, the refinement is completed, and the operation produces (S6850) an automatic editor configuration based on all "available" PFFs and/or PSFs (corresponding to step S6627 in FIG. 66) in the metamodel and ends (S6860). In lay terms, the editor will provide editing choices for all available (direct and refined) PFFs and PSFs.

Now Referring to FIG. 69, there is as flowchart illustrating an example of the detailed operation of step S6623 and S6627 in FIG. 66 that takes into account available and at the same time required PFFs/PSFs: When the operation is started (S6900), it determines (S6910) information about all available (i.e. supported by the MDS System, in a way that may be machine-enforceable) Policy Feature Function(s) (PFFs) and/or Policy Structure Function(s) (PSFs) from the metamodel (e.g. stored in CMP-MMR). These will be collectively referred to below as "$inputs_{1 \ldots n}$", meaning the collection of all supported machine-enforceable PFFs/PSFs inputs into the MDS System. This list of "$inputs_{1 \ldots n}$" initially may only include non-refined PFFs/PSFs (i.e. those directly supported by the various PFF/PSF services). Next, the operation determines (S6920) at least one refinement template that matches with at least one of the "$inputs_{1 \ldots n}$", and—if it found a matching refinement template (S6930)—applies this/those template(s) to produce (S6940) at least one refined PFF/PSF, i.e. (reverse-) refines at least one "$outputs_{1 \ldots m}$" for PFFs and/or PSFs. "$outputs_{1 \ldots m}$" (for PFFs and/or PSFs) may be considered outputs of refinement templates. Again, because this particular example refines bottom-up (i.e. starting from available PFFs/PSFs), the refinement direction can be considered a reverse-refinement (as opposed to refining a high-level policy top-down into machine-enforceable rules). However this is only a theoretical distinction, as the templates may be the same for refinement/reverse-refinement. Step S6940 also stores information about the "$outputs_{1 \ldots m}$" in the metamodel to characterize that these "$outputs_{1 \ldots m}$" are now also available. In lay terms, "$outputs_{1 \ldots m}$" are now also supported, because they can be mapped to supported (aka. "available") "$outputs_{1 \ldots m}$" via refinement template(s). The operation then loops (e.g. iteratively, recursively etc.) back to step S6910 to determine "$inputs_{1 \ldots n}$" of all available Policy Feature Function(s) and/or Policy Structure Function(s) from the metamodel. These "$inputs_{1 \ldots n}$" now include "$outputs_{1 \ldots m}$". The operation repeats the already-described loop S6910, S6920, S6930, S6940 for as long as a matching refinement template can still be found in step S6930. If no matching refinement template can be found, the refinement is completed, and the operation determines (S6950) all required and all available Policy Feature Function(s) and/or Policy Structure Function(s) from metamodel, and specifically determines (S6960) all Policy Feature Function(s) and/or Policy Structure Function(s) that are both required and available at the same time. The operation then produces (S6970) an automatic editor configuration based on all "available" PFFs and/or PSFs (corresponding to step S6627 in FIG. 66) in the metamodel and ends (S6980). In lay terms, the editor will provide editing choices for all policy features that are defined as desired (i.e. required PFFs and/or PSFs) that are also supported (directly and refined available PFFs and/or PSFs). In many instances, the operation in FIG. 69 will produce a subset of editing choices compared to the operation in FIG. 68, because it will not configure available editing choices that are not required (thus avoiding cluttering the editor).

It is noted that the described approach is only an embodiment of many. In another embodiment, for example, the operation could start by determining all "required" PFFs/PSFs first, and then calculating (e.g. iteratively, recursively etc.) refinement templates from those to "available" PFFs/

PSFs. This approach could be called top-down from required PFFs/PSFs, in contrast to the bottom-up approach described before. It is understood by those skilled in the art that the particular chosen approach may depend on the requirements and the specific information being processed. For example, if there are only very few required PFFs/PSFs but many available ones, then iterating top-down may be preferable, while if there are only very few available PFFs/PSFs but many required ones, then iterating bottom-up may be preferable.

Lifecycle Phases of the MDS System

The below describes numerous exemplary lifecycle phases which certain MDS System embodiments may go through during its lifecycle.

In some embodiments, there is an installation phase, where at least one system installer (e.g. an administrator) installs the components (e.g. software logic on devices), using, for example, attached keyboard and screen, network remote access or the like. In an embodiment, an administrator installs at least one of the following MDS System components on one or more devices' memory using, for example, attached keyboard and screen or the like: CMP-MMR (Metamodel & Model Repository, e.g. in Eclipse); CMP-MDR (Metadata & Service Metadata Repository, e.g. in Eclipse); CMP-PAP (Policy Access Point, i.e. Policy Rule Repository); CMP-PE (Policy Editor, e.g. web app server/browser); CMP-AEC (Automated Editor Configuration); CMP-RSC (Automatic MDS Runtime System Configuration); CMP-MDS (MDS Access Rule Generation, i.e., Model-Driven Security); CMP-PSV (Policy & MDS System Verification, i.e., Model-Driven Security Accreditation); CMP-OSC (Other Security Technology Component Configuration); CMP-PMR (Policy Monitoring Point, i.e., central incident collector/aggregator); CMP-PPG (Predictive, Assisted Policy Generation); CMP-RAA (Risk and Attack Detection/Analysis/Prediction).

In an embodiment, the installation phase also involves installing the following components: Firstly, one or more CMP-PEP (Policy Enforcement Point, PEP), which in some embodiments are installed on each node of the Protected SoS. In an embodiment, one CMP-PEP is installed on some or all such nodes, while in another embodiment, several CMP-PEPs are installed on some or all such nodes (e.g. to implement XLAC, as described above). Secondly, one or more CMP-PDP (Policy Decision Point, PDP), which in some embodiments is installed on its own device, and in other embodiments is installed together with other components. In one embodiment, CMP-PDPs & CMP-PEPs are installed on each to-be-protected application node (e.g. collocated with the middleware layer on each node). In another embodiment, CMP-PDPs & CMP-PEPs are not collocated, and CMP-PEPs contact CMP-PDPs to obtain access decisions.

In an embodiment, the installation phase further involves installing the following components (for PFFs/PSFs): CMP-ASS (Attribute Source Services), CMP-CS (Calculation Services), and CMP-MS (Mapping Services). In some embodiments, this involves installing such services, while in other embodiments, this involves connecting existing services into the MDS System (e.g. by installing "wrappers" around existing sources):

Finally, in some embodiments the installation phase further involves installing the functional description sources connector CMP-FDS (Functional Description Sources). For example, an administrator installs a data connection between the MDS System's CMP-FDS component and actual functional description sources that should be fed into the MDS System. In some of these embodiments, the MDS System uses such information obtained from other sources (such as model-driven development tools, BPMS tools, asset monitoring/management tools etc.). It is noted that the CMP-FDS component is not the data source itself, but rather the "connector" (and aggregator, analyzer, normalizer, formatter etc.) from the other functional description sources.

In some embodiments, there is a configuration phase. In such embodiments, a system configurer (e.g. administrator(s), system integrator(s), system deployer(s)) configures the installed components and interconnections (by setting configuration files/options/settings etc.) using for example a keyboard and display/screen.

In an embodiment, the configurer configures CMP-MMR, or CMP-MMR auto-configures itself from configuration files. CMP-MMR sets up a repository for metamodels and models, and configures its modeling framework feature (e.g. Eclipse EMF). In lay terms, such a repository can be viewed as a specialized database for metamodels & models. In an embodiment, CMP-MMR is configured so that when it launches, it loads preconfigured metamodels (e.g. bootstrap metamodels), and optionally also bootstrap models. In some cases, the configurer authors a metamodel based on a meta-metamodel (e.g. Eclipse Ecore, OMG MOF) and configures CMP-MMR to load those when it launches.

In an embodiment, the configurer configures CMP-MDR, or CMP-MDR auto-configures itself from configuration files. CMP-MDR sets up a repository for metadata, which in some embodiments is built using metamodeling and modeling features (e.g. Eclipse EMF). In lay terms, such a repository can be viewed as a specialized database for metadata. In an embodiment, CMP-MDR is configured so that when it launches, it loads preconfigured metadata about services and features (e.g. PFFs such as attribute services, calculation services, mapper services; PSFs such as policies, rules, and rule elements, descriptive information etc.), and optionally also bootstrap metadata. In an embodiment, the configurer authors their own metamodel based on meta-metamodel (e.g. Eclipse Ecore, OMG MOF) and configures CMP-MMR to load those when it launches. In an embodiment, the configurer authors metadata (e.g. based on a meta-metamodel, such as Eclipse Ecore, OMG MOF) and configures CMP-MMR to load those when it launches. Alternatively, CMP-MDS is configured so that (upon launching) it will discover the metadata of available services.

In an embodiment, the configurer configures CMP-PE, or CMP-PE auto-configures itself from configuration files. In some embodiments, the configurer additionally configures CMP-AEC, or CMP-AEC auto-configures itself from configuration files. CMP-AEC can be configured so that (upon launch, e.g. of the web app server that implements the editor), it reads for example configuration files, templates, default/standard configurations etc. CMP-AEC also reads for example initial bootstrap metamodel/metadata from CMP-MMR and CMP-MDS, which includes information used to customize the editor (e.g. populate possible selections e.g. in pull-down menus, and particular features of the policies, e.g. number of attributes going into a decision). CMP-AEC also reads for example a functional system description, to allow e.g. (optional) tagging/grouping of elements of the system description, assets, information flows, users etc.

In an embodiment, the configurer configures CMP-RSC, or CMP-RSC auto-configures itself from configuration files. In some cases, this involves connecting CMP-RSC to the repositories CMP-MMR and CMP-MDR, which (upon launching) provide information about which components (services), e.g. implementations of PFFs (e.g. CMP-ASS/CMP-CS/CMP-MS) and/or PSFs, are available in the MDS System runtime. In some cases, this involves connecting CMP-RSC to CMP-FDS, so that (upon launching), CMP-RSC can automatically (or partly automated) connect the information flows between the runtime components, in particular: (1) Deploying CMP-PEPs on each node and CMP-PDPs on one or more nodes of the Protected SoS, and connect CMP-PDPs with CMP-PEPs. It is noted that in some embodiments this may not be needed because CMP-PDPs and/or CMP-PEPs are automatically started with each node's application launch, and CMP-PDPs and CMP-PEPs may be collocated on each node. (2) Based on explicit configurations, or based on dynamic configuration upon launching, connect CMP-PDPs with available and required PFFs (e.g. CMP-ASS/CMP-CS/CMP-MS) and/or PSFs, and connect CMP-PDPs with CMP-PAP.

In an embodiment, the configurer configures CMP-OSC, or CMP-OSC auto-configures itself from configuration files or dynamically generated configurations obtained from e.g. a discovery service. CMP-OSC is configured to connect with the underlying other technology component(s) that will receive the generated security configuration(s) from the MDS System (e.g. connector into MS SharePoint, firewalls, IPS, operating systems such as SELinux, SAP . . . ). In some embodiments, CMP-OSC includes an automatic discovery feature that automatically detects available "other security components" and matches with a list of supported "other security components" for which CMP-OSC supports automatic (security) configuration. Automated or manual, this configuration phase will often involve manual configuration of secure sessions, API keys, cryptographic material etc.

In an embodiment, the configurer configures CMP-FDS, or CMP-FDS auto-configures itself from configuration files or dynamically generated configurations obtained from e.g. a discovery service. CMP-FDS is configured to connect with the functional description sources that will provide the functional description to the MDS System. CMP-FDS turns the information obtained from such sources into a suitable form (e.g. a model) that is transmitted (push or pull) to CMP-MDS and other parts of the MDS System. CMP-FDS is usually (but not always) not the functional description source provider itself, but rather the connector to the provider (e.g. external model-driven tools, discovery tools etc.) In some embodiments, this information is explicitly specified and fed into CMP-FDS. In other embodiments, CMP-FDS includes an automatic discovery feature that automatically detects available functional description sources and matches them with a list of supported ones. Examples of sources include: software models from MDD/MDE tools; models from BPMS tools; automatically detected system and information flow information from e.g. asset monitoring systems, network mapping tools, discovery services (e.g. OMG DDS discovery service); discovery of supported other security components (which are configured by CMP-OSC) etc. In yet other embodiments, the information is automatically discovered by an automatic discovery feature (or is provided otherwise), and is additionally enriched manually with information relevant to the MDS System (e.g. tagging labels for confidential data sources into the functional model).

In an embodiment, the configurer configures CMP-MDS, or CMP-MDS auto-configures itself from configuration files or dynamically generated configurations and/or templates. CMP-MDS is configured so that (upon launching) it loads model transformation workflows, model-transformation templates, other templates (e.g. rule templates, attribute templates, default policies, refinement templates) etc. Furthermore, CMP-MDS is configured to connect with: CMP-MMR, CMP-MDR, CMP-PAP, CMP-OSC, CMP-FDS, and other components that form inputs or outputs of CMP-MDS.

In an embodiment, the configurer configures CMP-PMR, or CMP-PMR auto-configures itself from configuration files or dynamically generated configurations. CMP-PMR is configured so that (upon launching) it connects to CMP-PDPs to collect, aggregate, and analyze incidents. Furthermore, (in some embodiments only) it displays incident in a dashboard to users (e.g. security personnel). CMP-PMR is also configured to connect with external tools, for example monitoring/IDS/IPS/SIM/SIEM tools, using an export feature (for example, turning incident alerts into the standard Syslog format and providing them to said external tools).

In an embodiment, the configurer configures CMP-PSV, or CMP-PSV auto-configures itself from configuration files or dynamically generated configurations. CMP-PSV is configured to load (upon launching) verification metamodels & models (stored in the CMP-MMR, or a separate instance of CMP-MMR), model transformation workflows, model-transformation templates (portions), other templates (e.g. evidence templates, default policies etc.). Furthermore, CMP-PSV is configured to connect (upon launching) with information sources: CMP-MMR, CMP-MDR CMP-PAP, CMP-RSC, CMP-MDS, CMP-OSC, CMP-FDS, CMP-PMR.

In an embodiment, the configurer configures CMP-ASS, CMP-CS, and/or CMP-MS (examples of PFFs/PSFs), or CMP-ASS/CS/MS automatically configure from configuration files/templates. CMP-ASS/CS/MS are configured to load (upon launching) the metadata about its services (optional), and a metamodel (MM) portion pertaining to its services (optional). Furthermore, CMP-ASS/CS/MS are configured to (upon launching) connect to CMP-MDR to provide their metadata information, and to CMP-MMR to provide their metamodel information. CMP-ASS/CS/MS can push this information, or respond to pull requests. CMP-ASS/CS/MS are also configured to (upon launching) connect (push or pull) to CMP-MDS, CMP-RSC, and CMP-PDP.

In some embodiments, there is also a launch phase, during which the MDS System is started by executing the MDS System's components (e.g. software on a dedicated computing device, or several components collocated on one computing device). In other words, the software and hardware that executes the MDS System components is run.

In an embodiment, the launcher (e.g. human administrator) launches CMP-MMR, or CMP-MMR automatically launches (e.g. when the device starts). CMP-MMR starts up the metamodel/model repository and modeling framework feature of CMP-MMR (e.g. Eclipse EMF), which can be understood as a potentially specialized, flexible database for metamodels & models. CMP-MMR loads template(s) of a preconfigured bootstrap metamodel, or the launcher authors their own metamodel based on meta-metamodel (e.g. Ecore, MOF). As they become available, CMP-MMR also obtains metamodel information from PFFs (e.g. CMP-ASS/CS/MS) and/or PSFs and adds it at the correct position in the metamodel.

In an embodiment, the launcher launches CMP-MDR, or CMP-MDR automatically launches. CMP-MDR starts up its metadata repository (which can be understood as a potentially specialized database for metadata). As they become available, CMP-MDR loads template(s) of preconfigured metadata about services and features (e.g. PFFs such as CMP-ASS/CS/MS, and/or PSFs such as rule elements)—these templates can be based on configuration files, on manual configuration, or on metadata discovered from (or provided by) the services and features themselves. For example, CMP-MMR could listen at a (system-wide agreed) network location, publish-subscribe middleware topic, reference, API etc.

Based on the obtained metadata and metamodel, CMP-MMR and CMP-MDR can now calculate valid refinement chains (e.g. "attribute refinement" paths) to determine which PFFs (e.g. attributes) and/or PSFs (e.g. rule elements) (directly available or mapped) are available, i.e., based on available PFF (e.g. attributes, calculations) templates and PSF (e.g. "rule refinement") templates, which (directly available or mapped) PFFs (e.g. calculations) and/or PSFs can be supported. PFF refinement (e.g. "attribute refinement") and PSF refinement (e.g. "rule refinement") are described in depth elsewhere in the present application. During this process, CMP-MDR is checked for each mapping to ensure that the PFFs (e.g. CMP-ASS/CS/MS) and/or PSFs actually fit together (interfaces, syntax etc.). The results of these calculations, mapped PFFs (e.g. attributes) and mapped PSFs (e.g. rule elements), are added as extra model and/or metamodel elements into the same CMP-MMR (and/or marked as available, e.g. associated with a descriptive "available" metamodel entity). As a result of this process, CMP-MMR contains information about all available (mapped or direct) PFFs (e.g. attributes, calculations), and PSFs (e.g. policies, rules, rule elements).

In an embodiment, the launcher launches CMP-PE, or CMP-PE automatically launches (it is noted that CMP-PE can be used without CMP-AEC in some cases), reads configurations (e.g. selectable policy features) and executes the user interface (e.g. software on a web app server that provides a browser-based policy editor GUI). During the policy authoring phase, when the user completes policy entry (e.g. on a web page provided by CMP-PE), CMP-PE generates the corresponding policy model (this step is obvious, because the features selectable in the editor are based on the metamodel/metadata).

In an embodiment, the launcher launches CMP-AEC, or CMP-AEC automatically launches. The CMP-AEC feature starts up (e.g. web app based) and reads: configuration files, templates, default/standard configurations; the metamodel/metadata from CMP-MMR & CMP-MDS, which includes information used to customize the editor (e.g. populate possible selections e.g. in pull-down menus; and particular features of the policies, e.g. number of attributes going into a decision); the system description, to allow (optional) tagging/grouping of elements of the system description assets, information flows, users etc. The editor component CMP-PE feature starts up (e.g. web app based) and—if CMP-AEC is part of the embodiment—gets configured dynamically by CMP-AEC: This means that the appearance of the policy editor and policy features selectable in the policy editor CMP-PE are determined by CMP-AEC based on information obtained from CMP-MMR. CMP-AEC can support dynamic editor updates, by repeating this process whenever any changes occur to the MDS System that impact the selectable PFFs/PSFs (e.g. addition, removal, or modification of CMP-ASS/CS/MS or rule elements): CMP-AEC receives metamodel/metadata updates (via push or pull from CMP-MMR & CMP-MDR) and updates CMP-PE editor appearance dynamically (e.g. when attributes/calculations/mappers are added or removed, or when system relevant aspects change).

In an embodiment, the launcher launches CMP-RSC, or CMP-RSC automatically launches. If system components are statically deployed and connected, CMP-RSC already configured them during the configuration phase. If system components are dynamically deployed and connected, CMP-RSC will integrate components as follows based on information from the CMP-MMR and CMP-MDR: (1) Deploy CMP-PEPs (sometimes started automatically when the application node with its middleware starts); (2) Also, deploy CMP-PDPs, and connect CMP-PDPs with CMP-PEPs (sometimes started automatically when the application node with its middleware starts); (3) Furthermore, connect CMP-PDPs with CMP-PAP (e.g. PDPs connect to the PAP at a known network location, or configure all CMP-PDPs by providing the connection information to CMP-PAP). It is noted that there could be more than one CMP-PAP. (4) Additionally, connect CMP-PDPs with available (and/or maybe required) PFFs (e.g. CMP-ASS/CS/MS) and/or PSFs (e.g. rule element services, which may be built into the CMP-PDP), which can be done in various ways, such as: (4a) Based on CMP-MDR only, connect to all available services (PFF, PSF etc.): In this example, the metadata includes all information needed. CMP-RSC obtains connection information (metadata) from CMP-MDR for all PFFs (e.g. CMP-ASS/CS/MS) and/or PSFs; it then sends the connection instructions (and configurations) for all PFFs (e.g. CMP-ASS/CS/MS) and/or PSFs to the CMP-PDP, which sets up the connections. In this example, the metadata also includes the names of services used in the "low level" rules, so the CMP-PDP knows which component to call to fetch information (e.g. attributes, calculations, mappers). (4b) Based on CMP-MDR & CMP-MMR: In another embodiment, the metadata in CMP-MDR does not include the names used in the "low level" rules for the various components. In this case, CMP-RSC also obtains metamodel information from CMP-MMR about the semantics of all PFFs (e.g. CMP-ASS/CS/MS) and/or PSFs; it uses this information to determine the names used in the "low level" rules for the various components, and sends this information to CMP-PDP. (4c) Only connect to needed services (e.g. PFFs/PSFs): In this example, maybe there are only a few CMP-ASS/CS/MS (examples of PFFs—PSFs may be handled analogously), so it is easiest to connect all CMP-PDPs to all PFFs (e.g. CMP-ASS/CS/MS) and/or PSFs. In other embodiments with many PFFs (e.g. CMP-ASS/CS/MS) and/or PSFs, it is preferable to only connect to the PFFs (e.g. CMP-ASS/CS/MS) and/or PSFs that are actually needed to decide the policy. In such embodiments, the connection information is communicated by CMP-RSC to the CMP-PDPs after CMP-MDS rule generation-based on which PFFs (e.g. attributes, calculations, and mappings) and/or PSFs are used by the "low level" policy rules. (4d) Based on manual configuration: In another embodiment, the administrator manually configures the connection with CMP-PDPs with available and required PFFs (e.g. CMP-ASS, CMP-CS, and CMP-MS) and/or PSFs (e.g. using a manual CMP-RSC configuration feature); (5) Additionally, connect CMP-MDS with available (and/or required) PFFs (e.g. CMP-ASS/CS/MS) and/or PSFs, and with CMP-PAP: If system components are statically deployed and connected, CMP-RSC already configured them during the configuration phase. If system components are dynamically deployed and connected, CMP-RSC will integrate the MDS System's runtime components based on information from the CMP-MMR and CMP-MDR, which provide information about which PFFs (e.g. CMP-ASS/CS/MS) and/or PSFs are available (and/or required) for the MDS System runtime, and maybe also which refinement chains have been calculated. CMP-RSC automatically (or partly automated) connects the information flows between the runtime components. At runtime (later), CMP-RSC (optionally) repeats/updates this functionality. (6) Connect CMP-OSC with available and required PFFs (e.g. CMP-ASS/CS/MS) and/or PSFs: If system components are statically deployed and connected, CMP-RSC already configured during the configuration phase. If system components are dynamically deployed and connected: Based on the information in the repositories CMP-MMR and CMP-MDR (as well as discovered information and CMP-OSC configurations etc.), the CMP-RSC automatically (or partly automated) connects the information flows between the policy generation CMP-MDS and CMP-OSC components. CMP-RSC may also connect CMP-PAP with CMP-OSC if needed. At runtime (later), CMP-RSC (optionally) repeats/updates this functionality.

In an embodiment, the launcher launches CMP-PDPs and CMP-PEPs, or CMP-PDPs and CMP-PEPs automatically launch. For example, CMP-PEPs (and CMP-PDPs) can be bundled with the Protected SoS node and automatically launched together with the Protected SoS node (e.g. CMP-PDPs/PEPs can be bundled with the application or middleware software). CPM-PDPs, based on configuration files or automated discovery, connect to: CMP-PAP (if there are several, it picks the most suitable based on a selection algorithm, such as e.g. closest in terms of network topology); to PFFs (e.g. CMP-ASS/CS/MS) and/or PSFs (so that they have access to e.g. attribute, calculation, and mapping services during policy decisioning); and to CMP-PMR (so they can provide incident alerts to the central CMP-PMR).

In an embodiment, the launcher launches CMP-OSC, or CMP-OSC automatically launches—based on earlier configuration, or automatic configuration, or discovery, at launch time, or a combination of the these (and other) choices. CMP-OSC connects with the underlying other technology component(s) that will receive the generated security configuration(s), via connectors, configuration files/commands, API calls, code etc. to configure security features. For example: MS SharePoint, firewalls, IPS, operating systems (e.g. SE Linux), SAP etc. For automatic configuration, an automatic discovery service detects available relevant systems and matches with a list of supported technologies for which CMP-OSC supports automatic (security) configuration. At runtime, CMP-OSC (optionally) repeats this functionality to dynamically update for which other security technologies CMP-OSC will generate security configuration(s)

In an embodiment, the launcher launches CMP-FDS, or CMP-FDS automatically launches. Based on earlier configuration, or automatic configuration at launch time, or a combination of the two options, CMP-FDS connects supported functional description source into CMP-FDS. Examples of sources include: software models from MDD/MDE tools; models from BPMS tools; automatically detected system and information flow information from e.g. asset monitoring systems, network mapping tools, discovery services (e.g. OMG DDS discovery service); and discovery of supported other security components (to be configured by CMP-OSC). At launch-time, or at runtime (once, or repeatedly/continuously), CMP-FDS turns information from that source into a model that is transmitted (push or pull) to CMP-MDS as an input into e.g. the rule generation. CMP-FDS processes (aggregates, analyzes, normalizes, consolidates and reformats etc.) information from the other functional description sources into a consolidated system description model.

In an embodiment, the launcher launches CMP-MDS, or CMP-MDS automatically launches. Based on prior configuration, or based on dynamic and automatic discovery/configuration, CMP-MDS connects to CMP-MMR, CMP-MDR, CMP-PAP, CMP-OSC, and CMP-FDS. CMP-MDS also loads for example model transformation workflows, model-transformation templates (portions), other templates (e.g. refinement templates, default policies, default PFFs and/or PSFs etc.).

In an embodiment, the launcher launches CMP-PMR, or CMP-PMR automatically launches. Based on prior configuration, or dynamic and automatic discovery/configuration, CMP-PMR connects with CMP-PDPs to collect incidents, and starts collecting, aggregating, analyzing, consolidating, etc. alerts. It may also display incidents in a dashboard and exports incident alerts (e.g. monitoring tools via Syslog).

In an embodiment, the launcher launches CMP-PSV, or CMP-PSV automatically launches. Based on prior configuration, or dynamic and automatic discovery/configuration, CMP-PSV connects to CMP-MMR, CMP-MDR CMP-PAP, CMP-RSC, CMP-MDS, CMP-OSC, CMP-FDS, CMP-PMR. CMP-PSV loads for example: verification metamodels & models (stored in the CMP-MMR, or a separate instance of CMP-MMR), model transformation workflows, model-transformation templates (portions), other templates (e.g. evidence templates, default policies etc.)

In an embodiment, the launcher launches CMP-ASS, CMP-CS, and/or CMP-MS (examples of PFFs), or CMP-ASS/CS/MS automatically launch. CMP-ASS/CS/MS load: metadata (MD) about its services/implementation (optional), and metamodel (MM) portion pertaining to its services (optional). CMP-ASS/CS/MS may push their metamodel and metadata portions to CMP-MMR and CMP-MDR, respectively, or respond to pull from CMP-MMR and CMP-MDR (or: administrator manually modifies metamodel in CMP-MMR and CMP-MDR to reflect CMP-ASS/CS/MS). At runtime CMP-ASS/CS/MS respond to connection requests from CMP-MDS, CMP-PDP, and CMP-PSV. At runtime CMP-ASS/CS/MS also respond to runtime configuration CMP-RSC requests. It is noted that the analogous applies to launching policy structure functions.

In an embodiment, at the runtime phase, the MDS System can be used to author policies, generate "low level" technical rules, decide/enforce/monitor "low level" technical rules, and to verify compliance with requirements models.

In an embodiment, for policy authoring, a user (e.g. security administrator) can use CMP-PE to select and save "high-level policies". CMP-PE may be automatically configured by CMP-AEC: CMP-AEC automatically generates configuration data used by CMP-PE, based on information in CMP-MMR and CMP-MDR, and on templates. In particular, configurations are based on the particular features, data types, inputs and outputs of available PFFs (e.g. attributes, calculations, mappings). CMP-MMR and CMP-MDR determine which mappings are supported by CMP-MS, and only those will be configured by CMP-AEC.

In an embodiment, configurations may also be based on available PSFs (e.g. rule features, rule structures, rule templates etc.) Only supported PSFs, e.g. policies, rules and rule elements (i.e. directly available, or mapped) may determine the layout of the editor. Similarly, only supported PFFs, e.g. attributes (i.e. directly available, or mapped) may be selectable in CMP-PE, e.g. in pull-down menus.

For policy authoring, a user (e.g. security administrator) can also use CMP-MMR directly to author "high-level policies", for example by directly entering a model (based on the metamodel) into the CMP-MMR tool (e.g. Eclipse EMF's "Reflective Model Editor"). This can provide added flexibility and freedom, but is harder to use and manage, because available policy features may need to be manually figured out by examining metamodel information and information stored in CMP-MDR. The entered model is directly saved into CMP-MMR. It is also possible to edit the metamodel directly (e.g. using the Eclipse EMF Ecore editor); however, manual changes to the metamodel may have many unforeseen consequences and break the CMP-MDS component's functionality.

For policy authoring, a user (e.g. security administrator) can also use CMP-PAP directly to author "low-level policies" (as defined in the MDS patent), for example by directly entering machine-enforceable technical rules into CMP-PAP (e.g. Eclipse text or model editor). The CMP-PAP may also hold the technical rules generated by CMP-MDS. In line with well-known model-driven development tool practices, rules directly entered into CMP-PAP may need to be entered into a "protected region" of the policy file so that CMP-MDS does not later overwrite these rules.

In an embodiment, users (e.g. security administrators) can trigger the automated technical "low-level" rule generation, or it can automatically trigger (e.g. whenever certain conditions occur, esp. changes, such as policy changes, SOA service re-orchestration etc.). Low-level rules are automatically generated (from "high-level" policy models) by CMP-MDS using e.g. the operation depicted in FIGS. 65, 66, 68, and 69 (and/or the operation described in the MDS patent). Inputs into CMP-MDS during rule generation include: CMP-MMR (metamodels and models), CMP-MDR (metadata), CMP-FDS (functional system description(s)), PFFs such as CMP-ASS/CS/MS (attribute services, calculation services, and mapping service—or: attribute values, calculation results, mapping results), PSFs (e.g. rule elements) etc. Outputs from CMP-MDS during rule generation include: CMP-PAP (which can store generated "low level" rules; CMP-MMR (which can also store "low level" rules, and then push optimized format to CMP-PAP); CMP-OSC stores generated other security component configurations, or CMP-MMR can hold the configurations and push them to CMP-OSC; CMP-RSC may additionally configure runtime components based on generated rules (e.g. certain infrastructure configurations/rules generated from infrastructure templates), e.g. communicate configuration information to CMP-PDP regarding how to connect to which PFFs (e.g. CMP-ASS/CS/MS) and/or PSFs (depending on which rules should be enforced on which Protected SoS node). The functionality of CMP-MDS includes the operation depicted in FIGS. 65, 66, 68, and 69. It may also include the operation described in the MDS patent.

In an embodiment, dynamic connection to services (CMP-RSC) is another runtime feature: In embodiments with many CMP-PDPs and many PFFs (e.g. CMP-ASS/CS/MS) and/or PSFs, it may be preferable to only connect to the PFFs (e.g. CMP-ASS/CS/MS) and/or PSFs that are actually needed to decide the policy (e.g. or performance reasons). In such embodiments, the connection information is communicated by CMP-RSC to the CMP-PDPs after CMP-MDS rule generation. The connection information is based on which PFFs (e.g. attributes, calculations, and mappings) and/or PSFs are used by the "low level" policy rules and can be determined by CMP-RSC after CMP-MDS has generated the rules for each CMP-PDP.

In an embodiment, decision-making/enforcement is done ag runtime (or launch time) by CMP-PAP (for rules distributed to CMP-PDPs) and CMP-OSC (for configurations distributed to other security component technologies).

Depending on the embodiment, the generated rules and configurations are either directly pushed by CMP-MDS to CMP-PAP & CMP-OSC, or pushed by CMP-MDS to CMP-MMR, and then CMP-PAP & CMP-OSC. From there, rules are transmitted (push or pull) from CMP-PAP to CMP-PDPs, and configurations are transmitted (push or pull) from CMP-OSC to other security components.

In an embodiment, decision-making/enforcement is done at runtime by CMP-PDPs and CMP-PEPs. This process is usually triggered by some event (e.g. arrival of a request message at the CMP-PEP). CMP-PEP intercepts the message. If applicable, CMP-PEP also strips out relevant attribute values (e.g. sender ID, called target, parameter values), and sends them to the CMP-PDP (essentially becoming a CMP-ASS for certain attributes stripped out of the message (in this specification, for consistency these particular CMP-PEP features are referred to as CMP-ASS). The CMP-PEP also asks CMP-PDP for an access decision. The CMP-PDP may fetch further attributes from e.g. CMP-ASS (and other PFFs and/or PSFs); may map between attributes used in rules and attributes used to decide the policy, using CMP-MS if needed; and calculates attribute matches using CMP-CS (built-in operators, or external calculation services). CMP-PDP then transmits the decision (and optional actions, e.g. obligations) to CMP-PEP, which enforces the decision (allow, deny, log, redact/filter, trigger specified other action etc.). For access policies, decision-making/enforcement is related to well-known ABAC approaches. However, it is noted that the MDS System is not limited to access control policies, but can manage a wide range of policies, including other security policies and non-security policies (e.g. auditing, Quality of Service, availability).

In an embodiment, decision-making/enforcement can also be done at runtime by the other security components configured by CMP-OSC. The other security component decides/enforces the configured policy in its proprietary way based on the provided configurations. For example, Windows firewall rules generated by CMP-OSC only allow network connections between all interactions specified in the functional system description.

Incident Monitoring is done by CMP-PMR and CMP-PDPs. CMP-PDPs generate alerts based on incidents, (e.g. requests being blocked because they violate the policy); or based on policy rules that trigger an alert action in addition to, or instead of grant/deny access etc. (such rules are like access control rules but trigger an alert instead of an access decision). Alerts include information that describes the nature of the event (e.g. like Syslog events), such as caller IP, caller ID, time, called IP, called ID, parameter values etc. CMP-PDPs send generated alerts to CMP-PMR, which holds a central policy monitoring repository. CMP-PMR collects, aggregates, consolidates, and analyzes incidents. CMP-PMR also displays alerts in a dashboard. CMP-PMR also exports alerts to $3^{rd}$ party products, e.g. using Syslog format (e.g. intrusion detection systems, IDS). Additionally, CMP-OSC may configure other security components to send alerts to either CMP-OSC (for reformatting and transmitting to CMP-PMR), or directly to CMP-PMR.

For compliance/accreditation analysis and evidence generation, the user (e.g. security administrator, compliance auditor) triggers CMP-PSV, or CMP-PSV automatically executes (1) periodically, or (2) event-triggered, e.g. whenever the functional system changes (changes are captured by CMP-FDS), whenever the policy changes (changes are captured by CMP-MRR), whenever PFFs (e.g. CMP-ASS/CS/MS) and/or PSFs change (changes are captured by CMP-MRR and CMP-MDR) etc. Based on the previously described configuration and launch, CMP-PSV collects information from the various configured sources, normalizes them, detects changes to previous normalized versions, generates change evidence, and correlates information with compliance/accreditation models (with metamodels) stored directly in CMP-PSV or in CMP-MMR. CMP-PSV automatically generates "supporting evidence" for an organization's compliance/accreditation processes. Supporting evidence is provided to the user for example in a display component (screen), document form (text document, word processor document, spreadsheet, XML document, or other suitable notation) etc. Some of the functionality of CMP-PSV has also been described in the MDSA Patent.

The MDS System automatically (or semi-automatically) adapts to changes. It supports a high degree of agility, which means it can update security enforcement in the face of various changes.

Changes to the functional description are detected by CMP-FDS. For example, the orchestration of Protected SoS nodes may change, or Protected SoS nodes may be modified/added/removed. It is noted that in most cases the functional description only covers certain aspects and layers of the Protected SoS (e.g. application nodes and their interactions). In such cases it is therefore not realistic to expect that CMP-FDS can detect each and every change to any layer of any Protected SoS node. Instead, it detects changes to the covered aspects and layers. When the functional system changes, CMP-MDS reads in the new functional system description from CMP-FDS, and generates new rules/configurations and transmits to CMP-PAP (which updates CMP-PDPs) & CMP-OSC configurations. Furthermore, CMP-RSC may be triggered to update the deployment of CMP-PEPs and CMP-PDPs accordingly.

When the security policy metamodel changes (e.g. because of manual CMP-MMR edits, or changes to the available services and templates, such as PFFs, PSFs, refinement templates etc.), CMP-MDS reads in the new metamodel from CMP-MMR, and if necessary, uses a different set of needed model transformation templates (an example of refinement templates) in the transformation workflow to be able to handle the new metamodel (or: manual customization of the model transformation workflow may be required). CMP-MDS then generates new rules/configurations and transmits to CMP-PAP (which updates CMP-PDPs) & CMP-OSC configurations.

When the security policy model changes (e.g. via edits in CMP-PE or CMP-MMR), CMP-MDS reads in the new policy model from CMP-MMR, and generates new rules/configurations and transmits to CMP-PAP (which updates CMP-PDPs) & CMP-OSC configurations.

When "low level" rules change, for example, when "low level" rules are directly edited in CMP-PAP, these changes can simply be distributed to the relevant CMP-PDPs.

When PFFs (e.g. CMP-ASS/CMP-CS/CMP-MS) and/or PSFs change (e.g. get added, modified or removed), CMP-MDR (and in many cases also CMP-MMR) is changed accordingly (automatically, through push/pull, discovery service; or manually). This triggers CMP-MDS to read in the new metamodel and metadata from CMP-MMR and CMP-MDR, and, if necessary, to use a new set of the needed model transformation (refinement) templates in the transformation workflow to be able to handle the PFF (e.g. CMP-ASS/CMP-CS/CMP-MS) and/or PSF changes (or: manual customization of the model transformation workflow may be required). Furthermore, CMP-RSC, if necessary, reconfigures CMP-PDPs (based on CMP-MDR) to enable them to interact with the changed PFFs (e.g. CMP-ASS/CMP-CS/CMP-MS) and/or PSFs. Finally, CMP-MDS generates new rules/configurations and transmits them to CMP-PAP (which updates CMP-PDPs) and CMP-OSC configurations.

It is noted that the MDS System may not just update the generated rules and configurations, but CMP-RSC may (optionally) repeat or update the configuration of the MDS System whenever CMP-PEPs, CMP-PDPs, PFF (e.g. CMP-ASS/CMP-CS/CMP-MS) and/or PSF etc. are modified/added/removed at runtime. Such reconfiguration can be triggered by changes in the CMP-MMR and CMP-MDR, and also by changes in CMP-FDS, by changes to PFFs/PSFs etc.

It is obvious to anyone skilled in the art that such changes simply trigger the same process as if the MDS System was run for the first time (after installation/configuration/launching). A potential complexity is introduced if transmitted updates should only include the differences (deltas) from the current state. In that case where only the differences to the prior versions need to be transmitted, change detection requires normalizing/sorting of rules and configurations, and storing prior normalized versions to compare with the new version. Change detection is described in depth in the MDSA patent (in a slightly different context) and applies here. If updates are fast and the system is smaller, then it may also be possible to simply run through the entire process (including rule and security configuration distribution), making the process practically identical with an initial run-through.

The preceding MDS System lifecycle discussion explained examples of phases embodiments of the MDS System may go though.

Some Features of the MDS System

Embodiments of the MDS System include some or all of the following features, configured according to the configurations described above, and composed of the components described above. It is noted that not all features are independent of each other, i.e. sometimes feature choices are mutually exclusive, or several features are required in combination. The following discussion does not discuss each and every feature of the MDS System, but rather focuses on specific aspects that are particularly relevant for implementing an effective MDS System.

PFF Refinement (e.g. Attribute Refinement, Calculation Refinement, Mapper Refinement)

"PFF refinement", (e.g. attribute refinement) (also sometimes referred to as "transformer chains") is one of the central concepts behind the MDS System: One of the goals of PFF (and PSF) refinement is to bridge the semantic gap between how humans want to express policies and how machines technically enforce these policies. For example, policy authors often want to author a "high-level" policy using intuitive/generic/expressive PFFs, e.g. attributes (e.g. "EU" European Union geographic area), but the runtime enforcement technology (e.g. ABAC access control decision logic) may not have access to an intuitive PFF, e.g. attribute source (e.g. for "EU"/"not-EU").

This architectural feature may (potentially iteratively) match PFFs (e.g. attributes) in policies with other PFFs in policies, and/or with PFFs that have sources/implementations (e.g. for attributes), and/or with PFFs such as calculation functions (as well as e.g. calculations with other calculations, attribute sources with attribute sources, mappers with mappers, and attributes/calculations/mappers with system configurations) etc. The following discussion illustrates attribute refinement as an example of PFF refinement. It is noted that PFF refinement is not at all limited to the described attribute refinement alone, but analogously applies to other PFFs (e.g. mapper refinement, calculation refinement). The term "attribute refinement" (an example of PFF refinement) is used to refer to mappings from an input attribute into a (more matching) output attribute. More specifically, mapping services (sometimes referred to as "transformers") can be used to map a "required attribute" to an "available attribute" (or vice versa), e.g. geographic location to country, and further to EU/non-EU. "Required attributes" (and PFFs/PSFs in general) are attributes used by the policy author to author policies and/or used by calculation services, while "available attributes" are attributes that are technically available as an attribute source service (CMP-ASS). Required attributes (and PFFs/PSFs in general) can be available attributes, but may sometimes not be. Required attributes (and PFFs/PSFs in general) can be specified explicitly in the metamodel (e.g. as a "required" metamodel association), can be implicitly specified by the inputs into calculations, can be implicitly specified by the high-level policy. Available attributes (and PFFs/PSFs in general) can be explicitly specified or implicitly determined from the metamodel and/or metadata information.

Attribute refinement can for example be (1) between (possible multiple) attributes provided by attribute sources and attributes required by calculations, (2) between attributes used in the policy to attributes available as attribute sources, and (3) between attributes used in the policy and attributes required for the calculation function result refinement. Most of the time, two or all of those cases occur at the same time.

Mapper services CMP-MS, which may be considered related to PFF refinement templates (e.g. for role-to-identity mappings identity mappings) can be used to map between available attributes and required attributes, to bridge a semantic (or syntactic) gap. Mapper services can also be chained (layered) in a refinement chain/path to bridge a wider gap. Mapper services can be components that are queried across the network to do the mapping, or can be collocated into other components (e.g. CMP-ASS, CMP-CS, CMP-PDP). Mapper services can for example be implemented using text files, lookup tables, hard-coded software, databases etc. In some cases, an actual mapping of values can be encoded into the template, e.g. as a lookup table, instead of mapping e.g. an attribute to a reference to a mapping service and another attribute.

It is noted that attribute refinement can be done before rule generation (e.g. by pre-calculating refinement chains), at rule generation time (i.e. pre-processing the mapping, for example by filling values from mapping services into rules) or at decision time (i.e. mapping at runtime, for example by filling a reference to a mapping service into rules).

A simple example for attribute refinement would be a geospatial PBAC distance calculation function CMP-CS calculates the geospatial distance between two geolocations. Assuming that only postal addresses are available as the geospatial attribute of the accessed resource (via a CMP-ASS), while the actual geolocation is only available for the requestor (e.g. GPS), an attribute refinement mapper service could now be implemented to map ("refine") postal addresses to (averaged) geospatial positions, which then could be provided to the calculation service. Similarly, attribute refinement can be done to map (usually statically) from attributes in policies to attributes required for the calculations (e.g. the policy is expressed in terms of user addresses, but the attribute sources and calculation services all operate using geospatial locations).

Various embodiments can be configured for attribute refinement (and other PFFs) as discussed below.

In one basic embodiment, no attribute mappers are used, but some attribute refinement is done within the attribute source itself. This approach limits the number of expressible policies, and does not facilitate reuse, flexibility, and extensibility. On the upside, this approach does not introduce any new complexity.

In other embodiments, mapper services are used. In one case (depicted in FIG. 20A), the attribute source can encapsulate the mapping, which seemingly reduces complexity, but does not facilitate flexibility and/or expressiveness. In another case (depicted in FIG. 20B), mapper services are called by the CMP-PDP after fetching attribute values, and before calling the calculation function. Mapper services, attribute source services, and calculation services are implemented together and hard-wired. Again, this seemingly reduces complexity, but does not facilitate flexibility and/or expressiveness. In yet another case (again depicted in FIG. 20B), mapper services are again called by the CMP-PDP after fetching attribute values, and before calling the calculation function. Mapper services, attribute source services, and calculation services may be implemented separately. This approach significantly increases flexibility and/or expressiveness, but introduces additional complexities related to the required integration of attribute services, mapper services, and calculation services. The MDS System can automatically connect the most suitable mapper services with attribute services and calculation services based on the model/metadata in CMP-MMR/CMP-MDR (a manual/ad-hoc approach, by comparison, is too time-consuming, expensive, and error-prone).

As already noted, attribute refinements can be multi-step chains. In other words, an attribute can be mapped to another attribute by one mapping service. That attribute can then again be mapped to another attribute by another mapping service. And so on, until the refined attribute matches with the required attribute. This enables reuse, flexibility and replaceability.

For attribute refinement at decision time, information about how to chain the mappers can be put in the policy rule, rather than the actual values (in this case, the CMP-PDP calls the mappers at decision time, starting with the fetched "available attribute", and ending with the "required attribute" that can be fed into the calculation service). This bottom-up refinement maps from raw information feeds to general policy attributes, during an attribute pre-processing stage. One goal is to turn raw information feeds into generic policy attributes that can be used in policy rules (e.g. more generic policy models). For example, CMP-PDP goes bottom up through the refinement chain and calls mapping services, starting with a geolocation, refining to country codes, and further refining to "EU" (if the country is in the EU). Attribute refinement at decision time is preferable for dynamic attributes, or attributes whose values are very large (e.g. large sets of polygons). CMP-ASS can calculate attributes that need to be available at decision time in numerous ways, for example: Firstly, using decoupled continuous dynamic re-/pre-calculation, i.e. in a way that is decoupled from the actual access decision-making, i.e. pre-calculated values are available whenever an access control decision is made (for example, mapping identities to operational tasks, taking dynamically changing operational charts and business process models into account). This is particularly useful for computationally intensive attributes that do not have to be perfectly fresh. Secondly, using coupled dynamic calculations, which are particularly useful if attributes are dynamic and dependent on the particular request context and/or other dynamic attributes, i.e. have to be calculated on-the-fly during the access control decision-making. For example, "everyone in an accident area should be able to access data about anyone else within 500 ft".

For attribute refinement at rule generation time, it is also possible to put the mapped values directly in the "low level" policy rule by CMP-MDS using static pre-calculation (if appropriate). This top-down refinement maps from general (high-level) policy attributes to (low-level) raw attributes, during policy generation or authoring. One goal is to automatically generate (using CMP-MDS) policy rules that only have easily obtainable, machine-enforceable, quickly evaluable attributes. This works better for attributes that are static or only "mildly" dynamic and can therefore be pre-calculated and "baked" into technical security rules (e.g. mapping a country name to/from its (approximate) geospatial polygon, or replacing a role by a set of identities, replacing a type of application with the reference to the actual application, replacing a type of resource with the attribute values of actual resources of that type etc.). This can be complemented with periodic, or on-demand triggered, attribute and rule updates whenever attribute values change. The advantage of this approach is that the model-driven security process eliminates the requirement for complex, performance-intensive attribute calculation servers. For example, if the high-level policy states a geolocation attribute value should be "EU" (required attribute), but the available attribute is a geolocation, then the refinement chain can be traversed down from EU to country code (using a mapping service that supports this), and then from country code to geographic polygon (using a mapping service that supports this). Pre-calculating some values in rules may for example be useful if those values allow the distribution of selective rules to only those CMP-PDPs that actually enforce those policies (e.g. if PDPs are collocated with application nodes, a rule applying to a kind of application node can be inflated into many rules, each separate rule with an already-mapped application identifier value for each applicable application node).

Note again that refinement can be done in both directions, i.e. from available to required attributes, and from required attributes to available attributes.

Multi-step refinement (also called "transformer chains" or "refinement paths"), i.e. chaining mapper services in a layered stack, is a central concept of model-driven security. It enables flexibility, replaceability, extensibility, and reuse. Refinement paths can for example be automatically calculated by CMP-MMR, CMP-MDR, and CMP-MDS using the metamodel (in CMP-MMR) and metadata (in CMP-MDR) (and maybe also CMP-FDS).

CMP-MDS, together with CMP-MMR and CMP-MDR can calculate such attribute refinement paths by traversing all plausible refinement choices, and adding information about available attribute refinement paths into the metamodel. This way, the policy editor configurator CMP-AEC can configure the policy editor CMP-PE with the various supported attributes (directly supported, or refined).

It is noted that attribute refinements are not limited to one-to-one mappings, but can include different options (e.g. a tree of several potential refinement paths based on which attributes are available) including one-to-one, one-to-many, many-to-one, many-to-many. These more complex mapping structures can for example be specified in an attribute refinement template. CMP-MDS can choose the most suitable refinement option based on a suitable algorithm, e.g. available attributes, most performant and available attributes, most reliable and available attributes etc. It is even possible to flexibly pick particular refinement template paths based on available PFFs/PSFs (e.g. attribute sources, calculation services, and mapping services). Refinement templates themselves can include one-to-one, one-to-many, many-to-one, many-to-many refinement paths, and refinement templates can again be stacked (if inputs and outputs match) in one-to-one, one-to-many, many-to-one, many-to-many relationships. Mappings provided by mapper services can also be considered refinement templates (and sometimes vice-versa). Refinement templates can incorporate any programmable functionality, not just mappings of PFFs/PSFs: as an example, a high-level policy "all encrypted interactions between secret-labeled systems should be allowed" can for example be refined using a model transformation workflow or another software program that checks the encryption configuration of each system and produces rules accordingly.

In summary, the main goal of attribute refinement may be to flexibly map between (i.e. in both directions) low-level, machine-enforceable (raw) attributes, and high-level human-intuitive, generic attributes. As noted before, PFF refinement is not at all limited to the described attribute refinement alone, but analogously applies to other PFFs.

"PSF Refinement" (e.g. Policy Refinement, Rule Refinement, Rule Element Refinement)

As opposed to PFF refinement, e.g. attribute refinement using CMP-MS, which essentially replace attributes by refined attributes, PSF refinement, e.g. rule refinement, actually changes the form (e.g. structure) of the generated rule(s).

In one embodiment, policies consist of rules, which themselves consist of rule elements. While rule elements involve more or less complex calculations on the attributes and the comparison value, each rule element as a whole usually evaluates to a Boolean TRUE/FALSE result. To construct a rule, several elements of a rule are combined using Boolean operators e.g. AND/OR. If the entire rule of Boolean statements is determined to be TRUE, the action is triggered, e.g. ALLOW/LOG/DENY). To construct a policy, several rules are combined with a particular selection algorithm (e.g. take the first matching rule in a list, take a matching rule if there is only one match, take the AND combination of all matching rules).

PSF refinement (e.g. for policies, rules, rule elements) may be required because a user may want to write a policy using some generic policy form/structure (e.g. "proximity>80%")—however, there may be no matching machine-enforceable form/structure (and maybe also no matching PFF, e.g. attribute) available at runtime, and PFF refinement (e.g. attribute refinement) does not work either because there is no matching refinement path (i.e. no mapping, no supported calculation operator/semantic etc.) To solve this challenge, "PSF refinement" takes for example one or more "required" rule elements authored in a policy (e.g. "proximity>80%"), and applies the matching refinement template to create different one or more rule elements, which include rule elements (and attributes) that are "available", i.e. machine-enforceable (e.g. "proximity %" is mapped to "time % & geography %" (changing both PFFs and PSFs), which then for 80% can be mapped to e.g. "time is within 1 hour AND geography is within 1 mile") (in a particular implementation, again changing both PFFs and PSFs).

In other words, PSF (e.g. rule) refinement maps between "high-level" policy structural constructs used by the policy author to author policies, and "low-level" policy constructs that are machine-enforceable. PSFs (i.e. structural policy constructs) range from entire policies, to policy rules, to rule elements. An example for policy refinement would be where a policy that has no rule format (structure) is selectable by the policy author, e.g. "only allow the interactions the Protected SoS application developer has explicitly coded" (the refinement template could generate rules for those interactions). A particular policy expression is provided to the policy author (e.g. keyword/description, tick-box). An example for rule refinement would be where an entire policy rule (structure) has no machine-enforceable representation, e.g. "only allow access between anyone in proximity greater than a certain percentage" (described above). Again, a particular rule format is provided to the policy author, and a rule refinement template (or a stack) is loaded by CMP-MDS to refine the authored rule into a machine-enforceable rule (e.g. 80% proximity translates to temporal proximity within 24 h and geographic proximity within 10 mi). An example for rule element refinement would be where a rule element in a rule has no machine-enforceable representation, while other rule elements do. For example, "only allow requestors with the role commander access between anyone in proximity greater than 80%". The process is similar to rule refinement, except the refinement is only carried out or the rule portion that is not machine-enforceable. In the example, the rule element 80% proximity needs to be refined, while the rule element requester role is commander does not need to be refined.

It is noted that, for the sake of simplicity, all three categories are examples of "PSF refinement".

Rule elements, for example, are refined by CMP-MDS using rule refinement templates, which describe how certain policy rule elements should be refined into other rule elements. For example, the template could specify that a rule element (proximity, numerical_operator, percentage) can be refined into a ((proximity_operational_task, numerical_operator, number of hops) AND (proximity_temporal_time_point, numerical_operator, hours difference)).

It is noted that PSF (e.g. rule) refinements are not limited to one-to-one mappings, but can include different options (e.g. a tree of several potential refinement paths based on which rule elements and/or attributes are available). As with PFFs, PSF refinement templates themselves can include one-to-one, one-to-many, many-to-one, many-to-many refinement paths, and refinement templates can again be stacked (if inputs and outputs match) in one-to-one, one-to-many, many-to-one, many-to-many relationships (the other features explained related to PFF refinement templates also apply to PSF refinement templates). CMP-MDS can choose the most suitable refinement option based on a suitable algorithm, e.g. available attributes, most performant and available attributes, most reliable and available attributes etc. It is even possible to flexibly pick particular refinement template paths based on available rule elements, attribute sources, calculation services, and mapping services.

Furthermore, it is noted that PSF (e.g. rule) refinements can be chained/stacked (like PFF refinements such as attribute refinements), to bridge a larger gap between required and available policies (and more specifically, PSFs).

CMP-MDS, together with CMP-MMR and CMP-MDR can calculate such PSF (e.g. rule) refinement paths by traversing all plausible refinement choices, and adding information about available PSF (e.g. rule) refinement paths into the metamodel. This way, the policy editor configurator CMP-AEC can configure the policy editor CMP-PE with the various supported PSFs, e.g. rule elements (directly supported, or refined).

Service Flexibility (e.g. Attributes, Calculations, Mappers)

The MDS System is flexible with respect to services inputs and outputs, and how calculation sources interact with service sources. Services/implementations can be PFF sources (e.g. attribute sources, calculation sources) and PSF sources (e.g. rule element deciders). For example, in simple cases, many calculation services will require access to one attribute source, for which it calculates a result and compares it to the comparison value in the policy. The MDS System is not limited to this particular embodiment. For example: In more complex cases, such as the Proximity-Based Access Control (PBAC) embodiment, proximity calculations usually require two (or more) attribute sources, and yield one distance result that is compared to the comparison value in the policy. In some cases (e.g. where Vector-Based Access Control—VBAC—is used), calculation services take a vector of attributes as inputs, calculate a result vector, and compare this result vector with the comparison vector in the policy.

Figure 20:
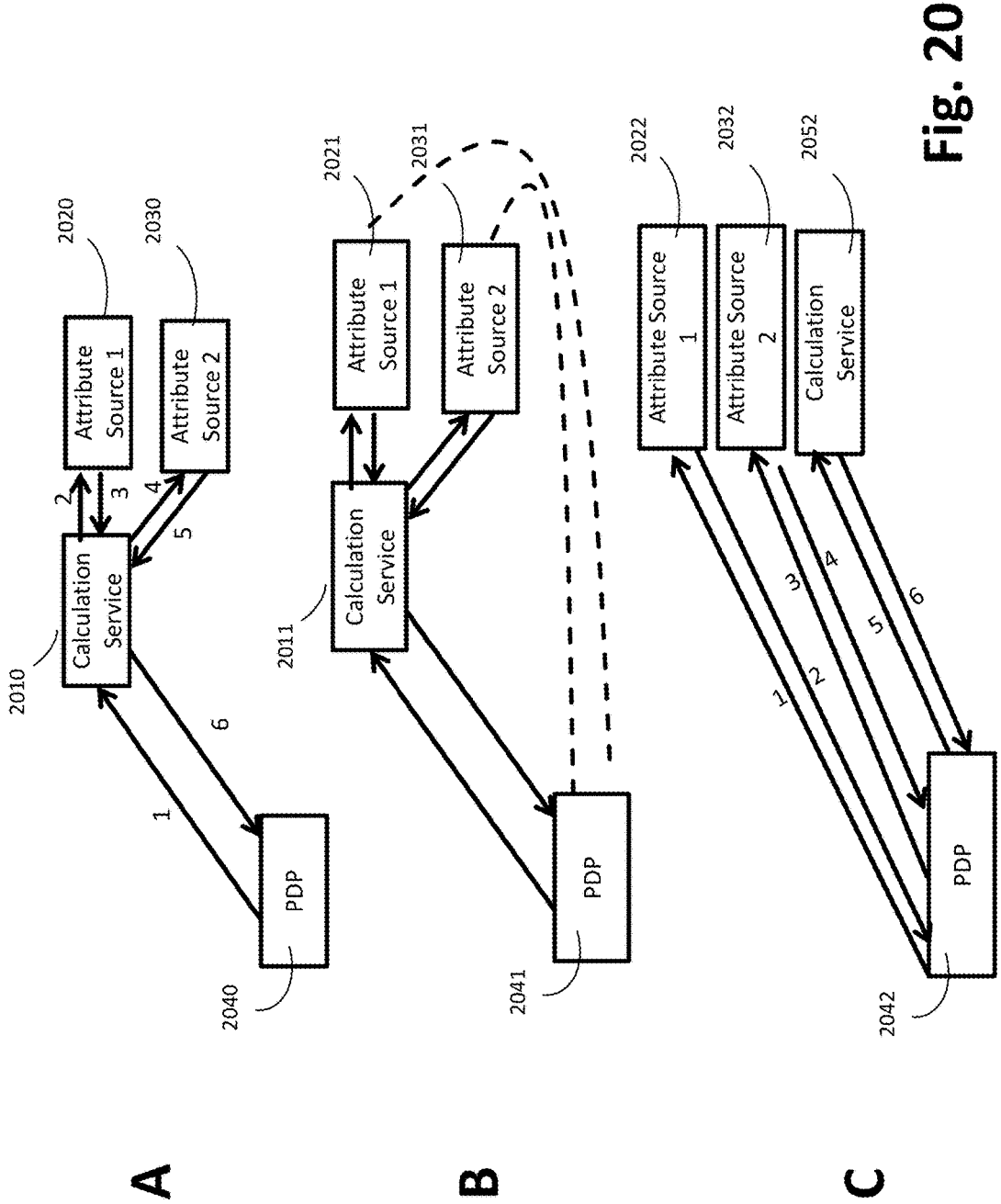
FIG. 20 illustrates three block diagrams of different configurations of attribute services, calculation services, and policy decision points according to an embodiment.

While the following describes specific examples of service flexibility, the present application is by no means limited to the described examples, but service flexibility analogously applies to PFFs and PSFs in general. For example, various embodiments are possible to feed attribute data into calculation services:

For example, as depicted in FIG. 20A, calculation services (2010) can hide attribute services (2020 and 2030): In this basic architectural design, CMP-PDPs (2040) call calculation services without specifying any attribute feeds. The calculation services then call the required attribute services (and potential mappers) themselves to obtain the attribute data, and return a distance result. While this architectural approach is simple and avoids semantic mismatches because everything is hardwired, it completely lacks flexibility (all attribute sources need to be implemented together with the calculation service, statically integrated with the calculation service, and cannot be replaced). A potential complexity (depicted in FIG. 20B) is due to the fact that attribute sources are often extracted from the message context (e.g. requestor ID) or the message content (e.g. requested geospatial location), in which case the calculation service (2011) may need to call back to the CMP-PDP (2041) to obtain attributes (2021 and 2031).

In another example (depicted in FIG. 20C), attribute source services (2022 and 2032) are also implemented together with the calculation services (2052) (avoiding semantic mismatches because everything is hardwired), but the CMP-PDP (2042) first calls the attribute sources (2022 and 2032) (and optionally mappers) to obtain the attribute values, and then provides them to the calculation service (2052). This design has the advantage that attribute values extracted from the message are readily available at the CMP-PDP, making some of the calls to attribute sources unnecessary. However, the design still has the drawback that there is no flexibility, i.e. attribute sources cannot be mixed-and-matched with calculations.

In yet another example (again depicted in FIG. 20C, i.e. this architecture design looks the same as the previous one), attribute services (2022 and 2032) (and optionally mappers) are implemented separately from calculation services (2052). This way, various compatible attribute sources can be used for various matching calculation sources. While this dramatically increases the flexibility of the MDS System, it is now necessary to ensure that attribute sources actually match with what the calculation service expects syntactically and semantically. Using the MDS System, matching can be done automatically by using information about services (attributes, mappers, calculations), captured in a metamodel (ontology, taxonomy, namespace etc.) and service integration metadata (interfaces, data types, IP, port etc.). Alternatively, matching can also be done manually and ad-hoc by an administrator, although the effort, time, and error-potential would be higher.

Figure 21:
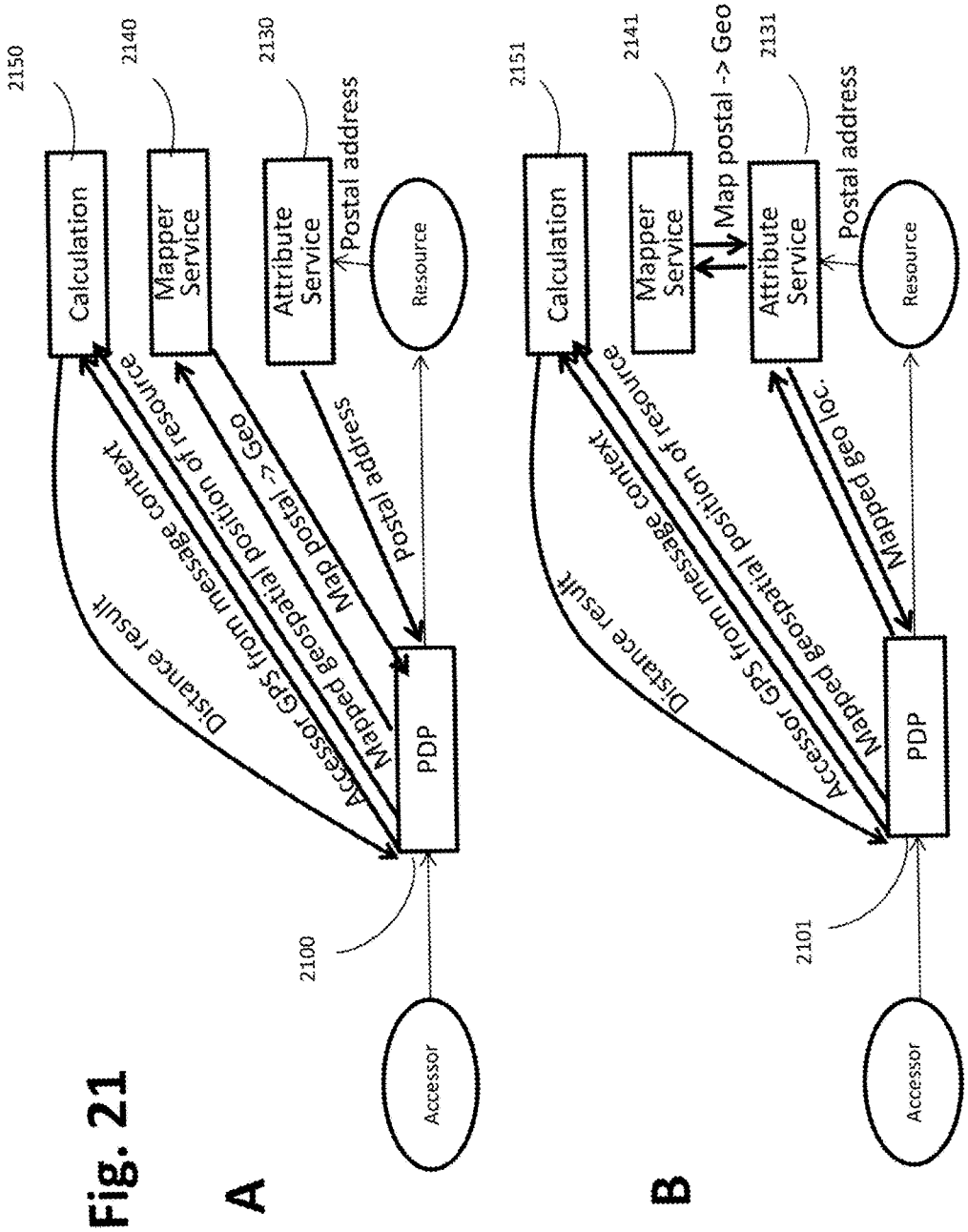
FIG. 21 illustrates two block diagram of different configurations of mapper services, attribute services, calculation services, and policy decision points according to an embodiment.
Figure 22:
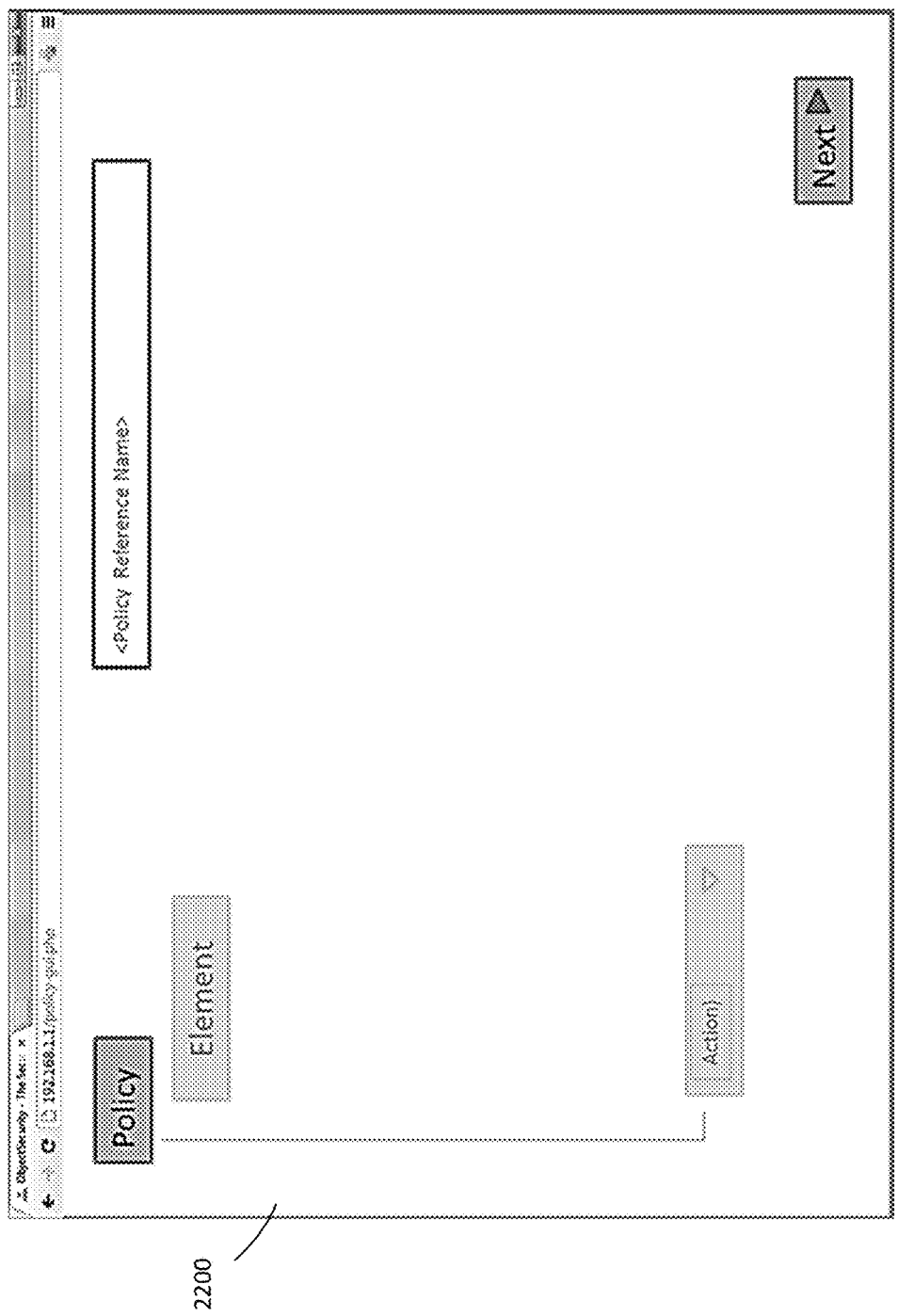
FIG. 22 illustrates a screen capture of step 1 of a browser-based policy authoring action according to an embodiment.
Figure 23:
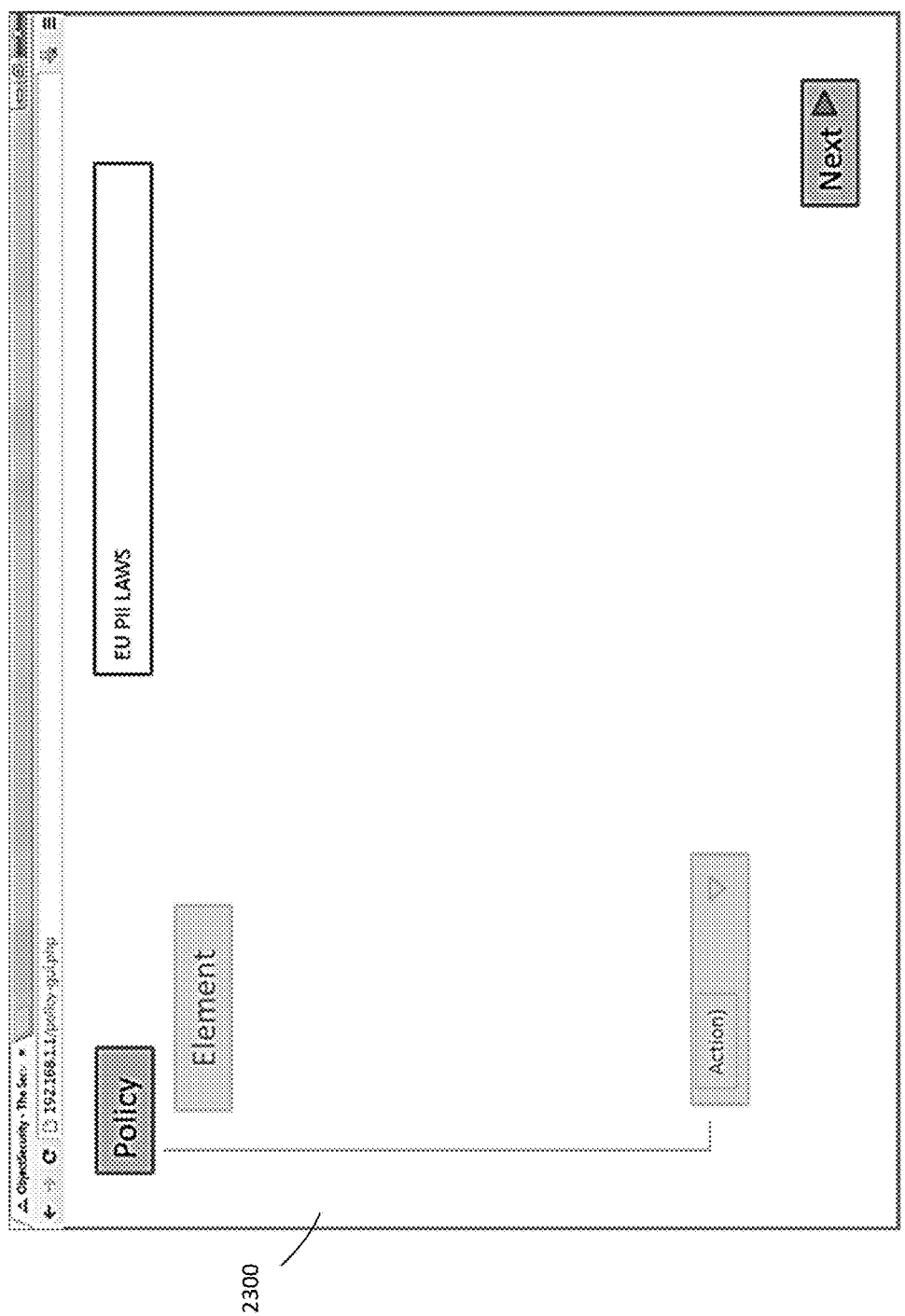
FIG. 23 illustrates a screen capture of step 2 of a browser-based policy authoring action according to an embodiment.
Figure 24:
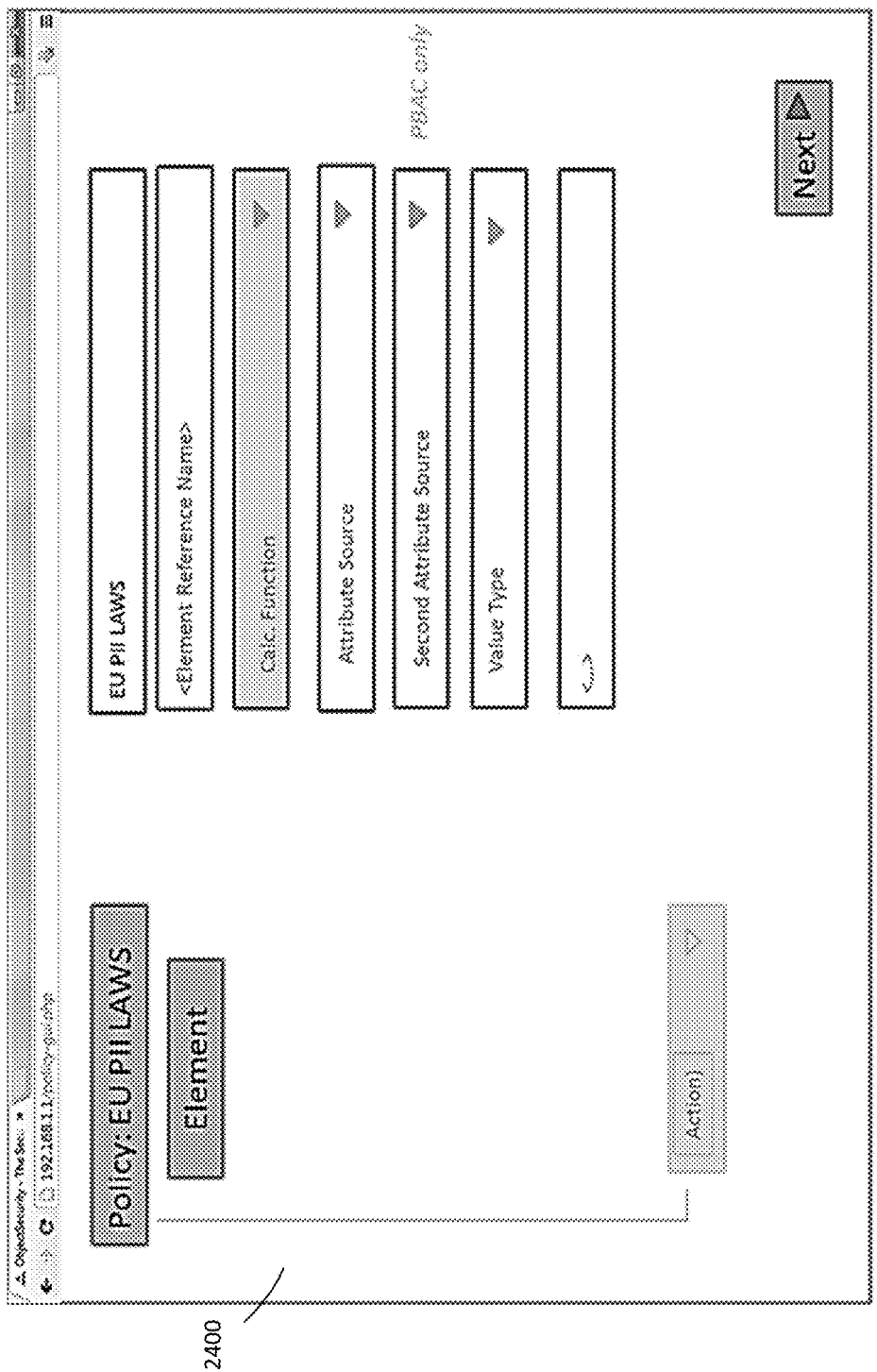
FIG. 24 illustrates a screen capture of step 3 of a browser-based policy authoring action according to an embodiment.
Figure 25:
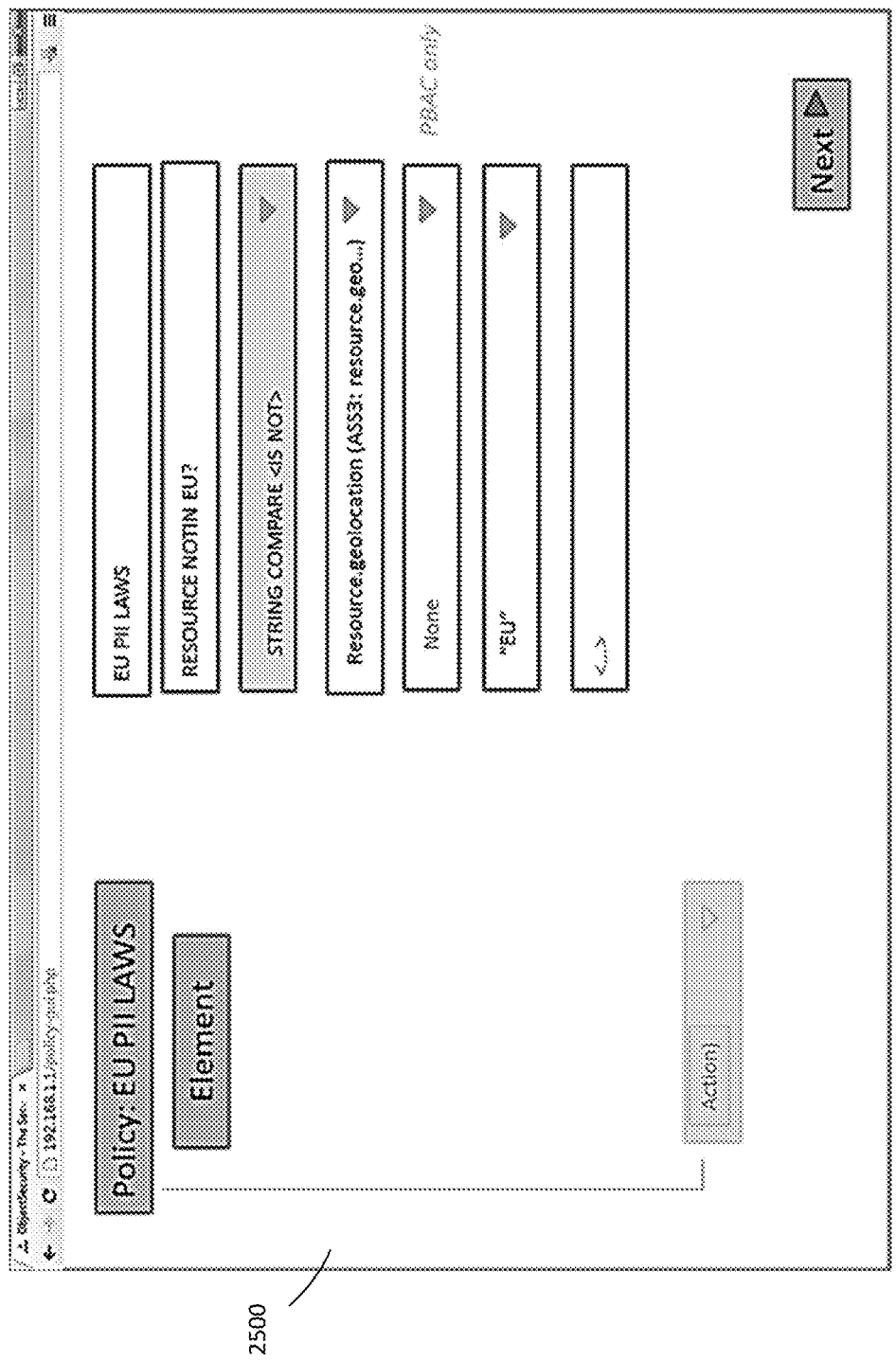
FIG. 25 illustrates a screen capture of step 4 of a browser-based policy authoring action according to an embodiment.
Figure 26:
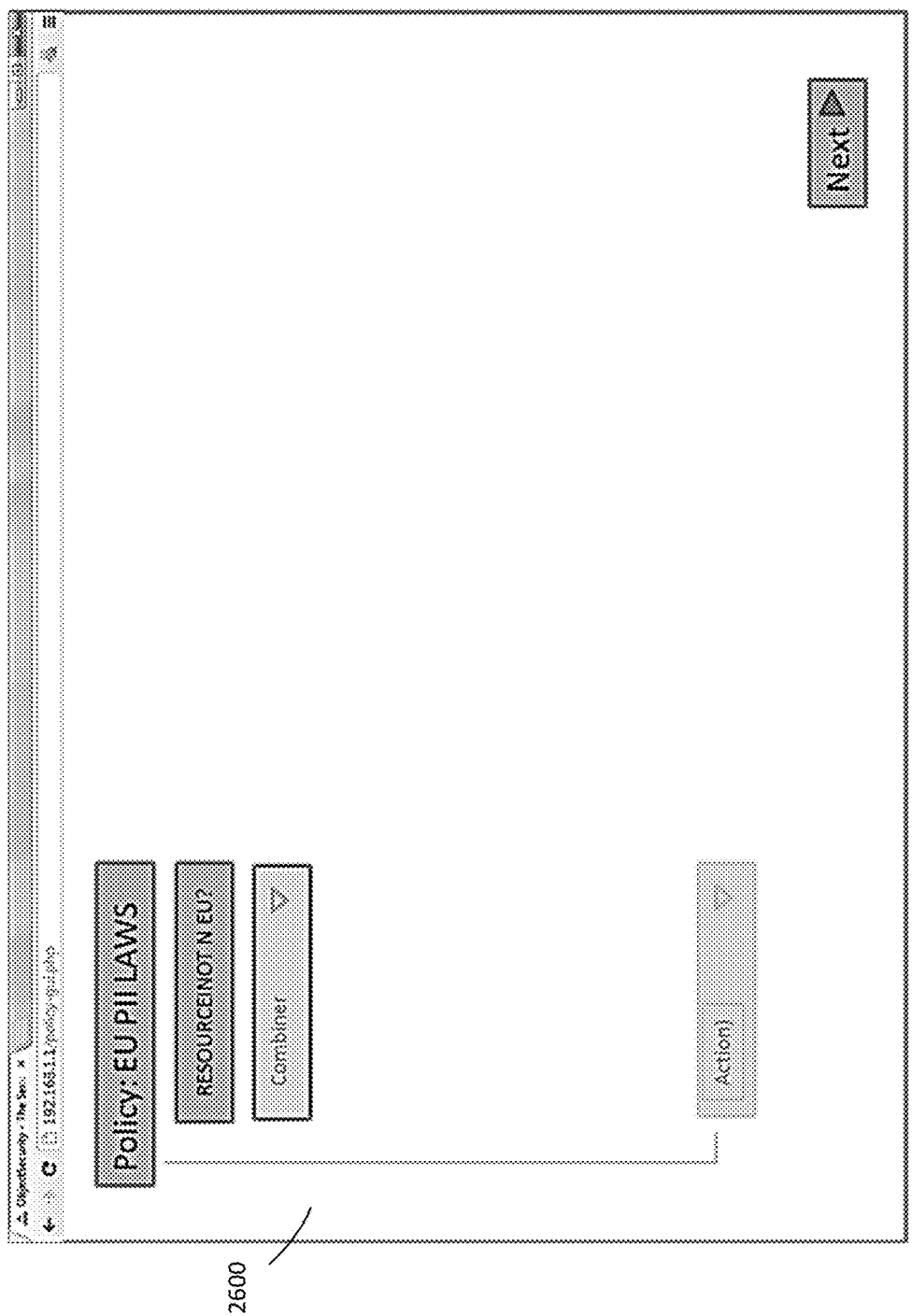
FIG. 26 illustrates a screen capture of step 5 of a browser-based policy authoring action according to an embodiment.
Figure 27:
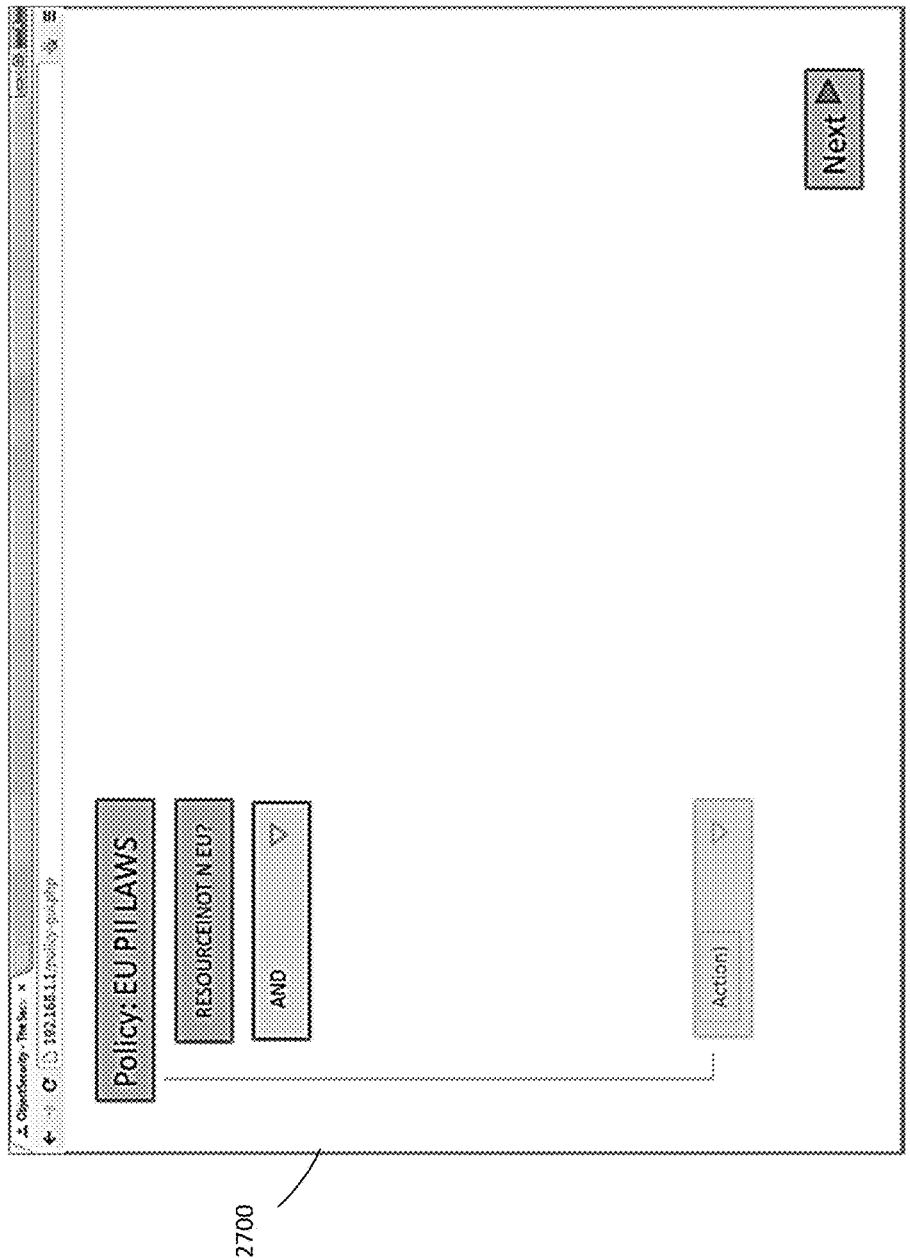
FIG. 27 illustrates a screen capture of step 6 of a browser-based policy authoring action according to an embodiment.
Figure 28:
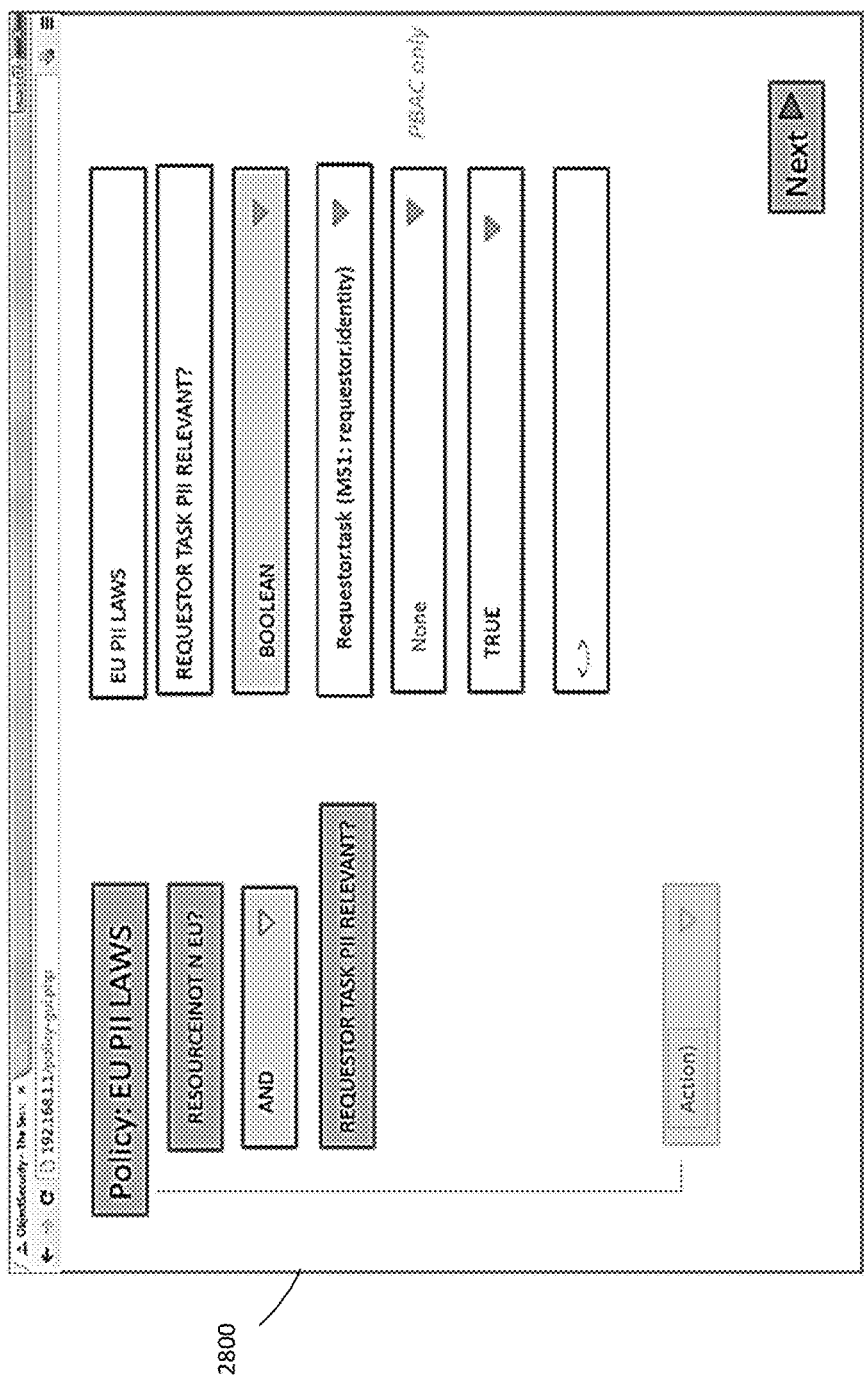
FIG. 28 illustrates a screen capture of step 7 of a browser-based policy authoring action according to an embodiment.
Figure 29:
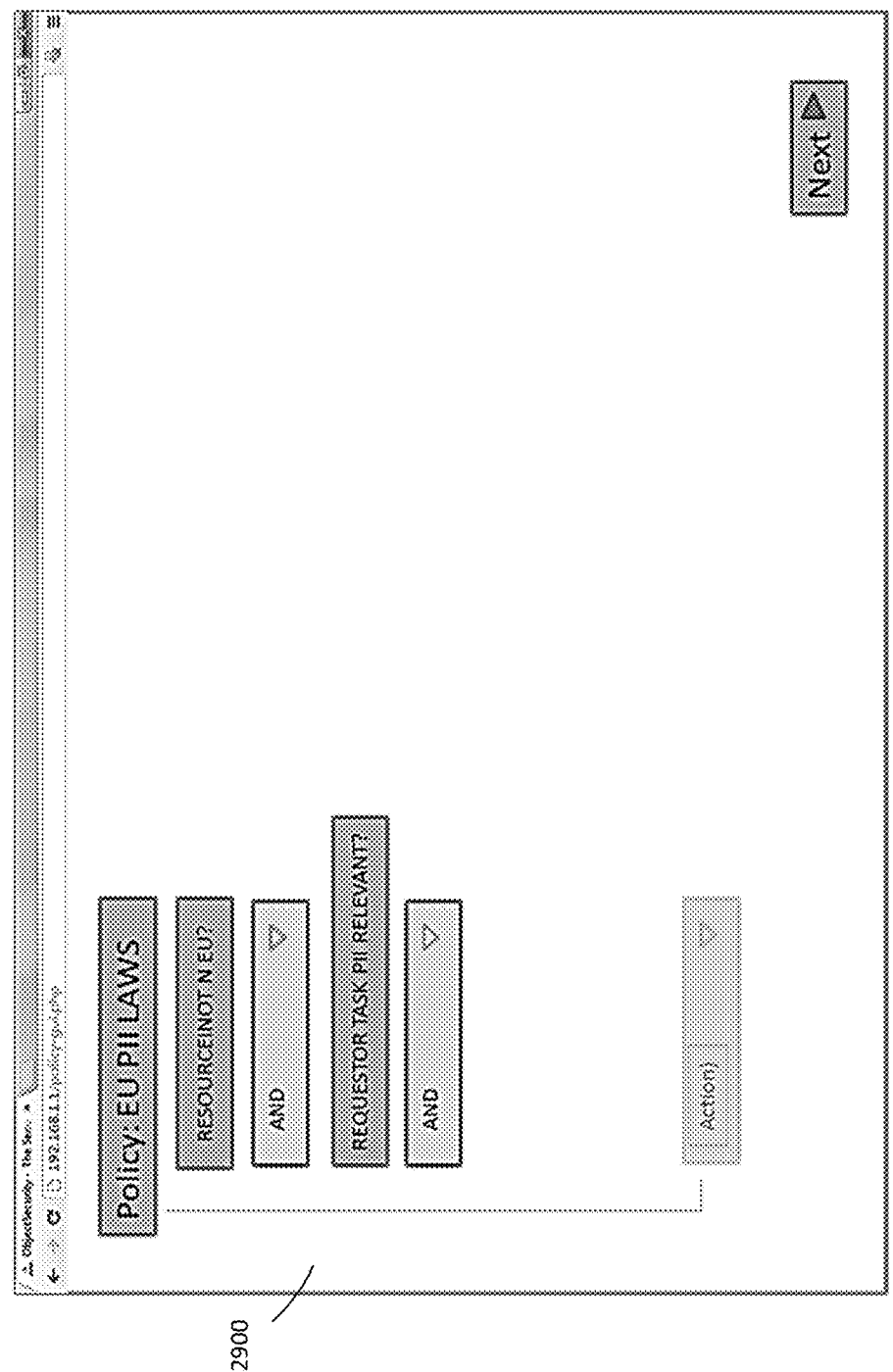
FIG. 29 illustrates a screen capture of step 8 of a browser-based policy authoring action according to an embodiment.
Figure 30:
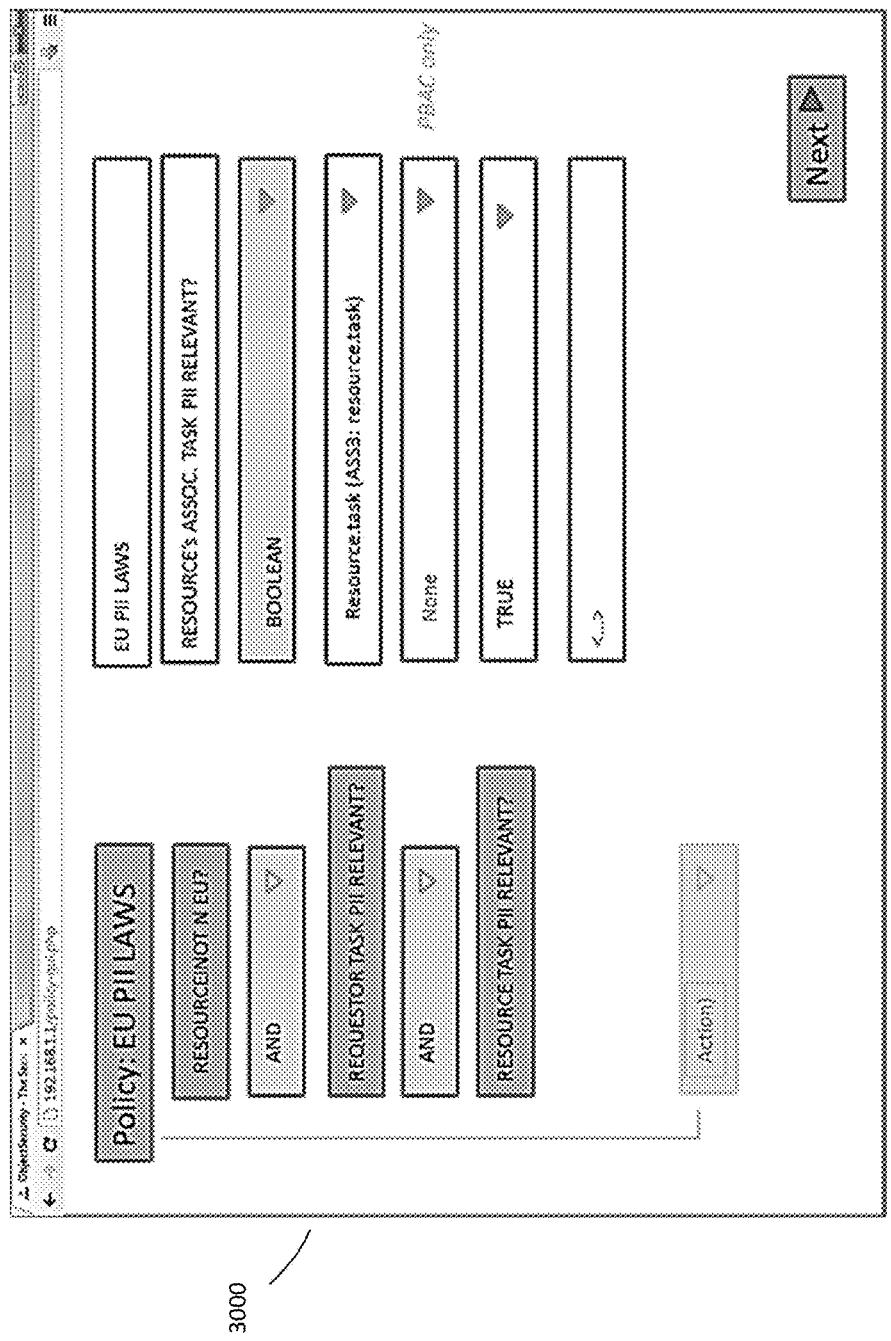
FIG. 30 illustrates a screen capture of step 9 of a browser-based policy authoring action according to an embodiment.
Figure 31:
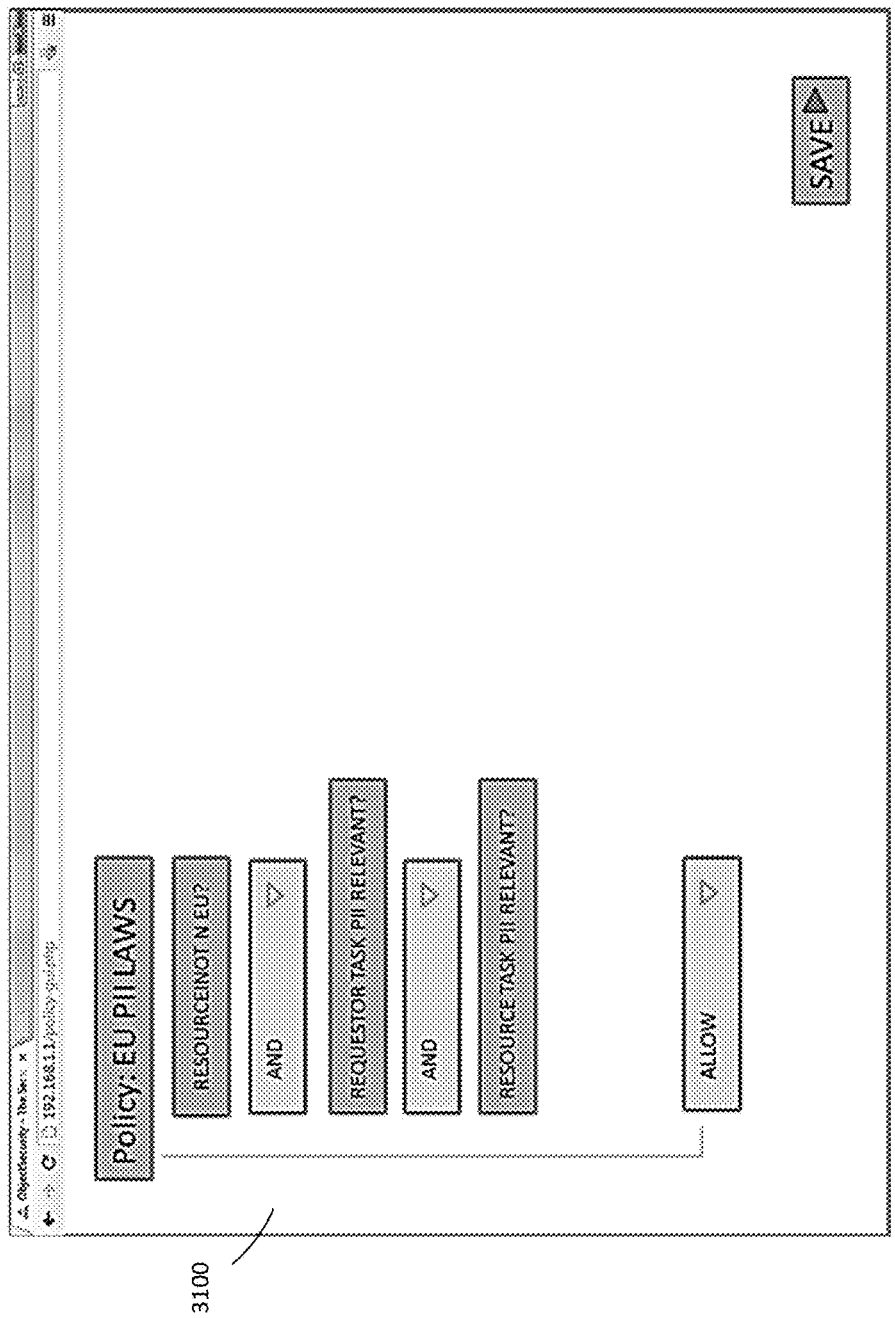
FIG. 31 illustrates a screen capture of step 10 of a browser-based policy authoring action according to an embodiment.

The examples depicted in FIG. 21A and FIG. 21B further illustrate the difference between a scenario where a mapper service that is not hidden behind an attribute service (FIG. 21A) and another scenario where a mapper service is hidden behind an attribute service (FIG. 21B). In the example scenario, the policy includes a proximity calculation based on geospatial position of the accessor; however, the attribute sources only provide the postal address of the accessor (and it is assumed that the postal address captures the desired geospatial semantics). In FIG. 21A, CMP-PDP (2100) first calls the postal address attribute services (2130), providing e.g. the resource identity, and obtaining the postal address. It then calls the mapper service CMP-MS (2140) to get the address mapped to the geospatial position. Finally, CMP-PDP calls the calculation service (2150), providing the geolocations for the accessor (directly accessed from the device GPS) and the resource, and obtains the distance result value needed for access decision making. In FIG. 21B, the interaction flow is different, because the attribute service hides the mapping service (resulting in simplicity, but less flexibility, reuse, extensibility etc.): CMP-PDP calls the attribute services for the mapped geospatial location (2131), which obtains the postal address for the resource, and itself calls the mapper service (2141), obtains the result, and returns the mapped geospatial location for the resource. CMP-PDP (2101) then calls the calculation service (2151), providing the accessor's geolocation (obtained from the device GPS) and the resource's geolocation. CMP-PDP (2101) receives the distance result value needed for access decision making from CMP-CS (2151).

As stated earlier, while the above describes specific examples of service flexibility, the present application is by no means limited to the described examples, but service flexibility analogously applies to PFFs and PSFs in general.

Metamodels

The previous sections already illustrated that a highly flexible "plug & play" (in terms of PFFs/PSFs) architecture for (e.g. attribute, mapper, and calculation services developed independently from each other) introduces additional complexities. In particular, inputs and outputs between components need to be matched syntactically and semantically across PFF refinement chains (e.g. for attributes), to allow intuitive policy authoring, and to yield the desired policy decision results (e.g. calculation results). Furthermore, PSF (e.g. rule) refinement templates need to be matched syntactically and semantically to allow intuitive policy authoring (i.e. supporting intuitive PSFs).

Hypothetically, such semantic matching of PFFs and/or PSFs (e.g. attributes, mappers, calculations, rule elements), could be done manually and without any metamodel feature. However, such a manual, ad-hoc integration approach is not recommended for a full "plug & play" architecture, because it (1) effectively hard-wires the integration, thus not achieving the desired flexibility; (2) introduces a high degree of risk that the various services do not interact as planned, resulting in a non-working system, or worse in an ineffective access control system. A manual integration approach is instead appropriate for the basic, hardwired architectural scenarios above.

Instead, it is recommended to use CMP-MMR and its metamodel (or other suitable data structure) that relates all PFFs/PSFs (e.g. attributes, mappers, calculations, rule elements etc.) in terms of semantics. This metamodel will allow semantics of every service input and output to be uniquely identified, and ensures the semantically correct integration. Metamodeling is highly flexible and extensible, and provides necessary input into many MDS System components, including CMP-MDS, CMP-RSC, CMP-OSC, CMP-AEC, CMP-RSV etc.

In particular, metamodeling is a critical, integral part of model-driven security, and implementing the described metamodel is therefore highly recommended if model-driven security CMP-MDS is used to automate rule generation (policy implementation).

In one embodiment, a "bootstrap metamodel" is available that forms a consistent semantic basis for the MDS System. This metamodel includes general model elements that allow the flexible extension of the metamodel by associating new metamodel content with model elements from the bootstrap metamodel. In an embodiment, PFF services (e.g. CMP-ASS/CS/MS) (and PSF services) include a metamodel portion that semantically describes their services and where it ties into the bootstrap metamodel. This metamodel portion can be provided to CMP-MMR automatically (e.g. CMP-MMR pulls from CMP-ASS/CS/MS, or CMP-ASS/CS/MS push to CMP-MMR). Human administrators can also manually specify metamodel extensions in CMP-MMR to bring new PFFs/PSFs (e.g. CMP-ASS/CS/MS) into the metamodel.

A metamodel could for example be structured hierarchically, with sub-trees for e.g. PBAC notions, and sub-trees for kinds of PFFs/PSFs (e.g. attributes, mappers and calculations). A rudimentary illustration of a PBAC metamodel embodiment such a metamodel could is depicted in FIG. 3 (it is noted that this metamodel is just a highly simplified and illustrative example. The MDS System is not limited to this metamodel, and this metamodel may not be the most useful or practical way of structuring the particular semantics required for the specific MDS System implementation; it also mingles potential metamodel entities and model entities together in one single diagram). The right side of FIG. 3 shows how a specific geospatial attribute service (Geo Position OGC Format) is associated with more abstract geospatial semantic metamodel elements. This allows CMP-MMR, for example, to easily identify all geospatial services currently available. Also, the high-level policy model can be captured flexibly using the entities captured in the metamodel.

In order to identify refinement chains, CMP-MMR's refinement chain matching algorithm can search semantically matching inputs (into e.g. CMP-MS, CMP-CS, and rule refinement templates) for every output (or vice-versa)—for example, an attribute service "CMP-ASS-1" provides a geospatial location, and a mapper service "CMP-MS-1" takes a geospatial location and provides the country code. This allows the algorithm to add an association from the CMP-ASS-1 to CMP-MS1, and adding country code as a new available attribute into the metamodel. Various well-known graph search methods can be used to optimize this refinement chain matching, or an exhaustive search can be carried out.

The analogous approach is used for identifying PFF (e.g. attribute) refinement chains and PSF (e.g. rule) refinement chains: For example, the metamodel captures rule formats (e.g. number of inputs, calculation services/operators, results), possibly with by-default available rule elements (i.e. rule elements that are machine-enforceable by CMP-PDP) specified in the bootstrap metamodel. For example, by searching and matching inputs into rule templates with available rule elements, the algorithm can create associations between rule elements (and their individual inputs and outputs), and associate newly available (mapped) rule elements with the "available rule elements" model element.

The metamodel can also semantically match inputs and outputs of PSF (e.g. rule) refinement templates in the same fashion, and save the refinement chains as additional information (e.g. in the metamodel) for future use (e.g. to optimize rule generation).

The end result of this process (carried out by CMP-MMR, or optionally by CMP-MDS) is that all available PFFs (e.g attributes) and PSFs (e.g. rule elements) (directly available, or refined) are specified in the metamodel.

In an embodiment, the metamodel also includes information about "required attributes" (an example of required PFFs) and "required rule elements" (an example of required PSFs). "Required" may indicate attributes and rule elements policy authors prefer to author policies with, or may be needed as inputs into calculations and other PFFs/PSFs. Generally, "required attributes" are generic and intuitive. For example, an attribute "country code" could be associated in such a way that it is understood as a "required attribute" (e.g. defined by/for a user, or by calculation functions). The refinement chain matching algorithm can use this information to determine where paths from available attributes and rule elements should ideally end. This avoids the algorithm from determining refinements that human users are not interested in or that are not fed into calculations: as a consequence, only the required attributes and rule elements will be made selectable to policy editor CMP-PE by CMP-AEC (or they will be made selectable first, e.g. in pull-down menus). This also bounds the complexity and computational cost of the searching/matching process.

Furthermore, the metamodel informs both the policy editor configurator CMP-AEC (e.g. displaying available choices of calculations and attributes/mapped attributes), as well as CMP-MDS, which generates technical security rules.

Metadata

While the metamodel allows for semantic matching (of e.g. PFFs/PSFs), inputs and outputs may not match technically, especially with respect to syntax, interfaces, languages etc. of the implementation Therefore, the metamodel is only going to provide the desired level of integration/interoperability if it is used together with the additional syntactic metadata.

In an embodiment, services contain their own metadata (e.g. WSDL files if web services are used to implement the MDS System), which services provide to CMP-MDR. In another embodiment, metadata is centrally authored by a human administrator. The effect is the same: CMP-MDR, the repository of service metadata includes integration/interoperability information for all PFF/PSF services (e.g. CMP-ASS/CS/MS) (e.g. interface descriptions, supported data types, IP addresses, port addresses, languages etc.).

In some embodiments, metadata is also associated with each input and output of PFFs/PSF (e.g. rule) refinement templates, to ensure that e.g. rule refinement chains can actually be technically integrated. Often, this metadata will pertain to services that form inputs.

Syntactic metadata can be helpful without the abovementioned metamodel, because it allows the identification of which inputs and outputs can be technically integrated. However, a more effective MDS System is achieved if both the metamodel (capturing the semantic relationships of all inputs and outputs) and metadata (capturing technical and data syntax of inputs and outputs) are used together.

The refinement chain matching algorithm described in the previous section can now—in addition to verifying a semantic match via the metamodel—verify for each association that the integration is technically feasible (e.g. data formats match), and drop any refinements that cannot be technically integrated. In other words, verifying metadata matches restricts the metamodel to include only technically feasible refinement chains.

The metadata repository CMP-MDR also forms a critical input into CMP-RSC, which technically integrates the MDS System based on the metadata (and other information), including deploying CMP-PDPs where needed, and integrating services (e.g. attributes, mappers, calculations) with CMP-PDPs.

Automatic MDS System Configuration and Integration

This feature, which is implemented in CMP-RSC (automated runtime system configuration), may use the available metamodel/metadata, and a system description, and may figure out which components of the MDS System need to be connected in which way to make the MDS System work for the particular policies and components.

The automated runtime system configuration may include determining where policy decision points CMP-PDPs and policy enforcement points CMP-PEPs should be installed (e.g. on all or some Protected SoS nodes), for example based on which kind of resources are provided and/or consumed by which Protected SoS nodes. CMP-RSC can determine the location of each CMP-PDP and CMP-PEP by analyzing the functional description provided by CMP-FDS, and optionally also information about which policies could be enforced by the MDS System. CMP-RSC triggers an installation, deployment, configuration and launch process for each CMP-PDP and CMP-PEP. It is noted that in some MDS System deployments, this step can be simplified very elegantly by bundling the CMP-PEP (and often also CMP-PDP) software with software that automatically gets launched on each Protected SoS node, such as e.g. the middleware software the virtual machine software, the operating system etc. This way, CMP-PDPs and CMP-PEPs are automatically launched together with each Protected SoS node.

The automated runtime system configuration includes determining which PFFs (e.g. attribute source services CMP-ASS, calculation services CMP-CS, and mapper services CMP-MS) and PSFs need to be connected with which CMP-PDPs and CMP-PEPs. In some embodiments it may be desirable to connect each CMP-PDP only to the particular services/implementations required to enforce the policy. In many cases this can only be determined by CMP-RSC after the rules have been generated by CMP-MDS, because the rules determine which services need to be available at each CMP-PDP. In other embodiments (e.g. with few services or few PDPs), it may be preferable and simpler to simply connect all CMP-PDPs to all services.

Automatic system configuration can greatly reduce the MDS System configuration/maintenance cost and error-potential. However, it is only really practical if several of the abovementioned architectural features are selected. In particular, CMP-RSC usually requires the metamodel CMP-MMR and metadata from CMP-MDR. In cases where only the minimum necessary services should be integrated with CMP-PDPs, information about the particular rules generated by CMP-MDS are also required. This feature is a highly flexible, extensible, and effective architecture choice.

It is noted that CMP-RSC could theoretically also configure in a similar fashion only the particular services that need to be made available to CMP-MDS for rule generation (esp. for attribute refinement at rule generation time)—however, it is often a preferred implementation to simply automatically integrate all available services into CMP-MDS, because there often is less of a performance impact.

In some basic alternative embodiments, manual MDS System integration is the "forced" choice for the more basic architectures, esp. ones without separately designed services, and without metamodel/metadata. This is because these architectures do not provide much configuration flexibility, and do not capture enough information to support automatic runtime system configuration.

Policy & MDS System Correctness+Compliance

Automated analysis of the correctness and assurance (i.e. the level of confidence that the security is as specified/expected) may be critical features of the MDS System, which are part of the CMP-PSV component.

In some embodiments, such verification can be done manually, but realistically only for hard-wired, static systems with simple policies and a fixed set of services. For more flexible, larger MDS Systems, manual verification is likely to become too time-consuming and error-prone. CMP-PSV therefore implements automated analysis of the correctness and assurance in such more complex embodiments:

In an embodiment, CMP-PSV checks whether certain compliance/accreditation requirements policies (ideally themselves modeled) are met. It also detects changes to the Protected SoS and the MDS System on an ongoing basis, and generates supporting evidence for compliance/accreditation. The method and system for this has been described in depth in the MDSA Patent: The analysis algorithm essentially traverses all modeled/metamodeled information sources in the MDS System and checks that compliance/accreditation policies are complied with.

In another embodiment, CMP-PSV analyzes that security policies are correctly enforced, i.e. are free from errors, omissions, conflicts etc. The method and system for this has been described in depth in the MDSA Patent: The analysis algorithm exhaustively traverses the correlation (e.g. CMP-MDS workflow templates, attribute refinement paths, rule refinement paths etc.) between every generated security rule (or configuration) and triggered incident/alert back to the high-level policy elements that were the basis for the generated rule and/or incident.

In yet another embodiment, CMP-PSV verifies the correct integration of the correct PFF/PSF services (e.g. attribute services, mappers, and calculations). This is absolutely critical for the overall correctness of the MDS system. The integration has to be done correctly (by CMP-RSC or manually), or otherwise there can be many unintended consequences, such as a non-working system, or (worse) a system that enforces an incorrect security policy (related to the 'garbage-in-garbage-out' problem). Based on the models/metamodels and metadata in CMP-MMR and CMP-MDR, respectively, CMP-PSV automatically checks the various models for inconsistencies, errors, omissions etc. Furthermore, CMP-PSV automatically checks log files from CMP-RSC indicating the current situation of actually installed runtime MDS System components. Additionally, CMP-PSV can check alerts about missing heartbeats (regular "I am up and running" messages produced by all MDS System components) to further assess the current situation. Based on all this information, CMP-PSV can determine whether there are any inconsistencies, errors, omissions, and whether there are any issues with the deployment and/or runtime behavior of each component.

Functional System Description

A useful data source into the MDS System is the functional system description (also referred to as "functional model"). The functional system description captures various layers of IT assets and interactions (e.g. network and/or application layer information flows), and other relevant information. The functional system description could be manually specified, detected via asset management/monitoring tools, or fed in from (application/process) modeling tools (e.g. UML tools, BPM tools).

It is noted that functional system descriptions are not always easily available, especially not if security policies are purely expressed in terms of users and kinds of data resources (i.e. independent of systems and networks). In general, system descriptions are more likely to be available and precise/complete for systems with a lot of machine-to-machine interactions (e.g. Internet of Things, SOAs, for example for air traffic control systems).

There are various categories of embodiments, including for example:

In one embodiment, where no functional system description is available, the human administrator (configure/integrator) needs to have implicit system knowledge to determine where the protected resources are, where the CMP-PEPs and CMP-PDPs should be deployed, etc. The integrator essentially has to manually capture the system description (which CMP-PEPs protect which resources, which CMP-PDPs are related to which PEPs, etc.) to be able to configure the MDS System, and to be able to author meaningful policies. Unfortunately this suboptimal scenario is usually the case, which makes today's access control deployments expensive, time-consuming, inflexible, maintenance-intensive and error-prone.

In another embodiment, the MDS System uses a functional system description model to automatically generate technical access rules (CMP-MDS), configure attribute refinement and rule refinement (CMP-MMR/CMP-MDR), to configure the technical MDS System runtime (CMP-RSC), etc. In this embodiment, the functional system descriptions are manually created by humans (e.g. system developers, integrators etc.), for example using modeling languages such as e.g. UML or BPMN. It is noted that the MDS System is not limited to the use of the well-known UML and BPMN modeling standards, but could use any other specification approach that can be machine-processed into a model that fits to the modeling approach used for the MDS component of the MDS System. A particularly effective is where the functional system description modeling is done as part of some sort of model-driven development process (MDD/MDE, BPM orchestration etc.) where the running system was generated from the functional system description model. This inherently ensures that the model matches with the running system. Also, if such models can be reused from other stakeholders (e.g. developers, accreditors) who already need to build such models, the effort for configuration, operation, and maintenance of the MDS System is reduced. Alternatively (but less preferred), if humans (e.g. security administrators) create the models without model-driven development, there is the chance that some aspects are incorrect or missed out, which causes the MDS System to be less accurate.

In yet another embodiment, the functional system descriptions are automatically detected and generated. This is done by using information from sensors that detect for example network topologies, information flows, router configurations, end-system configurations, application configurations, user-related information (e.g. users logged into a system or application). This automation feature takes all the information and produces a consolidated picture of the functionality of the already-deployed (and usually already running) Protected SoS. Many commercial products are available to detect some of these aspects that form the functional system description—well-known product categories are for example:

- Network topology mapping tools
- Network monitors
- Network management tools
- Asset monitoring/management tools
- Information flow monitoring tools (e.g. a passive DDS application node that listens to all topics and records which DDS nodes publishes and reads messages
- Discovery service tools and registries, such as DDS discovery service (e.g. provided by RTI DDS), UDDI etc.
- User identity management tools, single sign-on tools
- Configuration management tools
- Application management tools
- Process orchestration tools (e.g. BPMS/BPEL web service orchestration tools)
- Audit tools
- Monitoring tools
- SIM/SIEM tools To arrive at a consolidated model of applications, actors, information flows etc., CMP-FDS "normalizes" all the different information from these various tools into a coherent picture that includes all aspects required by CMP-MDS during rule generation, during CMP-PSV during compliance automation, maybe also for CMP-RSC during automatic runtime system configuration, CMP-OSC for configuration of other security components, etc. CMP-FDS structures this information in a form that matches with the metamodel of the functional system description in CMP-MMR. This is necessary so it can be used by CMP-MDS, e.g. in some form of UML model. Relevant information detected includes for example: node network location per node; node DDS application per node; type of user(s) using/logged into each node; interactions/information flows occurring between nodes; interaction order/workflow (e.g. in the case of process orchestration) etc.

While designing a system that "normalizes" all this information into a coherent model is cumbersome because of all the different formats and semantics used, it is conceptually not difficult—it is obvious to anyone skilled in the art how this can be achieved. For example, if routing tables provide information about end systems and network topologies, and discovery services detect certain services (e.g. DDS applications), then DDS applications can be associated with the systems, and thus the network topology between these applications. Other example steps include:

- populate network map with IP addresses of all nodes
- associate discovered DDS application (with their published/subscribed topics) with each node
- associate interactions with DDS applications based on detected network traffic
- associate interaction details with DDS applications based on detected DDS topic publishing/receiving
- associate users with nodes based on identity management/single sign-on tools (e.g. MS Active Directory knows which user is logged into which machine)
- associate labels with each application based on traffic observed, topic name, data on node etc. (e.g. PII)

It is noted that this automatic detection feature often needs to run for a while (except in cases where all required information is available from repositories), while the deployed "system of systems" is in operation, in order to be able to detect which systems, interactions etc. happen. As mentioned above, this automatic detection feature may often not be as robust/reliable as obtaining the system description from a model-driven development tool that generates the running system from a functional model (and thus the model is guaranteed to match with the running systems). This is because in many cases not everything relevant for the functional system description can be detected. For example, some applications may not communicate during the detection window, and are therefore not being added to the functional system description. Also, during the detection phase, attacks or abnormal behavior could skew the result.

Cross Layer Access Control (XLAC) (and Other Security Components Configuration)

In addition to generating security rules using a model-driven security approach (done by CMP-MDS), the MDS System can also automatically generate configurations for "other security components" (done by CMP-OSC). The model-driven security mechanism may be similar to model-driven security rule generation, but instead of reading for example attribute refinement paths and rule refinement paths, and generating rules pushed to CMP-PAP/PDP/PEPs, it uses specific templates for specific security components (outside the MDS System) and generates specific security configurations for those "other security components". Examples of other security components include network stacks; firewalls; database security; middleware security, virtual machine security, operating system security, hardware isolation etc.

In an embodiment in which CMP-OSC supports Microsoft Windows Firewall, an operating system firewall, an example high-level policy states that: Network traffic should only flow between systems handling confidential information, but not from systems handling confidential information to systems handling non-confidential systems. CMP-MDS and CMP-OSC can obtain the functional system description from CMP-FDS that captures the network and system information of all Windows-based Protected SoS nodes. Further CMP-MDS and CMP-OSC can categorize Protected SoS nodes into ones handling confidential information and ones not handling confidential information. CMP-OSC can now generate Windows firewall configuration commands in the form required by Windows firewall to only allow connections between systems handling confidential information. It is noted that the MDS System is not limited to firewalls but can be used to configure any other security components that accept configuration, such as remote configuration via network commands (e.g. secure shell), configuration files, code files etc.

"Cross-Layer Access Control" (XLAC) is an embodiment of the MDS System implemented by CMP-OSC. XLAC aims to solve the problem that today's software security is usually either hard to manage or not very effective. Also, today's security solutions do not provide a unified way of managing and enforcing consistent security policies. Instead, security features on each layer in the system stack conventionally needs to be managed separately (based on different policy features and semantics), resulting in duplicate effort and error-potential. As a result, security is usually not handled on all layers, resulting in vulnerabilities.

The idea behind XLAC is to reuse (by implementing a suitable CMP-OSC component) existing security enforcement mechanisms as much as possible—ideally spanning all system layers and network interactions. CMP-OSC (and optionally CMP-MDS) is used to automatically generate technical security configurations and access rules for all layers in the stack.

As depicted in FIG. 8, XLAC unifies security management for many different software and hardware layers that are brought together including, for example:

Applications: CMP-OSC generates configuration for application specific security features (or an externalized policy decision point, which applications can explicitly call if needed, is configured by CMP-OSC or CMP-MDS)

Middleware: CMP-OSC generates configuration for middleware security features

Virtual Machine (VM): CMP-OSC generates configurations for existing VMs (including e.g. Operating System VMs and Process-Level VMs, PLVMs), such as security features, virtual networks and/or virtual network security appliances.

Operating System (OS): CMP-OSC generates configuration for OS security features that support the security policy model (inside and outside the VM, if applicable)

Network: CMP-OSC generates configurations for the network stacks at endpoints to support the security policy model, and potentially also configures network equipment such as routers and firewalls.

Hardware: CMP-OSC generates hardware separation configurations that isolate the security software components from other software, and prevents unauthorized information flows between other system processes.

XLAC enables consistent, unified, manageable policy management (using the MDS System) for robust access control and other security and non-security functions such as encryption, monitoring, logging, hardware separation, Quality of Service (QoS). It also improves access control and Protected SoS assurance, by controlling information flows across all layers of the stack and the network. It is noted that XLAC is not limited to access control or security, but can enforce a wide range of other policies.

Policy Editor Auto-Configuration

In MDS System embodiments that include a policy editor component CMP-PE, users can author policies in CMP-PE. A notable feature of the MDS System is that the policy editor may be automatically configured by CMP-AEC using information from the metamodels in CMP-MMR, and potentially also from the metadata (in CMP-MDR), ensuring that only PSFs (e.g. policy rule elements) and PFFs (e.g. attributes) are selectable (by users) that can actually be supported (i.e., available) by the MDS System's runtime. For example, if there is no information source or mapping implementation anywhere for user roles, then the editor should not offer the option to author rules with roles. Various editor configurations for the MDS System include for example:

1) In one embodiment, where there is no user-facing editor component CMP-PE, policies can be directly authored in CMP-MMR and/or CMP-PAP. Because there is no CMP-PE, there is no use for CMP-AEC in this embodiment.

2) In another embodiment, there is an editor component CMP-PE, but no automatic editor configuration CMP-AEC. In this case, CMP-PE has to be manually configured or is hard-wired/static. Parts of policies could for example be selectable in pull-down menus, tick boxes and the like of a browser based editor (e.g. depicted in FIGS. 22-31, which could for example be served by a web server based PHP application). Example configurations include the following selectable items: selectable attributes, including directly available and mapped attributes; selectable calculation functions, including directly available and mapped; selectable comparison result types (e.g. Boolean, string, numeric etc.); selectable policies, policy rules, and policy rule elements, again directly available and mapped/refined; selectable actions; etc. Because there is no CMP-AEC, the selectable choices are hard-wired, and can only be modified by for example manually modifying configuration files or by recompiling the editor software. An alternative (often not preferred) embodiment of the policy editor may instead allow the unconstrained (error-prone) authoring in of high-level policies, thus not requiring editor configuration, but also not offering any assistance to the user. For example, users need to know which PFFs/PSFs are available, how they are expressed (exactly consistent with what is stored in the metamodel) etc.

3) In yet another, more flexible embodiment, there is an editor component CMP-PE, and an automatic editor configuration component CMP-AEC. In this case, the selectable policy items in CMP-PE are automatically configured by CMP-AEC. CMP-AEC analyzes the metamodel in CMP-MMR (and optionally the metadata in CMP-MDR) to determine available PFFs/PSFs (e.g. attributes and rule elements) (directly or mapped) in the MDS System. These metamodel elements can be easily identified because they are associated with the same parent metamodel elements (e.g. all available attributes could be associated with the parent "available attributes", which could be associated with the parent "attribute"). CMP-AEC then configures CMP-PE such that only those PFFs/PSFs (e.g. attributes and rule elements) are selectable. In some cases, CMP-AEC can also repeat this process on an ongoing basis or whenever the metamodel (and/or metadata) change in a way that would affect CMP-PE. As a result, CMP-PE only offers the PFFs/PSFs (e.g. attributes and rule elements) that are actually available at that given point in time.

4) In yet another embodiment, there is an editor component CMP-PE, and again an automatic editor configuration component CMP-AEC. The difference to the previous embodiment is that CMP-AEC analyzes the metamodel in CMP-MMR (and optionally the metadata in CMP-MDR) to determine available and at the same time required PFFs/PSFs (e.g. attributes and rule elements) (directly or mapped) in the MDS System. These metamodel elements can be easily identified because they are associated with the same parent metamodel elements. CMP-AEC then only selects the required PFFs/PSFs (e.g. attributes and rule elements) for which a refinement path has been identified by CMP-MMR and CMP-MDR between available PFFs/PSFs (e.g. attributes and rule elements) and required PFFs/PSFs (e.g. attributes and rule elements). CMP-AEC then configures CMP-PE such that only those PFFs/PSFs (e.g. attributes and rule elements) are selectable. In other words, in this embodiment not each and every available PFFs/PSFs (e.g. attributes and rule elements) are selectable, but only required PFFs/PSFs (e.g. attributes and rule elements) for which a refinement mapping is available to available PFFs/PSFs (e.g. attributes and rule elements). The purpose is to only display relevant (i.e., required) selectable items, rather than having the editor flooded with selectable choices, e.g. available attributes and mapped attributes from each refinement step. For example, available attribute "geospatial GPS position" and its mappings to "street name", "street+house", "ZIP/postal code", "country code", and "continent" could all be selectable. However, if only "country code" is a available attribute that is also required, only this attribute would be selectable. As in the previous embodiment, in some cases, CMP-AEC can also repeat this process on an ongoing basis or whenever the metamodel (and/or metadata) change in a way that would affect CMP-PE. As a result, CMP-PE only offers the PFFs/PSFs (e.g. attributes and rule elements) that are actually available and at the same time required at that given point in time.

It is noted that many different editor visualizations are possible for CMP-PE, as long as the visualization is flexible. An example would be a browser based editor (e.g. depicted in FIGS. 22-31), which could for example be served with a flexible web page layout and selectable options by a web server based PHP application.

Predictive Assistance for Policy Authoring

This component creates policies for a Protected SoS automatically based on the analysis of existing historic or current information sources, and offers them to the policy authors as potential policy options. For example, historic incident data, or information about the protected systems, may be in depth in the CMP-PPG component description above.

MDS for Graph Databases

A particular embodiment of the MDS System manages security policies for graph databases, which is known for a database that uses graph structures with nodes, edges, and properties to represent and store data and for any storage system that provides index-free adjacency. In graph databases (Graph DB), both nodes and edges can have properties. This makes them very flexible.

One embodiment of the MDS System is concerned with access control for graph databases: How can access to information stored in the graph database be controlled based on the requestor's attributes, attributes/properties of the requested node(s), and the edges (and their properties) etc.

Due to their inherent graph based information representation, the MDS System that implements proximity-based access control (PBAC), relationship-based access control, and RsBAC (and the broader VBAC concept) is useful for controlling access to information stored in a Graph DB.

For example, access can be granted to requestors:
  to all nodes that have certain properties (e.g. every file marked with property "criminal record")
  to all nodes that have ingoing edges with certain properties (e.g. every node that has an ingoing edge "crime_committed_by" from a node with property "crime event")
  to all nodes that have outgoing edges with certain properties (e.g. every file that has an outgoing edge "crime_committed_by" from a node with property "crime event")
  to all nodes that are in proximity to a node the requestor has explicit access to (e.g. if the requestor has access to a "criminal record" node, access is also granted to all nodes that have edges with properties "interacted_with" one hop from that node, and also 2 hops from that node if both edges have properties "interacted_with").

It is obvious to anyone skilled in the art that the MDS System (optionally together with the MDS patent and the MDSA patent), can be used to manage "high-level" policies (using an embodiment of CMP-PE), and to generate "low-level" access rules (using an embodiment of CMP-MDS) and/or configurations (using CMP-OSC) that can be enforced (using an embodiment of CMP-PDP/PEP and/or other security components configured by CMP-OSC) for access requests to Graph DBs, and also monitored (using an embodiment of CMP-PMR) and compliance-checked (using an embodiment of CMP-PSV), etc.

An innovative aspect of this embodiment of the MDS System is that the functional system description (from CMP-FDS) can now be created in several ways:

Firstly, from both the "system of system" (e.g. which systems and devices are connected to which other devices, and to the Graph database or databases), obtainable via CMP-FDS.

Secondly, from mining the nodes, edges, and properties stored in the Graph DB; for example by CMP-FDS initially (statically), at certain intervals, or continuously, to create a "functional" system description (of the graph information). In a way, the graph stored in the Graph DB can be conceptually viewed as the functional, interconnected system of systems (i.e. an interconnected system of data nodes) that forms part of the CMP-FDS inputs into the MDS System.

With that interpretation, it is apparent to anyone skilled in the art that the MDS System can also be used very well for this use case, to enforce generic, "undistorted", intuitive security policies, including access control to data stored in the Graph DB.

It is noted that this part of the MDS System is not concerned about using data stored in graph databases to create source services (e.g. PFF/PSF) such as attribute sources or calculation sources (for example, having the social relationships between criminals stored in a graph database, and using it to determine e.g. proximity between two criminals. Graph databases are useful for storing the data required for certain CMP-ASS, CMP-MS, and CMP-CS, for example if their functionality depends on complex, semantically rich data.

Cryptographic Protection of the MDS System

In an embodiment, the risk of protocol-based attacks is reduced cryptographically, by including a separate trusted component ("CMP-CY") in the MDS System which sets up the initial cryptographic data components, but does not participate in the on-line operations of the other components. Thus, CMP-CY can be effectively shielded from protocol-based attacks and numerous other security attacks. In some embodiments, the functionality of CMP-CY is provided by the runtime MDS System configuration component CMP-RSC.

In another embodiment, cryptographic certificates are installed on each component and Protected SoS node, achieving the same end effect. In some embodiments, trusted hardware modules or hardware-separated parts of processors are used to store cryptographic materials.

Cryptographic Privacy Preservation

In some use cases of the MDS System, the confidentiality of sources (e.g. attribute sources) may need to be preserved. For example, some attributes may be privacy sensitive and/or confidential in some situations, e.g. geo-location based PBAC may require making the access control system at the server-side aware of user locations, which may lead to privacy or confidentiality breaches. For example, if a top-secret cleared person is on a top-secret classified mission and needs to access an unclassified map information resource, that person's top-secret geospatial information must not be leaked into the unclassified map resource.

In an embodiment of the MDS System, prior art is applied to the MDS System (M. S. Kirkpatrick, G. Ghinita, and E. Bertino. Privacy-preserving enforcement of spatially aware RBAC. Transactions on Dependable and Secure Computing TDSC, January 2012; and: A. Karp, H. Haury, M. Davis. From ABAC to ZBAC: The Evolution of Access Control Models. HP Laboratories HPL-2009-30. As described in the prior art, the MDS System preserves privacy by combining cryptographic token techniques with a separation of functionality among several distinct components.

Selective Rule Distribution

Some MDS Systems have several CMP-PDPs, for example one per network enclave of the Protected SoS. In some cases (e.g. most OpenPMF deployments), there is even one CMP-PDP on each Protected SoS node (together with the CMP-PEP). In some cases, for example ones that implement XLAC, there may even be several CMP-PDPs on each Protected SoS node, covering different layers and aspects of the system.

In such embodiments, CMP-PAP includes a mechanism that selects only the specific rules from its central rule repository that pertain to each decision point (rather than sending all rules to every CMP-PDP), i.e. where they are decided. Various selection algorithms can be supported, including for example: Firstly, distributing rules based on the "requested resource" specified in the rule, if the requested resource can be associated with a Protected SoS node (this is typically the case), and thus with the CMP-PDP on that resource. Secondly, distributing rules to CMP-PDPs based on network closeness or network performance to the CMP-PEPs (and Protected SoS nodes) that CMP-PDP serves. Thirdly, distributing based on computational complexity of the policy, so that the computational load gets distributed among the available CMP-PDPs and the like. Similarly, CMP-OSC can be used to selectively distribute configurations only to those security components that implement them.

It is noted that such ABAC deployments with one or more CMP-PDPs on each Protected SoS node differ from what most of the industry does. For example, most XACML implementations have a central decision point that receives all rules from CMP-PAP, which is queried by local enforcement points CMP-PEP. Having one or more CMP-PDPs on each Protected SoS node is usually more robust and performant, because security enforcement does not require network connectivity and frequent interactions between CMP-PDPs and CMP-PEPs.

Risk/Attack Detection & Policies

Related to risk assessment (e.g. how likely a user or node is going to be used/involved in an attack), CMP-RAA may use predictive analytics approaches to assess the risk of suspicious behavioral patterns for users/systems/etc. (similar to the ones used for e.g. risk assessment in the insurance industry). In particular, CMP-RAA may analyze how likely is a user or node going to be involved in an attack, develop behavioral patterns (e.g. for users) and use predictive analytics methods to assess the risk of suspicious patterns (similar to the ones used for e.g. risk assessment in the insurance industry).

The notion of access control policies based on detected emerging attacks (e.g. using Attack Tree Analysis or Cognitive Attacker Modeling) has already been discussed in the CMP-RAA component description. The policies that govern access control actions as a result of such analysis can be called "predictive policies" for risks/attacks/threats etc. For example, a policy could state "all requestors are only granted access to resources as long as they are not detected suspicious actors in an attack tree for two consecutive steps in the attack tree". This kind of policy will require certain information storage (e.g. CMP-ASS attribute source services) which are populated by CMP-RAA, e.g. containing a list of currently suspicious actors with information about how many consecutive steps in an attack tree have been detected, and supporting information (e.g. which attack tree).

Appliance-Based CMP-PEPs

In some embodiments of the MDS System, CMP-PEPs are located not on Protected SoS nodes, but instead on network nodes that can for example reside on trust boundaries or network enclave boundaries between Protected SoS nodes. Such CMP-PEPs (and sometimes their associated CMP-PDPs) can be hosted on dedicated appliances, which are ideally hardened from an assurance perspective, or can be collocated with firewalls, routers, switches and other network appliances. For dedicated CMP-PEP appliances, CMP-RSC may not need to install or launch CMP-PEPs/PDPs, but still needs to configure the connections between CMP-PDPs and other components of the MDS System (especially CMP-PAP, CMP-ASS/CS/MS). The process is analogous to the CMP-RSC configuration for other CMP-PDPs. When such appliances are started, CMP-PDPs can connect to their CMP-PAP based on automatic discovery, configuration by CMP-RSC, explicit manual configuration etc.

Figure 33:
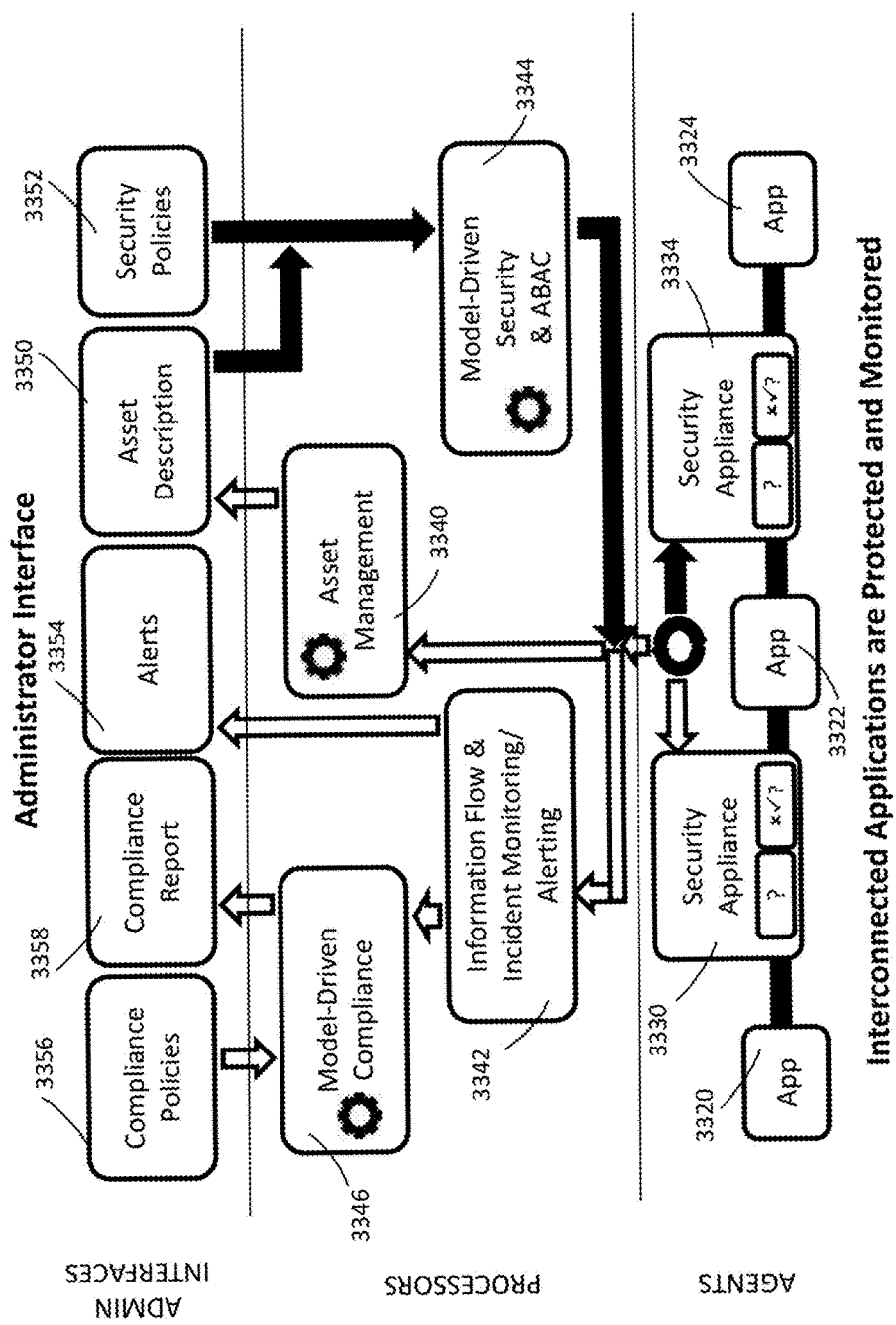
FIG. 33 illustrates a block diagram of appliance-based access control according to an embodiment.

FIG. 33 depicts a partly appliance-based embodiment of the MDS System (called "TrustWand" by the inventors), showing three layers:

Agents (bottom of FIG. 33): Detect process health; monitor incidents; monitor assets, networks, and information flows; and enforce access policies. Agents also have advanced features of the MDS System, such as process health notification, data tagging, redaction/filtering etc. Agents can be network-based (security appliance) (3330 and 3334), or locally tied in with a Protected SoS node system (including virtual machine) or application (3320 and 3322 and 3324).

Processors (middle of FIG. 33): Analyze and process the information received from the Agents and Admin Interfaces. The "Model-Driven Security & ABAC" system (3344) generates machine-enforceable technical access policy rules (e.g. implemented as CMP-MDS), using security policies from the Security Policies (3352) administrator interface (e.g. implemented as CMP-PE and CMP-AEC), the functional system description from the Asset Description (3350) administrator interface, and other information sources—using the operation of CMP-MDS (optionally with the operation disclosed in the MDS Patent). It distributes the generated rules to the Agents (3330 and 3334, as well as 3320 and 3322 and 3324), where they are enforced at runtime. The Asset Management system (3340) collects, aggregates, and analyzes information about IT assets (hardware and software) and information flows (e.g. across the network) detected by the Agents (3330 and 3334, as well as 3320 and 3322 and 3324), and provides an asset description to the "Asset Description" (3350) administration user interface. The "Information Flow & Incident Monitoring/Alerting" system (3342) collects, aggregates, and analyzes incident information created by the Agents (3330 and 3334, as well as 3320 and 3322 and 3324), and provides an incident information to the "Alerts" (3354) administration user interface, as well as to the "Model-Driven Compliance" (3346) system. The "Model-Driven Compliance" (3346) system aggregates, normalizes, and analyzes the provided incident information and other information sources (as described in the MDSA Patent and the present patent application) and, based on compliance policies administered via the "Compliance Policies" system (3356), produces a compliance report, which is presented to the user via the "Compliance Report" (3358) administrator interface.

Admin Interfaces (top): allow security administrators to configure and monitor the system based on a generic policy model that is "undistorted by the idiosyncrasies of the technologies in which it will be implemented" (cf. Object Management Group). The "Compliance Policies" system (3356) and the "Security Policies" system (3352) allow users to manage compliance and security policy information, respectively. The Compliance Report (3358) system provides compliance reporting information to the administrator(s). The Alerts (3354) system provides incident alert information to the administrator(s). The Asset Description (3350) system provides the asset and information flow information to the administrator(s).

Fine-Grained Resource (Content) Labels

In an embodiment of the MDS System, access should be decided not just on a per-request basis (i.e. is this request allowed to access a resource?), but on a finer granularity of the particular data returned: For example, if a storage resource contains many document records that are tagged with resource labels according to a known labeling scheme (e.g. "criminal record", "purchase record", "staff meeting record", . . . ), then CMP-PE can be configured (e.g. by CMP-AEC) to allow the authoring of fine-grained resource policies based on these resource labels. For example, a policy could state that "only criminal investigators are allowed access to criminal records from the storage node".

CMP-MDS can generate machine-enforceable rules (or configurations) based on these labels, and CMP-PDPs should be able to make security decisions based on those fine-grained resource label dependent rules.

Furthermore, attribute source services CMP-ASS need to be able to obtain the labels of the requested resource and provide them to CMP-PDP for decision-making. This can be implemented for example by having the CMP-ASS obtain the requested resource (e.g. by requesting it from the resource), extracting the labels, and providing them to the CMP-PDP for decision-making triggered by the inbound request intercepted by the CMP-PEP (if granted, the CMP-PDP could act as a proxy and directly return the already-obtained resource; or the request could be passed on to the resource, effectively repeating the access request). Or, for example, the CMP-PDP can examine outgoing responses (rather than ingoing requests) returned by the requested resource, extract the labels from the tagged resource (this can be done by CMP-ASS or CMP-PEP), and make the security decision then (e.g. access control).

Another, more specific implementation may involve a special interface provided by the resource that can be queried by the CMP-PEP and that provides the labels for a requested resource (content) only.

Inbound and Outbound, and Requestor-Side/Resource-Side CMP-PEPs

In the MDS System, CMP-PEPs can trigger policy decision-making by CMP-PDP for Protected SoS nodes for either inbound communications (i.e. messages sent to the resource) or outbound communications (i.e. messages sent from the resource), or both. While this distinction may seem insignificant, each choice has major implications, dependent on the communications paradigm of the Protected SoS, on the information transmitted, etc. For example, inbound communications in request-reply style communications usually transmit a "read" request to a service, followed by a response that for example includes the requested information. The information flows from the resource to the requestor. For "write" requests, e.g. to a storage system, the inbound communications (request) would include the information. For an "execute" request, there may be no response. In a data distribution centric publish-subscribe architecture, requests (i.e. registering as a subscriber or publisher to a topic) are separate from the information flows, which are handled automatically by the publish-subscribe middleware software. There are numerous other communications paradigms well-known to anyone skilled in the art.

CMP-PEPs can enforce policies on inbound (to the resource) communications easily based on attributes of the caller, and based on information about the resource that can be obtained from the request message itself (e.g. invoked resource operation, the requested kind of data). Inbound CMP-PEPs have the great advantage over outgoing CMP-PEPs that they will block denied requests before they even reach the protected resource, thus ensuring availability and robustness. However, if the policy decision depends on the specifics of the response (e.g. the particular kind of information returned), then inbound CMP-PEPs cannot easily obtain the information CMP-PDPs require to make access decisions. A feasible approach like the MDS System's support for fine-grained resource (content) labels where the required information from the resource itself at the time the inbound request gets intercepted by CMP-PEP. In some cases (e.g. where the returned data is small), the CMP-PEP can cache the requested information and pass it on as a response itself. In other cases, this means that each granted request incurs two accesses to the resource: one to determine the policy decision, followed by the actual request. Inbound (to the resource) PEPs are often not ideal for such use cases. In other cases (such as publish-subscribe based systems), there is no request that triggered a response, but the responses (publications) are simply published and distributed to all subscribers—inbound (to the resource) PEPs are often not ideal for such use cases either.

In some cases, it is therefore useful to also have CMP-PEPs enforce policies on outbound (from the resource) communications, especially in cases where the policy decision-making involves taking content from the requested/provided data into account. The technical CMP-PEP implementation is similar to the ones for inbound (to the resource) CMP-PEPs. However, in some use cases there are potential major availability (esp. "denial of service", DoS) issues with only using an outbound (from the resource) CMP-PEP: Attackers could potentially make many computationally or memory intensive requests, which the protected resource would try to fulfill until its computational resources (CPU, memory) are exhausted. DoS attackers are not concerned that they would not get any responses back (blocked by CMP-PEP), as the DoS attack would be successful either way.

As a consequence, the best of both worlds for such use cases may be to have CMP-PEPs that intercept both inbound (to the resource) and outbound (from the resource) communications: As a first step, inbound policies can reduce the DoS risk and decide requests that are not dependent on the returned information. As a second step, outbound policies can ensure that only the correct information is returned.

For some use cases, there may also be a need for outbound (from the requestor) and/or inbound (to the requestor) CMP-PEPs. For example, outbound (from the requestor) CMP-PEPs may be required if there is a need for data leakage prevention from the requesting node and the trust boundaries are such that the requested resource cannot be trusted by the requestor (e.g. for Bell LaPadula "no write-down" policies). Inbound (to the requestor) CMP-PEPs could for example be needed to implement policies to ensure the data integrity of the requestor (e.g. for health-based access control policies—c.f. "PHABAC" described below).

The MDS System can include one or more of the described CMP-PEP types, depending on the particular managed policy, the communication paradigm used etc.

Cyber "Health" Based Security Policies

A particular embodiment of the MDS System implements security policies based on the cyber "health" (meaning the level of compromise/non-compromise, i.e. being hacked/not hacked) of systems, devices, or software processes.

A particular example implements access control based on software process "health", with software processes running inside process-level virtual machines, which isolate process execution from the host platform ("Process Health Attribute Based Access Control", PHABAC). The purpose of PHABAC is to ensure information flows should only be allowed if the sending/receiving nodes are not being hacked. PHABAC prevents harm from spreading by ensuring that only uncompromised information flows can go to/from virtual machines across an interconnected IT landscape. Virtualization has been used to increase system assurance for quite some time. However, one disadvantage of traditional hardware virtualization is that a full operating system needs to be installed in each virtual machine, making it large and resource intensive. Therefore the granularity of virtualization is limited—for example, it would be impractical to spawn a full virtual machine for each web browser tab to separate browser tabs from each other. Process level virtualization makes this separation more fine-grained by isolating each process into its own Process Level Virtual Machine ("PLVM") (also sometimes called "micro-VM"), thus preventing compromised processes from compromising other processes. Process level virtualization as such is not a new concept. For example, FreeBSD jails have been around for many years. It is noted that while the following discusses the PLVM embodiment, the described system works analogously for the coarser traditional hardware virtualization embodiment.

In the PLVM use case, PHABAC dynamically adjusts access for information flows between processes based on the cyber security "health" of those processes, i.e. the probability that the PLVM-hosted process is or is not compromised (this approach differs from prior art around "trust-based access control", which mostly concerns users or data). PHABAC thus prevents harm from spreading across systems, and information from leaking into the hands of attackers.

While as such not novel (e.g. FreeBSD jails), software process level virtualization has growing cyber security impact. This is because it is more fine-grained than traditional hardware virtualization, isolating each process into its own Process Level Virtual Machine ("PLVM"), thus preventing compromised processes from compromising other processes. PLVM security currently mainly involves: (1) detection of harmful/malicious behaviors (including PLVM escaping) from outside the PLVM using "introspection"; (2) robust process separation (including hardware-supported) to prevent escaping; (3) increased granularity of PLVM virtualization compared to conventional OS VMs; (4) policy-based access control of system resources from the PLVM. Unfortunately security is never 100% effective, for example: (1) successful escaping (see CERT VU#649219, which is SYSRET 64-bit operating system privilege escalation vulnerability on Intel CPU hardware); (2) conventional access controls for controlling information flows into/out of the PLVM are too simplistic to be effective; (3) behavior-based/signature-based introspection methods are only partly effective (e.g. insufficient zero-day & APT detection, whitelists, false-positives/negatives etc.); (3) virtualized processes usually need to allow some information flows in and out of the PLVM to be useful (e.g. to save a document, or to send/receive information across the network), which by definition bypasses virtualization separation.

PHABAC dynamically adjusts access for information flows between processes based on the cyber security "health" (also called "trustworthiness" in the following) of processes, i.e. the probability that a PLVM-hosted process is not compromised (this differs from prior "trust-based access control" research that concerns users or data).

An important feature of an example implementation (for PLVM virtualized processes) of the PHABAC MDS System is that it automatically detects the process health of virtualized processes from outside the PLVM using "introspection" (of the virtual machine from outside the virtual machine), and automatically notifies each Protected SoS node's CMP-PDP about the detected process health of the Protected SoS nodes they are communicating with. This ensures that only uncompromised and authorized information flows are allowed to enter or leave the PLVM across an interconnected IT landscape. It is noted that PHABAC is not limited to PLVM virtualized processes—it can also be implemented using other types of virtualization (e.g. operating system VMs, with introspection), or no virtualization at all (using e.g. endpoint monitoring/anti-malware/antivirus tools in lieu of introspection).

PHABAC adds following two main features to the MDS System:

Firstly, PHABAC uses PLVM introspection, an emerging mechanism in the IT industry, to detect the process health of PLVM-hosted processes using "introspection" (which detects behaviors inside the PLVM from the outside the PLVM), together with behavioral/signature based analysis tools. PLVM introspection can detect whether any process is behaving badly inside the virtual machine (e.g. malware), thus providing the trustworthiness attributes for each PLVM-hosted process. In other words, PHABAC's PLVM introspection process yields specific dynamic "health-based" attributes that can be used for security policy enforcement by the MDS System. To be effective, introspection needs to meet at least the following goals: The introspection mechanism needs to reside outside the PLVM to ensure the introspection mechanism itself cannot be attacked by harmful processes. Moreover, the introspection mechanism needs to be able to detect emergent escape attempts before they are successful, because once successful, the introspection mechanism itself is maybe vulnerable. It is noted that there are fundamental challenges around behavior-based and signature-based approaches to introspection, e.g. false positives/negatives, limited zero-day protection etc. Attack Tree Analysis (ATA) and Cognitive Modeling of attackers are useful, well-established methods for detecting emergent attacks based on known attack behaviors. But these methods should ideally be used in combination with "whitelisting" behavioral "execution tree" analysis: behavioral patterns of known applications are used as a basis for determining deviations from normal/expected behavior of the software running in the PLVM. Similarly, known behaviors related to sets of system resources (e.g. network, hard drive, certain executables, certain storage files etc.) required for applications to run can be used to determine emergent attacks, especially if a process requests resources beyond what is considered normal for the application executed by the process. Other indicators are unexpected PLVM performance changes, e.g. if an attacker uses an unusual amount of computational resources. Introspection can also use techniques such as scanning files or binaries inside the VM for malicious patterns, malware etc. It is noted that introspection by its very nature is likely to not be 100% effective in detecting emergent attacks, but it will go a long way in many cases.

Within PHABAC, the PLVM introspection mechanism provides the trustworthiness attributes to a trustworthiness notification mechanism that notifies CMP-PDPs about the determined trustworthiness of PLVM-hosted processes, so that potentially harmful information flows can be blocked.

Figure 34:
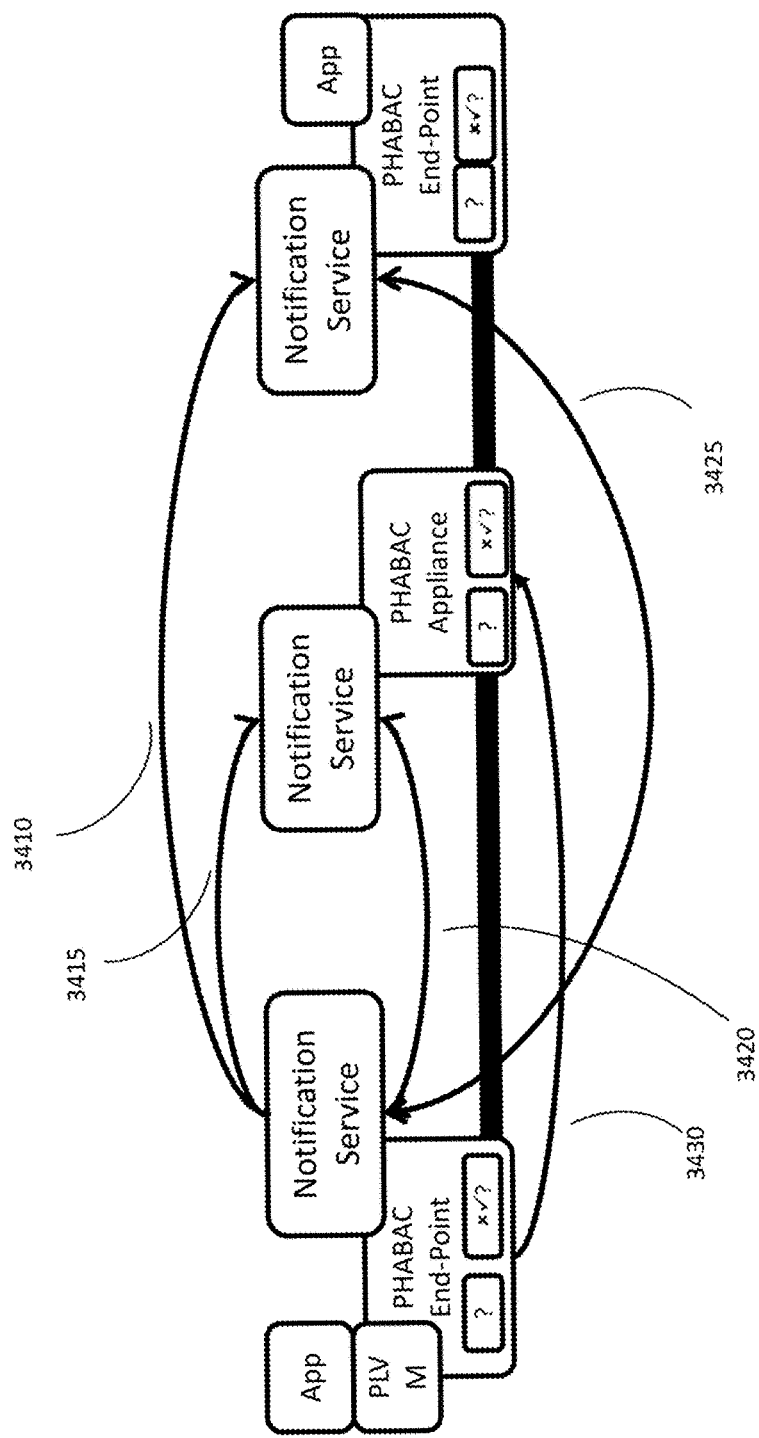
FIG. 34 illustrates a block diagram of a PHABAC health notification framework according to an embodiment.

Secondly, PHABAC uses process health notifications to inform CMP-PDPs on other Protected SoS nodes about the detected process health (e.g. detected level of compromise/non-compromise) of PLVM-hosted processes, to prevent information flows to and from those compromised processes. It is noted that trustworthiness (i.e. level of compromise/non-compromise of a PLVM-hosted process) is most often a highly dynamic attribute, and will have to meet stringent timeliness requirements to preventatively block information flows to/from compromised processes: notifications need to be communicated while attacks unfold and before escape attacks are successful. Otherwise the PHABAC introspection mechanism and notification mechanism could be hacked. Numerous design choices can be implemented for trustworthiness notifications. Several potential candidates that could be implemented together are (illustrated in FIG. 34), for example:

1) Trustworthiness attributes are tagged to information sent (interactions 3410 and 3415), so that it arrives together with the information at the recipient and can be directly used for access control policy enforcement. This approach has the advantage of being light, easy to implement, and reliable. It works well for information leaving a compromised PLVM. However, it cannot protect well from inbound information flows, because a sender does not automatically know about the trustworthiness of the receiver.

2) A distributed trustworthiness notification framework propagates trustworthiness notifications between all CMP-PDPs that protect processes/systems/applications that are potentially communicating with each other (interactions 3420 and 3425). This approach has the advantage that trustworthiness information is propagated to where needed without requiring any changes to how information gets transmitted. However, it has the potential disadvantage that trustworthiness notifications may not reliably arrive when and where needed.

3) A trustworthiness handshake protocol exchanges trustworthiness prior to each information flow (interaction 3430). This approach is very reliable, but introduces some overheads and latency.

There may be a need for multi-hop propagation of trustworthiness information, for example if information flows travel multiple hops. Numerous policies can be implemented similar to privilege delegation policies, such as: use the initiator's trustworthiness level; use the average of the trustworthiness levels of all nodes on the multi-hop path; use the lowest of the trustworthiness levels of all nodes on the multi-hop path; etc.

Figure 32:
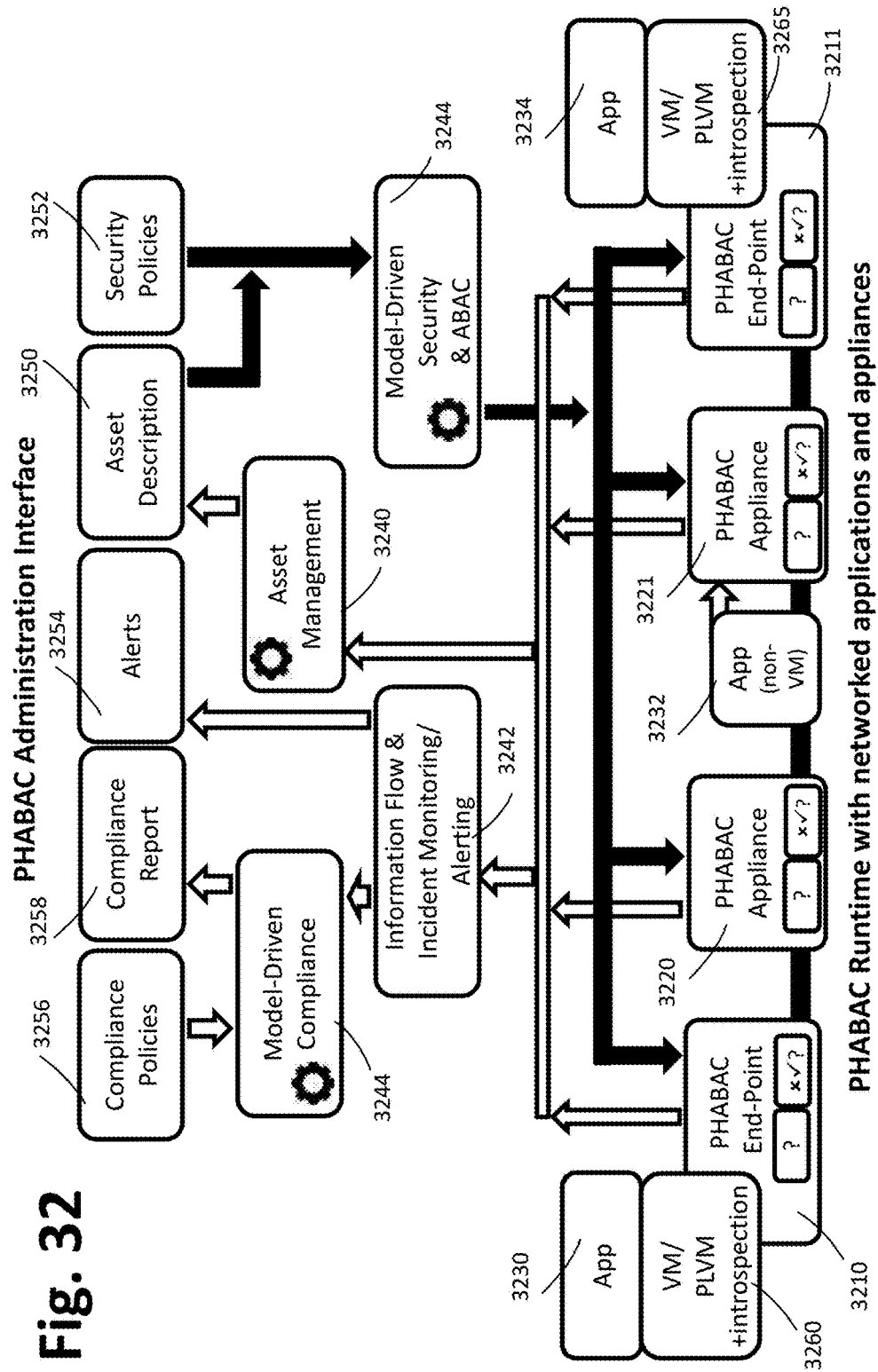
FIG. 32 illustrates a block diagram of Process Health Attribute Based Access Control (PHABAC) according to an embodiment.

The conceptual diagram in FIG. 32 illustrates where VMs/PLVMs and introspection tie into the overall MDS System architecture (only displaying one exemplary scenario with two PLVM-hosted processes on two separate systems). The depicted embodiment includes the combination of several aspects of the MDS System, including:

Asset & network monitoring: Detect assets across the interconnected IT landscape, including an enterprise network map, an IT asset list, and information flows across networks: PHABAC agents on End-Points (3210 and 3211) and PHABAC Appliances (3220 and 3221) detect applications (3230 and 3232 and 3234) and the systems they operate on, as well as their network interactions. This information is collected, aggregated and analyzed by the Asset Management system (3240), and presented to the user in the Asset Description administration user interface system (3250)

VM/PLVM introspection: VM/PLVM introspection systems (3260 and 3265) on PHBACC End-Points (3210 and 3211) detect the trustworthiness of virtualized applications using introspection and behavioral/signature based analysis tools. This information is used by the PHBAC End-Point (3210 for 3260, and 3211 for 3265) to control access to system resources, and access to the network. This information is also used for Trust notifications (see below). This information may also be provided to the "Information Flow & Incident Monitoring/Alerting" system (3242)

Trust notifications: Inform other applications' PHABACC End-Points (e.g. 3210 may inform 3211) and PHABAC Appliances (3220 and 3221) about the detected trustworthiness (e.g. detected level of compromise/non-compromise) of virtualized applications, to prevent information flows to or from those compromised applications. As described above, this can involve tagging outgoing data with trustworthiness attributes, propagating trustworthiness attributes using a distributed notification framework, a handshake protocol etc.

Access policy automation: Apply generic trustworthiness-based access policy templates (models) to the specific interconnected IT landscape and information flows (obtained via CMP-FDS) to generate machine-enforceable trustworthiness-based access rules (using an MDS System), and maybe also using multi-level security approaches. The "Security Policies" (3252) administration user interface system (implemented e.g. as CMP-PE and CMP-AEC) allows users to author security policies with trustworthiness attributes. The "Model-Driven Security & ABAC" system (3244) (implemented e.g. as CMP-MDS) consumes security policies from the security policies system (3252), as well as a functional system description from the asset description system (3250), and other applicable information sources available to the MDS System. It then generates machine-enforceable security policy rules that may include trustworthiness attributes using the functionality of CMP-MDS (and optionally the method/system described in the MDS Patent), and distributes them to the PHABAC End-Points (3210 and 3211) and PHABAC Appliances (3220 and 3221), where runtime decision-making, enforcement, and monitoring occur.

Access enforcement: Block information flows to and from compromised applications based on access policies and trustworthiness attributes (using CMP-PDPs and CMP-PEPs). For defense in depth, block both on the network (using hardware and/or virtual network appliances) (3220 and 3221) and on end-systems (3210 and 3211).

Monitoring & Reporting: Collect incidents (e.g. via CMP-PMR) such as notifications, denied accesses etc., and automatically map these incidents to a compliance evidence report based on compliance policy templates (using model-driven security techniques). The "Information Flow & Incident Monitoring/Alerting" system (3242) CMP-PMR collects information from PHABAC End-Points (3210 and 3211) and PHABAC Appliances (3220 and 3221). It analyzes Information about incidents (including the detected level of compromise) and provides it to the "Alerts" administration user interface (3254) for display to the user. It (3242) also collects numerous other information sources described in the MDSA Patent and this present patent application, and provides this information to the "Model-Driven Compliance" system (3244) CMP-PSV, which normalizes and analyzes the information using the method/system described in the present application and in the MDSA Patent, based on compliance policies administered by users via the "Compliance Policies" (3256) administration user interface. Based on these policies (3256), the "Model-Driven Compliance" system (3244) generates a compliance report, which is presented to the user via the "Compliance Report" administration user interface (3258).

In summary, PHABAC analyzes the level of compromise/non-compromise (i.e. being hacked/not hacked) of a device or software process using numerous techniques (prior art), and generates "cyber security health" attributes that can be used for access control purposes by the MDS System.

It is noted that these "health" (i.e. trustworthiness) based features can also be used for policies other than access control, for example monitoring and auditing policies. It is also noted again that PHABAC is not limited to PLVM virtualized processes—it can also be implemented using other types of virtualization (e.g. operating system VMs, with introspection), or no virtualization at all (using e.g. endpoint monitoring/anti-malware/antivirus tools in lieu of introspection).

Sequence/Workflow/Business-Process Based Policies

In an embodiment of the MDS System, sequence/workflow/business-process based policies determine access based on the sequence of events, such as business process workflows. For example, a requestor is only granted access to a particular node in step 8 of a workflow, if that requestor's last workflow step was step 7 of the same workflow.

The MDS Patent teaches that business process models (e.g. Business Process Modeling Notation, BPMN) can be used as functional system descriptions in the MDS System. Since process models specify an interaction sequence (i.e. a process/workflow), the MDS System can manage policies based on process sequence and steps if a process/workflow model is provided via CMP-FDS.

In the context of Proximity-Based Access Control (PBAC), this concept is described in the context of "Business Process Proximity"

History Based Policies

In an embodiment of the MDS System, security policies are based on security attributes based on some historic behavior/events, for example the user's access history. Such history based policies are useful for segregation of duties, conflict of interest prevention policies, throttling policies, or to detect excessive "leaching" of data (e.g. during theft). History-based access control is known to anyone skilled in the art, and many approaches have been devised to deal with the inherent complexity that some system has to somehow store relevant information about events to build up a history. In the MDS System, history-based attributes can be managed in several ways, as discussed below.

Firstly, history-based attributes can be produced by the MDS System itself, for example, by supporting history-based alerting policies that collect events via CMP-PDP and CMP-PMR. CMP-PMRs can aggregate, analyze and provide such alerts to a history-based CMP-ASS. Examples of such "stateful" attributes include: requestor access history, requestor access frequency, requestor access to mutually exclusive dynamic groups of resources (for implementing e.g. "Chinese Wall" segregation of duty policies, dynamic conflict of interest policies), etc. The history-based CMP-ASS makes consolidated history-based attributes available for access control decision making, for example: "number of accesses by the requestor in the last x minutes". In more complex cases such as "mutually exclusive resources the requestor has accessed before", the attribute service's performance may degrade over time due to increasing data aggregation, analysis, and computation/storage requirements as the history grows over time. History-based access control in general can be highly complex and data intensive and has been a scientific research area for many years. For example, "requestors can access any resource that is not in conflict to anything the requestor has previously accessed" may require significant data storage and analysis.

Secondly, history-based attributes can be produced by reusing existing data sources, such as auditing systems, which can be queried to obtain the attribute. There are again performance considerations to keep in mind.

Thirdly, in some cases CMP-PDPs can keep their own history, especially when a history-based attribute and the associated access decision is only local to that particular CMP-PDP. For example, if a requestor is limited to 3 accesses to each particular Protected SoS node per hour, and there is a CMP-PDP/CMP-PEP on each Protected SoS node, each CMP-PDP can keep its own decentralized counter for each requestor (in contrast, for policies that e.g. only allow 3 accesses to any particular Protected SoS node per hour, a central CMP-ASS needs to be implemented).

Redaction & Filtering Policies (RFBAC)

An embodiment of the MDS System selectively redacts/filters content based on policies, rather than allowing/denying the entire information flow. Instead of allowing/denying requests, and carrying out other actions such as "alert", the MDS System can be used to manage policies that determine certain content from the returned data to be redacted and/or filtered. Redaction and filtering as access control concepts have been around for a long time, but not in the context of the MDS System.

The purpose of "Redaction & Filtering Based Access Control" (RFBAC) is to dynamically redact and filter data at a fine (e.g. document per-field/tag/marking and/or per-content item) granularity based on redaction & filtering access policies. Redaction and filtering transforms data based on policies (e.g. full deletion, partial deletion, random, replace, obfuscated, combined etc.) and possibly on other dynamic factors, so that only the information is left that the requestor is authorized to obtain. Numerous technical approaches are well-established to carry out the actual redaction and filtering process, for example there are XML processing and redaction tools (e.g. based on XML tags), content redaction/filtering tools (e.g. for images, video, audio, text etc.), metadata based redaction tools (e.g. based on tags/labels/ISMs).

RFBAC uses model-driven security to automatically generate (e.g. document per-field/tag/marking) access control rules from generic policy models, using other information sources that describe the filtered/redacted data's tags, content, or other markings (e.g. metadata about tags/markings, XML schema, etc.). Inside the government, tags are often called Information Security Markings (ISMs).

RFBAC can become quite complex for various reasons: Firstly, because rules are highly fine-grained, they can become numerous and complex (and thus unmanageable). Secondly, transmitted data on that fine granularity needs to be dynamically partly deleted or modified based on flexible redaction/filtering policies (thus complicating policies). Thirdly, what needs to be redacted or filtered may depend on the particular content transmitted (thus complicating the technical implementation)—for example, redact social security numbers in all transmitted content if the content contains social security numbers. Fourthly, certain content processing such as e.g. partial image redaction may be more performance-sensitive, although most conventional filtering/redaction will have little performance impact.

In order to implement redaction and filtering ("R&F") policies, the MDS System may require additional features as discussed below.

In an elaborate implementation, the MDS System can manage in CMP-MMR and CMP-MDR which redaction and filtering features are available, what kind of information is being transmitted, and what the data model of the transmitted data is. Some of this information can be provided by specialized "redaction and filtering components" (CMP-RF), while other information needs to be manually configured (e.g. content data models).

CMP-PE allows the authoring of R&F policies, based on the data model of the processed content.

Thanks to PFF/PSF refinement (e.g. attribute and rule refinement), CMP-PE can offer generic "required" attributes (i.e. a generic data model about content) and calculations that map to the available attributes (i.e. R&F instructions on a content specific data model) and calculations. For example, a generic policy could be to "redact all personal identifiable information (PII) by a random placeholder", which could be refined based on a content model to "redact all social security numbers by a random placeholder", with "social security number" being a generic attribute of a content model. CMP-PE can be dynamically configured by CMP-AEC.

CMP-MDS generates machine-enforceable rules based on the authored policies, potentially using PFF refinement and PSF refinement (e.g. attribute refinement and rule refinement), including e.g. refinement templates that map generic "required" attributes into content specific "available" attributes (e.g. using content specific mapping services CMP-MS). "Other information sources" that would be useful feeds into CMP-MDS include for example: content metadata models, ISM data models, content data models, XML schemas etc. For example, a required attribute "social security number" can be (in a simplistic example) mapped to a "replace first 5 numbers of the numerical form xxx-xx-xxxx with random numerical placeholders".

Based on the generated rules, CMP-PDP instructs the redaction/filtering components about which parts of the content to redact/filter, and how to redact/filter (obfuscate, remove, black out, randomize etc.).

Redaction/filtering components ("CMP-RF") do the redaction/filtering based on the instructions provided by CMP-PDP. For example, instruct a processing component to carry out the actual redaction.

Figure 35:
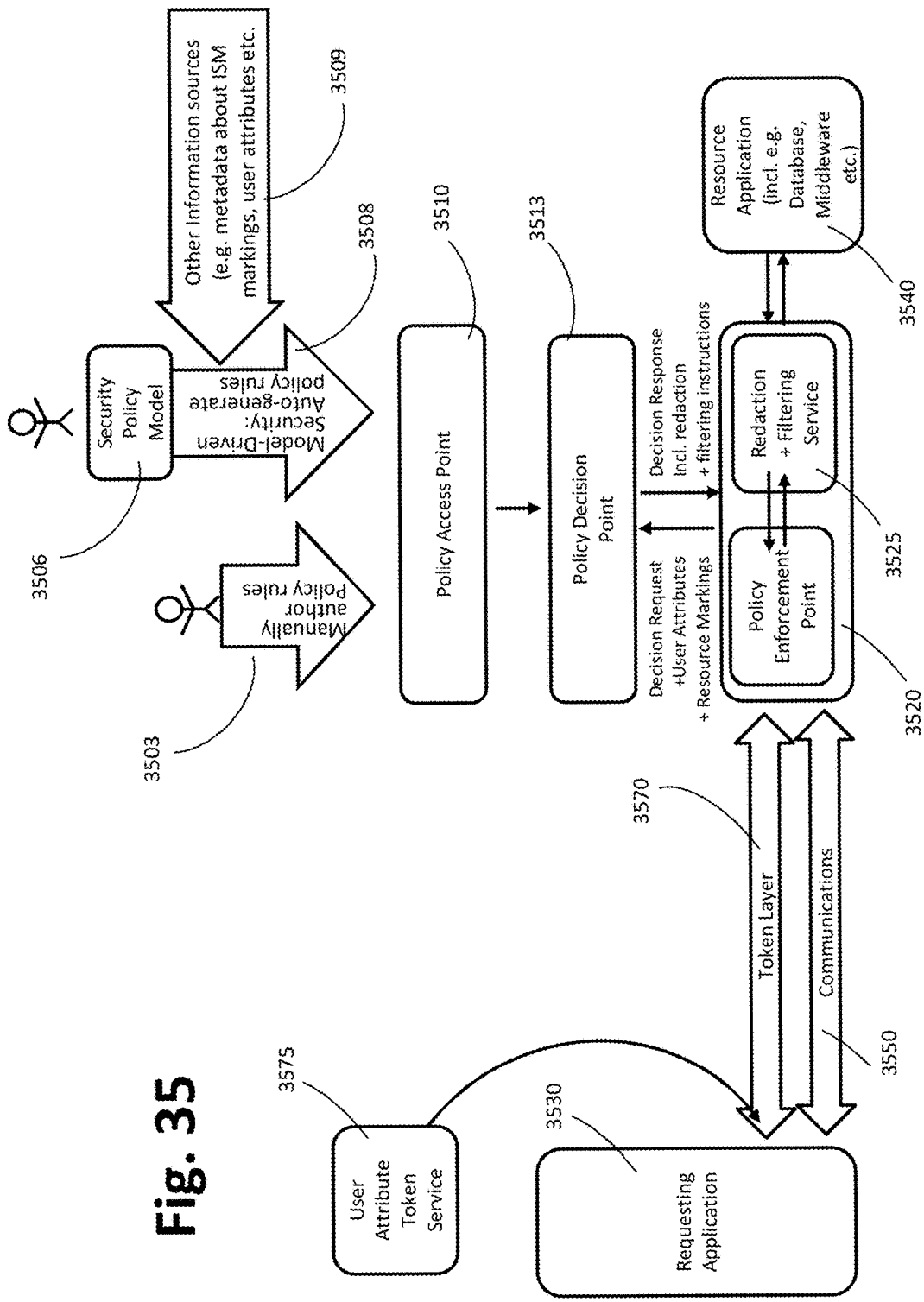
FIG. 35 illustrates a block diagram of redaction and filtering based access control according to an embodiment.

FIG. 35 illustrates an embodiment of the MDS System that implements RFBAC. It includes per-field/per-marking attribute-based access control (ABAC) with a redaction & filtering engine, as well as model-driven security for improved policy manageability. An embodiment automatically or semi-automatically generates—using model-driven security (3508)—the machine-enforceable redaction/filtering policies from generic, "undistorted" redaction & filtering policy models (3506) administered by human users. Model-driven security (3508), which may be implemented as described in the MDS Patent and in the present patent application, may take various other information sources (3509) into account, e.g., content metadata, ISM markings, context information etc. In an embodiment, some or all of the machine-enforceable redaction/filtering policies are manually authored in a suitable policy editor (3503) (e.g. text editor, contextual editor, autocomplete editor, wizard, drop-down menus etc.) by human users. In the example depicted in FIG. 35, the machine-enforceable rules are stored in the Policy Access Point (PAP) (3510) (which may be implemented by CMP-PAP), and subsequently distributed to one or more Policy Decision Points (PDP) (3513) (which may be implemented by CMP-PDP).

In the example depicted in FIG. 35, the requesting application (3530) communicates a request via a communications channel (3550) to the resource (3540). This request may include user attribute tokens, which may come from a separate User Attribute Token Service (3575) or directly from the Requesting Application, to the communication via a Token Layer (3570). The Policy Enforcement Point (PEP) (3520) (which may be implemented by CMP-PEP) intercepts the request, and collects information about the request (e.g. requestor attributes). In the depicted example in FIG. 35, the PEP also requests policy decision-making relevant information (e.g. relevant attribute values) about the requested resource from the Redaction & Filtering (RF) Service (3525), which may in turn request that information from the resource (3540) directly (for example attributes such as resource markings, document labels/tags etc.). The information is returned to the PEP (3520) from the RF Service (3525), which may receive the information directly from the resource (3540). The PEP (3520) provides the information to the PDP (3513), which makes the access decision, and returns a decision response to the RF Service (3525). This response may include including redaction and filtering instructions, which—in the example depicted in FIG. 35—the RF Service (3525) uses to redact and/or filter the response before it is communicated (3550) to the requesting application (3530). It is noted that the interaction order between PDP (3513), PEP (3520), RF Service (3525) and the resource (3540) can be changed without altering the end effect. In particular, it may be preferable in some cases for the RF Service (3525) to request (i.e. forward) the requesting application's (3530) request from the resource (3540), extract (from the response) the decision relevant information for use by the PEP (3520) and PDP (3513), and carry out the redaction and filtering on that already-obtained response, and return that redacted/filtered response to the requesting application (3530). In other cases (esp. when the response content is large), the RF service (3525) may request decision-relevant information from the resource (3540), and, once it receives the redaction/filtering instructions, obtain the response from the resource (3540), carry out the redaction/filtering, and return the results. In yet another case, the PDP (3513) may orchestrate all interactions between PEP (3520), RF Service (3525) and resource (3540).

AuthoriZation Based Access Control (ZBAC) Policies

In AuthoriZation Based Access Control (ZBAC) (Karp et al. "From ABAC to ZBAC", HP Labs Report), authorization tokens (similar to physical keys), rather than attributes about the requestor, resource and context, are used to convey authorizations. An authorization server issues cryptographically signed tokens for other parties upon request, which are used as an access attribute source when access decisions are made. A standard that can be used to implement authorization tokens is the OAuth industry standard. In ZBAC, requestors ask a central service for some access permissions (rather than attributes about the requestor) wrapped in a cryptographic token, which can then be used to access a service. A ZBAC token is more like a car key, which gives an authorization to unlock a car to whoever holds the key. While the token should typically be signed and bound to an identity, the holder of the token should be able to issue that authorization (or subsets of it) to other parties (i.e. the car does not care if I lend you my car key—it will still unlock). ZBAC may simplify authorization delegation and other necessary features in today's interconnected IT application chains (e.g. revocation of authorizations). ZBAC can be used alongside or instead of conventional ABAC.

In an embodiment of the MDS System that implements ZBAC, CMP-MDS (directly or via CMP-PAP) distributes the machine-enforceable rules to the ZBAC authorization servers based on the participants served by each ZBAC server (e.g. on ZBAC server per trust domain, per organization etc.).

Whenever a participant (e.g. Protected SoS node, user, application) wants to obtain permission for a request, it contacts the ZBAC server to obtain an authorization token, maybe providing the attributes associated with the request (e.g. requesting user, requested resource, context, etc.). If the access should be granted, the issuing ZBAC server (acting as a CMP-PDP) creates and returns a cryptographically signed authorization token that essentially states that the access should be granted. The process can be automated by an outgoing Protected SoS node's CMP-PEP that intercepts all outgoing requests, obtains the ZBAC token, and transmitted with the request (e.g. using a token transfer protocol layer, a specific XML tag etc.)

On the receiving resource side (potentially in a different trust domain with a different ZBAC server), the receiving Protected SoS node's CMP-PEP passes the token and attributes about the message on to its own ZBAC server to determine whether access should be granted. Based on an agreed trust relationship between federated authorization servers (that is technically implemented using e.g. cryptographic certificates), the ZBAC server can act as the CMP-PDP and confirm that the token was issued by a trusted ZBAC server, and that the token grants access for the specific request.

It is noted that ZBAC policies can be used in combination with other policies, which is for example useful in cases where some parts of the access decision depend on dynamic attributes that can only be evaluated at decision-making time.

It is noted that a potential complexity around ZBAC is that there still needs to be a common understanding as to what authorizations actually mean. For example, an authorization "requestor is authorized to access color printers" means that both the issuing and verifying ZBAC servers need to know whether the accessed resource is a color printer or not, and need to know that the request actually pertains to access to a particular color printer. In general, the potential for confusion is lower if the accessed resource is represented in a technical nature (e.g. IP address, MAC address, REST interface, DDS publish-subscribe topic etc.)

The MDS System can technically implement ZBAC within an ABAC implementation in the MDS System in various ways. For example, CMP-PDPs can completely offload the access decision to their ZBACs server is a ZBAC token is provided. In an alternative example, the MDS System can implement ZBAC-specific ABAC rule elements that allow the CMP-PDP to determine access based on ZBAC if a ZBAC token is provided by the requestor, and based on ABAC if no ZBAC token is provided. In yet another example, both a ZBAC token and ABAC rule elements are used to determine access (e.g. ZBAC for static access, and ABAC for dynamic access). Or, for example, CMP-PDPs can act as the ZBAC server, evaluating ZBAC tokens themselves (this requires more elaborate certificate and key management). In the MDS System, CMP-PEPs and CMP-PDPs on both ends of a communication can transparently handle all communications with ZBAC servers and the ZBAC token transfer from requestor CMP-PEP to resource CMP-PEP.

Vector-Based Access Control (VBAC) Policies

In some embodiments, the MDS System implements one or more configurations of "Vector-Based Access Control" (VBAC). Proximity-Based Access Control (PBAC) and Relationship-Based Access Control (RsBAC) are specific VBAC configurations.

Traditional access control rules are usually based on rule elements of the form (in pseudonotation):

(<attribute specifyer><calculation function><comparison value>)

That is, a specified attribute, which needs to be fetched by a policy decision feature, is compared to a specified comparison value using a calculation function. In other words, there is a single attribute, a single calculation function, and a single comparison value. It is noted that attributes and comparison values do not have to be numerical. They can be of any type (including e.g. polygons, data elements such as images/sounds/video, strings, etc.

Figure 36:
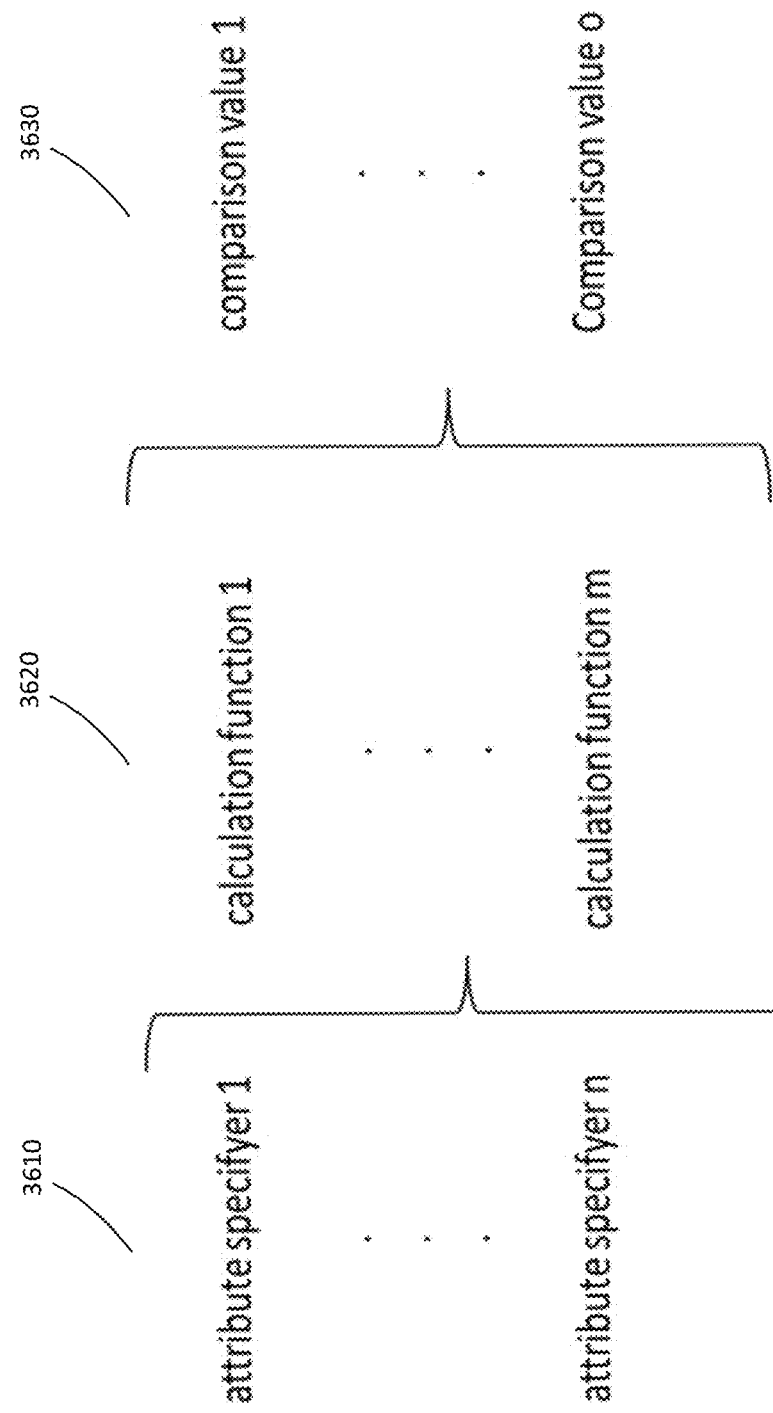
FIG. 36 illustrates a diagram of Vector Based Access Control (VBAC) according to an embodiment.

VBAC is a vast superset of such rules (depicted in FIG. 36): A vector of one or more attribute specifyers (3610) is fed into one or more calculation functions (3620), and the results are compared to a vector of one or more comparison values (3630). In lay terms, VBAC compares potentially more than one attributes to potentially more than one comparison values, using potentially more than one calculation function.

Rule elements now look as follows:

( <attribute specifyer-1, . . . , attribute specifyer-n>
<calculation function-1, . . . , calculation function-m>
<comparison value-1, . . . , comparison value-o>
)

PBAC is a narrow subset of VBAC, where two attribute specifyers are compared to one comparison value, using one calculation function, as follows:

( <attribute specifyer-1, attribute specifyer-2>
<calculation function-1>
<comparison value-1>
)

Numerous embodiments of the MDS System are possible that include the additional rule element formats to support VBAC, including (categorized by how many attribute specifyers, calculation functions, and comparison values there are):

The following is an example VBAC Rule Element 1:1:1 (conventional ABAC):

```
( <attribute specifyer-1>
  <calculation function-1>
  <comparison value-1>
)
```

The following is an example VBAC Rule Element 2:1:1 (e.g. PBAC):

```
( <attribute specifyer-1, attribute specifyer-2>
  <calculation function-1>
  <comparison value-1>
)
```

While PBAC is an example of such a policy element category, the calculation function does not necessarily have to calculate the proximity between the two input attributes. Any other semantics (e.g. kinds of relationships other than PBAC) could be supported, as long as they are based on the two attributes, and—using one calculation function—compares the calculation result to one comparison value.

The following is an example VBAC Rule Element n:1:1 (n>2):

```
( <attribute specifyer-1, attribute specifyer-2, . . . , attribute specifyer-n>
  <calculation function-1>
  <comparison value-1>
)
```

Any semantics (e.g. any kind of relationship between the attributes) could be supported, as long as they are based on the n attributes, and—using one calculation function—compares the calculation result to one comparison value. For example, the point of closest geospatial distance between n points could be calculated using this function. As another example, if the input specifies a vector of characteristics about data (e.g. music track, as described below in the PBAC section related to the Music Genome Project), the calculation function could calculate how well the music track (characterized by the attribute vector) meets the listener's taste (comparison value could be a percentage value).

The following is an example VBAC Rule Element n:1:o (n>2, o>1):

```
( <attribute specifyer-1, attribute specifyer-2, . . . , attribute specifyer-n>
  <calculation function-1>
  <comparison value-1, . . . comparison value-o>
)
```

Any semantics could be supported, as long as they are based on the n attributes, and—using one calculation function—compares the calculation result to a vector or comparison values. For example, any kind of relationship between each input attribute and its respective comparison values could be calculated, even if that calculation for some or all of the attributes is impacted by some or all of the other attributes.

It is noted that there can be, but does not have to be, a direct comparison between attribute specifyers and comparison values, that is, comparison value 1 compares calculation results related to attribute specifyer 1, comparison value 2 compares calculation results related to attribute specifyer 2, and so on. This does not have to be the case. For example, in the vector of music track characteristics, the input attributes are the characteristics, and the comparison value is again a vector of characteristics.

For example, how well does the music track characterized by the input vector play at the same time as the one characterized by the comparison values. There can be a strong correlation between the characteristics of each attribute specifyers if the music tracks are very similar (same speed, beat, tonal key etc.). However, a good match could also be found in very different tracks, for example playing a beat-less, quiet, floating meditation song with little tonal movement on top of an electronic music track with rapid, strong beats, riffs etc. It is noted that while music track characteristics are used to exemplify the presented concepts, the MDS System is by no means limited to this use case. It is just an intuitive example. Many useful other relationships can be calculated using the MDS System.

Also it is noted that "n" does not need to be the same as "o". A calculation function could for example take a vector of 100 input attributes, and compare the result with a vector of 4 comparison values.

The following is an example VBAC Rule Element n:m:o (n>2, m>1, o>1):

```
( <attribute specifyer-1, attribute specifyer-2, . . . , attribute specifyer-n>
  <calculation function-1, . . . calculation function m>
  <comparison value-1, . . . comparison value-o>
)
```

Any semantics could be supported, as long as they are based on the n attributes, and—using m calculation functions—compares the calculation result to a vector or comparison values.

For example, n pieces of information (e.g. maps, images, audio, video) could be compared to comparison values only found in certain types of information (e.g. recognized voice in audio, recognized face in photo), using m calculation functions (e.g. a function depends on the type of attribute, or the type of comparison value.

For example, if attribute1 is an image, and the comparison value (could be the first one in the vector, or at another position in the vector) is an identifier of a face, then a calculation function (could be the first one in the vector, or at another position in the vector) would be applied that detects faces in images and matches them with an identifier (e.g. known criminal).

The following list illustrates examples of other VBAC combinations: While only some examples have been discussed, VBAC comprises any/all paths through attribute specifyer(s), calculation function(s), and comparison value(s) could be supported by the MDS System, depending on the desired behavior. For example:

- Any permutations of one, or more than one attribute specifyers calculation functions, and comparison values (as described above, and e.g. 1:1:o, 1:m:1, n:m:1 (there are very many combinations if o, m and/or n are large).
- Any paths from attribute specifyer(s) via calculation function(s) to comparison value(s). (there are very many combinations if o, m and/or n are large). (in particular, there does not have to be a direct correlation between the positions in the vector, e.g. attribute-specifyer-1 does not need to, but could be, be compared to comparison-value-1, using calculation-function-1; any paths are possible, and useful paths are determined by the desired behavior)
- Any combinations of types of attribute specifyers
- Any combinations of types of comparison values
- Any combinations of types of calculation functions, taking any combination of types of attribute specifyers, and comparing to any combination of types of comparison values.

It is noted that while VBAC's name assumes that the rule element is used in access control rules, this does not need to be the case. The concept could for example also be used for big data analytics, and many other kinds of applications.

In summary, VBAC is a generic rule element feature that can be used to calculate rule elements based on
- a potentially numerous, potentially differing collection of attributes,
- using a potentially numerous, potentially differing collection of calculation functions,
- which compare a potentially numerous, potentially differing collection of calculation results
- with a potentially numerous, potentially differing collection of comparison values.

Relationship-Based Access Control (RsBAC): Embodiment of VBAC

An embodiment of the MDS System implements Relationship-Based Access Control (RsBAC). RsBAC is a specific (narrow) configuration of the general VBAC MDS System in that RsBAC is one particular VBAC use case with very specific semantics: In RsBAC, calculation function(s) calculate the relationship(s) between the (at least two) input attributes, and compares the calculated relationship(s) between the input attributes with comparison value(s) that qualify and/or quantify that relationship.

Proximity-Based Access Control (PBAC) is an example of a specific use case of RsBAC with the relationship semantics specifically being some form of proximity (or distance) calculated between the input attributes, which is compared to the distance comparison value. It is noted that the RsBAC MDS System according to the present application differs from the predominant scientific literature (reference: e.g. Giunchiglia et al. "RelBAC: Relation Based Access Control". IEEE SKG'08 Conference Proceedings), which is much narrower by comparing the distance between users and data.

RsBAC differs from PBAC in that the relationship between the two input attributes does not need to be a distance/proximity relationship.

Proximity-Based Access Control (PBAC) Policies

An embodiment of the MDS System implements Proximity-Based Access Control (PBAC). PBAC is based on exactly two input attribute values (of any type, could be vectors, e.g. x/y/z geospatial coordinates), one distance calculation function, and one distance comparison value (of any type, could again be a vector). PBAC includes several novel aspects: Firstly, rule elements need to be changed to allow two attributes to go into a proximity calculation (conventional ABAC only has one going in). Secondly, there are many different proximity dimensions that can be combined to capture the desired proximity notion (prior art around PBAC focuses on a geospatial proximity notion and calculation method).

PBAC Definition

Proximity-Based Access Control (PBAC) may be defined as follows: PBAC is access control using policies that are based on the relative proximity/distance between one or more proximity attributes associated with an accessor and one or more proximity attribute associated with an accessed resource.

Proximity definitions comprise the following general concepts:

- The proximity attributes considered, which is the attribute(s) used to express proximity. For example, time, place, causation, influence, order, occurrence, or relation. A requirement for proximity attributes is that they are within a space where a notion of distance exists.
- The distance function between two or more proximity attributes. In mathematics, a metric or distance function is a function that defines a distance between elements of a set. A set with a metric is called a metric space. A metric induces a topology on a set but not all topologies can be generated by a metric. A topological space whose topology can be described by a metric is called "metrizable". Graphs and graph theory can for example also be used to describe distances (e.g. number of hops across a directed graph).

It is noted that PBAC is a narrow use case of Relationship-Based Access Control (RsBAC). RsBAC does not just calculate the proximity between two input attributes, but any other relationship. RsBAC, in turn, is a narrow use case of Vector Based Access Control (VBAC), which can take any number of inputs, calculation functions, and comparison values. In other words, PBAC can be seen as VBAC with only two attribute inputs, one distance calculation function, and one result value.

Figure 37:
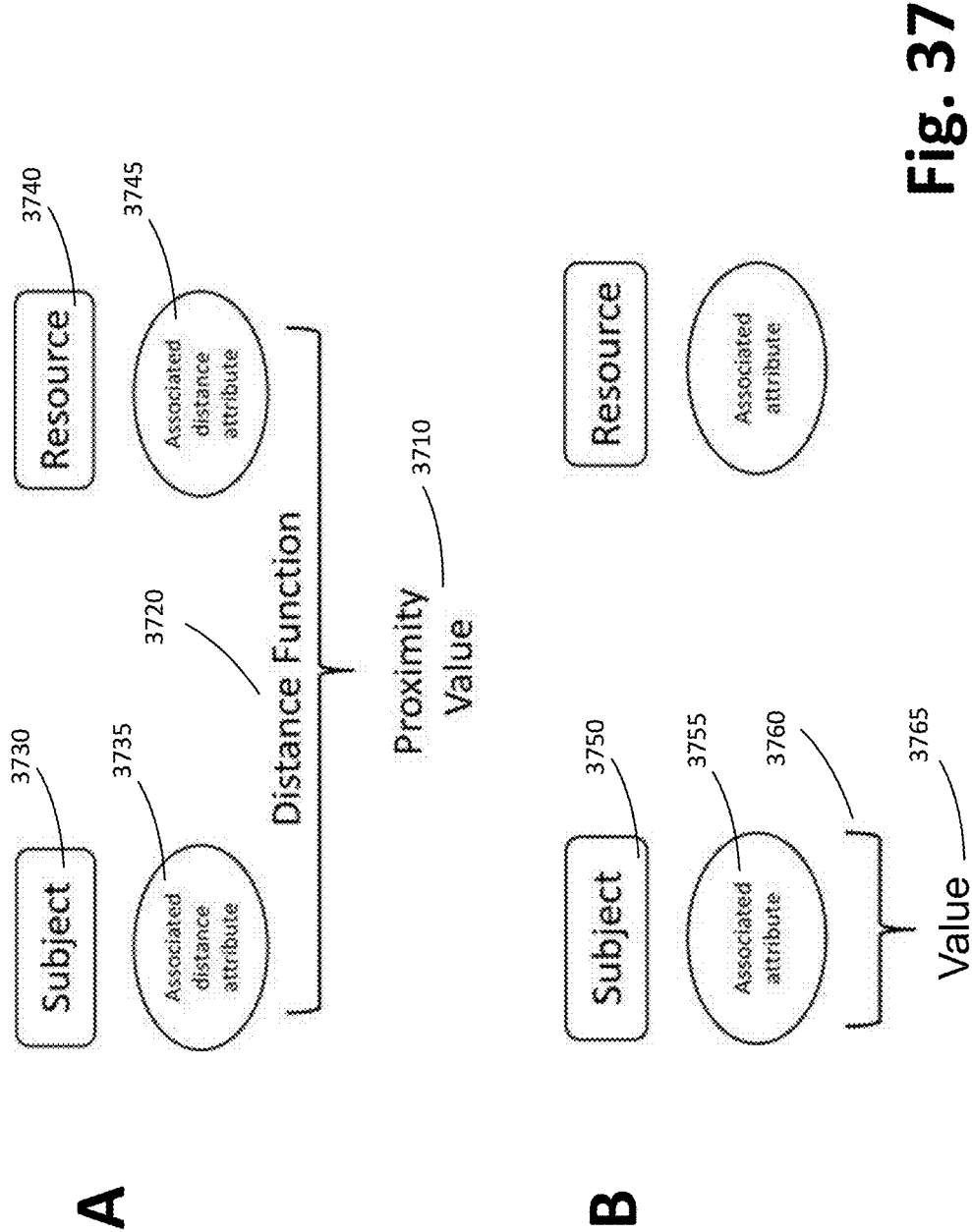
FIG. 37 illustrates Proximity Based Access Control (PBAC) distance calculation (FIG. 37A) compared to non-PBAC policy calculation (FIG. 37B) according to an embodiment.

PBAC differs technically from non-PBAC attribute-based access control (ABAC) systems in several respects: Firstly, a calculation function takes two attributes as inputs (conventional ABAC rule elements have one input). Secondly, a relative distance function exists between attributes associated with the requesting subject, the action and/or the requested resource. The distance functions usually includes distance values (note: the distance type depends on the kind of proximity) in addition to zero values (i.e. equality, no distance, same). As depicted in FIG. 37A, the policy rule element is determined based on the proximity value (3710) result of that distance function (3720) calculated between a subject's (3730) distance attribute (3735) and a resource's (3740) distance attribute (3745). Many other (non-PBAC) access control attributes and decisioning functions used in ABAC are either only (as depicted in FIG. 37B) calculating (3760) result values (3765) from the requesting subject's (3750) attribute (3755), or (not depicted) the requested resource, the requested action, and environmental context.

PBAC Implementation Considerations

The PBAC MDS System embodiment has several novel features (implementation considerations):

Proximity can be calculated within a single attribute space or across several different attribute spaces: As an example of the former case, temporal proximity/distance is calculated between two points on a common time line. As an example of the latter case, some proximity/distance function is designed between the level of organizational seniority of the subject and the security classification label of the accessed resource.

Proximity attributes can change dynamically or be static. For example, time or location is typically dynamic, while attributes such as security clearances and classifications are typically more static.

Proximity attributes are machine-processable, or need to be transformed (using CMP-MS): For example, "team leaders operating on a city neighborhood can see everyone else's information related to that city neighborhood" is most likely not machine-enforceable. The PBAC MDS System uses CMP-MDS (for rule generation and attribute refinement) to transform attributes into matching (rawer) technical machine-processable/enforceable attributes such as polygons on a map.

Proximity attributes are obtainable at runtime. In some cases, attributes are not easily available at runtime. For example, the risk attribute of a resource may be hard to obtain reliably at runtime.

Distance be calculated on-the fly, beforehand, or using a decoupled service. This is an implementation consideration. Proximity needs to be calculated at the appropriate performance one way or another. Calculation on the fly would be e.g. time comparison. Calculation beforehand would be e.g. analyzing an organizational chart and producing role-based or identity-based access control rules that match the (organizational) proximity policy. An example of a decoupled service would be a "polygon-to-country mapper" or a SIEM that calculates the security risk of accessing a system based on security incidents of that system.

Proximity attributes are directly or indirectly associated with requestors and resources (and environmental context). In an example for "direct association", the geo-location of the subject can be used as a basis for geospatial proximity. An example of "indirect association" is where a geospatial label associated with the subject's current task the basis for geospatial proximity. The resource side is analogous: The geo-location of the resource can be used as a basis for geospatial proximity (direct association), or a geospatial label associated with the requested information can be the basis for geospatial proximity (indirect association).

The proximity calculation can be stateful or stateless: In many cases, the proximity calculation is only based on the static or dynamic attributes of subject and resource of the current request. In other cases, the decision might also be based on the state of the system, the attributes or other context at the time of earlier requests. This might be useful for, for example, the enforcement of a dynamic Chinese Wall policy. For example, if a requestor has been close to a specific resource in the past, he/she may not be allowed to access another resource.

PBAC Benefits

PBAC has numerous benefits, including: it helps increase access for those who should have access, while decreasing the 'all or nothing' system-wide access that has caused insider threat issues in the past; and that it makes access policies simpler, more manageable, more intuitive, ore automated, more relevant, more auditable, more granular, more flexible, more automated, more effective in terms of enforced access; and it improves least privilege (reducing overprovisioning):

Improves access control effectiveness: One of the main benefits of PBAC is that it can improve the effectiveness of the access control. This is because valid access is maximized while reducing overprovisioning.

Policies are more relevant: In cases where proximity intuitively captures the security policy requirements, technical PBAC policies can match better with real world use cases and requirements. Without PBAC, implementing an access control implementation often requires "massaging" the desired security policy requirements to the underlying access control technologies and models, resulting in semantic disconnects and incorrect policy enforcement.

Support for more granular policies: PBAC conceptually allows the definition of very granular policies, because PBAC attributes are often very expressive and fine-grained. However, this granularity can come at a price, often requiring cumbersome attribute management (e.g. GeoXACML specifies very fine-grained, but very cumbersome spatial attributes)

Support for simpler policies: PBAC allows the specification of simpler policies, using generic, intuitive proximity-based attributes and distance calculation functions. However, it is noted that such simple PBAC policies may not be directly machine-enforceable, and require the MDS System to be made enforceable (especially CMP-MDS).

Less overprovisioning (least privilege): Thanks to the increased use case relevance and granularity of PBAC policies compared, access is less overprovisioned, and thus closer to true least privilege.

Improves access control manageability: PBAC helps reduces access policy management and enforcement effort. It helps reduce personal attention and time required to ensure correct need-to-know access control. This is because it enables the definition of "undistorted", intuitive proximity-based policies. Manageability is particularly improved if some of the mapping complexity (esp. the attribute information source and the mapping to generic policy attributes) can be offloaded to some other stakeholders that already do this task anyway. For example, mission planners will maintain organizational and operational charts, which can be reused, rather than managing all this information in raw, technical access rules. The reuse of information from other stakeholders is a useful feature of many efficient MDS System implementations: While the overall complexity is only somewhat reduced, part of the overall complexity is handled by other stakeholders who have to deal with that complexity anyway.

Support for more expressive policies: Proximity is often a very intuitive concept for expressing policies thanks to the various proximity attributes used to express PBAC policies. PBAC policies can express access control requirements that non-PBAC policies cannot (or at least not easily) express.

Support for more intuitive policies: Proximity is often a very intuitive concept for expressing policies, and consequently PBAC policies are often more intuitive than non-PBAC policies that are often "massaged" to control access for use cases where the underlying policy would be better expressed using proximity concepts.

Support for more flexible policies: PBAC can allow the authoring of more flexible policies, because additional, potentially highly expressive (i.e. semantically rich) "undistorted" proximity attributes are available to define policies.

Improves access control monitoring and auditing: Because policies are more relevant and intuitive, incident monitoring of policy violations also automatically becomes more effective (using CMP-PMR and CMP-PSV).

Automation: Because policies capture dynamic proximity-based policies, less manual work is required compared to conventional access control approaches, where for example roles and groups may need to be frequently updated to reflect the intent of proximity-based policies.

Can push most Relevant/Important Information Based on Proximity: Based on proximity, the PBAC MDS System can automatically determine/infer the most relevant/important information to be presented to the requesting subject, and potentially even push that information to the subject. This relieves users from having to focus their attention on irrelevant information.

Automatic Access Control Based on Proximity: Usually based on geospatial proximity, the PBAC MDS System can automatically log users into a device when they are getting geospatially close to that device (e.g. medical staff in a hospital), or log users out if they leave a device's proximity.

PBAC Challenges

However, PBAC's potential challenges include the lack of availability of attribute information sources, attribute reliability, proximity calculation complexity/feasibility, rule complexity, enforceability etc.

Attribute Availability: Proximity attributes can be highly intuitive (e.g. "working on tasks related to a similar geospatial area"), and thus can allow the specification of highly intuitive, generic, expressive policies (e.g. "all analysts can access resources about a geographical area if they are working on tasks related to a similar geospatial area"). However, the attribute data sources used in such policies are often not available at that generic, "undistorted", intuitive level of abstraction, or are not available at all. For a start, many proximity attribute sources are not easily obtainable. Attribute sources may not be available at all (e.g. no formally encoded organizational chart available), may be continuously dynamically changing, may not be available quickly enough at runtime, may not be available reliably at the logical PDP location (e.g. information about the requesting subject) etc. Also, attributes are often not readily machine-enforceable, and have to be refined using CMP-MDS.

Attribute Source Performance: If proximity attributes have to be calculated at runtime (i.e. decision making time) from raw data, the calculation results (i.e. the attributes) may not be available fast enough (e.g. a risk value associated with a requested resource). It is noted that if the PDP needs to pull dynamic attributes from an external attribute source calculator, the PEP may hold the request until the attribute has been fetched and a policy decision has been made. This may cause unpredictable or unacceptable delays (i.e. violating real-time QoS requirements).

Attribute Reliability: The proximity attribute values associated with a requesting subject and a requested resource should be based on trustworthy and reliable information. This includes both the reliability of the information and the assurance/trustworthiness from a cyber security perspective. This may be hard to achieve for some attributes. Not having reliable attributes may render the entire PBAC system worthless because the information used as a basis for deciding access is unreliable ('garbage-in-garbage-out' problem). As far as reliability is concerned, the following questions may need to be addressed: How accurate/precise is the attribute source (e.g. how accurately does the organizational chart that is used to calculate organizational proximity attributes reflect real-world operations)? How reliably can the attribute value be identified as associated with the subject/resource (e.g. the tasks subjects work on, and the tasks resources are related to, may not always be easy)? If the attribute is calculated from one or more (raw) information sources, how reliable/accurate is the result (e.g. operational charts may be incomplete or outdated, and the proximity calculation service may need approximate, infer, or just provide no result)?

Attribute Cyber Assurance: This may include several aspects such as: Data source assurance (can the CMP-PDP obtain the attribute value without it being tempered with?); Data transmission assurance (is the attribute data sent from the data source to the calculation feature and on to the CMP-PDP secured?); MDS System assurance: (is the security posture of the PBAC system with all its components continually monitored and assured?). While the transmission and system assurance can be assured more easily, the assurance of the data source as such may be harder to assure.

Attribute Freshness/Staleness: How reliably are attributes updated and propagated to where they are used for proximity calculations and access decision-making? For example, what happens if someone moves to a new position, or is taken off a project. How quickly is the proximity attribute recalculated? Attributes can be calculated in several ways (listed by increasing freshness): Firstly, static pre-calculation for attributes that are static or only "mildly" dynamic, and can be "baked" into machine-enforceable policy rules (periodically, or on-demand triggered). Secondly, decoupled continuous dynamic re-/pre-calculation for dynamic attributes that can be continuously be pre-calculated by the CMP-ASS, i.e. pre-calculated values are available whenever an access control decision is made. Thirdly, coupled dynamic calculation for attributes that are dynamic and dependent on the particular request context, i.e. have to be calculated on-the-fly during the runtime access control decision-making?

Proximity Distance Calculation Feasibility/Complexity: Some attributes may not be suited to a distance calculation. This may be because distance metrics may be complex, unavailable, unreliable, or unknown. Or there may be no easily comparable numerical value. For example, consider a highly complex attribute such as "relevance", in access rules "users should only be able to access relevant information necessary for their current work". Rule and/or attribute refinement templates may be needed to make it clear how relevance proximity is exactly calculated. In addition, the distance function may not be a simple numeric, linear value. For example, social proximity (e.g. in social networks) where social connections are weighted using several orthogonal criteria, the function may involve a complex calculation.

Attribute Association with Subjects, Resources, Context: Is the attribute directly associated with the subject/resource, or indirectly with something the subject/resource has or does etc.? For example, in the case of geospatial proximity, is the physical location of the subject (e.g. PDA with GPS) used as a geospatial attribute, or is the geospatial area related to the task the subject carries out used as a geospatial attribute (e.g. someone carries out intelligence analysis about a certain country, which makes the country's geospatial area the access attribute)?

Attribute Association with Information Sources (Direct/Indirect): Is the attribute directly related to the information source, or indirectly? For example, the attribute "time" may be directly related to the data sources current clock, time stamps etc. In contrast, the attribute "relevance" may indirectly relate to a combination of other attributes (e.g. a combination of organizational, operational, geospatial, and temporal attributes), which themselves have direct or indirect information sources.

Policy Rule Complexity: Conventional ABAC policies may be of a relative simple nature, consisting of a triple (<attribute><calculation><comparison-result>). However, PBAC policies may be more complex than other policies because of the potential dependence between two (or more, cf. VBAC) attributes related to the subject, the resource, and environmental context. In other words, the value of an attribute is not compared to an absolute value, but to another attribute's value in the same rule. For example, "a device can access the map data resource only 500 ft around their device's geo-location", i.e. a quadruple "(<device position>, <distance-function><requested geo-location><value 500 ft>)?" is checked. Alternatively, at the expense of flexibility, this could be reduced (e.g. by CMP-MDS) to a triple, e.g.: (<device position><within-500-ft?><requested geo-location>), or (<device-position-within-requested-geo-location><less or equal><500 ft>).

Calculation Function Complexity: Another challenge is related to the fact that PBAC calculation functions can be more complex than traditional ABAC policy decision functions. For example, temporal proximity policies could include statements involving intuitive concepts such as "while", "until" etc. Evaluating such statements at runtime could be extremely challenging and/or performance-intensive, because while the attribute is temporal in nature, the attribute may have non-temporal characteristics. For example, "team leaders are allowed to access the resource related to their mission until the mission is over". This policy is probably not readily machine-enforceable unless a specific CMP-ASS is built that provides an attribute that qualifies whether missions are over or not. In this case, it is probably best (if possible) to express the attribute differently at the technical, machine-enforceable level (e.g. a combination of operational proximity and other attributes), and map the intuitive policy to that technical policy rule (e.g. using model-driven security). Also, access policies may require that access be conditioned not only by proximity attributes related to the subject and the resource, but also on constraints/obligations such as the proximity attributes about other users and/or context (e.g. presence or absence). For instance, consider a government official accessing a document that is classified according to a multi-level security model. Depending on the nature of the document, it may be desirable to require the presence of a supervisor, the absence of any civilian (e.g., non-governmental personnel), or both.

Policy & Attribute Enforceability (Generic/Simple/Intuitive vs. Specific/Technical): Highly generic, "undistorted", simple, relevant and intuitive PBAC policies are based on highly generic, simple, relevant and intuitive attributes and rules, and are therefore often not directly machine-enforceable. The MDS System ensures that such PBAC policies can actually be technically enforced by a machine at runtime access decision-making, depending on the proximity aspects, the policies, and the attributes. Firstly, this can be done using PSF refinement (e.g. rule refinement), which maps for example generic, human-intuitive policies (e.g. rule elements) to machine-enforceable policy rules. For example, for business process proximity (e.g. in an orchestrated SOA application environment), a generic policy such as "access to SOA applications is only allowed if the preceding business processes step has been completed" can be turned into a number of technical rules for each business process step and each node in the SOA. These rules can then be easily selected for the PDPs related to the SOA nodes which they apply to. Secondly, this can be done using PFF refinement (e.g. attribute refinement), which maps for example generic attributes to machine-enforceable attributes, e.g. using static attribute pre-calculation for static attributes, using decoupled continuous dynamic re-/pre-calculation for dynamic attributes, or using coupled dynamic calculation dynamic and context dependent attributes.

Policy Verifiability/Auditability (& Compliance/Accreditation): Because PBAC's proximity attributes may be complex and may be calculated from many sources, and because policy rules can involve complex distance functions between related attributes, verifying the correctness of the technical enforcement with the requirements may be very challenging. Complex examples include: if technical machine-enforceable rules do not closely reflect the generic, human-intuitive policies (e.g. "any team leader can access information related to the city neighborhoods he/she operates in"), or if the policy is "stateful". In the technical, machine-enforceable rules, numerous technical rules may be required that contain contextual roles of commanders and tasks, and various polygons for city neighborhoods. Alternatively, attribute mapping/calculation services are required that are queried on the fly, at which point the policy stays more generic, but elaborate audit of the mapping/calculation is required. The PBAC MDS System generates rules (and refines rules and attributes etc.) using a repeatable, verifiable model-driven security process in CMP-MDS, which enables CMP-PSV to automatically analyze the correlation between various aspects of the MDS System (including authored policies, technical rules, technical enforcement, alerts) and to verify that the mapping is correct. In addition, attribute sources and calculations need to be reliable (and trustworthy from a cyber security perspective), and the MDS System runtime needs to be reliable and protected.

Dealing with Change/Agility: One of the general challenges around access control has to do with the fact that changes may require updating the access control policy. The challenge is to design the PBAC system in such a way that policies can be expressed in generic terms that do not depend on the specifics and changes of the underlying IT landscape, the MDS System configuration, the technical access rules, or technical attribute feeds. For example, agile changes to the IT landscape (e.g. applications and their interactions), changes to the security policy, changes to attributes etc. can occur frequently or continuously (e.g. new CMP-PEPs may need to be installed, and old ones need to be maintained, access policies may need to be modified when security requirements change, access policies may need to be modified when the IT landscape changes, attribute feeds may need to be integrated and maintained). This may require continuous maintenance of the PBAC system. The PBAC MDS System uses model-driven security to keep the policy "undistorted" from numerous changes: "Other information sources" (ideally maintained by other stakeholders) are used by the rule generation (model transformations), to get from the generic security policy model to the specific technical access rules. Such feeds include for example application/system/topology information (e.g. UML models, BPM SOA orchestrations, asset/network mapping tool feeds) obtained via CMP-FDS, and attribute & attribute feeds (e.g. role-to-identity and role-to-permission feeds, organizational charts, business process models, country to polygon etc.) obtained via CMP-ASS and CMP-MS. An alternative approach is to try to foresee most/all possible changes/configurations a system may go through, and designing attributes and rules in such a way that they can cope with the changes. This is probably unmanageable at a larger scale.

Attribute Privacy/Confidentiality: Some attributes may be privacy sensitive and/or confidential in some situations. For example, geo-location based PBAC may require making the access control system at the server-side aware of user locations, which may lead to privacy or confidentiality breaches. For example, if a top-secret cleared person is on a top-secret classified mission and needs to access an unclassified map information resource, that person's top-secret geospatial information is leaked into the unclassified map resource, which may not be desirable. As described above in this specification, one solution approach described in prior art is to preserve privacy by combining cryptographic techniques with a separation of functionality among several distinct components. The only trusted component in the architecture sets up the initial cryptographic data components, but does not participate in the on-line operations of the PEP. Thus, it can be effectively shielded from protocol-based attacks.

Multiple users of different priorities in a proximity zone (for PBAC assisted device access): If single-user resources are automatically made available based on proximity (automatic authorization), e.g. when getting close to a device, then there is the potential challenge around accidental login of subjects, or forced logout of lower-priority subjects, if higher-priority subjects merely pass through the proximity zone. One approach (described in prior art) defines a "space model" with different zones and entry/exit points, and graphs of possible/allowable paths through the space. Also, roles are "enabled" if the subject enters the relevant proximity zone (i.e. subject is allowed to access but does not access), and can subsequently be "activated" if the subject wishes to exercise the privileges associated with the role. It also defines various constraints, including presence constraints or absence constraints.

PBAC Data Sources for Proximity Distance Calculations

For PBAC to work, it usually requires various attributes related to accessors and requested resources (and potentially additional environmental context attributes), together with their (in some cases speculated) type. User attribute values can for example come from Attribute Services. Resource attribute values for example can come from document metadata. Metadata can for example sometimes be created "on the fly" by extracting and/or analyzing data, for example business process metadata can come from SOA/BPM systems and/or EA.

Figure 38:
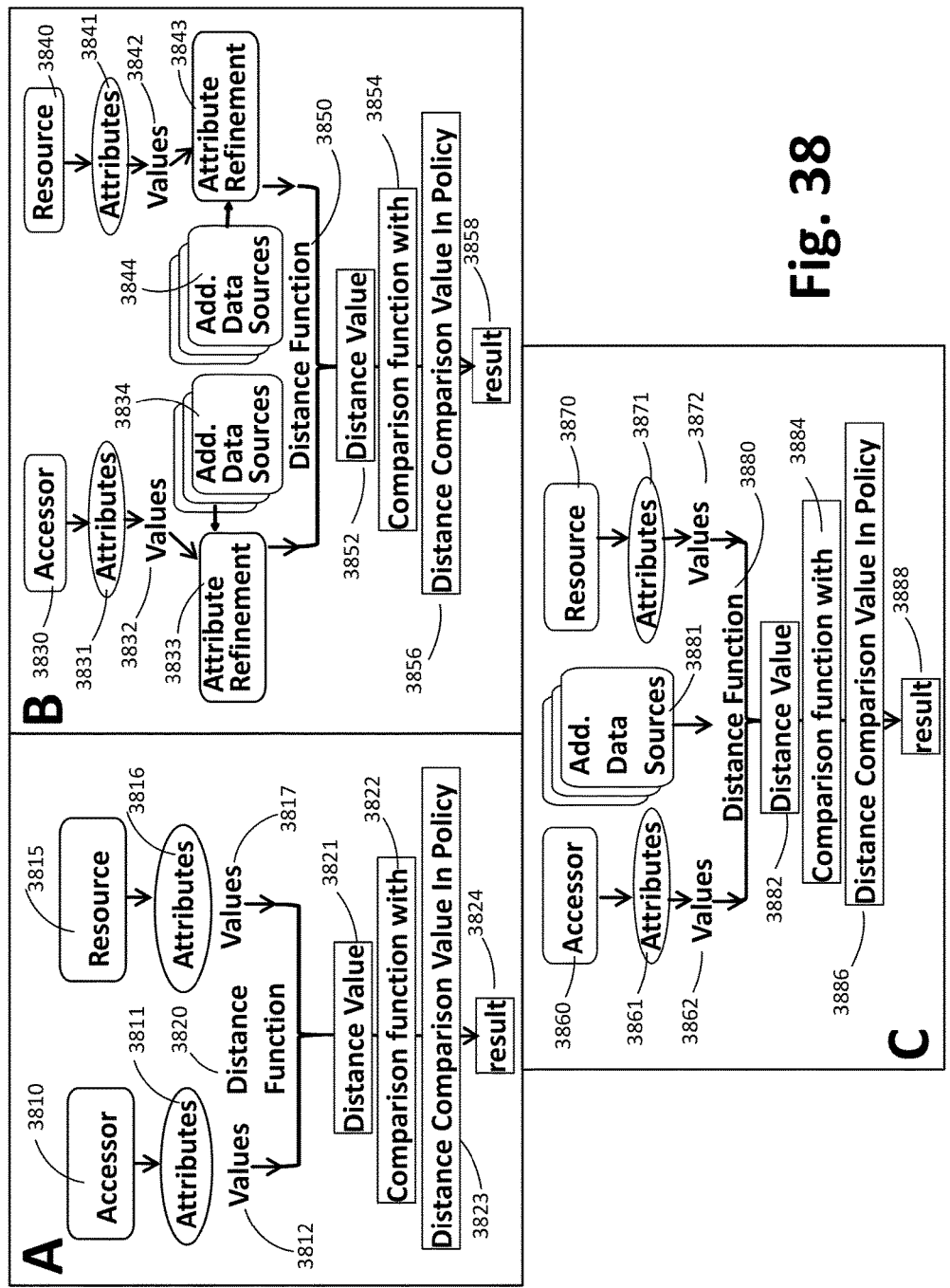
FIG. 38 illustrates 3 alternatives for calculating PBAC distance functions according to an embodiment.

Proximity distances can be calculated using various metrics and data sources. These can be categorized as follows (it is noted that the following calculation approaches can also apply to calculations and attributes other than proximity):

1. Direct Calculation from Attribute Values (an Example is Depicted in FIG. 38A)

The data for the calculations is directly derived from the accessor's (3810) attribute (3811) value(s) (3812), the resource's (3815) attribute (3816) value(s) (3817), or (not depicted) the data, the message, and/or context. In other words, distance/proximity value (3821) between several attribute values (3812 and 3817) can be calculated by the distance function (3820) without the need for querying any additional data sources. Therefore, the attribute type must be such that a distance function can be directly calculated from the attribute values (i.e. "metrizable"). This is usually the case for basic types (e.g. numbers), geometric shapes etc. The calculated distance value (3821) can be compared with the distance comparison value in the policy (3823) by a suitable comparison function (3822). The result (3824) may be Boolean (true/false), indicating, for example, whether the proximity is within the bounds of the comparison value (3823) (alternatively, the result 3824 may be non-Boolean).

It is noted that the required distance function is primarily determined by the semantics of the desired PBAC policy. In other words, just because a distance can be mathematically determined between attribute values does not mean that that distance is relevant for the PBAC policy.

For example, a geospatial distance function between two points in a geographic area can be easily calculated from the attribute values themselves using simple mathematical function (e.g. square root of a square determined by subtracting the smaller number from the larger number on each axis). However, the implicit semantics of that particular distance function would be a shortest direct line irrespective of landmarks, obstacles, roads etc. Also, this particular distance function assumes that the geospatial location attribute values are geospatial coordinates.

While this may potentially be a useful distance notion for aircraft, it may not be a relevant notion of distance for many other PBAC use cases. For example, geospatial distance could be calculated using further information in addition to the values, such as shortest distance using roads and bridges, fastest distance using roads and bridges, shortest/fastest distance avoiding obstacles (e.g. mountains, oceans). If geospatial distance is calculated in this way, then a wealth of additional sources need to be fed into the distance calculation (e.g. information a navigation system uses to calculate distance and shortest/fastest route).

2. Indirect Calculation from Additional Attribute and/or Distance Sources:

In this case, proximity cannot be directly calculated from the original attribute values. The data for the calculations has to be indirectly derived from other data source(s) that contains the relationships between attribute values (associated with the accessor, requested resource, the data, the message, and/or context). In other words, the distance/proximity between several attribute values is calculated by taking into account one or more additional data sources. Such additional data sources can either be used for attribute refinement or for the distance calculation function, as follows:

In the case where no suitable attributes are available that are required by calculation functions, potentially chained "attribute refinement" (at policy generation time or at decision time) maps (maybe using CMP-MS) available attributes so that direct distance calculation is possible after attribute refinement (depicted in FIG. 38B): Accessor (3830) Attribute (3831) value(s) (3832) are mapped by attribute refinement (3833), which draws on additional data sources (3834); similarly, resource (3840) Attribute (3841) value(s) (3842) are mapped by attribute refinement (3843), which draws on additional data sources (3844). The same process may be done with attributes from message data and/or content (not depicted). The rest of the calculation is comparable to the one depicted in FIG. 38A: the distance function (3850) calculates a distance value (3852), which a comparison function (3854) compares with a distance comparison value in the policy (3856), to produce a result indicating whether the distance value (3852) suffices the distance comparison value in the policy (3856) according to the comparison function (3854) stated in the policy. This value may be Boolean (yes/no), but may be of another type. For example, if the policy semantics are concerned about the geospatial proximity between the country location of the accessor and the country location the data pertains to, then this distance can be calculated from country name attributes after an attribute refinement from country name to polygon has been calculated (assuming obstacles, mountains, seas etc. are not relevant).

In the case where proximity cannot be directly (i.e. without using further data sources) calculated from the original attribute values because there is no calculation or it cannot be calculated, the distance calculation function itself may require additional data sources (depicted in FIG. 38C): Accessor (3860) attribute (3861) value(s) (3862), resource (3870) attribute (3871) values (3872), and (not depicted) attribute values from message data and/or context, feed into a distance function (3888). This distance function (3880) draws on additional data sources (3881) to calculate a distance value. The rest of the calculation is comparable to the one depicted in FIG. 38A: the distance function (3880) calculates a distance value (3882), which a comparison function (3884) compares with a distance comparison value in the policy (3886), to produce a result indicating whether the distance value (3882) suffices the distance comparison value in the policy (3866) according to the comparison function (3884) stated in the policy. This value may be Boolean (yes/no), but may be of another type. For example, the coalition proximity between the country location of the accessor and the country location the data pertains to.

A combination of direct and indirect calculations, or layering of multiple direct and/or indirect calculations is possible.

The reason for distinguishing direct and indirect calculations may be because indirect calculations will often incur higher performance and maintenance efforts (and higher system complexity) than direct calculations.

Examples of PBAC Proximity Dimensions

This section discusses a non-exhaustive list of examples of proximity dimensions that can be used for PBAC. Because dedicated, purpose-built PBAC attribute stores are often not available, proximity may need to be inferred by looking at existing data and approaches, and by utilizing proximity-based data profiles.

1) "Geo-Location/Geospatial Proximity" is a particular physical proximity definition of a geospatial location associated with an accessor in relation to the geospatial location associated with an accessed resource. For example, "a team leader may want to gain insight into data from other teams at a shared city neighborhood (spatial proximity)", or "analysts doing analysis on a particular country can only access information related to that country". It is noted that this does not necessarily need to be the actual physical location of the accessor or resource, but the association with a geospatial location or area. For example, if an analyst is working on an analysis of a particular geographic region (e.g. country), that analyst would be associated with that region for PBAC purposes even if the analyst physically resides elsewhere. The same applies to the resource: Access to a map of a geospatial area would be associated with that geospatial area for PBAC purposes.

Attributes that provide geospatial information associated with the accessor or accessed resource. For the accessor, these attributes could for example come from any geospatial information associated with the accessor's current task or role, or from the GPS of a physical device the accessor uses to access the resource (which may have attribute trustworthiness issues). For the accessed resource, these attributes could for example come from the data provided by the service (e.g. information about a geospatial area), or from a geospatial tag on the data or the service (e.g. country labels). Geospatial attributes can contain numerous additional dimensions that may need to be taken into account, such as altitude. This complicates the definition of a future-proof generic geospatial attribute type.

Figure 39:
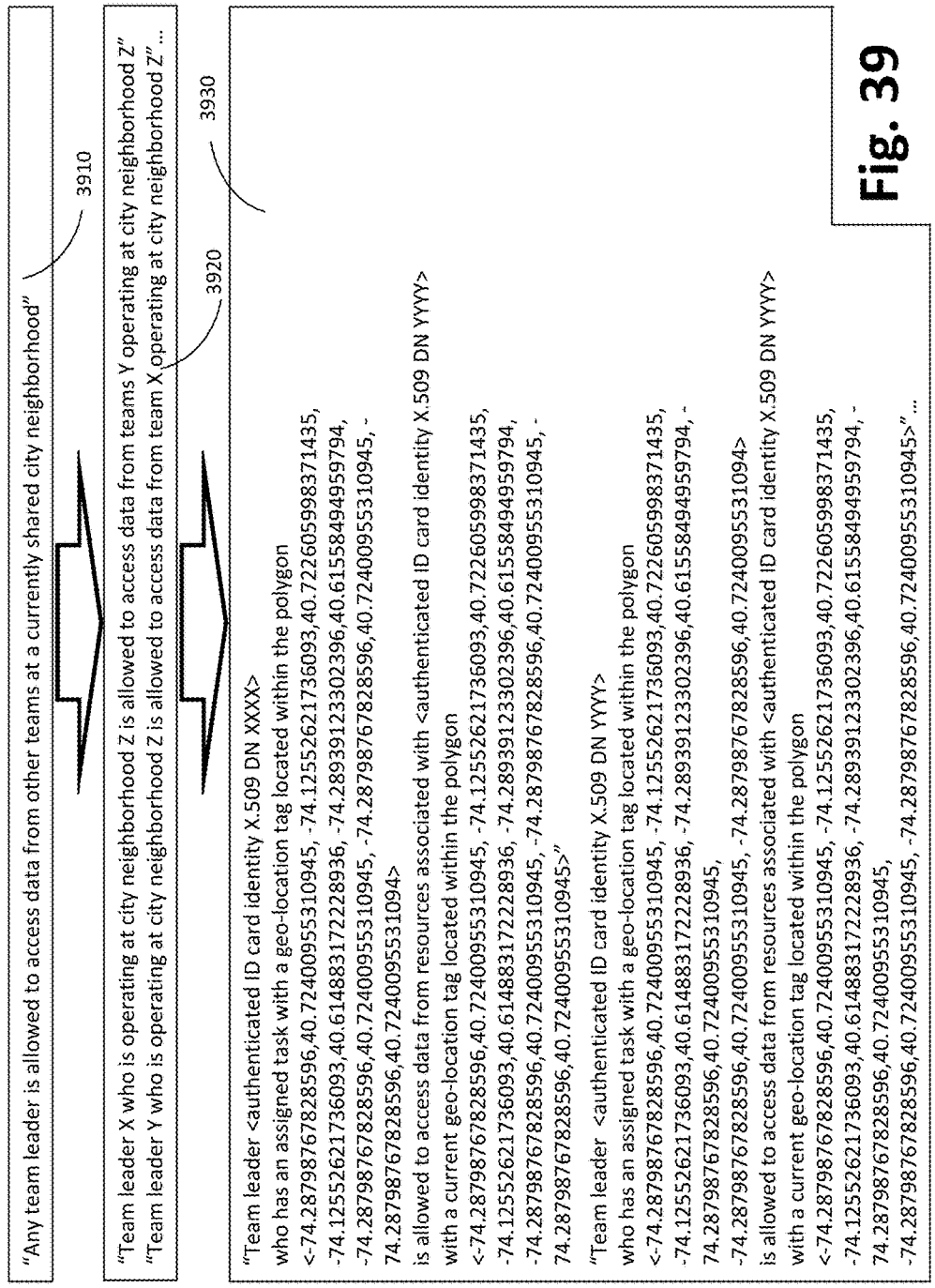
FIG. 39 illustrates a flowchart of a PBAC policy refinement example according to an embodiment.

Geospatial attributes can be expressed at different levels of abstraction, and attribute refinement and rule refinement can map between these levels of abstraction. FIG. 39 depicts an illustrative example where a geospatial policy expresses the generic, "undistorted" policy close to human thinking, but not machine-enforceable (3910). Using rule refinement and attribute refinement, it is transformed into a specific, but usually not machine-enforceable policy (3920) (unless specialized pre-processing attribute services are developed to provide the attributes used in this policy—provided the attribute is relatively static). Using further attribute refinement, this policy is then further transformed into very specific, machine-enforceable policy (3930) (provided pre-processing attributes is possible and attributes are relatively static). It is noted that this example may not be a preferred choice in many cases.

Geospatial proximity calculation functions can involve numerous semantics, and it needs to be clear how exactly proximity is calculated. For example: Is altitude considered as part of the distance? Is the distance by geographic area on the map calculated? Or is the distance by road calculated? Are obstacles considered (e.g. seas, mountains) or not? Is the geo-location of the accessor/resource taken as a basis for the calculation, or a geospatial tag associated with a task or an information resource, or geospatial information of the information itself?

Different calculation methods may therefore need to be applied depending on exact attribute type. In the example in FIG. 39, the calculation function could for example check whether the geospatial areas associated with the accessor and the resource exactly match (or whether an approximate match is sufficient).

2) "Organizational Proximity" is a particular organizational proximity definition of an organizational position associated with an accessor in relation to the organizational position associated with an accessed resource, whereby proximity depends on the organizational information source used, e.g. organizational hierarchy. For example, "everyone can access resources associated with any subordinates, but no superiors" or "team leaders can access resources associated with first-degree sister teams".

This PBAC dimension requires specific attributes that contain information about the organizational structures and the organizational relations between subjects. For example, a hierarchical organizational chart, hierarchical roles structures, or organizational groupings (such as coalitions or joint actions) would provide useful information to calculate an organizational proximity attribute. This attribute is likely to be only mildly dynamic, i.e. changes do happen but not all the time. Static attribute refinement at rule generation time (with minor updates as and when needed) may therefore be more performance efficient and easier to implement compared to a dynamic runtime attribute service. For example, CMP-MDS can consume a model of an organizational hierarchy with their role associations, and map those to the actual roles in the policy. This way it is possible to automatically determine the position in the organizational hierarchy for every subject and resource owner. Organizational position attributes could comprise numerous aspects, depending on how many different information sources could be fed into the attribute generation.

Figure 40:
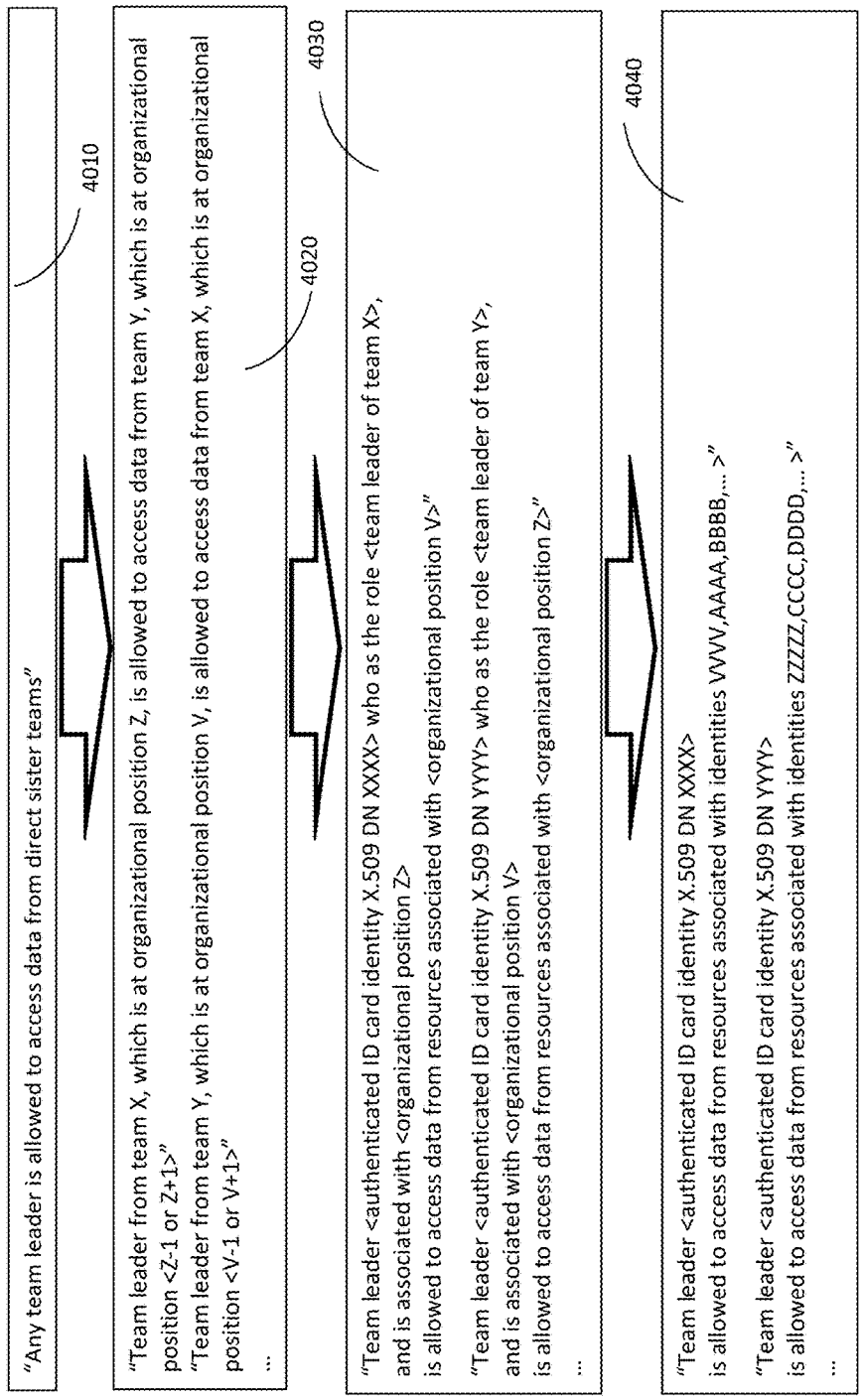
FIG. 40 illustrates a flowchart of a PBAC policy refinement example according to an embodiment.

Rules and attributes can be expressed at different levels of abstraction (as already explained for geospatial proximity above). FIG. 40 depicts an illustrative example how a generic organizational PBAC policy could be refined in three refinement steps: Starting with the generic policy closest to human thinking (and not machine-enforceable (4010), refinement generates specific, but not machine-enforceable policies unless specialized pre-processing attribute services are developed to provide the attributes used in this policy, and the attributes are static (4020). These rules can be further refined in to specific, machine-enforceable policy rules that may need to be authored or generated if no pre-processing attribute servers can be implemented, or if pre-processing would limit the flexibility too much (4030). These can be further refined into specific, hard-coded machine-enforceable policy rules if no pre-processing attribute servers can be implemented at all (4040). It is noted that the final step of this illustrative implementation choice effectively "bakes" the entire organizational hierarchy and proximity calculation into the particular access control rules. In other words, the entire attribute calculation is done at the time the policy gets generated out of models using model-driven security. This choice is particularly useful for static or only mildly dynamic attributes, because none or few updates to the rules are required, and these few updates can be specifically produced and distributed to CMP-PDPs for rule replacement. More dynamic attributes would require constant rule updates, which model-driven security can fully automate—however, the performance impact of either implementing complex, dynamic runtime attribute services and frequent rule updates needs to be evaluated to find the right trade-off.

Different calculation methods will need to be applied depending on exact attribute source. This is because the semantics of the organizational proximity attribute(s) depend heavily on the information sources used to calculate the attribute(s), and also on how several organizational proximity aspects are combined. For example, a role hierarchy can be analyzed to establish the distance (and direction) between different roles. Similarly, an organizational chart captures the position of every team in relation to other teams, which can be used to calculate an organizational proximity value.

3) "Operational Proximity" is a particular operational proximity definition of an operational position associated with an accessor in relation to the operational position associated with an accessed resource. Again, the exact semantics of "operational proximity" depend on the information sources and proximity calculation method used. For example, "coalition partners can access each other's information related to the current coalition task if they are in the same coalition", or "team leaders can access information about their current task, and other tasks closely related to their current task, produced by any other team", or "team leaders can access intelligence assessments developed by supported ground teams".

Figure 41:
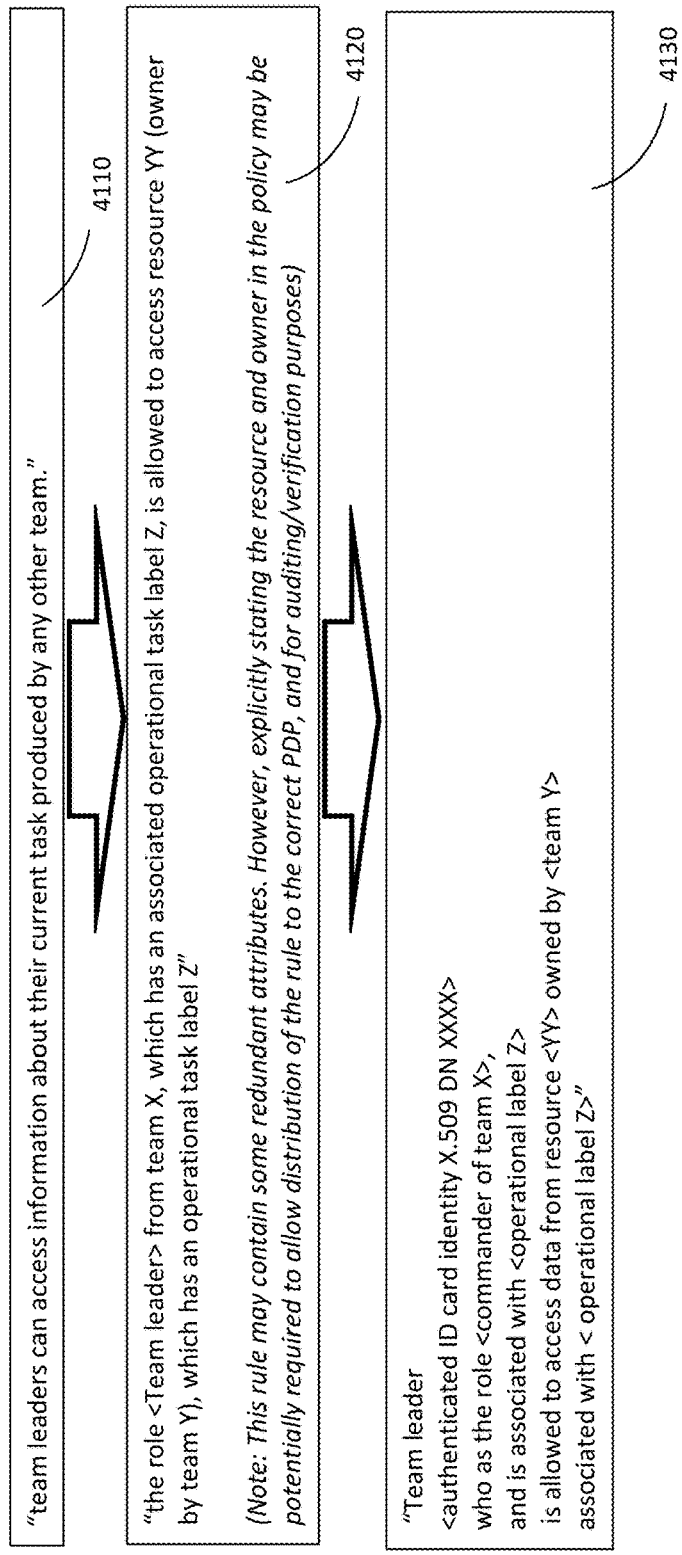
FIG. 41 illustrates a flowchart of a PBAC policy refinement example according to an embodiment.

This PBAC dimension requires specific attributes that contain information about the operational relations between subjects and resource owners. For example, one could calculate operational proximity attributes from information sources such as labels that describe the operational attributes of information resources, or operational tasks/roles associated with owners of those information resources. Operational attributes are often somewhat dynamic, i.e. changes do happen periodically but not all the time. Therefore, the right trade-off needs to be again identified between static "hard-coding" of attributes at rule generation time and dynamic attribute calculations at decision time. Operational attributes could comprise numerous aspects, depending on how many different information sources could be fed into the attribute generation (for example, if a resource owner spans several different operational environments). It is also noted that attributes can be expressed at different levels of abstraction, as described above: For example (depicted in FIG. 41), a generic organizational policy that is not machine-enforceable (4110) is first refined into more specific, relatively static, but still not machine-enforceable rules (4120) (unless specialized pre-processing attribute services are developed to provide the attributes used in this policy). These rules are then refined into specific, machine-enforceable rules (4130), which is relatively unspectacular, because the policy only checks that the labels are the same.

As an example, a senior intelligence analyst could be one level distance away (in operational proximity terms) from all information resources related to criminals, and the analyst's policy could state that "throttled" access is granted to all resources that one level of operational distance away from the analyst. This way, analysts could broadly carry out intelligence, but not access too much information indirectly related to their tasks without being noticed.

The semantics of the operational proximity attribute(s) depend heavily on the information sources used to calculate the attribute(s), and also on how several operational proximity aspects are combined. For example, if operational task labels and a task hierarchy are available, these could be used to establish close operational proximity (i.e. working on the same operation), or a distance relation between different operational labels (e.g. by a hierarchy of tasks and topic types, e.g. intelligence analysts and information about criminals). Potentially, an operational proximity chart can be modeled that captures the position of roles/tasks and topics and their relations, which could be used to calculate an organizational proximity value. Different calculation methods will therefore need to be applied depending on exact attribute source.

4) "Temporal Proximity" is a temporal proximity of a time associated with an accessor in relation to the time associated with an accessed resource. For once, the semantics of "time" are pretty intuitive, as time is a linear, universal, immutable concept. However, more complex temporal statements captured in "Temporal Logic" (a well-known academic subject) can use temporal relationships such as "until" and "after". For example, "coalition partners can only access mission plan details 30 minutes in advance", or "first responders can only access team movement maps 3 days after the actual team movements", or "only mission planners authorized to work on plans for 4 weeks in advance are allowed access to information relating to missions planned in 4 weeks", or "foot police officers are only granted access to particular mission information for the duration of 5 minutes". More complex temporal logic statements such as "police officers can only access mission information until the mission is over" can also be potentially useful for temporal proximity policies.

Minimal attribute refinement is necessary for simple temporary attributes, as time is a simple absolute or relative numerical value, and temporal proximity is well-understood. However, if the current time is used for the temporal proximity calculation, the assurance of the time sensor needs to be taken into account. But since time is an ever-changing value, most attribute evaluation will probably need to be done on-the-fly, rather than hard-coding values into the policy rules. For example, <current time+30 minutes> needs to be calculated on the fly.

Temporal proximity can be intuitively and quickly calculated by a time differential.

However, complex Temporal Logic policy statements may need some considerable logic calculation to be resolvable, for example, an "until <event>" statement may need to capture information about the event to calculate a machine-enforceable attribute (e.g. a simple time value derived from the event time). Temporal Logic allows the logical resolving of events (e.g. if A happens before B, and B happens before C, then A also happens before C). In one embodiment, temporal logic could be implemented as a dynamic attribute service that resolves complex temporal algebra. In another embodiment, temporal algebraic constructs could be used in generic policy models, and refined into simple time and time differential values in the machine-enforceable policy.

5) "Business Process Proximity" is a particular business process proximity definition of a business process step associated with an accessor in relation to the business process step associated with an accessed resource. In other words, business process proximity can be simply defined by the distance in process steps in the BPMN model. Again, the exact semantics of "business process proximity" depend on the information sources, the process orchestration technology used, and the proximity calculation method used. For example, "Team leaders can only modify the mission plan if they have previously informed their superior about the change using a particular web application on their PDA, and the superior has cleared the change using another particular web application on his/her PDA. The distributed application is driven by e.g. a BPM-orchestrated SOA, or a widget-based system". Or "access to the logistics system's billing SOA service is only allowed if the preceding 5 steps of the equipment purchasing workflow have been successfully completed."

Business processes happen on many levels, and may only be captured on some of these layers. Furthermore, in many cases there are no business processes (instead, a fluid "tribal knowledge" and an ad-hoc "art" approach is used), or processes are captured in a form that cannot easily be used as a PBAC attribute. However, with the advent of SOA-related IT architectures (including Ozone Widget Framework, OWF) and service orchestration technologies, a technical business process attribute for PBAC is available. In particular, the business process orchestration technology for SOA has sufficient specificity and rigor to provide clear, usable PBAC attributes. For example, SOA service orchestrations are modeled using the Business Process Modeling Notation (BPMN), which is also used by enterprise architects (e.g. for DoDAF). The BPMN models can then be compiled into the Business Process Execution Language (BPEL), which then executes the runtime orchestration of the underlying SOA services according to the BPMN model. Therefore the precise sequencing of all workflow steps the composite SOA application goes through is well-captured. In this scenario, business process steps can be referred to e.g. in absolute terms (e.g. "step 7 in path X of the workflow"), relative terms ("the preceding step in the workflow"), or in characteristics terms ("all workflow steps related to the logistics system's billing SOA service"). The raw attribute source can for example from the BPMN model (static values for the policy rules) and from the BPEL server (dynamic values related to the caller's current position in the business process).

Figure 42:
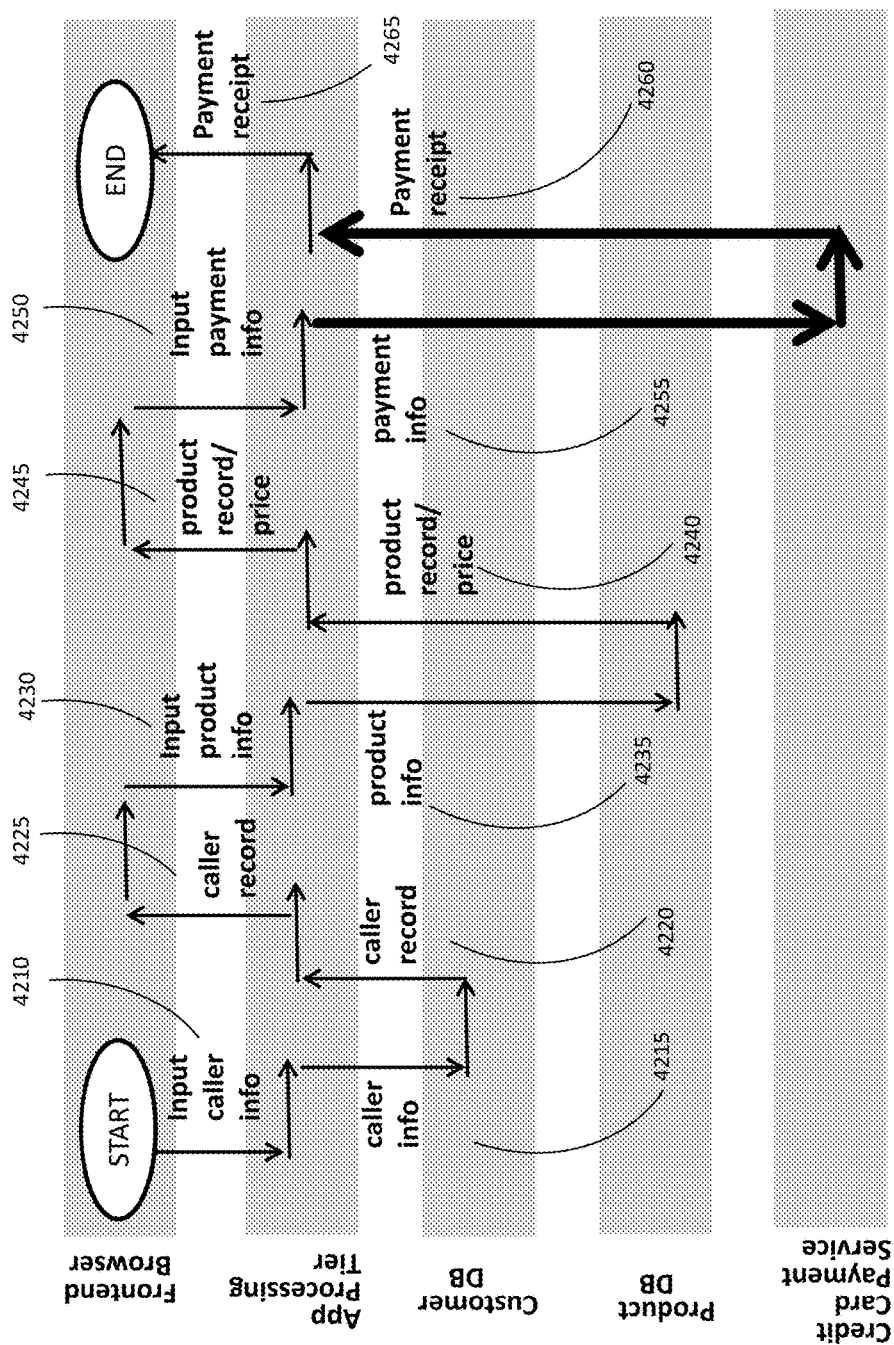
FIG. 42 illustrates a business process workflow diagram of business-process-based access control according to an embodiment.

The following example (depicted in FIG. 42) illustrates the business process proximity calculation for a SOA, with the aim of implementing improved least privilege, not only at the front end, but for each node in the SOA. In a telephone sales division of a company, all telephone sales staff use a wizard-style, browser-based front-end to access an application that guides them to a workflow as they speak with the customer. In addition to the web browser, there are four additional systems: the application processing tier (i.e. business logic, presentation layer), customer database, product database, and a credit card payment service. The backend web services that make up this application are orchestrated using a SOA business process modeling (BPM) orchestration engine that models the workflow. The simplified workflow is depicted in FIG. 42. Telephone sales staff first input customer information (steps 4210 and 4215) to pull up a customer record (from a customer database) (steps 4220 and 4225), then put in the information for the product the customer requests (steps 4230 and 4235) and receive product information and pricing (from a product database) (steps 4240 and 4245), and then input the customer's credit card (step 4250), which is charged via a credit card payment service (step 4255), and a receipt is generated and returned (steps 4260 and 4265). The generic policy that should be enforced at the credit card processing service is "only allow charging requests if the integrated application is in the correct step in the workflow for both the customer context and the telephone sales staff context" (bold arrows in FIG. 42). This means that credit cards will only be charged if the same telephone sales staff carried out all preceding workflow steps successfully for the particular customer whose card is submitted for payment processing. This intuitive, simple rule can be modeled using the abovementioned model-driven security approaches. Other policy aspects that can be modeled in addition include: the request comes from an authenticated sales staff and from an authenticated system, and if the request is encrypted'.

CMP-MDS can automatically generate machine-enforceable access rules for all twelve interaction in the workflow (see FIG. 42) to allow exactly those interactions, but only if they have been preceded by the preceding interaction, are authenticated to come from the correct calling system, have been triggered by a valid user (telephone sales staff), and are encrypted. CMP-PDP can obtain information about the current workflow they are in from a CMP-ASS that queries the orchestration engine (e.g. BPEL). Because the models are defined in a very generic way, CMP-MDS can automatically update the matching detailed technical access control rules whenever the application workflow changes (e.g. an audit step for larger payments is inserted, or the interaction sequence changes). As a result, access to the credit card payment service is much more contextually restricted than with non-PBAC policies, while at the same time application/workflow agility is preserved.

6) "Security Proximity" is security proximity of a security proximity attribute associated with an accessor in relation to the security proximity attribute with an accessed resource. The semantics of "security proximity" depend on the security model selected, and can be quite complex, or very intuitive. An example of a well-established security proximity policy could be "team leaders who are top secret cleared can access information resources classified as top secret". Hierarchical Role-Based Access Control (RBAC) would be another example how security proximity could be defined, where proximity between roles is defined by the hierarchy, and access is controlled by the proximity of two roles to each other. Bell LaPadula may be a theoretical example of a security proximity model.

Security attribute services can provide the information required to calculate proximity (for example, roles, security labels, tags etc.). If the security attributes are readily available at sufficient performance for runtime decisioning/enforcement, they can be directly used in the machine-enforceable access rules. If they are quite static but not readily accessible (i.e. require mappings and other pre-processing), these can be "baked into" the machine-enforceable access rules in their raw form (e.g. mapping roles-to-identities and vice-versa). If they are highly dynamic, a runtime attribute calculation service could be developed (however there are major implementation concerns around performance—for example even simple security attribute evaluations such as "is the calling subject' certificate hierarchy used to certify a public key used valid?" could lead to an unacceptable and unpredictable delay that would violate the real-time requirements of the system).

Security proximity is usually intuitive if proximity is structured in a hierarchy or other easy-to-parse structure (e.g. hierarchy, levels, structured lattice of labels). However, the semantics can quickly become complex or unclear depending on the exact definition of the security proximity dimension. Also, depending on the exact definition of the security proximity dimension, more elaborate logical statements may be possible. As a (theoretical) example, leaking information into or out of a security label in a BellLaPadula sense may depend on whether the information has been accessed and at what security label.

7) "Risk proximity" is proximity of a risk proximity attribute associated with an accessor in relation to the risk proximity attribute with an accessed resource. The semantics of "risk" depend on the risk dimensions of interest (e.g. security, cost, damage, death), and can be quite complex. An example of risk proximity would be: "requestors can access information from information resources that have lower risk than the requestor's risk'. Or all individuals (with a risk-vetting) can access a information resource with a risk-level within +−10% of their risk-vetting."

While "Risk-Adaptive Access Control" (RaDAC) has been proposed (in prior art) as an access control model to capture risk, the definition specifically focuses on the proximity of the risk attribute(s) associated with the requesting subject and the risk attribute(s) associated with the requested resource.

Risk attributes can come from many information sources, such as Security Incident & Event Management (SIEM) systems, e.g. HBSS. If the risk attributes are readily available at sufficient performance for runtime decisioning/enforcement, they can be directly used in the machine-enforceable access rules. If they are quite static, they can be "baked into" the rules during rule generation if they are highly dynamic, an attribute service could be queried at decision time.

Because calculating current risk attributes for subject and resource is highly complex and computationally intensive (a significant part of the cyber security industry is concerned with that challenge), there are major implementation concerns around performance unless the risk attributes of the subject and resource are reduced to a simple (e.g. numerical, linear, or vector of numeric values) risk value by the attribute source.

The semantics of risk proximity can quickly become complex or unclear depending on the exact definition of the risks taken into consideration. While complex logical risk statements would be theoretically possible, probably the best approach is to simply let risk-calculating products produce a simple risk value (independent of the MDS System) and provide that value as a dynamic attribute feed into the decisioning/enforcement.

For example, assume that the risk proximity calculation for subjects and resources is based on the security risk associated with the system they use. In other words, a system with a high risk of being hacked is not allowed to access an important information resource. Or a resource with a high risk of being hacked cannot be accessed from a (especially critical) system that has a high risk of being hacked. For example, an end-system SIEM can provide the risk associated with the subject's device and the resource's device covered by the SIEM, simply by mining the event (AV/Malware/DLP etc.) and asset rollup (for auditing), and calculating the current risk of using that device based on the average severity of all incidents reported for that device. That value could be weighted by the criticality of the system (if available).

8) "Social Proximity" is proximity of a social proximity attribute associated with an accessor in relation to the social proximity attribute with an accessed resource. The semantics of "social proximity" depend on the dimensions the social graph is based on (e.g. single-dimensional such as Facebook, or multi-dimensional and/or weighted as proposed by some early academic work). An example of social proximity would be in a social network (e.g. Facebook): "everyone can only access their friends' information and limited information about friends' friends.", or "intelligence analysts working on a task related to a criminal A can access all information about criminals that are in two hops social proximity to criminal A". Or "Friend's friends can access my information unless friend's friends' friends' are on my blocked list".

While distance calculation across a simple social graph is easy, performant, and based on readily-available attribute sources (e.g. social networks usually have an API to search the graph), some attribute refinement may still be needed.

Because the social graph changes frequently, but not continually, quite a bit of attribute refinement pre-processing can be done to turn the abovementioned complex examples into simpler social graph distance rules. The trade-off is primarily between repeated pre-processing vs. complex on-the-fly attribute calculation and retrieval.

Calculation can be done easily if the social graph is simple, e.g. Facebook's which only has a few connection options between participants (close friend, acquaintance, blocked, not connected, restricted list) etc. The more complex the graph (e.g. weighted/multi-dimensional), the more complex the calculation gets.

9) "Informational Proximity" is proximity of an information proximity attribute associated with an accessor in relation to the information proximity attribute with an accessed resource. The semantics of "information proximity" depend on the dimensions considered. For example, "a user can use a feature in an information service for terrain information to access other information services that contain similar terrain information." As a real-world example of information proximity (however unrelated to access control), consider the Pandora online music service with the Music Genome Project. A given song is represented by a vector (a list of attributes) containing approximately 400 "genes" (analogous to trait-determining genes for organisms in the field of genetics). Each gene corresponds to a characteristic of the music, for example, gender of lead vocalist, level of distortion on the electric guitar, type of background vocals, etc. The system depends on a sufficient number of genes to render useful results. Each gene is assigned a number between 0 and 5, in half-integer increments. The Music Genome Project's database is built using a methodology that includes the use of precisely defined terminology, a consistent frame of reference, redundant analysis, and quality control to ensure that data integrity remains reliably high. Given the vector of one or more songs, a list of other similar songs is constructed using a distance function. Attributes can be obtained e.g. from metadata or by analyzing the information. Potentially elaborate (but mostly static) attribute refinement may be required to map between a vector of characteristics and a descriptive attribute (e.g. "terrorism-unrelated terrain information"). Calculation can be done e.g. using a comparison function of all vector elements and subsequent weighted sum of all vectors.

Example PBAC Distance Calculation Methods

The following presents numerous distance calculation methods. It is noted that the data type of a distance calculation may not automatically determine the distance calculation method. For example, just because an ID value may be an integer, the numerical distance between the two integer values may not be a relevant distance metric. The distance calculation method is primarily determined by the desired PBAC policy semantics, and secondly by the (potentially refined) attribute values and semantics. There are countless distance calculation methods, because there are many different ways to define distance for PBAC policies. The following presents numerous methods to aid the understanding of the general idea.

1) Numerical Calculations: Attributes can consist of numerical values, such as Boolean, integers, floating-point numbers etc. Attributes can also consist of several numbers with distinct meaning, such as time/date values. In some cases, the linear distance between N axes is a semantically meaningful calculation, i.e. directly calculate the numerical distance between numbers, e.g. by subtracting one number from the other, or by calculating the time difference between two time/date values based on an algorithm. For example, the direct distance calculation of geospatial points on a map (not taking any obstacles, road layouts, routing algorithm etc. into account). However, in many cases numbers encode different semantics (e.g. random numbers as identifiers), in which case numerical calculations do not provide useful PBAC distance results. In some cases, a weighted numerical vector describes numerous different aspects of an attribute (e.g. for information proximity). In this case (just to present one example), the differences between all sub-attributes can be calculated, and subsequently a weighting algorithm can be applied (capturing the importance of each sub-attribute with respect to proximity) to arrive at a single, comparable distance value.

2) Mapping Tables can capture proximity distances even if there is no algorithm to determine distance. For example, coalition proximity (i.e. operational proximity) may be explicitly stored in a table. Such a mapping table can capture all distances explicitly, e.g. "USA, Canada: CoalitionLevel1", "USA, UK: CoalitionLevel2" etc.

3) Graphs & Models: There are countless ways graphs (cf. graphs in mathematics) and models (cf. modeling languages) can be used to calculate distances (e.g. Dijkstra's algorithm), differing primarily in their ordering and the specific features of the edges between nodes. "Basic Graphs" can simply capture nodes (e.g. containing attribute values) and links between the nodes. These links can be bi-directional or unidirectional/ordered. The distance can simply be calculated by counting the "hops" along the links required to get from one attribute value to the other. Examples where this distance calculation method works well are social proximity, where a social-graph links capture "friend" relationships, "friends-of-friends" relationships etc. between nodes. In "Extended Graphs" (e.g. with "Weighted Vector Links"), links in graphs can also be tagged with more complex values, such as weights and vectors, for example specifying the strength of the social connection (e.g. close friend or acquaintance), or the kind of social connection (e.g. business or personal).

A wealth of academic work is published around graph theory, social network distance calculation etc. Numerous intuitive distance calculation algorithms have been proposed that factor the tagged information into the distance calculation.

4) Hierarchies/Trees are often used to capture organizational distance. For example, an organizational chart captures the hierarchical distances between all organizational teams. Organizational proximity for users can for example be calculated by first mapping users to their organizational team, and then counting the hops between organizational teams across the hierarchy/tree.

5) Semantic Models/Ontologies/Taxonomies etc. area useful if more complex information models are required to capture distances correctly. Semantic information models (models/domain-specific languages, ontologies, taxonomies etc.) can be used to express all entities and their various semantic relationships. Such models can be analyzed using model-driven approaches to calculate the distance between entities based on the particular desired distance semantics. Information proximity can be captured well in such models.

6) (Business) Process Models capture process workflows. If the position of the accessor and/or resource is known, the business process distance can be easily calculated by counting the hops along the workflow model. This way, business process proximity can be calculated.

7) Other Mathematical Calculation Methods: There are countless additional methods of calculating distances. Some examples include: E-statistics, or energy statistics, are functions of distances between statistical observations; Mahalanobis distance is used in statistics; Hamming distance and Lee distance are used in coding theory; Levenshtein distance; Chebyshev distance; Canberra distance; Manhattan distance; Circular distance; etc.

8) Polygons are an example of more complex calculation methods where a distance function is not always a simple mathematical calculation, but can depend on many both static and dynamic information sources and non-trivial distance metrics. Polygons are especially used for geospatial metrics. The metrics used for calculating distance need to be clearly outlined. For example, is the distance the shortest direct line between some point on the edge of each polygon? Or is it the center of the polygon (based on the polygon's area). And what happens if polygons overlap, or contain each other. The specific desired PBAC policy semantics should determine the exact metrics used.

9) Sets and Bags: Sets of information (conceptually unordered collections of elements without duplicates, and the related so-called "bags" (conceptually unordered collections of elements with duplicates) can also be attribute values for which a distance may need to be calculated. The specific desired PBAC policy semantics should determine the exact metrics used, e.g. number of identical items, number of almost identical items etc. Sets and bags can involve quite complex calculation methods.

10) Complex Geospatial Distance Metrics: There are countless metrics to calculate geospatial proximity based on which geospatial aspects matter. For example, Automotive Navigation Systems and route mapping are ubiquitous today in the form of Navigation System devices, smartphone features, built-in car navigation, web etc. Distance calculations are conceptually graph algorithms, based on graphs consisting of many both static and dynamic information sources, including road database, speed limits, road quality, toll fees, ferries, real-time and predicted traffic, accident/incident information etc. As a consequence, the distance calculation is a resource-intensive process. Furthermore, the notion of distance can be configured to different metrics, such as shortest path, fastest path based on speed limit or real-time traffic, avoiding toll roads, suitable for trucks etc. Another example is Pedestrian Navigation Systems, where shortest/fastest distance calculation can be considerably more complex, as there would potentially be many more paths. For the military in a terrain without sufficient roads, such distances could be calculated based on obstacles such as rivers, mountains etc. Yet another example is Aircraft Geospatial Distance, which may also not always be calculated in a straight line, but instead based on the air traffic control corridors available for the aircraft to get from a starting point to an endpoint. An additional complexity is caused by the fact that air corridors can change based on certain conditions, such as crisis situations, wars etc.

11) Information Processing Based Distance Metrics: When PBAC for information proximity is considered, processing of information sources such as image, video, audio, and other content can help compute the distance between information (e.g. similarity between several images based on some metric such as "depicts potential criminal facility"). Many algorithms have been researched and used in practice. In general, the content processing will most likely be done on the content first, resulting in a tag (e.g. vector of descriptive parameters), which can then be used for the actual proximity calculation. Calculating such metrics can be even more complex if the distance depends on dynamical content, for example conflict-of-interest (Chinese Wall, history-based) policies where information proximity may depend on which user has accessed which information in the past.

PBAC Embodiment Before-After Comparison

It is evident that PBAC allows the expression of generic, intuitive access policies that cannot be easily expressed without PBAC's features. A policy "everyone can access any resources associated with tasks in proximity to the task they are working on" (assuming there is a proximity calculation service for tasks) is easy to author and understand. Moreover, because proximity calculations are dynamically calculated based on input attributes, access can change dynamically without the need to update the policy (e.g. if someone's task assignment changes).

For PBAC to work well, it is critical that there is a distance calculation service—in many cases, distance calculation are based on some data sources, which have to be well-maintained. For example, there is no simple "numerical" way of calculating the distance between tasks—instead, task relationships need to be stored in a data source accessible to the PBAC calculation service. Other calculations can be done without access to data sources, e.g. direct geospatial distance between to geospatial points. PBAC provides the best value if it can reuse such information sources from systems that already maintain that data (just like MDS benefits from reusing functional system models from development tools). But even if data sources need to be maintained, this can be a lot more intuitive and manageable than alternative access control methods (managing task relationships may be more intuitive than authoring and maintaining many detailed, static, per-user and per-resource access rules).

Without PBAC, there would be no easy way to take proximity between tasks into account when deciding what access to grant. Instead, one would need to revert to more hard-coded rules such as "user X can access resources associated with tasks A, B, C, D, E", or use roles and groups to "bucket" users and resources. Both approaches are too static, unmanageable, and non-intuitive.

Applicability of the MDS System: Example Embodiments

It is noted that the MDS System is not at all limited to the particular presented examples. Many policies, services, refinement paths, metamodels etc. can be designed to implement the MDS System in such a way that it allows the semantic mapping from intuitive policies to technical enforcement. Furthermore, the MDS System is not limited to the attributes, calculations, and mappings presented in the example.

In particular, the examples do not include much environmental context (e.g. current time, emergency crisis level), in order to not overcomplicate the discussion. It is obvious to anyone skilled in the art that the MDS System is not restricted to policies (e.g. proximity-based) between requestor and resource, but could also involve policies (e.g. proximity-based) between requestor/resource and environmental context.

EXAMPLE EMBODIMENTS

1) Use Case Scenario

Figure 43:
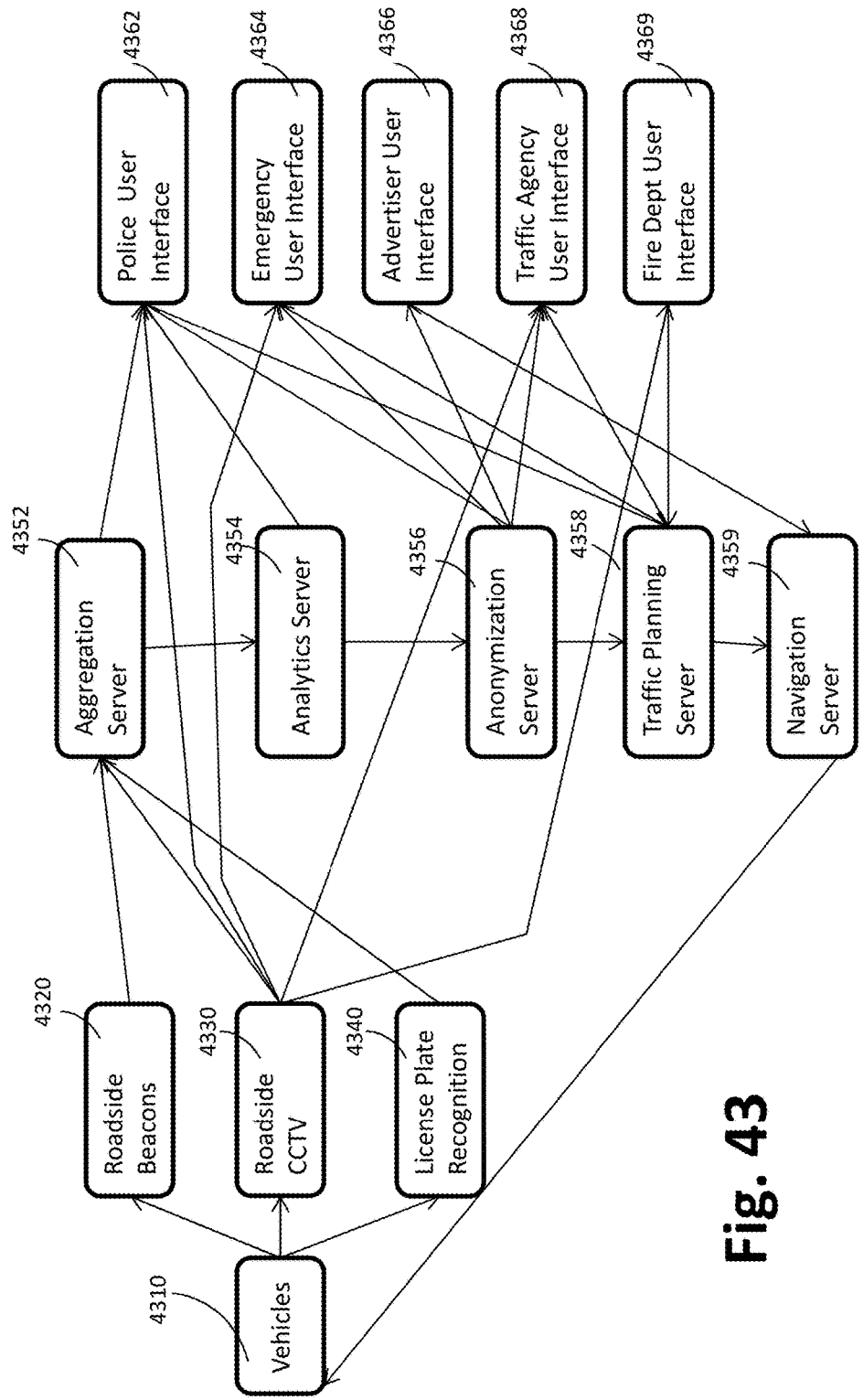
FIG. 43 illustrates a functional application diagram of an example scenario according to an embodiment.

The scenario, which illustrates a fictitious intelligent transport system, is briefly described as follows:

The functional model depicted in FIG. 43 to illustrates the example scenario and its Protected SoS: an interconnected DDS application, showing application nodes and interactions supported by the applications. The depicted functional model example is highly simplified and only vaguely shows the interaction between the main interconnected systems. It is noted that this application scenario is not designed to be realistic, but rather to just present an interconnected IT landscape example that can be used for the remainder of this example.

Vehicle nodes (4310) are tracked using 3 methods:
Roadside Beacons (4320) detect cars;
Roadside CCTV (4330) captures live video;
License Plate Recognition (4340) systems read license plates.
Server nodes are:
the Aggregation Server (4352) aggregates the collected information;
the Analytics Server (4354) makes sense of the information and look for traffic patterns;
the Anonymization Server (4356) takes those results and anonymize them so they do not include personally identifiable information (PII);
the Traffic Planning Server (4358) takes that information and predicts/plans traffic with the goal of mitigating and preventing traffic jam issues;
the Navigation Server (4359) takes that information and provides guidance to vehicle navigation systems (e.g. provide alternative routes to a percentage of travelers on a particular route so that traffic jams can be prevented/mitigated.

Actor user interface nodes are the following, and access (from their user interface, "UI") to certain information should be restricted depending on who they are and on context:
Police UI (4362): May see everything—even live CCTV—if there is a search warrant or a task that requires that information, i.e. if the feed is "in proximity" (maybe restricted using a complex PBAC policy).

Emergency Services UI (4364): May be able to view and impact the traffic planning server based on emergencies and their geographic location etc. May also see live CCTV of the emergency site.

Advertiser UI (4366): May only see anonymized information and provide advertisements to the navigation server to be pushed to the vehicle navigation device Traffic Agency UI (4368): May see anonymized information only, and CCTV of areas with traffic issues identified by the traffic planning server; and should be able to impact the traffic planning server, e.g. for manual traffic planning intervention Fire Dept. UI (4369): May see and impact information from the traffic planning server; and should see live CCTV of emergency sites.

2) Use Case Policies

This example only focuses on a small subset of examples (some very generic, some very specific), to illustrate how the MDS System works:

"requestors working on a privacy relevant task can only access privacy relevant resources (i.e. handling PII) if the resource resides outside the EU"

"only the interactions between nodes that are defined in the functional system description are allowed"

"requestors on a User Interface node are only allowed access to resources if they are in at least 80% proximity to the requested resource" (this is a highly abstract/ generic policy, which may not be desirable because policy authors may not understand the implications)

"police officer with the authenticated identity of "John Doe" can access the Roadside CCTV installation XY from his Police User Interface device between 9 AM and 5 PM" (this is a highly specific rule, which can also be authored if there is a need for it. this is a highly specific rule, which can also be authored if there is a need for it).

Specifically looking at the Police User Interface (a subset of the example scenario), one could want to support more granularity:

For example, different proximity percentages per interaction:

Police user using the Police User Interface device is allowed access to resources on the Aggregation Server if within 70% proximity to the resource.

Police user using the Police User Interface device is allowed access to resources on the Roadside CCTV if within 90% proximity to the resource.

Police user using the Police User Interface device is allowed access to resources on the Analytics Server if within 40% proximity to the resource.

Police user using the Police User Interface device is allowed access to resources on the Anonymization Server if within 0% proximity to the resource.

Alternatively (or additionally), for example, finer granularity per interaction:

Police user using the Police User Interface device is allowed access to resources on the Aggregation Server if within 70% temporal (requestor task time window & resource time window) and operational (i.e. requestor task's target & resource's target) proximity to the resource.

Police user using the Police User Interface device is allowed access to resources (real time video) on the Roadside CCTV if within 90% geographic (requestor GPS & CCTV GPS) and temporal (requestor task time window, current time) proximity to the resource.

Police user using the Police User Interface device is allowed read access to resources on the Traffic Planning Server if within 50% geographic (requestor's task geolocation & resource geolocation) & temporal (requestor's task time window & resource time window) proximity to the resource.

Police user using the Police User Interface device is allowed read access to resources on the Traffic Planning Server if within 50% geographic (requestor's task geolocation & resource geolocation) & 90% temporal (requestor's task time window & resource time window) proximity to the resource.

3) Installation

In this example, CMP-PDPs & CMP-PEPs are collocated with the middleware (in this example, OMG DDS) on each to-be-protected application node.

Also, in this example, the system deployer produces a software bundle for the middleware libraries that includes the CMP-PDP & CMP-PEP. This bundle is installed on each node where the new middleware software bundle (with CMP-PDP & CMP-PEP) is installed—there is no need to explicitly install CMP-PDPs & CMP-PEPs.

In the example, the functional model (depicted in FIG. 43) comes from a model-driven development tool used to integrate and deploy the interconnected DDS application. The functional description source connector CMP-FDS to the development tool (here: Eclipse) is installed.

Furthermore, the following data services are installed (also depicted in FIG. 44):

CMP-ASS: Attribute service source components

CMP-ASS1 (4405): requestor_identity—obtained from the request

CMP-ASS2 (4410): requestor_geolocation_position—obtained from the requestor device GPS+the network's positioning of the device CMP-ASS3: resource_labels—obtained from document labels tagged to the document: item 1 (4415): "geolocation" the document pertains to; item 2 (4420): "task' the document pertains to; item 3 (4425): time window" the document pertains to; (can also be calculated from "task" using one of the mapping services below)

CMP-CS: Calculation service components

CMP-CS1 (4430): operational proximity (task1, task2)=number of hops between tasks relationships—It is noted that this calculation service requires access to a calculation data source that provides the number of hops. This data could for example come from task management systems, logistics management systems, ERP systems etc.

CMP-CS2 (4435): social proximity (target_identity1, target_identity2))=number of hops between targets (in the real-life social graph between criminals)—It is noted that this calculation service needs to have access to a calculation data source that contains the social graph—for example, big data analytics and intelligence analyst dashboard systems could provide that information. In this example, the relationships between targets are kept singular. In more complex real-world scenarios, relationships could be defined with a vector of different social relationship dimensions (e.g. professional, personal)

CMP-CS3 (4440): temporal proximity (time_window1, time_window2)=<result qualifier, value1, optional value2>—This calculates (using some standard operators, and its own operators e.g. before, after, overlap-before, overlap-after, subset, superset etc.) the relation of two time windows by qualifying and quantifying the result, and determining the match with two comparison values qualifying & quantifying the result (e.g. distance of windows, distance of overlap before and after window etc.). It is noted that while it could become quite complex to cover all possible relevant temporal relations, this can also be very simple. In this example, time window values are often "shrunk" into a specific point in time (i.e. beginning and end of window the same), which makes the result value a simple numerical distance value (in this example, hours are chosen for the sake of simplicity)

CMP-MS: Mapping service components

CMP-MS1 (4445): identity→assigned_task—It is noted that this mapping service requires access to a data source that provides the task assigned to an identity. This data could for example come from task management systems, logistics management systems, ERP systems, identity management systems etc. It could also be tagged to the identity as a label.

CMP-MS2 (4450): task→time window (the task pertains to)—It is noted that this mapping service requires access to a data source that provides the time window associated with a task. This data could for example come from task management systems, logistics management systems, ERP systems etc.

CMP-MS3 (4455): geolocation_position→country code—This mapping service requires access to a (pretty static) mapping function that maps a geo position (e.g. GPS) to a world map and checks in which country's polygon that point falls.

CMP-MS4 (4460): country code→political power block (EU, USA+Canada, Mexico+South America, . . . ). This mapping service requires access to a (pretty static) mapping function that maps country codes to power blocks. This could be implemented using a simple static mapping table CMP-MS5 (4465): task→target_identity (here: criminals)—This mapping service requires access to the task's information about which target the task pertains to. This could be a tag in the task management systems, logistics management systems, ERP systems, identity management systems etc.

CMP-MS6 (4470): task→privacy_relevant (here: handles PII and is regulated in the EU)—This mapping service requires access to the task's information about whether the information handles personal identifiable information (PII). This could be a tag in the task management systems, logistics management systems, ERP systems, identity management systems etc. It could also be automatically "harvested" from the task's documents (e.g. social security numbers) or the resources associated with the task.

4) Configuration

Figure 45:
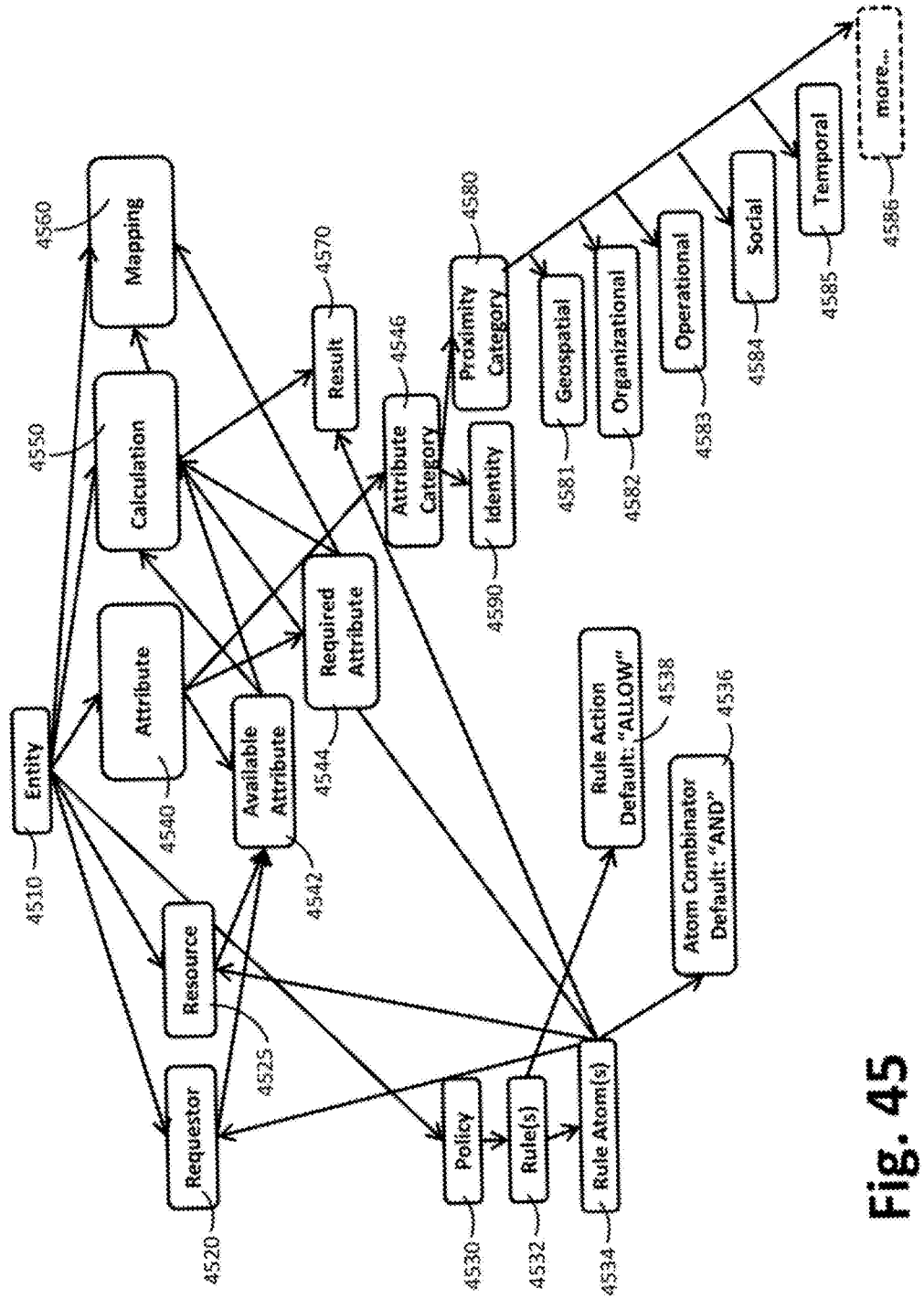
FIG. 45 illustrates a bootstrap metamodel of an example scenario according to an embodiment.

CMP-MMR may be configured with a bootstrap metamodel. FIG. 45 shows a simplified bootstrap metamodel excerpt (note: for illustrative purposes only as the depicted diagram is very simplified, incomplete, and not very clean sketch—only some relationships depicted to improve readability. Some of the removed fidelity includes: relationships can imply 1:1/n:n/1:n/n:1; relationships imply "is a" or "has a"). The exemplary metamodel starts with Entity (4510) as the parent element of all metamodel elements. Arrows in FIG. 45 depict simplified associations between Entities. The metamodel defines child entities of Entity (4510) for Requestor (4520), Resource (4525), Attribute (4540), Calculation (4550), Mapping (4560) and Policy (4530). It further defines: Available Attributes (4542) and Required Attributes (4544) as children of Attribute (4540); Calculations (4550) have a Result (4570); Policies (4530) have Rules (4532) with Rule Actions (4538), which have Rule Atoms (4534) (i.e. rule elements); Rule Atoms (4534) are made up of Requestors (4520), Resources (4525), Calculations (4550), Atom Combinators (4536), and Results (4570); Attributes (4540) can be categorized by Attribute Category (4546), in this example Identity (4590) and Proximity Category (4580) with its subcategories Geospatial (4581), Organizational (4582), Operational (4583), Social (4584), Temporal (4585) and optionally others (4586).

It is noted that in this example, services (once launched) will send their own metamodel portions to CMP-MMR—these will be added to the broad attribute categories at the bottom right by a metamodel receiving feature of CMP-MMR. It is again noted that this is only an example—the MDS System is not at all limited to this conceptual metamodel structuring. The MDS System is also not limited to services (once launched) send their own metamodel portions to CMP-MMR—the metamodel could also be centrally maintained.

Additionally, the configuration of CMP-MDR is mostly done dynamically upon launching (see further below).

Also, no services are preconfigured in this example, and CMP-PE is configured dynamically by CMP-AEC upon launching (see further below).

CMP-RSC does not need to be configured at this stage because: CMP-PEPs and CMP-PDPs are (in this example) collocated with each other, and are bundled with the middleware on each Protected SoS node and are automatically started with each node's DDS middleware upon application launch. Furthermore, CMP-RSC will later (upon launching) dynamically connect CMP-PDPs with available and required CMP-ASS, CMP-CS, CMP-MS, and with CMP-PAP. CMP-RSC can already configure the connection between CMP-FDS and CMP-MDS at configuration time, and connect the various other MDS System connections.

In this example, CMP-OSC is configured to support Microsoft Windows firewall. It configures firewall rules for each endpoint system firewall on each system that runs a to-be-protected application node. At this stage, the CMP-OSC connector into Windows firewall is configured so that—during runtime—CMP-MDS & CMP-OSC can push firewall configurations into Windows. The configurations are intuitive: whenever CMP-MDS (later) identifies that at least one interaction from one application node to another application node should occur, it will produce a network layer configuration (e.g. for Windows firewall) that allows that network connection in the direction required. Handling of the syntactic representation and importing of rules into the Windows operating system can be done by CMP-OSC using remote login and the "netsh" command, which allows setting specific firewall rules with the "remoteip" parameter.

CMP-FDS is configured to obtain the abovementioned functional model of the interconnected DDS application depicted in FIG. 43, showing application nodes and interactions supported by the applications.

Figure 46:
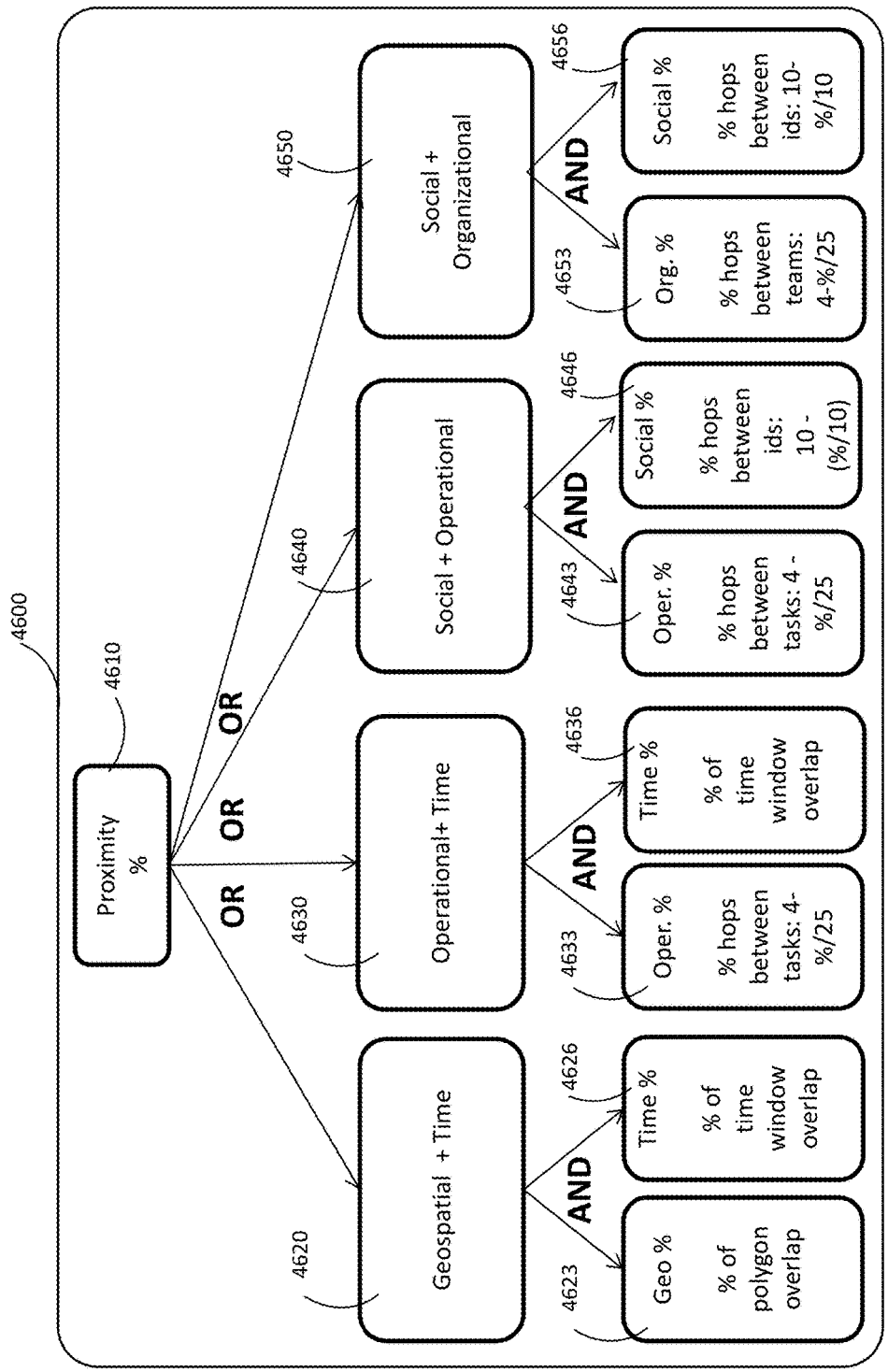
FIG. 46 illustrates a policy rule element refinement template of an example scenario according to an embodiment.

CMP-MDS is configured with policy rule refinement templates (an example of a PSF refinement template, which also replaces PFFs). Policy refinement templates in this example map proximity as a simple percentage value to several weighted combinations of several proximity dimensions, and further to specific calculation methods for the percentage calculation for each proximity dimension. The diagram depicted in FIG. 46 illustrates a rule generation template (4600) that illustrates how a very generic "proximity>=80%" rule element (4610) may be replaced (refined) with more specific sets of rule elements consisting of four "OR"-combined combination options "Geospatial+Time" (4620), "Operational+Time" (4630), "Social+Operational" (4640), "Social+Organizational" (4650). Each of these options can be further replaced (refined) with more specific sets of rule elements, in this case two "AND"-combined rule proximity calculation rule elements each: "Geospatial+Time" (4620) by "Geo % of polygon overlap" (4623) and "Time % of time window overlap" (4626); "Operational+Time" (4630) by "Operational %=4—%/25 hops between tasks (4633) and Time % of time window overlap" (4636); "Social+Operational" (4640) by "Operational %=4—%/25 hops between tasks" (4643) and "Social %=10—(%/10) hops between IDs" (4646); and "Social+Organizational" (4650) by "Organizational %=10—(%/10) hops between IDs" (4653) and "Social %=10—(%/10) hops between IDs" (4656).

This template (which could be implemented as several templates) can for example refine a "proximity>=80%" rule element into for example the following (in simplified pseudo-notation):

(geo % of polygon overlap AND % of time window overlap) OR (operational 4—%/25 hops AND % of time window overlap) OR (operational 4—%/25 hops AND 10—%/10 social target hops) OR (organizational 4—%/25 hops AND 10—%/10 social target hops): ALLOW It is noted that in an embodiment, it is beneficial to only generate this rule element if the used calculation services are available, and if enough—or all—attributes (direct or mapped) are available. This is because is only enforceable if all this information is available. Further below a different embodiment is shown where only one of the rule element refinement choices from the available ones needs to be selected by CMP-MDS for rule generation. In the above rule refinement example, at least one of the branches needs be "decidable" (i.e., calculations and attributes available) for each covered interaction to obtain access. In an embodiment, the rule element refinement process can only refine rule elements if the calculations and attribute sources are actually available at the node for which the rule is generated, and drop all others.

The benefits of such a "proximity>=80%" high level policy is that it could apply to the entire system, maybe with different percentages for different interactions. The system will then automatically determine (at rule generation time, or at decision time) for each interaction whether at least of the refinements paths is met by the particular interaction. For example (there are numerous detailed implementation assumption which are omitted to keep this explanation readable):

A police user P1 working on a task T that relates to an incident at road intersection X that occurred 12 days ago is requesting historic CCT footage from 9-15 days ago, from the Roadside CCTV system that overlooks intersection X, and the Roadside CCTV systems from one block away from intersection X in all directions. The access control system determines that both the geographic polygon overlap (of task T and the CCTV footage) and the time window overlap (of task T and the CCTV footage) are each closer than 80% proximity, and thus grants access.

A police user P2 working on the same task T that relates to an incident at road intersection X that occurred 12 days ago is requesting live CCT footage, from the Roadside CCTV system that overlooks intersection X, and the Roadside CCTV systems from one block away from intersection X in all directions. The access control system determines that, while the geographic polygon overlap (of task T and the CCTV footage) would be closer than 80% proximity, the time window overlap (of task T and the CCTV footage) is less than 80% proximity, and thus denies access.

An advertiser using the Advertiser User Interface can only work with geographic areas on a per-country basis (for advertisement purposes); the geographic polygon overlap with a Roadside CCTV system, or any specific detailed area processed by the Traffic Planning Server (or Navigation Server) is never higher than 1%, thus the advertiser will never get access to any CCTV footage using the first rule refinement path. Similarly, there is never any task (here: handling PII privacy information) overlap, because the CCTV footage is always labeled PII relevant, and the advertiser task is never labeled PII relevant. Similarly, the advertiser task never has any social proximity (i.e. task's criminal target) with any criminal records in the aggregation server, and can therefore never access those. In summary, the advertiser can only access non-PII information. As a consequence, requests by the advertiser to any server other than the Anonymization Server will not be granted.

Emergency users will get access to some PII (Roadside CCTV, Traffic Planning Server) via the geo+time branch because their tasks relate to a specific geography & (current) time Traffic planners will get access to some PII (Roadside CCTV, Traffic Planning Server, Anonymization Server) via the geo+operational branch because their tasks relate to a specific geography & a operational context (traffic related task)

Fire Dept users will get access to some PII (Roadside CCTV, Traffic Planning Server) via the geo+operational (emergency related task planning for a fire site) branch or the geo+time branch (fire site, current time).

These examples are simplified, but illustrate the powerful idea of rule refinement (an example of PSF refinement), in the examples in the context of proximity-based access control). The policy author may edit a single rule for each connection with "proximity" and a particular percentage value for each connection that determines how much "proximity" is required for access (or, as mentioned just above, just require>=80% proximity globally). However, this may not always be a desirable design choice because it potentially abstracts away too many details, and makes it practically impossible for the policy author to figure out what a certain proximity percentage means for a given interaction in a given context (unless the policy author also understands the refinement templates well). On the upside, it keeps access control policy authoring extremely simple and "undistorted", and allows the flexible replacement of calculation services and attribute services (examples of PFF services) and the like without requiring changes to the edited policies.

Further below another embodiment is presented where the rule element refinement feature only needs to pick one of the paths, rather than an "OR" of all four paths (depicted in FIG. 46). This may be a better design because it flexibly picks a path based on which attribute services and calculation services are available, and may change the rule element refinement path (and generate new rules) if attribute/calculation services become available or unavailable (maybe not an ideal design choice compared to the "OR" design choice, but it nicely illustrates flexibility of the MDS System).

In another embodiment, this can also be determined by the CMP-PDP at decision time: The CMP-MDS rule element refinement simply generates the rule element with all four OR-combined paths (depicted in FIG. 46), and if no attribute or calculation is available to decide a rule element, CMP-PDP just assumes (which is a reasonable design choice) that this element evaluates to "deny" and "alert" (informing CMP-PMR that a CP-ASS/CS-MS service was missing).

It is noted that the programs that actually execute the model transformations (e.g. in the inventors' OpenPMF product) are highly technical software programs and are therefore not presented verbatim. Instead, the process for the particular example is further explained below, to illustrate how the workflows work.

Also it is noted that the MDS System is not limited to the policy refinement example above, or the workflow examples further below.

Discussion of the configuration of other MDS System components (such as CMP-PMR, CMP-PSV, and CMP-ASS, CMP-CS, CMP-MS) is omitted here as it is apparent from the discussion of the configurations described above. These components are assumed to be configured so they can interact with the rest of the MDS System.

5) System Launch

CMP-MMR is launched and loads the bootstrap metamodel discussed above (cf. FIG. 45). It now listens to CMP-ASS/MS/CS components providing their respective metamodel portions. It now also loads refinement templates (e.g. for PSF rule element refinement).

CMP-MDR is launched and listens to CMP-ASS/MS/CS components providing their respective metadata portions. In this example, services provide the metadata themselves. For example, (system-wide agreed) DDS pub-sub topics could allow this automated communication of metadata to CMP-MDR. Or, for example, CMP-MDR could listen on a (system-wide agreed) port and/or network location. In this example, there is a system-wide agreed DDS topic used for communicating metadata in an agreed format (e.g. WSDL, XMI). Since service metadata include technical software integration details (e.g. like WSDL files), the actual configuration files is not covered here in depth. The services available in this example are depicted in FIG. 44 (it is noted that there is no calculation service to determine "organizational proximity"—this branch in the abovementioned PBAC rule template can therefore not be determined.

Figure 44:
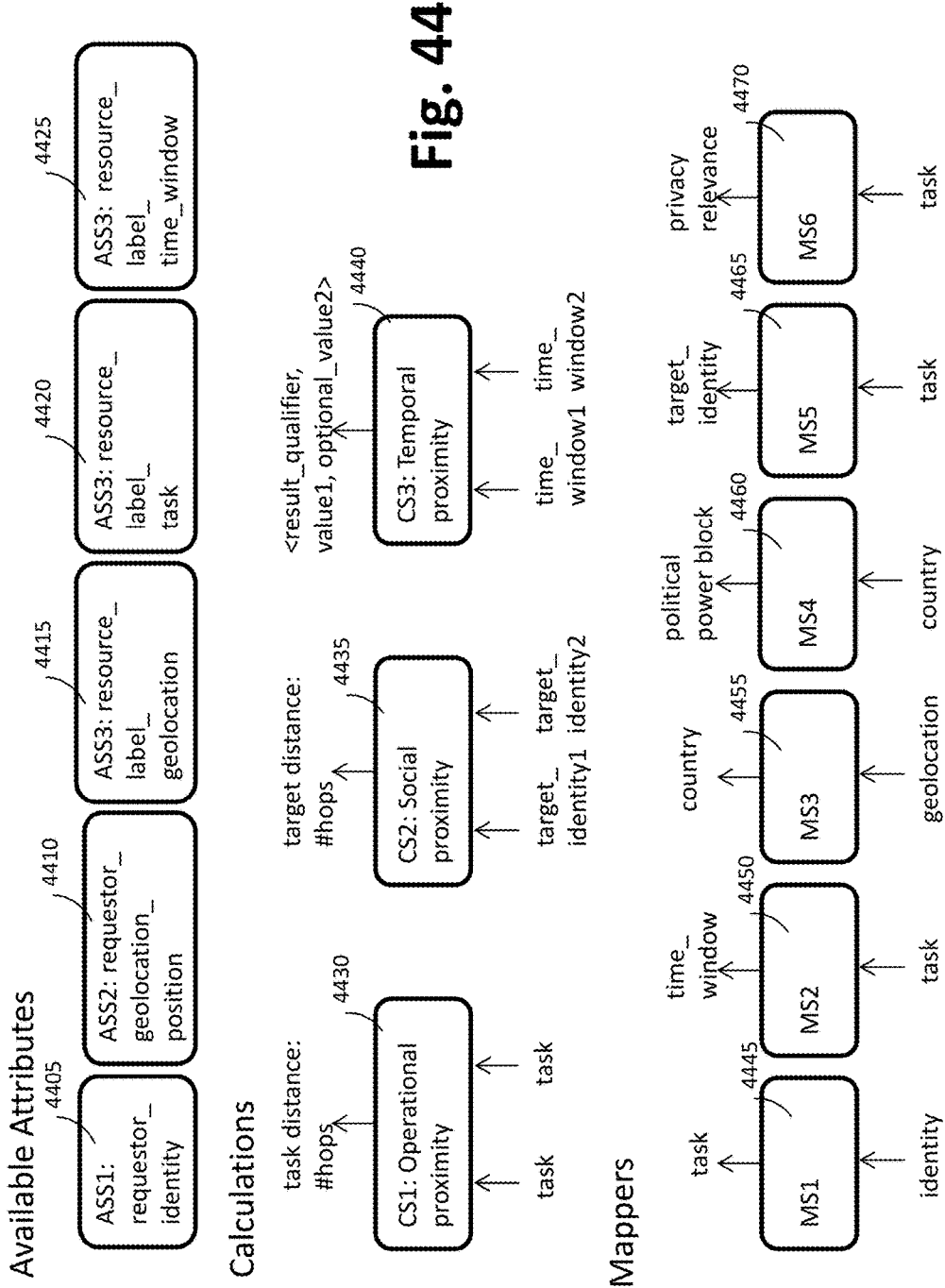
FIG. 44 illustrates available attribute services, calculation services, and mapper services of an example scenario according to an embodiment.
Figure 48:
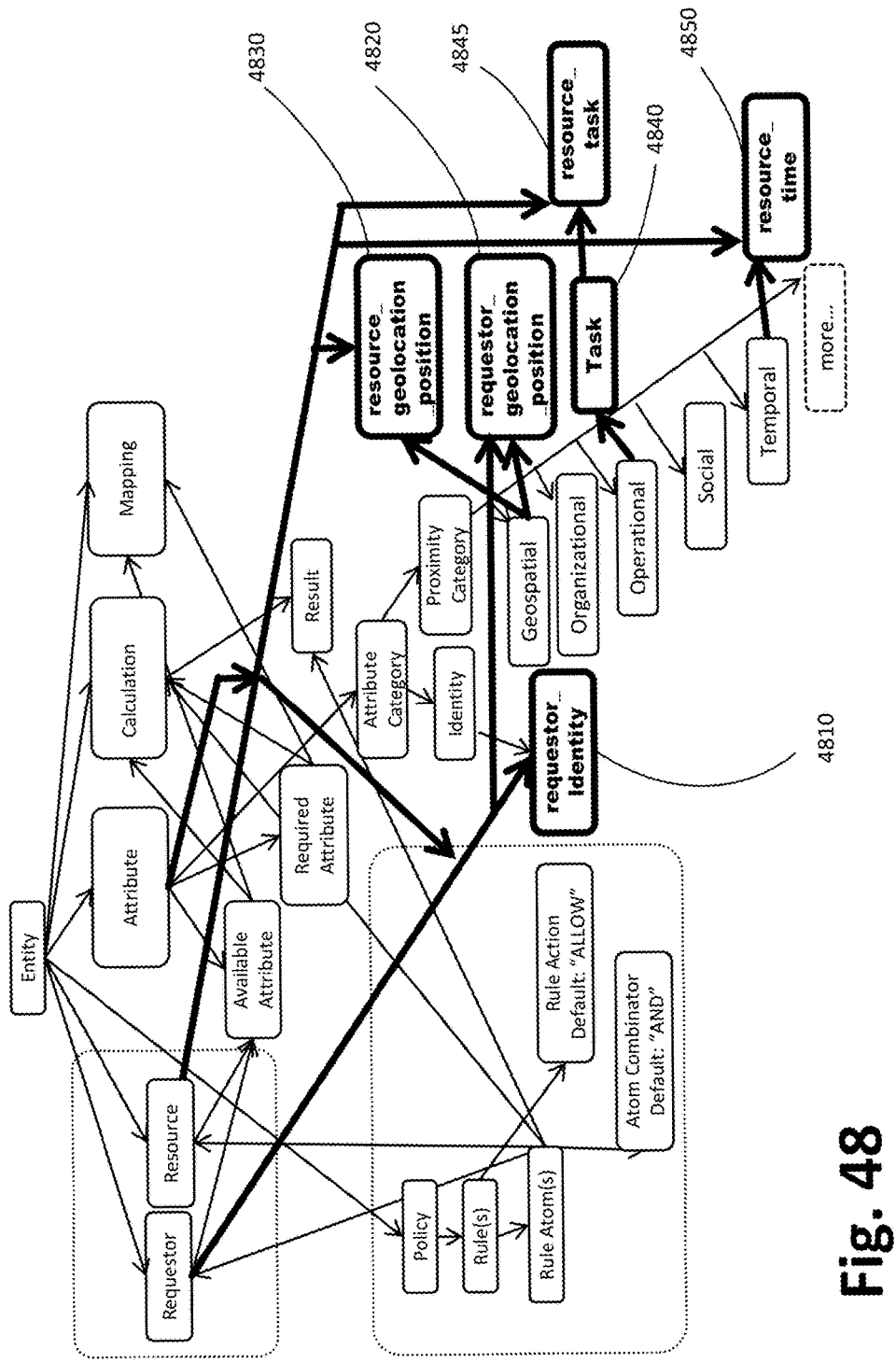
FIG. 48 illustrates a metamodel with added model entities and semantic associations for added attribute services of an example scenario according to an embodiment.

In this example, the CP-ASS, CMP-CS, CMP-MS services—once launched—provide metadata about their services to CMP-MDR, including interface syntax, network location, DDS topic information, and other information. This information shared by the services later allows CMP-MDS to get information from the services at rule generation time, and CMP-PDP to get information from the services at decision time. Once the CMP-ASS, CMP-CS, and CMP-MS are launched (that step is discussed further below), the CMP-MMR receives—in this particular example implementation—metamodel fragments from each service that tie into the bootstrap metamodel:

The particular metamodel fragments added by CMP-ASS (available attributes) introduced in FIG. 44 add metamodel fragments to the metamodel as depicted in FIG. 48 (which depicts the added metamodel elements in bold). It is noted that the illustrated metamodel additions are only examples:

CMP-ASS1: A metamodel element requestor_identity (4810) is added to the metamodel, describing its nature and its inputs and outputs; a reference to the metadata of CMP-ASS1 is added to the element; associations are added to the Attribute, Requestor and Identity elements to categorize the semantics of the service.

CMP-ASS2: A metamodel element requestor_geolocation_position (4820) is added to the metamodel, describing its nature and its inputs and outputs; a reference to the metadata of CMP-ASS2 is added to the element; associations are added to the Attribute, Requestor and Geospatial elements to categorize the semantics of the service.

CMP-ASS3: includes 3 resource labels, resource_geolocation_position (4830), resource_task (4845), and resource_time (4850), which are added to the metamodel, describing its nature and its inputs and outputs; references to the corresponding parts of the metadata of CMP-ASS3 are added to the element; associations are added as follows: resource_geolocation_position to Attribute, Geospatial and Resource; resource_task to Attribute, Resource and a new metamodel element Task, which itself is associated with Operational; and resource_time to Attribute and Temporal.

Figure 49:
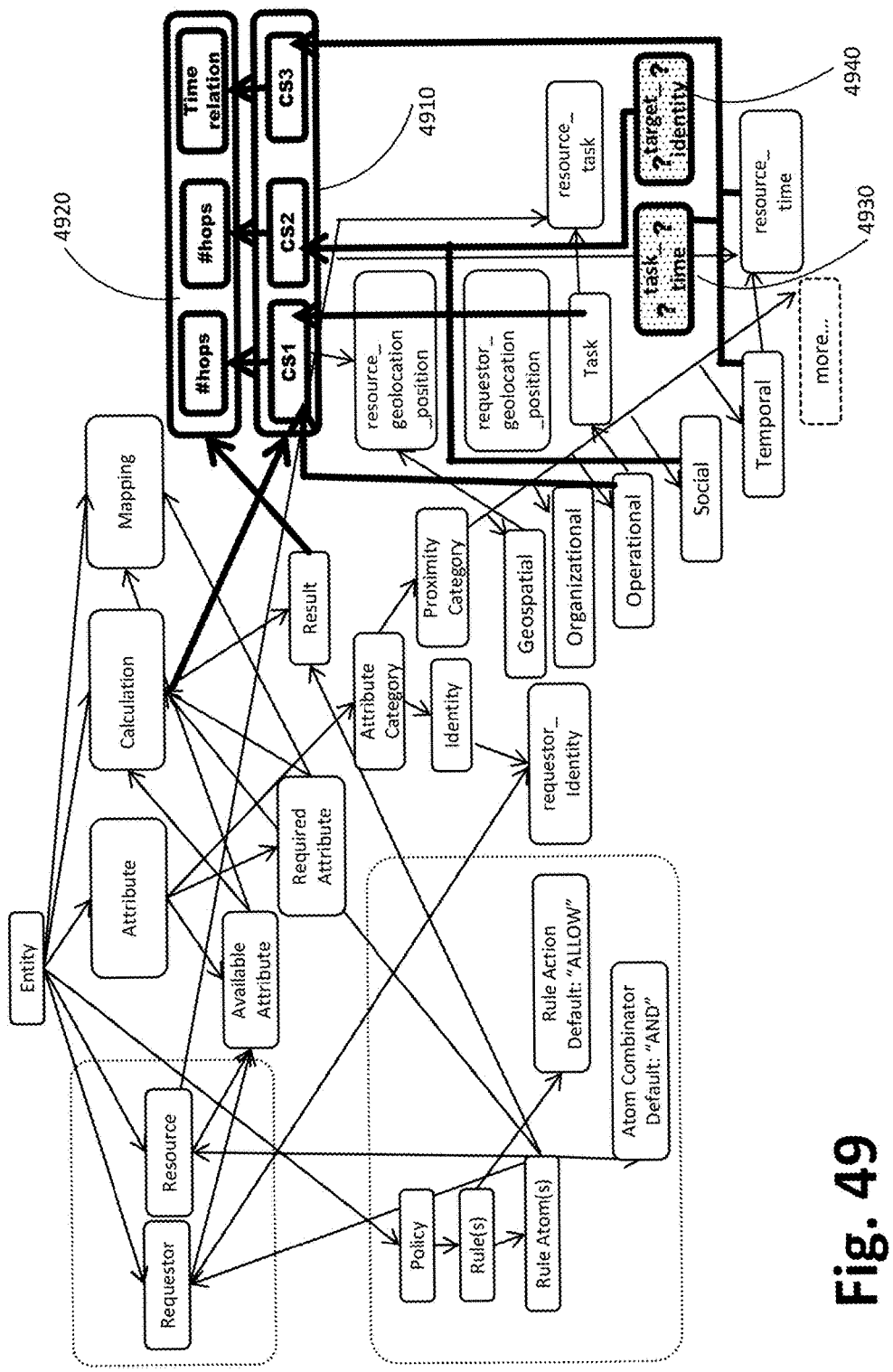
FIG. 49 illustrates a metamodel with added model entities and semantic associations for added calculation services of an example scenario according to an embodiment.

The particular calculation services introduced in FIG. 44 add metamodel fragments to the metamodel as depicted in FIG. 49, including relationships with the required attributes. As shown, not all "required attributes" are actually available at this stage (these are depicted by the shaded boxes with question marks). It is noted that the illustrated metamodel additions are only examples:

CMP-CS1: A metamodel element calculation service (4910) operational proximity is added to the metamodel; a reference to the metadata of CMP-CS1 is added to the element; associations are added to Calculation, Operational (input), Task (input), and Result for its output (4920) #hops to categorize the semantics of the service.

CMP-CS2: A metamodel element calculation service (4910) social proximity is added to the metamodel; a reference to the metadata of CMP-CS2 is added to the element; associations are added to Calculation, Social (input), target_identity (input), and Result for its output (4920) #hops to categorize the semantics of the service. It is noted that the target_identity input attribute (4940) is not "available" at this point, (i.e. not provided by any attribute services).

CMP-CS3: A metamodel element calculation service (4910) temporal proximity is added to the metamodel; a reference to the metadata of CMP-CS3 is added to the element; associations are added to Calculation, Temporal (input), task_time (input), and Result for its output (4920) Time_relation to categorize the semantics of the service. It is noted that the task-time input attribute (4930) is not "available" at this point, (i.e. not provided by any attribute services).

Figure 50:
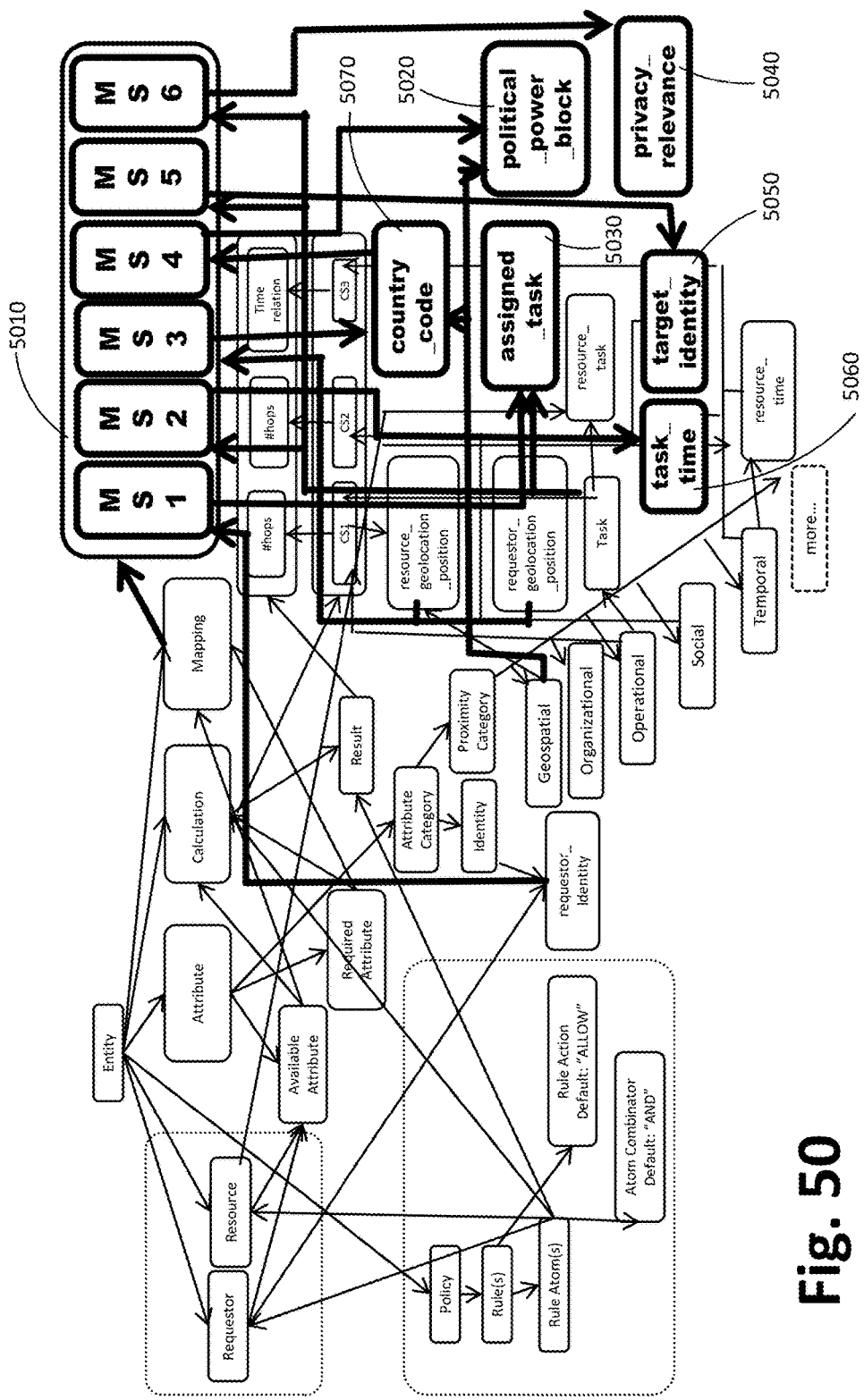
FIG. 50 illustrates a metamodel with added model entities and semantic associations for added mapper services of an example scenario according to an embodiment.

The particular mapping services introduced in FIG. 44 add metamodel fragments to the metamodel as are depicted in FIG. 50. It is noted that the abovementioned missing attribute services are now available thanks to the mappings. Also again it is noted that the illustrated metamodel additions are only examples:

CMP-MS1: A metamodel element mapping service (5010) identity→assigned_task is added to the metamodel; a reference to the metadata of CMP-MS1 is added to the element; associations are added to Mapping, requestor_identity (input), a new element (5030) assigned_task (output), to categorize the semantics of the service.

CMP-MS2: A metamodel element mapping service (5010) task→time window is added to the metamodel;

a reference to the metadata of CMP-MS2 is added to the element; associations are added to Mapping, Task (input), a new element (5060) task time (output), to categorize the semantics of the service.

CMP-MS3: A metamodel element mapping service (5010) geolocation_position→country code is added to the metamodel; a reference to the metadata of CMP-MS3 is added to the element; associations are added to Mapping, requestor_geolocation_position (input), a new element (5070) country_code (output), to categorize the semantics of the service.

CMP-MS4: A metamodel element mapping service (5010) country code→political power block is added to the metamodel; a reference to the metadata of CMP-MS4 is added to the element; associations are added to Mapping, country_code (input), a new element (5070) political_power_block (output), to categorize the semantics of the service.

CMP-MS5: A metamodel element mapping service (5010) task→target_identity is added to the metamodel; a reference to the metadata of CMP-MS5 is added to the element; associations are added to Mapping, Task (input), a new element (5050) target_identity (output), to categorize the semantics of the service.

CMP-MS6: A metamodel element mapping service (5010) task→privacy_relevant is added to the metamodel; a reference to the metadata of CMP-MS6 is added to the element; associations are added to Mapping, Task (input), a new element (5040) privacy_relevance (output), to categorize the semantics of the service.

The described metamodel additions are only simplified examples, in real-world implementations there are most likely more associations, and more precise ones.

Figure 51:
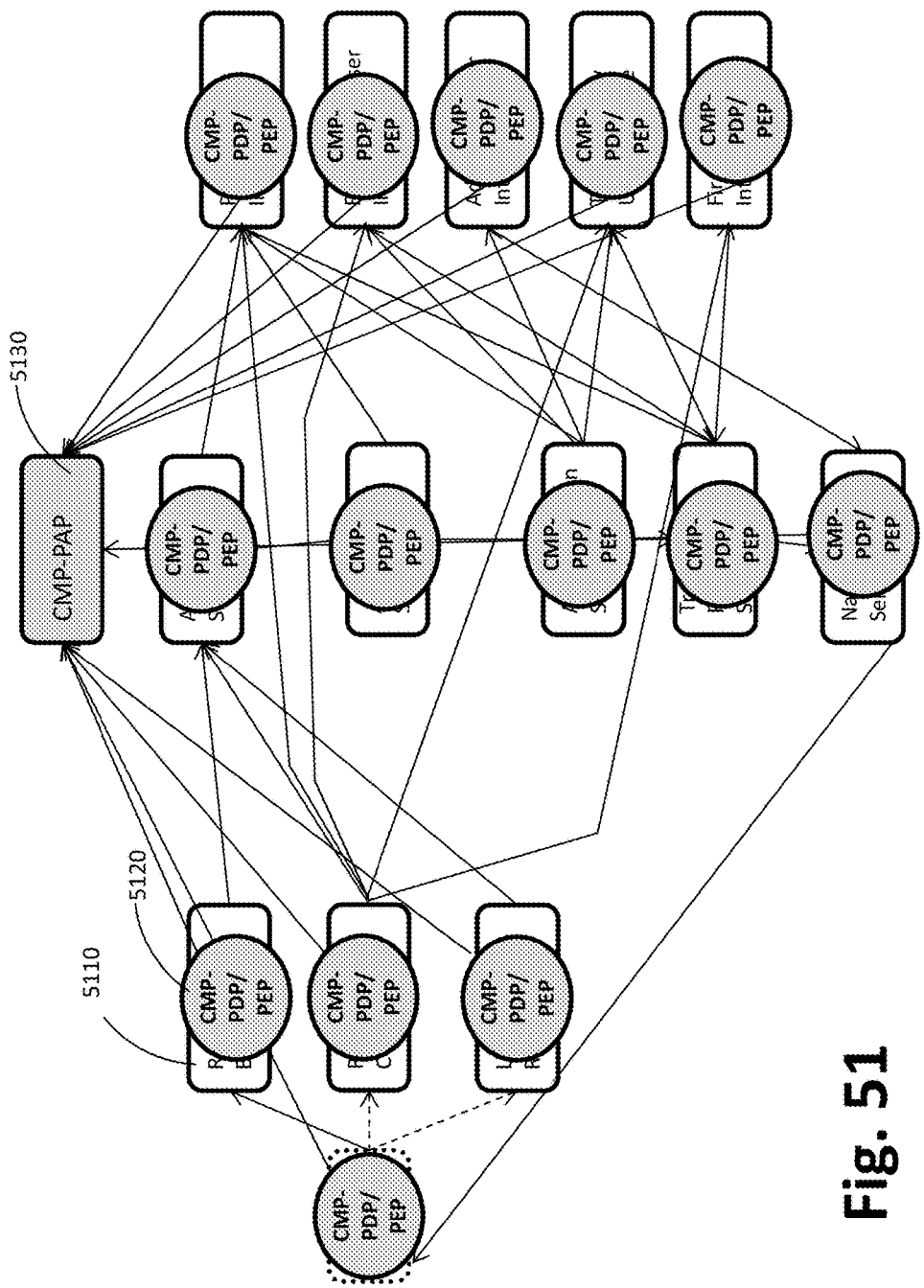
FIG. 51 illustrates a functional application diagram with added CMP-PAP, CMP-PDPs, and CMP-PEPs of an example scenario according to an embodiment.

Also, CMP-PEPs/CMP-PDPs launch, and CMP-PDPs connect to CMP-PAP. In this example, as depicted in FIG. 51, whenever an application (Protected SoS node) is started, the CMP-PDP and CMP-PEP automatically also start, and the CMP-PDP registers itself with CMP-PAP. A CMP-PEP/PDPs (e.g. 5120) resides on each node (e.g. 5110) of the Protected SoS, and their connections with CMP-PAP (5130) (it is noted that in this example, there is only one global CMP-PAP). Once "low level" technical rules are generated, CMP-PAP distributes the technical rules to CMP-PDPs based on where they are relevant. An alternative approach would be to distribute all rules to all CMP-PDPs and let each CMP-PDP determine which rules are relevant and decidable. This simpler design would be less scalable and less performant in most cases. In this example's simple deployment scenario, CMP-PDP/PEPs only control inbound requests to resources, i.e. enforce policy on inbound information flows, assuming that the inbound request sufficiently determines the information put in the response. In another embodiment, CMP-PDP/PEPs also control outbound information flows, and there are CMP-PDP/PEPs on the requestor side and resource side, thus minimizing the risk of information leakage.

CMP-PDPs also connect to CMP-ASS/CS/MS. In this simple example, all CMP-PDPs connect to all available CMP-ASS/CS/MS (this may be a preferred design choice if there is only one centralized CMP-PDP). In other embodiment with many CMP-PDPs and many CMP-ASS/CS/MS, it may be preferable to only connect to the CMP-ASS/CS/MS that are actually needed to decide the policy. In that other embodiment, the connection information (i.e. which CMP-PDP to connect to which CMP-ASS/CS/MS) is communicated by CMP-RSC to the CMP-PDPs after CMP-MDS rule generation—based on which attributes, calculations, and mappings are used by the "low level" policy rules. In that other embodiment, for example, if the Aggregation Server's CMP-PDP only receives a rule that checks operational (CMP-CS1) and temporal (CMP-CS3) proximity, then there may be no need to connect to CMP-CS2 (social proximity). However, this can be determined by CMP-RSC after CMP-MDS has generated the rules for each CMP-PDP (further discussed below).

CMP-AEC and CMP-PE also launch. An important feature of the automatically configured editor is that only supported calculation functions are offered (in the screenshots illustrated in FIGS. 22-31, these are standard functions, rather than the PBAC CMP-CS1/CS2/CS3), and only attributes are selectable—in pull-down menus—that are both available (directly or mapped attribute services) and at the same time required (by the calculation function). However, it is noted that CMP-AEC can configure refined attributes and rule elements to CMP-PE after CMP-MMR calculated the refinements.

In this example, calculations are available for two types of rule elements: Firstly, simple two-attribute rule elements: attribute, calculation, result comparison value; secondly, proximity-based two-attribute rule elements: attribute, attribute, calculation, result comparison value. Furthermore, the editor supports the rule element combinators "AND" and "OR", and actions "allow" or "log" (deny is unnecessary in this example and introduces the risk of rule conflicts), and "default deny", i.e. if no rule can be found by a CMP-PDP to evaluate to "allow", it applies a "default deny" rule (and sends an alert to CMP-PMR).

CMP-FDS also launches, and in this example, CMP-FDS now reads the functional model (which was already presented in the configuration section) from the Eclipse model-driven service integration tool. In another embodiment, CMP-FDS automatically detects the functional model by tapping into a "DDS discovery service" (offered by some DDS middleware vendors) that keeps track of all Protected SoS nodes (which are DDS nodes) and their interactions.

CMP-OSC also launches, and—in this example—does not require anything further at this point: CMP-OSC has already been explicitly configured to connect to MS Windows firewall on each node, and configure relevant network connections to be enabled.

Furthermore, CMP-PMR launches and starts listening to incoming alerts.

Moreover, CMP-PSV is launched in accordance with the MDSA Patent (including e.g. CMP-PSV connecting to CMP-MMR, CMP-MDR, CMP-PE, CMP-MDS, CMP-PMR, CMP-FDS).

CMP-MMR Launch: Attribute Refinement (an example of PFF refinement): CMP-MMR can now (and later in the face of changes, for example, to the MDS System or the Protected SoS) determine attribute refinement chains to produce (as much as possible) the required attributes from available attributes. To do this, it uses information in the metamodel and various other relevant information, including for example metadata in CMP-MDR (esp. to ensure that mappings can be syntactically integrated), rule refinement templates in CMP-MDS (esp. to obtain "required attributes") etc. As depicted in FIGS. 48, 49, and 50, two "required, but not available" attributes are now available in a mapped form, and four additional mapped attributes are available. It is noted that in another embodiment, calculations could also be chained/mapped in the same way as the illustrated attribute mappings—however this is not illustrated in this example in order to not overcomplicate the example. Furthermore, these simplified diagrams omit various standard calculation services in order to not overcomplicate the example. For example, Boolean operations on strings, and numeric operations are available. The diagram also omits various standard attributes which are available, such as current time, and standard mappers, such as string operations, type conversions etc. In summary, by traversing the resulting metamodel, CMP-MDS with CMP-MMR & CMP-MDR can calculate all available attribute refinement paths (and calculation refinement paths).

FIG. 52A-52C illustrate three generated attribute refinement paths. FIG. 52A depicts an attribute refinement path that enables to easily check whether the requestor or resource are outside the EU (i.e. if requester.geospatial.political_power_block is not "EU"): CMP-ASS2 or CMP-ASS3 (5211) provide the available attribute GPS position (5212) for requestors and resources, respectively; CMP-MS3 (5213) provides an available mapping to Country (5215), which is mapped by CMP-MS4 (5216) to Political Power Block (5217); Political Power Block (5217) is feeds into the calculation function "Location=power block" (5219) (standard string comparison).

The attribute refinement path in FIG. 52B and FIG. 52C, respectively, allow to intuitively check whether a requestor's and/or a resource's task are privacy relevant, i.e. handling personally identifiable information (PII). In FIG. 52B, the requestor's identity (5222), which is available from CMP-ASS1 (5221), is mapped to by the available mapping CMP-MS1 (5223) to Task (5225), which in turn is mapped by the available mapping CMP-MS6 (5226) to Task Privacy Relevance (5227), which feeds into the calculation function "Task=privacy relevant?" (5229) (standard string comparison). In FIG. 52C, the resource's task (5235) available from CMP-ASS3 (5233) is mapped by the available mapping CMP-MS6 (5236) to Task privacy relevance (5237), which feeds into the calculation function "Task=privacy relevant?" (5239) (standard string comparison).

Thanks to the attribute refinement, policy authors can now easily author intuitive policies to express for example that "requestors working on a privacy relevant task can only access privacy relevant resources (i.e. handling PII) if the resource resides outside the EU".

It is noted that that the MDS System is not at all limited to this particular example. Many services, paths, metamodels and the like can be designed to implement the MDS System in such a way that it allows the semantic mapping from intuitive policies to technical enforcement.

It is noted that at runtime, CMP-MMR (optionally) repeats the above connecting steps and/or loading step if any of the inputs (from CMP-FDS, CMP-PE, CMP-MDR, rule refinement templates) change.

An important design decision to make is whether attributes should be mapped at rule generation time (by CMP-MDS) or at runtime decision time (by CMP-PDP). The former (preprocessing) is often better for static mappings that do not result in too large values in the technical "low level" policy (e.g. "country code" to "political power block" is static and small), while the latter is often better for dynamic mappings, or mappings that would result in too large values in the technical "low level" policy (e.g. "country names" to "geospatial polygons" may be too large, and "identity" to "task" may be too dynamic). The runtime related section below will explain how these paths can be traversed to enforce these policies with the runtime available attributes and calculation services (GPS location, requestor identity, and resource task).

CMP-MDS Launch: Policy Rule Element Refinement Setup (CMP-MDS) (an example of PSF refinement): When CMP-MDS launches, it loads refinement templates (e.g., model transformation templates), including the example PBAC policy refinement template depicted in FIG. 46. In an embodiment, CMP-MDS now determines if inputs and outputs of the templates can be chained, creating policy rule refinement paths.

In an embodiment, CMP-MDS selects the rule elements at the top of each policy refinement path (single template, or chained), and provides them as "required rule elements" to CMP-MMR. In this particular embodiment, the assumption is that policy authors only want to author policies using the most generic, high-level rule elements. Similarly, CMP-MDS selects the attributes of those required rule elements and provides them to CMP-MMR as "required attributes". In another embodiment, attributes are explicitly marked "required" in the metamodel. In this particular embodiment, the assumption is that policy authors only want to author policies using the most generic, high-level attributes.

It is noted that at runtime, CMP-MDS (optionally) repeats the above step if any of the inputs (from CMP-FDS, CMP-PE, CMP-MMR/MDR, rule refinement templates) change.

Next, CMP-RSC is launched. Because of the particular setup in this example, CMP-RSC is not involved in deploying/connecting CMP-PEPs and CMP-PDPs, because these are started automatically when the application node with its middleware starts. Similarly, CMP-RSC is not involved in connecting CMP-PDPs with CMP-PAP. In this example, CMP-PDPs have a "call home" function that looks for the CMP-PAP on a known address/topic and connect to it (here: CMP-PAPs listen on a globally agreed DDS topic). In this example, there is only one CMP-PAP. In other embodiments where there are more CMP-PAPs, explicit configurations or a selection algorithm (e.g. connect to closest CMP-PAP on the network topology) would be required. If this feature is not part of the embodiment, in another embodiment CMP-RSE configures all CMP-PDPs by providing the connection information to CMP-PAP. This could also be done manually (e.g. using a manual CMP-RSE configuration feature)

In this example, CMP-RSC connects CMP-PDPs with available and required CMP-ASS, CMP-CS, and CMP-MS. Various embodiments are possible, for example:

1) Based on CMP-MDR Only, Connect to all Available Services:

In this example, the metadata includes all information needed: CMP-RSC obtains connection information (metadata) from CMP-MDR for all CMP-ASS/CS/MS; it then sends the connection instructions (and configurations) for all CMP-ASS/CS/MS to the CMP-PDP, which sets up the connections. In this example, the metadata also includes the names of services used in the "low level" rules, so the CMP-PDP knows which component to call to fetch information (attributes, calculations, mappers).

2) Based on CMP-MDR & CMP-MMR:

In another embodiment, the metadata in CMP-MDR does not include the names used in the "low level" rules for the various components. In this case, CMP-RSC also obtains metamodel information from CMP-MMR about the semantics of all CMP-ASS/CS/MS; it uses this information to determine the names used in the "low level" rules for the various components, and sends this information to CMP-PDP.

3) Only Connect to Needed Services:

In this example, there are only a few CMP-ASS/CS/MS, so it is easiest to connect all CMP-PDPs to all CMP-ASS/CS/MS. In other embodiments with many CMP-ASS/CS/

MS, it may be preferable to only connect to the CMP-ASS/CS/MS that are actually needed to decide the policy. In such embodiments, the connection information is communicated by CMP-RSC to the CMP-PDPs after CMP-MDS rule generation—based on which attributes, calculations, and mappings are used by the "low level" policy rules.

4) Based on Manual Configuration:

In another embodiment, the administrator manually configures the connection with CMP-PDPs with available and required CMP-ASS, CMP-CS, and CMP-MS (e.g. using a manual CMP-RSE configuration feature)

5) Policy Authoring

In this example, policies are authored using a web page based CMP-PE, and CMP-PE is automatically configured by CMP-AEC. CMP-PE consists of a PHP web application server that serves the web pages to the policy author's web browser. This design is very flexible with respect to the visualization.

CMP-AEC, based on the metamodel from CMP-MMR (which has been populated by taking into account the metadata from CMP-MDS), produces a configuration file and provides it to the CMP-PE (on the web application server). CMP-PE's web application server uses PHP to dynamically render the policy authoring web page based on that configuration file Policy authors (client-side) direct their web browser to the CMP-PE web server URL, and author access rule(s) using the web interface. CMP-PE (server-side PHP) receives authored policy information from web browser via HTML forms for example, stores it in a file, processes it into a model format (e.g. XMI) and sends it to CMP-MMR (which stores the model).

FIGS. 22-31 illustrate various example screenshots how an example policy rule could be constructed using a web browser frontend. This is only one embodiment of many. The web page is dynamically rendered using PHP, a server-side webpage scripting language that can dynamically render based on configuration files produced from the metamodels and metadata in CMP-MMR & CMP-MDR.

An important feature of the automatically configured editor is—in this embodiment—that only supported calculation functions are offered (in the screenshots these are standard functions, rather than the PBAC CMP-CS1/CS2/CS3), and only attributes are selectable—in pull-down menus—that are both available (directly or mapped attribute services) and required (by the calculation function). In the example, available PBAC calculation services functions are selectable in the policy editor's pull-down menus (not depicted in the screenshots) because CMP-CS1/CS2/CS3 are available, and because their respective required attributes are available (directly or mapped).

It is noted that this description illustrates only one example.

Based on CMP-AEC, some PBAC examples of rule elements that are configured by CMP-AEC in CMP-PE and that can be authored in the browser GUI include (in pseudo notation):

"proximity.operational.task (requestor.task, resource.task)<=2"

In this case, the refinement feature can easily traverse the refinement paths in the metamodel to determine that requestor.task is a mapped attribute and carry out the mapping. The same semantics can be expressed using:

"proximity.operational.task (requestor.identity, resource.task)<=2"

In this case, the refinement feature can determine that requestor.identity is not a matching required attribute for the calculation, but that a mapping path to requestor.task is available (and refine the attribute).

Some other PBAC policies supported by the example include (in pseudo notation):

"proximity.social.target (requestor, resource)<=3", or "proximity.social.target (requestor.task, resource.task)<=3", or "proximity.social.target (requestor, resource.task.target_identity)<=3", etc.

The following illustrates a more complex calculation, which checks that the requestor's task time window is a superset of the resource's time window by at least 3 hours earlier and 5 hours after:

"proximity.temporal.window-within (requestor.task, resource.time) (−3 h, +5 h)", or "proximity.temporal.window-within (requestor.task.time, resource.time) (−3 h, +5 h)", etc.

Some other example policies have already been discussed earlier in the "Use Case Policies" section.

In this example scenario, CMP-PE is configured by CMP-AEC such that the policy user is only presented with the most mapped (i.e. most generic/high-level) attributes for calculations. In the example, CMP-AEC should list those attributes and calculations first in the list of selections because they are assumed to be closer to human thinking. For example, rather than comparing GPS coordinates to hardcoded polygons, a privacy policy can now be expressed using the intuitive, simple statements such as "access to personally identifiable information is only granted outside the EU". In another embodiment, CMP-AEC configures CMP-PE allow the selection of all the different attributes from each level of the refinement paths. This may be overkill for many implementations—often it is safe to assume that the user is only interested in authoring policies using the highest available attributes for a calculation (e.g. if a calculation is about PII relevance of tasks, just offer "PII-relevant task" in the editor, vs. also offering the less-mapped attributes "task", "identity" etc. It depends on the particular embodiment which design choice is preferable. In another embodiment, attributes are explicitly marked as "required".

In other embodiments, policies are (alternatively or additionally) directly authored in metamodels (CMP-MMR or machine-enforceable rules (CMP-PAP).

6) Rule Generation (Using CMP-MDS): "Rule Refinement" PBAC Example (an Example of PSF Refinement)

This section illustrates two aspects: 1) the use of PBAC policies, and 2) policy rule refinement.

In the example, CMP-MDS loads a PBAC rule refinement template (an example of PSF refinement) depicted in FIG. 46. As opposed to attribute refinement (an example of PFF refinement) using CMP-MS, which essentially replaces attributes by refined attributes, rule refinement actually changes the form of the generated rule(s). The loaded template (which in this example is stored in CMP-MMR) shows at the top that a rule element can be made up of a simple element "Proximity" with a percentage value, signifying some proximity (e.g. between requestor and resource). Therefore, "high level" rule element can be authored as follows (in pseudo notation):

"(Proximity(requestor, resource)>80%)"

It is noted that realism is not a goal for this example, but the goal is rather to illustrate in simple terms how PBAC policies work, and how rule refinement works. It may not be a good design decision in certain scenarios to go with such highly generic policies that abstract nearly everything away, because policy authors may not be able to grasp the implications of, for example, a "80% proximity" policy applied system-wide—it may be preferable in certain scenarios to support more fidelity, such as allowing the authoring of policies on the middle layer in the above diagram.

Figure 47:
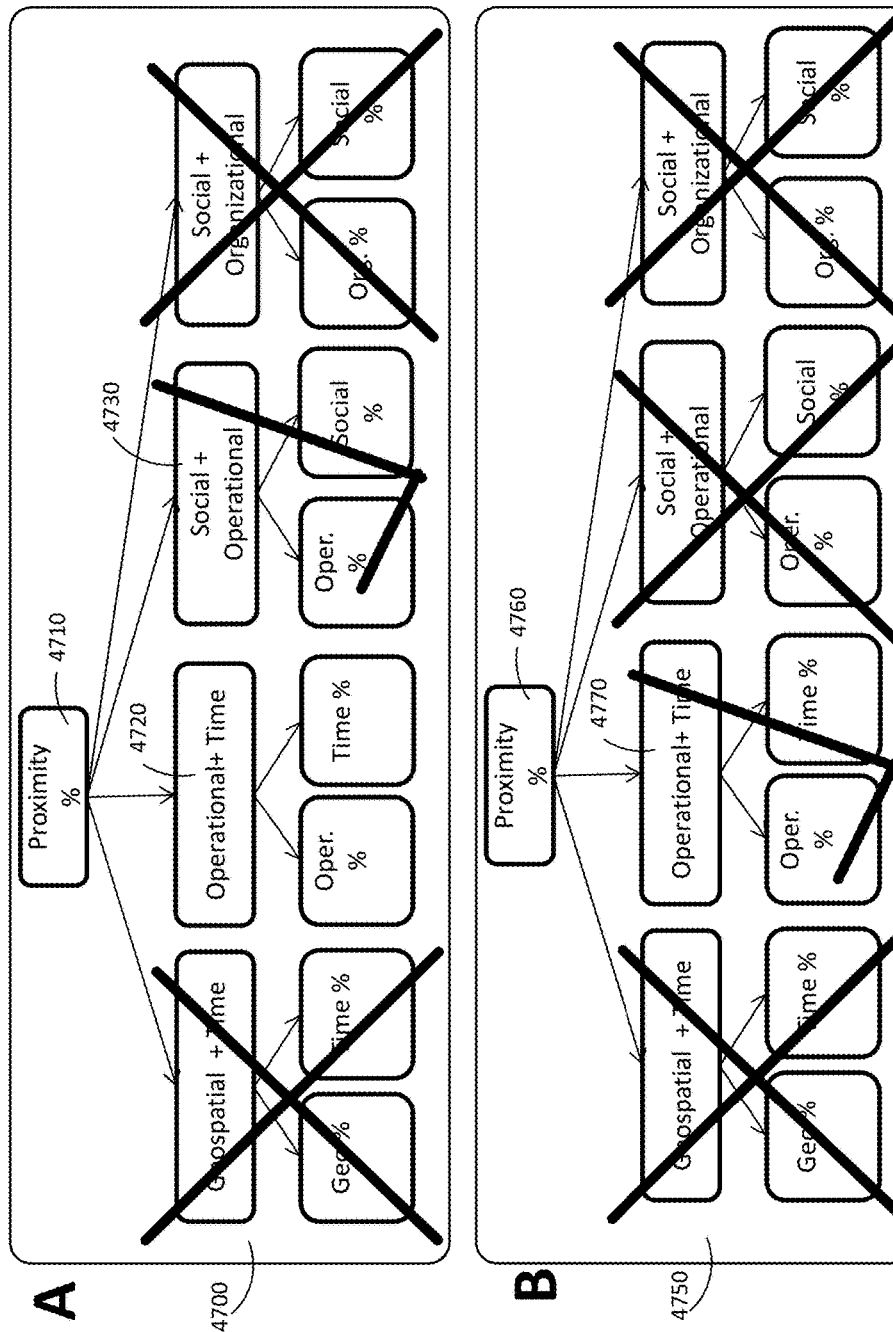
FIG. 47 illustrates two different selections of refinement paths through a policy rule element refinement template of an example scenario according to an embodiment.

Because there is no mapping "Proximity" as such provided by any CMP-CS in the example, the rule refinement template is analyzed by CMP-MDS, to see if any of the four possible combinations (i.e. paths through the tree) of available calculation services could be used to calculate Proximity. In the example, there are three PBAC calculation services, depicted in FIG. 44. Because there is no geospatial PBAC CMP-CS or any organizational PBAC CMP-CS, (as depicted in FIG. 47A) only two combinations can be calculated for "Proximity %" (4710) from the template (4700): "Operational+Time" (4720), and "Social+Operational" (4730). The CMP-MDS rule generation algorithm (in this example, a model transformation workflow) picks a path through the rule refinement template. If there is only one path, the choice is obvious. If there is more than one path—like in this example—based on configurable criteria, it selects one path (e.g. based on attribute reliability, performance), use both and combine the results, or either one of the available choices. For the sake of simplicity, the particular CMP-MDS implementation in this example picks the "Social & Operational" refinement and drops the other available path (Operational+Time), as depicted in FIG. 47A.

The rule refinement starts as follows (Note: all policy fragments in this example description are presented in a simple pseudo notation):

(Proximity(requestor, resource)>80%)

It proceeds in two steps because of the layers of the particular template used. The first step selects the broad PBAC categories (in pseudo notation):

(Proximity.social (requestor, resource)>80%) AND (Proximity.operational (requestor, resource)>80%))

The second step refines the policy to the following technical rule, by matching with available CMP-CS, and using the next step in the rule template (in pseudo notation):

```
( CMP-CS2 (
CMP-MS5 ( CMP-MS1 ( requestor.identity)),
CMP-MS5 ( resource_label_task )
) < (10 - 80 / 10)
)
AND
( CS1 (
CMP-MS1 (requestor.identity), resource_label_task )
< (4 - 80 / 25)
)
```

The rule generation algorithm—in this example—rounds to:

```
( CMP-CS2 (
CMP-MS5 ( CMP-MS1 ( requestor.identity)),
CMP-MS5 ( resource_label_task )
) < 2)
)
AND
( CS1 (
CMP-MS1 (requestor.identity), resource_label_task )
< 1)
)
```

It is noted that in this example, generated rules include explicit reference to the calculation service. This is not necessary, and in another embodiment the calculation service name could be based on a system-wide name/type space maintained by CMP-MMR in the metamodel (taking into account CMP-MDR metadata). In this case, any service could flexibly be replaced with another service that offers the same inputs and outputs and functionality. The refined rule would look the same as in this example; however, the reference to the CMP-CS and CMP-MS are not references to specific service instances but rather references to any service instance that meets the same name/type requirements (i.e. position in the metamodel) and metadata. In yet another embodiment, CMP-RSC provides configuration information for a list of potential services for the same category of service (e.g. several instances of CMP-MS1)—the CMP-PDP could then decide based on some criteria (e.g. performance, reliability, availability) which instance to connect to, and even change the connection later on (e.g. if the service level degrades).

In the example, the algorithm further refines the rule by replacing attribute names by references to the attribute service CMP-ASS:

```
( CMP-CS2 (
CMP-MS5 ( CMP-MS1 ( CMP-ASS1)),
CMP-MS5 ( CMP-ASS3-item-2 )
) < 2)
)
AND
( CS1 (
CMP-MS1 (CMP-ASS1), CMP-ASS3-item-2 )
< 1)
)
```

Figure 53:
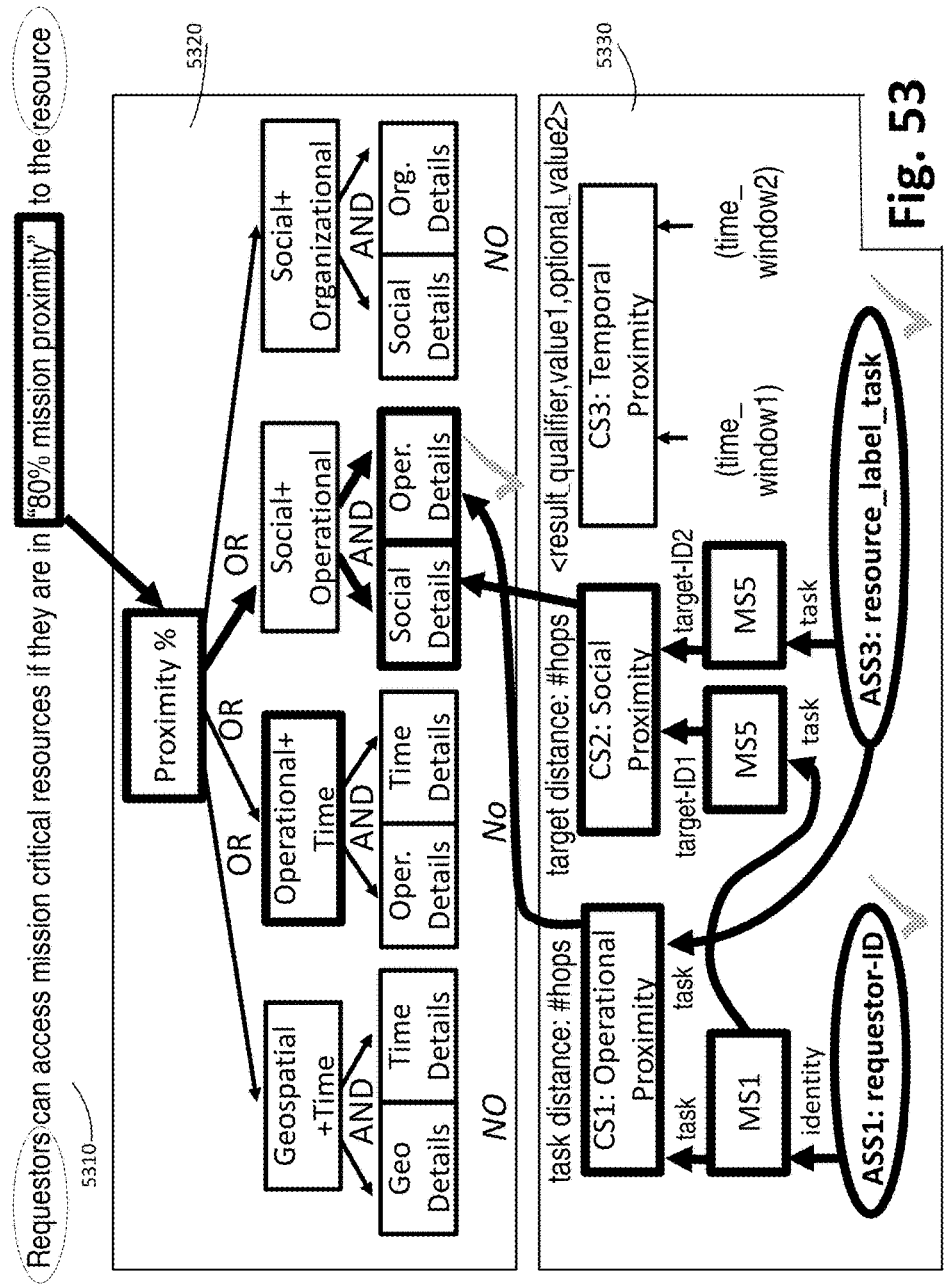
FIG. 53 illustrates diagram of rule element refinement and attribute refinement of an example scenario according to an embodiment.

The described refinement is intuitively summarized in FIG. 53, showing the high-level policy (5310) at the top, the already described rule refinement (5320) below, and the already described attribute refinement (5330) below that.

7) Rule Generation (Using CMP-MDS): "Attribute Refinement" Privacy Example (an Example of PFF Refinement)

Figure 52:
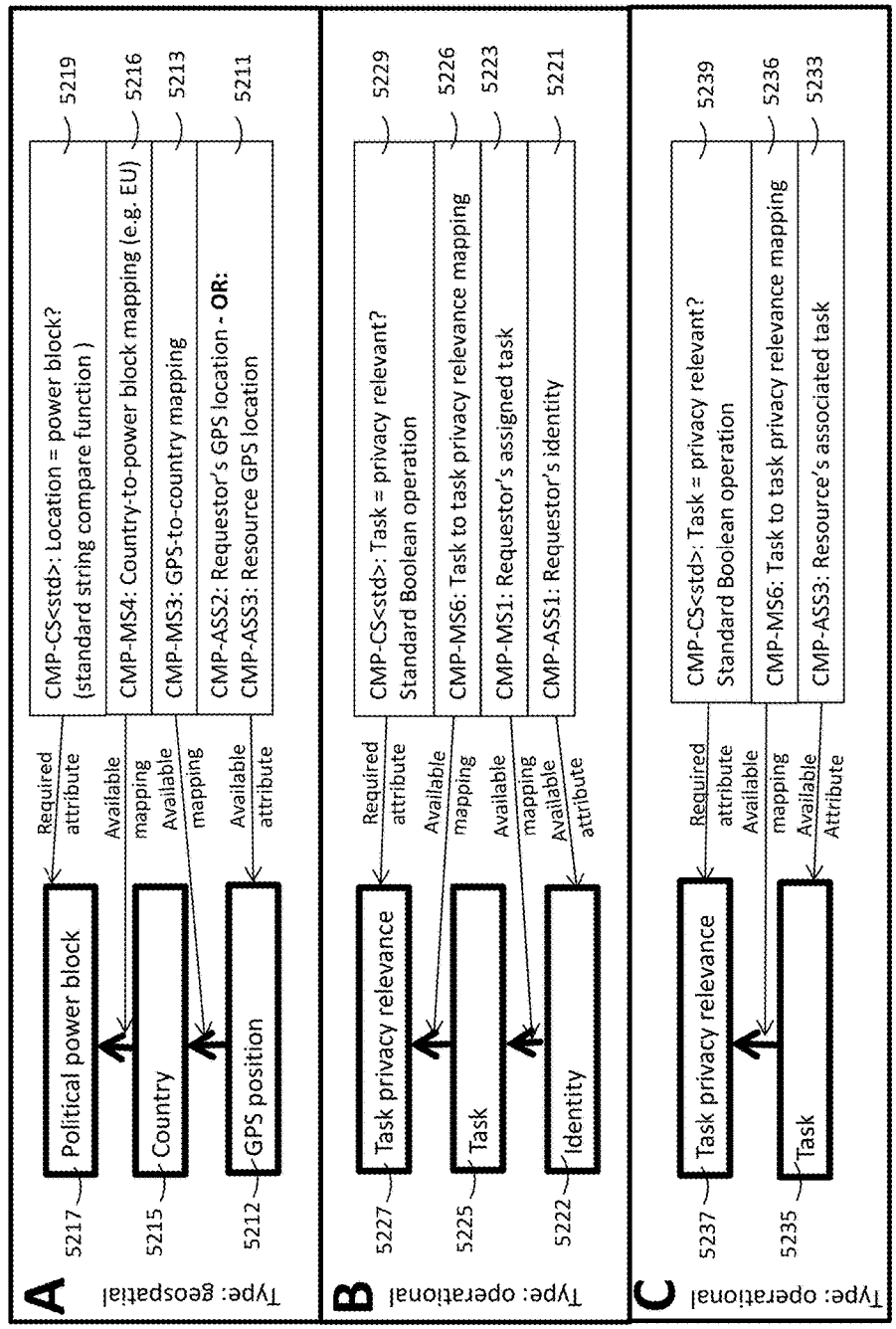
FIG. 52 illustrates 3 diagrams of attribute refinement of an example scenario according to an embodiment.

The (non-PBAC) refinement paths have been presented in the earlier (in the "Launch") section (depicted in FIG. 52, and it has been shown how CMP-AEC configures CMP-PE to allow the authoring of the following intuitive high-level privacy policy example:

"Requestors working on PII relevant tasks can only access Personal Identifiable Information (PII) resources if the requestor is not in the European Union (EU) and the PII resource is not in the EU."

It is not the goal to present a realistic policy, but to illustrate how the MDS System works.

Figure 55:
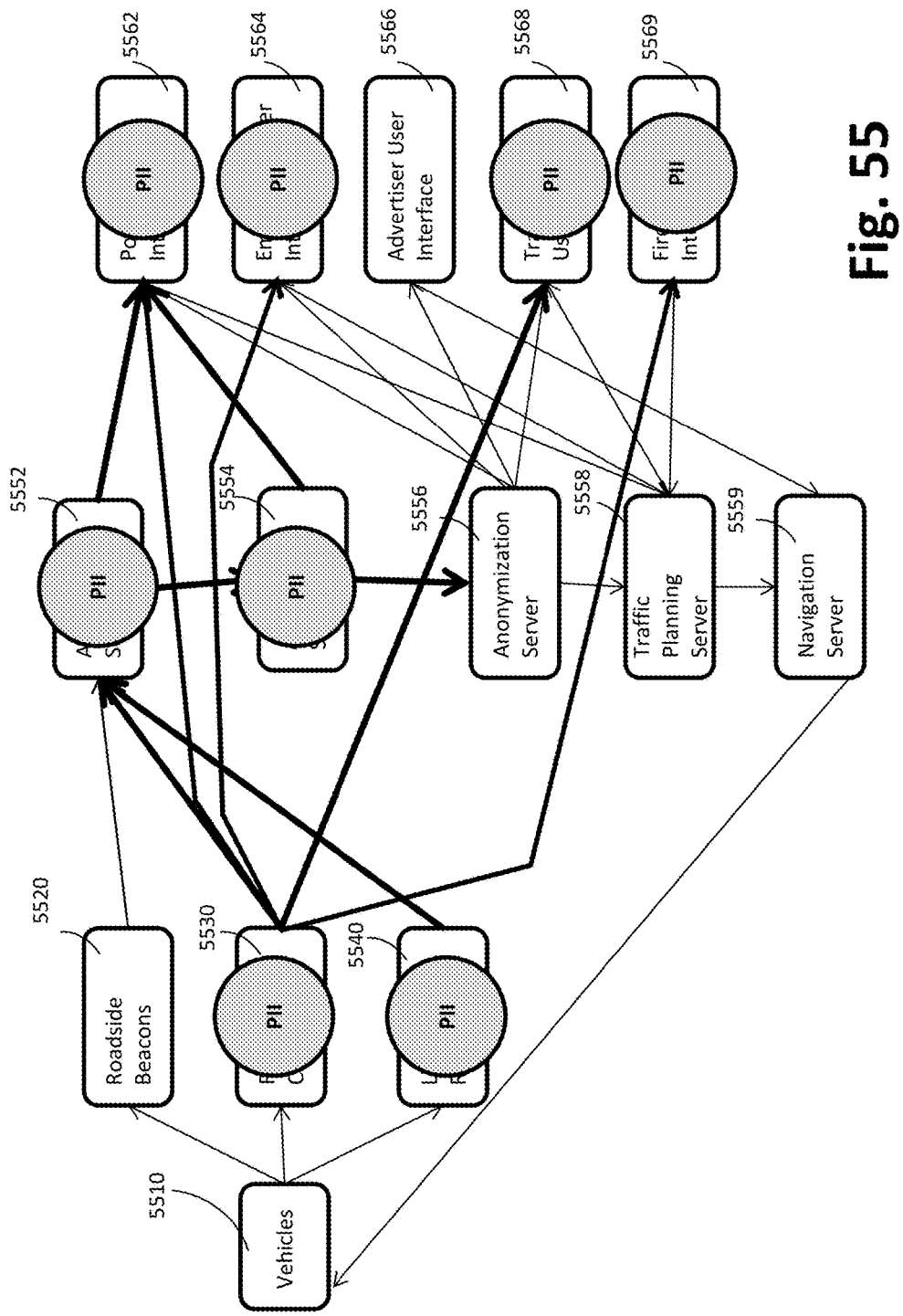
FIG. 55 illustrates a functional application diagram with added information about which systems process and transmit Personal Identifiable Information (PII) of an example scenario according to an embodiment.

In this simple example, policies are expressed and enforced on a coarse granularity regarding resources and their privacy relevance: Several Protected SoS application nodes provide data feeds which are (in this example) considered PII—therefore a resource is not a particular tagged document, but a particular tagged data source node as a whole (i.e. one PII label per node). Furthermore, in this example, these PII tags are static (i.e. the Aggregation Server is assumed—for policy purposes—to always provide PII (interactions marked in red & bold). Referring to FIG. 55, the PII relevant Protected SoS nodes of the example use case are: Roadside CCTV (5530), License Plate Recognition (5540), Aggregation Server (5552), Analytics Server (5554), Police User Interface (5562), Emergency User Interface (5564), Traffic Agency User Interface (5568), and Fire Dept. User Interface (5569), together with their PII relevant information flows (in this example: any information flow out of a PII relevant Protected SoS node). These PII labels form the data source for the resource side of CMP-MS6 (task-to-privacy-relevance), because the interactions between the nodes are interpreted as tasks. CMP-ASS3 provides the labels of a resource (resource_label_geolocation, resource_label_task, resource_label_time_window). PII labels for requestors are provided by chaining CMP-MS1 and CMP-MS6.

In another embodiment, the example could for example also be implemented using finer-grained resource labels as described above in this specification: For example, the Aggregation Server contains PII labeled records recorded from the Roadside Beacon, Roadside CCTV, and License Plate recognition system (e.g. labeled with geolocation, type of content, PII-relevance, time window etc.), then the MDS System could easily be modified to support the management of resource label based access control for each data item. CMP-PDPs can dynamically query such labels at decision time (or decide the policy via an outbound (resource-side) CMP-PEP that has access to the labels). An example policy for such a more fine-grained labeling approach would be: "police officers should only be able to access data from the Aggregation Server if the data's time window label overlaps at least 80% with the police officer's assigned task's time window" (note this is a simplified, not very realistic policy example to illustrate support for resource label policies).

It is noted that, for the sake of simplicity, the following discussion is based on the example with labels on a per-node granularity, not a per-content item granularity.

Figure 56:
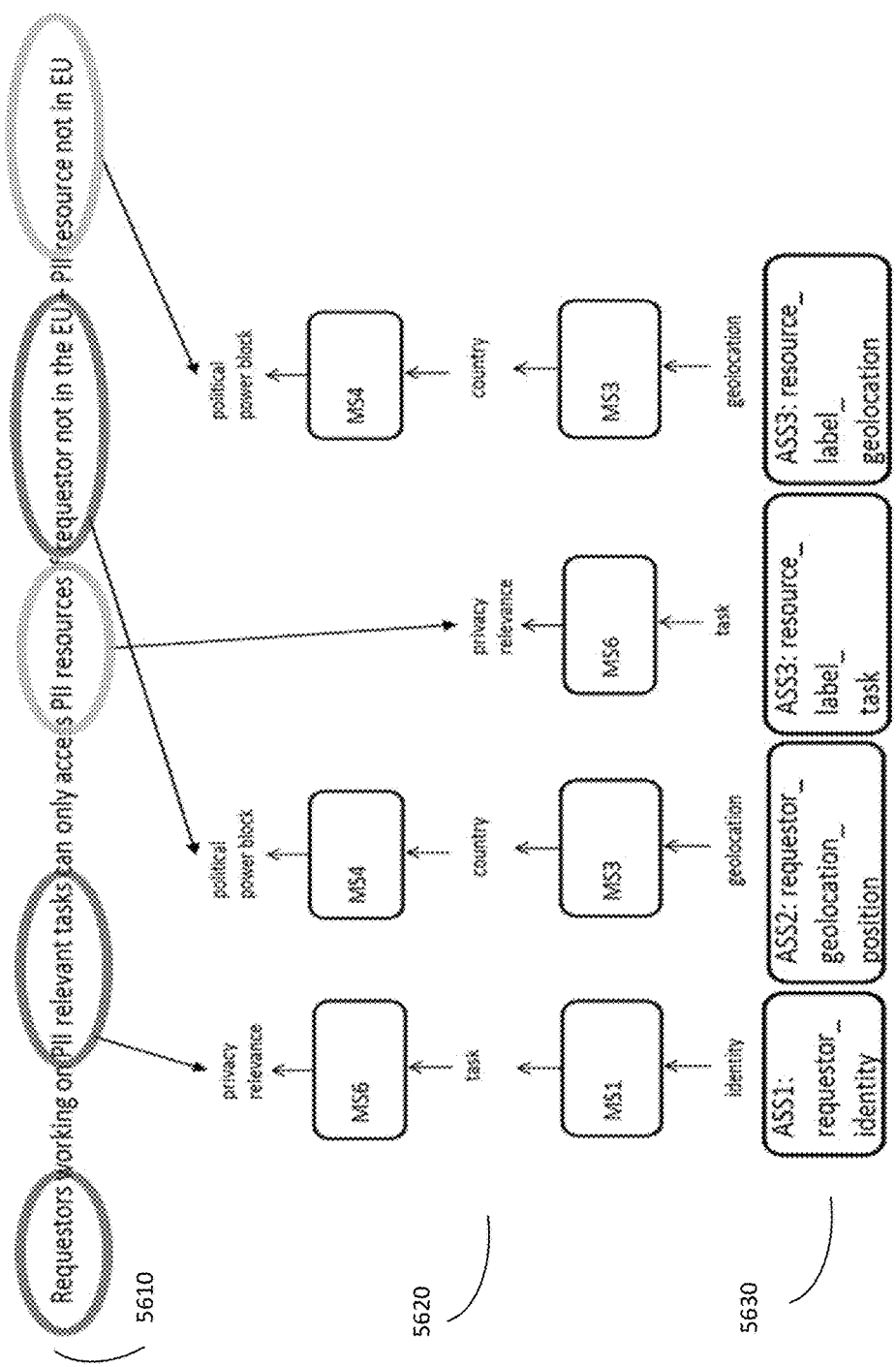
FIG. 56 illustrates diagram of attribute refinement of an example scenario according to an embodiment.

The described refinement is intuitively summarized in FIG. 56, showing the high-level policy (5610) at the top, the already described rule refinement mappings (5620) below, and the available attribute sources used (5630) below that.

Several CMP-ASS/MS/CS services need to be available in order to allow the actual attribute refinements. To illustrate the example, the following table explicitly lists all values provided by CMP-ASS3 (resource_task), which could be managed by a logistics system, dispatcher system etc.:

| CMP-ASS3: Resource-to-Task (per-node granularity, not per data item) | |
| --- | --- |
| Roadside Beacons node | Task "provide-vehicle-count" |
| Roadside CCTV node | Task "provide-live-video" |
| License Plate Recognition node | Task "provide-license-plate-numbers" |
| Aggregation Server node | Task "provide-aggregated-live-&-historic-data" |
| Analytics Server node | Task "provide-aggregated-analytics" |
| Anonymization Server node | Task "provide-anonymized-analytics" |
| Traffic Planning Server node | Task "traffic-planning-info+control" |
| Navigation Server node | Task "provide-navigation" |
| Police User Interface node | Task "detailed+live-info & control" |
| Emergency User Interface node | Task "detailed+live-info & control" |
| Advertiser User Interface node | Task "anonymized-info & display-ads" |
| Traffic Agency User Interface node | Task "detailed+live-info & control" |
| Fire Dept User Interface node | Task "detailed+live-info & control" |

To illustrate the example, the following table explicitly lists all values mapped by CMP-MS6 from tasks to privacy relevance:

| MS6: Task-to-privacy relevance | |
| --- | --- |
| Task "provide-vehicle-count" | not privacy relevant |
| Task "provide-live-video" | privacy relevant |
| Task "provide-license-plate-numbers" | privacy relevant |
| Task "provide-aggregated-live-&-historic-data" | privacy relevant |
| Task "provide-aggregated-analytics" | privacy relevant |
| Task "provide-anonymized-analytics" | not privacy relevant |
| Task "traffic-planning-info+control" | not privacy relevant |
| Task "provide-navigation" | not privacy relevant |
| Task "detailed+live-info & control" | privacy relevant |
| Task "detailed+live-info & control" | privacy relevant |
| Task "anonymized-info & display-ads" | not privacy relevant |
| Task "detailed+live-info & control" | privacy relevant |
| Task "detailed+live-info & control" | privacy relevant |

The tables can be produced manually (e.g. by writing a table, or by tagging tasks to nodes), semi-automatically, or automatically (e.g. if the system description contains relevant metadata, e.g. DDS topic name implies the task associated with the data, and PII relevance per node is captured as depicted in FIG. 55.

CMP-MDS can now start from the abovementioned authored "high level" policy "requestors can only access privacy-relevant resources related to the requestor's privacy-relevant tasks (i.e. handling PII) if the requestor resides outside the EU", and generate a machine-enforceable policy rule.

Because CMP-PDPs reside on each to-be-protected node, CMP-MDS needs to generate numerous rules that need to be distributed to each CMP-PDP. These then get pushed only to the CMP-PDPs where they are relevant. In another embodiment with only one central CMP-PDP, each rule only needs to be generated once, and will automatically be applied to each relevant node (CMP-PEP calls CMP-PDP)—this alternative may be simpler, but may also be less robust.

Depending on whether rules should be refined at rule generation time or at runtime decision time, the refinement differs:

Refinement at rule generation time: On one extreme, carry out all the attribute refinements during rule generation, so that the rule can be decided faster at decision time. This is preferable for more static refinements that do not produce very large rule values (e.g. complex geospatial polygons would potentially make rules large. In the example, CMP-MDS can carry out the following refinement steps (in pseudo notation):

(requestor.geospatial.political_power_block !="EU") AND (requestor.organizational.task.privacy_relevance== TRUE) AND (resource.organizational.task.privacy_relevance== TRUE): ALLOW;

The first line could theoretically be refined using a theoretical reverse mapping of MS4:

(requestor.geospatial.country !=<list of strings of EU member countries>)

This can then be further refined using a theoretical reverse mapping of MS3. It is noted that, in this case, since the EU is a mostly contiguous geographic area, it would be feasible to program MS3 in such a way that a list of countries can be provided, and MS3 returns a set of polygons of the merged areas of the list of countries. Regardless, this would still be a large set of complex polygons:

(requestor.geospatial.geolocation !=<geospatial polygons of all EU member countries>)

While the described refinement template at rule generation time is theoretically possible, the described mapping does not appear a good implementation in for the particular example. The purpose is solely to illustrate the refinement at rule generation time (i.e. preprocessing all refinements).

The other two rule elements (a.k.a. rule atoms) can also be theoretically refined at rule generation time using a reverse mapping of CMP-MS6 first, and CMP-MS1 after that (in pseudo notation that omits the actual potentially large lists of values, and instead describes them):

```
    (requestor.organizational.task <is-within> <list of privacy relevant tasks>)
AND
    (resource.organizational.task. <is-within> <list of privacy relevant tasks>)
    (requestor.identity <is-within> <list of identities working on privacy relevant
tasks>) AND
    (resource.name <is-within> <list of resources associated with privacy relevant
tasks>)
```

The resulting fully refined (hypothetical) rule would potentially contain very large static "baked-in" lists, but could be decided by CMP-PDP with no interaction with CMP-MS (all mappings have been explicitly encoded statically into the rules) (in pseudo notation):

```
    (requestor.geospatial.geolocation != <geospatial polygons of all EU member
countries>)
    (requestor.identity <is-within> <list of identities working on privacy relevant
tasks>) AND
    (resource.organizational.task. <is-within> <list of resources associated with
privacy relevant tasks>)
```

It is noted that the purpose of this hypothetical example is presented to illustrate one extreme case of the refinement process. In most cases, it would not be a good design decision.

Refinement at runtime decision time: one the other extreme, carry out all the attribute refinements at decision time, so that rules stay small and generic. This is preferable for dynamic refinements and refinements that would produce too large rule values. In this example, CMP-MDS can carry out the following refinement steps (in pseudo notation):

```
    (requestor.geospatial.political_power_block != "EU")   AND
    (requestor.organizational.task.privacy_relevance == TRUE)    AND
    (resource.organizational.task.privacy_relevance ==
TRUE):   ALLOW;
    (It is noted that this policy only uses standard operators "!=","=="
and
standard comparison types STRING & BOOL ).
```

The above rule is then refined into the following rule, which specifies which mappings to use at runtime decision time:

```
( CMP-MS4 ( CMP-MS3 ( requestor.geospatial.geolocation ) )
!= "EU")   AND
( CMP-MS6 ( CMP-MS1 ( requestor.identity ) ) == TRUE)   AND
( CMP-MS6 ( resource.organizational.task ) == TRUE):   ALLOW;
```

This is a compact rule that can be decided by CMP-PDP by chaining various CMP-MS, which have to be dynamically queried at decision time (unless the CMP-PDP prefetches and caches the required CMP-MS data, which is theoretically possible but usually not realistic).

In another embodiment, distributed rules do not even specify the mappings, that is, the above high-level rule is distributed instead of the low-level rule. At decision time, CMP-PDPs query CMP-MDS (or CMP-MMR directly) to obtain the mapping specification. CMP-PDPs effectively carry out the above refined rule generation step at decision-time.

9) Rule Generation (Using CMP-MDS): "Generating Rules for Specific CMP-PDPs"

A particularly useful refinement use case is the refinement of many rules with the accessed resource "baked into" the rule. This is because in the case where there are CMP-PDPs for each resource (Protected SoS node) these rules can then be distributed only to the CMP-PDPs of the resources the rules pertain to. In this example illustrating "Refinement at rule generation time" above, there is a statement:

(resource.name<is-within><list of resources associated with privacy relevant tasks>)

Combined with some of the statements from the example illustrating "Refinement at runtime decision time" above, the particular refinement produced by this rule generation process is:

```
( CMP-MS4 ( CMP-MS3 ( requestor.geospatial.geolocation ) ) != "EU") AND
( CMP-MS6 ( CMP-MS1 ( requestor.identity ) ) == TRUE) AND
(resource.name <is-within> <list of resources associated with privacy relevant
tasks>)
```

In other words, only the resources are baked into the rules. CMP-MDS can now generate a separate rule for each resource that is in the list <list of resources associated with privacy relevant tasks> and generate a rule specific for the CMP-PDP of that resource:

```
( CMP-MS4 ( CMP-MS3 ( requestor.geospatial.geolocation ) )
!= "EU")   AND
( CMP-MS6 ( CMP-MS1 ( requestor.identity ) ) == TRUE)   AND
(resource.node.name == "Roadside CCTV"): ALLOW
( CMP-MS4 ( CMP-MS3 ( requestor.geospatial.geolocation ) )
!= "EU")   AND
( CMP-MS6 ( CMP-MS1 ( requestor.identity ) ) == TRUE)   AND
(resource.node.name == "License Plate Recognition"): ALLOW
```

```
( CMP-MS4 ( CMP-MS3 ( requestor.geospatial.geolocation ) )
!= "EU")  AND
( CMP-MS6 ( CMP-MS1 ( requestor.identity ) ) == TRUE)   AND
(resource.node.name == "Aggregation Server"): ALLOW
( CMP-MS4 ( CMP-MS3 ( requestor.geospatial.geolocation ) )
!= "EU")  AND
( CMP-MS6 ( CMP-MS1 ( requestor.identity ) ) == TRUE)   AND
(resource.node.name == "Analytics Server"): ALLOW
( CMP-MS4 ( CMP-MS3 ( requestor.geospatial.geolocation ) )
!= "EU")  AND
( CMP-MS6 ( CMP-MS1 ( requestor.identity ) ) == TRUE)   AND
(resource.node.name == "Police User Interface"): ALLOW
( CMP-MS4 ( CMP-MS3 ( requestor.geospatial.geolocation ) )
!= "EU")  AND
( CMP-MS6 ( CMP-MS1 ( requestor.identity ) ) == TRUE)   AND
(resource.node.name == "Emergency User Interface"): ALLOW
( CMP-MS4 ( CMP-MS3 ( requestor.geospatial.geolocation ) )
!= "EU")  AND
( CMP-MS6 ( CMP-MS1 ( requestor.identity ) ) == TRUE)   AND
(resource.node.name == "Traffic Agency User Interface"): ALLOW
( CMP-MS4 ( CMP-MS3 ( requestor.geospatial.geolocation ) )
!= "EU)  AND
( CMP-MS6 ( CMP-MS1 ( requestor.identity ) ) == TRUE)   AND
(resource.node.name == "Fire Dept User Interface"): ALLOW
```

It is noted that no rules are generated for Roadside Beacon, Anonymization Server, Traffic Planning Server, Navigation Server, Advertiser User Interface, because those resources do not provide/handle PII.

In this example, only a single rule is pushed to each CMP-PDP that decides access for privacy-relevant resources. Assuming in this simplified example that the resource name is used to access the resource, the "privacy relevant" attribute has been completely refined without increasing rule complexity at each CMP-PDP.

9) Rule Generation (Using CMP-MDS): "Interactions Based Rules"

Another useful refinement use case is the refinement of many rules that have the specified interactions from the CMP-FDS system description "baked in". It is a useful default policy (in addition to other authored policies) to only allow the interactions between nodes as specified in the functional system description (depicted in FIG. 43), and block all other attempted interactions (because these would be attacks).

For example, according to the functional system description, the "Analytics Server" node should only respond to data requests from the "Anonymization Server" and the "Police User Interface". Therefore, a policy rule element can be generated specifically for the Analytics Server's CMP-PDP that can be added to other policies governing those interactions:

```
(requestor.node.name == "Police User Interface") AND
(resource.node.name == "Analytics Server") AND ...
   <other rule elements
governing this interaction>:
   ALLOW;
(requestor.node.name == "Anonymization Server") AND
(resource.node.name == "Analytics Server") AND ...
   <other rule elements
governing this interaction>:
   ALLOW;
```

As depicted in the functional system description diagram earlier in this application, there are many interactions, and many rules will be generated by CMP-MDS. However, only some/few of the rules will need to be distributed to each CMP-PDP (i.e. only the rules with a "resource.node.name" matching the CMP-PDP location).

10) Rule Generation (Using CMP-MDS): "Finer-Grained Resource (Content) Label Policies"

As described earlier in this specification, instead of allowing/denying requests, and carry out other actions such as "alert", the MDS System can be used to author policies using attributes associated with the particular data returned (or otherwise associated with the resource).

For example, if a storage node contains all records of a police agency, and all records are labeled according to a known labeling scheme (e.g. "criminal record", "purchase record", "staff meeting record", . . . ), then access control can be determined also based on resource attributes derived from those labels. An example policy states that "only criminal investigators are allowed access to criminal records from the storage node". To decide this policy, a CMP-PDP in one embodiment fetches the requested record(s)'s labels and makes an access decision. In another embodiment, a CMP-PDP parses the response with the record(s), and blocks the response if the correct label(s) is not present. In yet another embodiment, the CMP-PDP itself requests the requested document(s), parses it for required labels, and blocks the access if the correct label(s) is not present.

In a modified example, if the Aggregation Server now contains labeled records recorded from the Roadside Beacon, Roadside CCTV, and License Plate recognition system (e.g. labeled with geolocation, type of content, PII-relevance, time window etc.) The MDS System may be modified to support resource label based access control (as described earlier). A specific high-level rule example is: "police officers should only be able to access data from the Aggregation Server if the resource's time window label overlaps at least 80% with the police officer's assigned task's time window" (note this is a simplified, not very realistic policy example to illustrate support for resource label policies). Assuming that there are three kinds of content stored in the Aggregation Server (e.g. video footage with geospatial tag, timestamp tag, identities of detected individuals; license plates with geospatial tag and timestamp tag, number of cars detected with geospatial tag and timestamp tag).

The MDS System may now (in this very basic example) generate three machine-enforceable fine-grained label-based rules (assuming the timestamps are not uniformly accessible) from the high-level rules for the three types of content, e.g. (in pseudo-notation):

```
If (<requestor.identity.task.time_window> <contains_time>
<video.timestamp>): ALLOW
   If (<requestor.identity.task.time_window> <contains_time>
<licenseplate.timestamp>): ALLOW
   If (<requestor.identity.task.time_window> <contains_time>
<number_cars.timestamp>): ALLOW
```

At decision-making time, the MDS System (esp. CMP-PEP and CMP-PDP, with additional features) can intercept all requests to the Aggregation Server, obtain the requestor's task's time window, and query the Aggregation Server about the timestamp tag for the accessed content. This query can be made by actually obtaining the content and examining it (and potentially caching it as a response if access is allowed), or—if supported—by querying a special interface on the resource that provides the labels for a specified resource (or set of resources). Based on the label, the MDS System can then make the decision using a particular temporal calculation function ("contains_time") provided by a temporal calculation service CMP-CS.

It is noted that there could be several complexities: For example, if a resource contains numerous labels (e.g. the resource is a spreadsheet with license plate numbers and timesstamp), then the MDS System may need to redact and/or filter the response (e.g. stripping out or randomizing all spreadsheet rows that are not within the time window). While filtering is often intuitive, redaction may be needed if e.g. the requestor should know that there is redacted content, or e.g. if the application processing the response would not be able to handle a filtered response (i.e. expects the content in a certain format). Another complexity could arise if the redaction/filtering needs to process the content in a complex way: for example, if video footage includes sensitive information, and requestors should only see certain sensitive information, then the redaction/filtering engine (or the resource, acting as a service to the redaction/filtering engine) may need to process the video to strip out the sensitive information.

It is noted that the present application is not limited to these examples.

11) Rule Generation (Using CMP-PPG): Predictive Policy Generation

The example uses several (basic) predictive policy generation methods:

Firstly, for example, based on configurations modeled in CMP-PPG, it assumes that it is safe to assume that all information flows defined by interactions in the functional system description should be allowed. It first presents such a generic policy to the user. However, the user states this is not entirely correct (note that this is a theoretical example): some information flows from Protected SoS nodes that receive PII are not allowed to send PII to other non-PII nodes, e.g. in FIG. 55, the Traffic Agency UI 5568 receives PII from Roadside Beacons 5530, but cannot send PII to the Traffic Planning Server 5558. CMP-PPG may therefore present individual access rules for all interactions, which the user can edit to add checks for PII. Alternatively, CMP-PPG may present the option to take other attributes into account for the interactions, and the user selects "PII", which allows CMP-PPG to automatically extend the generated rules by only allowing PII on the PII interactions (bold lines in FIG. 55), and not on other interactions.

In another example, CMP-PPG listens to alerts over time to "learn" behaviors, and generates proposed rules for requests which repeatedly happen but are blocked. It presents those rules to the policy author (with supporting information/warnings), so the policy author can enable any of the repeatedly-blocked interactions if they should be allowed. Similarly, it can detect allowed interactions that never seem to happen and present a rule (with supporting information/ warnings) to disallow those interactions explicitly.

In yet another example, CMP-PPG attempts to simplify policies, by "reverse-refining" policy rules, for example if the high-level policy has been authored (e.g. over time) to include numerous detailed machine-enforceable rules. For example, if the analysis finds out that in fact all interactions defined in the functional model are rules, and PII (in FIG. 55) is checked in every rule (depending on each interaction's PII-relevance, in accordance with FIG. 55), then it can apply several refinement templates (in the reverse direction, from low-level machine-enforceable rule to high-level policy) to each rule, to replace each low-level rule with its corresponding high-level policy. If several or all machine-enforceable rules end up corresponding with the same high-level policy, then the replacement of those rules with the corresponding high-level policy. In the example (assuming an ideal, and maybe not very realistic use case), all interaction-based rules can be merged into one high-level policy stating all PII interactions from the functional system description are allowed between PII requestors and PII resources", and all non-PII interactions from the functional system description are allowed between non-PII requestors and non-PII resources".

As an example of access control, if the policy author manually authored numerous "allow" rules between nodes of the "system of systems", and the analytics engine determines that an unqualified "allow" rule exists exactly for each interaction defined in the functional system description, then it can propose a rule "allow all interactions defined in the functional system description" instead of the numerous rules.

Other examples are apparent, e.g. fine-grained redaction filtering rules based on which particular PII content (e.g in the Aggregation Server) is requested: For example, a new interaction between (referring to FIG. 55) the Advertiser UI (5566) and the Roadside Beacon (5530) may be sensible for particular content that has no PII relevance (e.g. count of anonymous vehicles near an advertising billboard). Based on the "learned" knowledge (in the previous examples) that non-PII interactions may be generally allowed between non-PII requestors and non-PII resources, CMP-PPG may observe blocked requests from the Advertiser UI and the Roadside Beaconf for non-PII, and propose an "allow non-PII interaction" rule to the policy author accordingly.

It is noted that the present application is not limited to these examples.

12) Policy Deconfliction

Because this example generates too many rules for a discussion of each and every generated rule, this discussion only covers a sample subset of policies. It is obvious that the MDS System is not limited to only the presented policies and rules, and that the MDS System in this example will produce many more rules than the few presented examples.

As an excerpt, the following describes the policies that apply to the Aggregation Server's CMP-PDP.

In this example, as mentioned above, the following example policies apply to the Aggregation Server:

Policy 1: "requestors working on a privacy relevant task can access privacy relevant resources (i.e. handling PII) if the resource resides outside the EU";

Policy 2: "only the interactions between nodes that are defined in the functional system description are allowed";

Policy 3: Police user using the Police User Interface device is allowed access to resources on the Aggregation Server if within 70% proximity to the resource which is refined to: Police user using the Police User Interface device is allowed access to resources on the Aggregation Server if within 70% temporal (requestor task time window & resource time window) and operational (i.e. requestor task's target & resource's target) proximity to the resource;

Policy 4: "requestors on a User Interface node are only allowed access to resources if they are in at least 80% proximity to the requested resource".

It is evident that these policies are conflicting. For example, policy 1 restricts access that is allowed by policy 3 (assuming that 70% proximity is closer than e.g. EU/non-EU. Policies 3+4 also conflict (70% vs 80%).

If the CMP-PE editor allows the authoring of conflicting policies, the MDS System needs to have a policy conflict detection and deconfliction method (as described in the prior art, e.g., in U.S. Pat. No. 8,272,025 B1). Another approach is to sort the policies by certain common criteria (e.g.

requestor, resource etc.) and ask the policy author for manual deconfliction. For example, it is potentially a good deconfliction approach to assume that a more specific policy takes priority over a more general policy.

Assuming manual deconfliction, the policy author produces the following policies relevant to the Aggregation Service:

Policy 1: "requestors working on a privacy relevant task can access PII resources (i.e. Aggregation Server) if the resource resides outside the EU";

Policy 2: "only the interactions between nodes that are defined in the functional system description are allowed, but constrained by other, more specific policies";

Policy 3: police users using the Police User Interface device is allowed access to resources on the Aggregation Server if within 70% temporal (requestor task time window & resource time window) and operational (i.e. requestor task's target & resource's target) proximity to the resource;

Policy 4: "non-Police requestors on a User Interface node are only allowed access to resources if they are in at least 80% proximity to the requested resource".

The following shows the generated policy 1, further constrained by policy 2 (only showing the particular rule generated for the Aggregation Server):

```
( CMP-MS4 ( CMP-MS3 ( requestor.geospatial.geolocation ) )
!= "EU")  AND
( CMP-MS6 ( CMP-MS1 ( requestor.identity ) ) == TRUE)  AND
(requestor.node.name == "Police User Interface")  AND
(resource.node.name == "Aggregation Server"): ALLOW
```

Policy 3 is generated as follows:

```
( Proximity.operational ( requestor, resource) > 70% ) AND
( Proximity.temporal ( requestor, resource)> 70%) ) AND
(requestor.node.name == "Police User Interface") AND
(resource.node.name == "Aggregation Server"): ALLOW
(further refined to:)
( CMP-CS1 ( CMP-MS1 ( CMP-ASS1 ), ASS3-item-2 ) < 1 ) AND
( CMP-CS3 ( CMP-MS2 ( CMP-MS1 ( CMP-ASS1 ) ) ,
ASS3-item-3 ), "CMP-
CS3.time-window-difference" ) < 30% AND
(requestor.node.name == "Police User Interface") AND
(resource.node.name == "Aggregation Server"): ALLOW
```

Policy 4 is refined as follows (for all requestors except Police User Interface:

```
( Proximity.operational ( requestor, resource) > 80% ) AND
( Proximity.temporal ( requestor, resource)> 80%) ) AND
(requestor.node.name !== "Police User Interface") AND
(resource.node.name == "Aggregation Server"): ALLOW
(further refined to:)
( CMP-CS1 ( CMP-MS1 ( CMP-ASS1 ), ASS3-item-2 ) < 1) AND
( CMP-CS3 ( CMP-MS2 ( CMP-MS1 ( CMP-ASS1 ) ) ,
ASS3-item-3 ), "CMP-
CS3.time-window-difference" ) < 20% AND
(requestor.node.name !== "Police User Interface") AND
(resource.node.name == "Aggregation Server"): ALLOW
```

(Note:
This example assumes that CMP-CS3 offers a wide range of temporal operators for time window comparisons, including the one used here.)

13) Policy Testing

Testing of security policies is a large, well-established field of computer science. Numerous approaches can be applied to test different aspects of the MDS System, such as for example:

Using the approach described in the MDSA patent to analyze the system's (Protected SoS+MDS System) security effectiveness, by analyzing the correspondence between compliance models and e.g. detected incidents, enforced rules, policy models, functional system description etc. The MDSA patent describes how changes between captured snapshots can be detected, so that the analysis can focus only on changes (thus shortening re-accreditation time).

Testing the policy decision-making correctness of individual CMP-PDPs, for example by developing a suite of combinatorial test access requests that test all combinations of access request features, including malformed ones, and record the test results.

Developing model-based automated tests where test models specify preconditions and post-conditions of system (Protected SoS) behaviors, and a test suite is generated from those models.

A different example approach is to automatically observe the behavior of the running Protected SoS over a period of time, and recording the test results. A test suite can be produced that executes some or all possible behaviors of the Protected SoS to trigger potential policy violations and errors. This can for example be implemented by replicating the entire system (Protected SoS and MDS System) in a virtualized environment and monitoring what happens. Alternatively, the actual system could be executed through all test scenarios prior to production use. Alternatively, it is potentially possible to test new policies for the running production system by running two instances of the MDS System: (1) A test MDS System that implements the new policy for the Protected SoS, but instead of enforcing anything, records what it would enforce (e.g. denying access will be logged, rather than actually denying access). (2) The actual MDS System that actively enforces the current policy. However, it may be too time-consuming to execute every possible behavior; the virtualized system may not behave exactly like the production environment; the actual MDS System constrains the behavior of the Protected SoS (in line with the old policy) so that the test MDS System cannot detect certain issues with the new tested policy.

It is noted that these policy testing approaches are only examples.

In the example scenario, a combination of the MDSA patent approach implemented in CMP-PSV, together with running a virtualized replica of the Protected SoS are used. This combination is a good choice because CMP-PSV can produce compliance evidence usually required for systems handling PII, and the virtualized testing is very easy due to the small, homogeneous DDS-based Protected SoS (i.e. easy to install/maintain) that needs to be replicated.

14) MDS System Runtime (Service Connection, Policy Distribution, Decision/Enforcement)

This section discusses various runtime related aspects.

In an embodiment with many CMP-PDPs and many CMP-ASS/CS/MS, it may be preferable to only connect to the CMP-ASS/CS/MS that are actually needed to decide the policy. In such embodiments, the connection information is communicated by CMP-RSC to the CMP-PDPs after CMP-MDS rule generation—based on which attributes, calculations, and mappings are used by the "low level" policy rules. For example, if the Aggregation Server's CMP-PDP will only receive a rule that checks operational (CMP-CS1) and temporal (CMP-CS3) proximity, then there is no need to connect to CMP-CS2 (social proximity). This can be determined by CMP-RSC after CMP-MDS has generated the rules for each CMP-PDP In an embodiment with many CMP-PDPs, CMP-PAP only distributes rules to CMP-PDPs if they are relevant for that CMP-PDP. This is because this example uses a decentralized CMP-PDP architecture (vs. one central CMP-PDP). Criteria for pushing rules to a particular CMP-PEP are for example: if the rule specifies the specific resource the CMP-PDP node provides (for inbound information flow rule enforcement—this is the case in this example); if the rule specifies the specific requestor node the CMP-PDP node controls information flow from (for outbound information flow rule enforcement—not in this example); if the rule pertains to any criteria the resource or requestor meet (e.g. privacy relevance), which the CMP-PDP node controls information flow from/to; or if the rule is independent of any of the specifics of the node, that is, could apply to any node, and thus needs to be distributed to all CMP-PDPs (e.g. "user x has access to anything between 9 am and 5 pm").

Because of the large number of rules that would be generated by this example for the policies described in the previous CMP-MDS rule generation section, this discussion will not present each generated rule and how it would be distributed. The previous section, plus the information presented in this section, makes it obvious to anyone skilled in the art which rules need to be distributed to which PEPs. For example, the abovementioned example rules for the Aggregation Server are ready for distribution to the Aggregation Server. Out of all generated rules, CMP-PAP can easily select those rules based on: resource.node.name=="Aggregation Server"

Runtime policy decision making by CMP-PDP and enforcement by CMP-PEP are again only presented for a subset of the example (Aggregation Server CMP-PDP/PEP): The following example scenarios illustrate some policy decisions and enforcements:

A Police User Interface user requests access to historic Roadside CCTV footage covering an area outside the EU for criminal analysis (assuming a per-data item labeling granularity for all data stored in the Aggregation Server):
ALLOW (reason: non-EU PII access is ok)
A Police User Interface user requests access to historic Roadside CCTV footage covering an area inside the EU (for a 1 week time window 4 weeks ago) for a criminal analysis task covering the same area for a 1 week time window 4 weeks ago (assuming a per-data item labeling granularity for all data stored in the Aggregation Server):
ALLOW (reason: proximity is ok)
A Police User Interface user requests access to historic Roadside CCTV footage covering an area inside the EU (for a 1 week time window 1 week ago) for a criminal analysis task covering the same area for a 1 week time window 4 weeks ago (assuming a per-data item labeling granularity for all data stored in the Aggregation Server):
DENY, ALERT (reason: no proximity)
An Advertiser User Interface user requests license plate numbers (assumed to be PII in this example) and associated criminal records for a certain geographic area:
DENY, ALERT (reason: no interaction in CMP-FDS, and no proximity)

Runtime policy decision making and enforcement by CMP-OSC (for the example scenario) supports Microsoft Windows firewall (as previously described). CMP-OSC generates Windows firewall rules that allow network connections between all interactions specified in the functional system description (cf. FIG. 43) Rule generation for all interactions has already been discussed above in the "Rule Generation" section. This is analogous, except the rule format is different, and the nodes are mapped to their IP addresses (this is trivial) so they can be enforced on the network layer. Taking the rule generation discussion earlier, this step is obvious to anyone skilled in the art, and a web link to Microsoft's "netsh" command line tool webpage that explains how to configure the required rules.

Incident monitoring by CMP-PMR is presented with some representative examples: a hacker attempts to connect to a "Roadside CCTV" node from a rogue device installed on the transport system network. The attacker masquerades as the "Aggregation Server" and sends a valid-looking request (from the rogue device), masquerading as a new "Aggregation Server". The CMP-PDP on the "Roadside CCTV" node does not have any "allow" rules for this rogue "Aggregation Server" (no rules allowing access have been generated because the rogue device is not part of the functional system description. The CMP-PDP sends an alert to CMP-PMR.

In another example, assume a policy where access to a Roadside CCTV node is granted to a Police User Interface node if that police officer's task is both in (1) geographic proximity to the CCTV location, and (2) temporal proximity to the CCTV footage, e.g. live feed if current task, vs. historic footage if working on an analysis task of past events (which would be stored in the Aggregation Server). In this case, a non-authorized Roadside CCTV footage request by the police officer working on an analysis of past events should be decided to be blocked, and an alert should be sent by CMP-PDP to CMP-PMR.

15) Verification/Evidence CMP-PSV

This feature is discussed in depth in the MDSA patent. As a general example, CMP-PSV could be used to produce evidence that is has been verified that "no PII can leak from a PII-marked Protected SoS node to any non-PII-marked Protected SoS". This policy can be modeled using the modeling and metamodeling techniques described in the MDSA Patent and the present application. The verification component CMP-PSV can read that policy, and based on the policy, collect and normalize various evidence used during the verification.

For example, before the Protected SoS is executed, an initial (in this example very simple) compliance/accreditation report can be produced based on collecting all interactions defined in the functional system description (from CMP-FDS) and analyzing/documenting which interactions from PII-marked systems are programmed to go to non-PII-marked systems (which would be a violation), and which interactions from PII-marked systems are programmed to go to PII-marked systems (which would be compliant). This normalized initial accreditation/compliance evidence is stored, and potentially presented to a user (e.g. on a screen).

Assuming the Protected SoS allows agile reconfiguration (e.g. Service Oriented Architecture SOA orchestration), the interactions may change over time, and automated re-accreditation/compliance may be needed. In this example, re-accreditation is triggered in regular intervals (e.g. every month), and also whenever a change is detected (e.g. the orchestration tool deploys changes): CMP-PSV repeats the abovementioned process to generate normalized evidence, and then runs a change detection algorithm to compare the new normalized evidence with the old normalized evidence. This allows CMP-PSV to analyze and document the changes since the last accreditation, and automate simple decisions (e.g. no change means no manual sign-off by management is required. The functionality of the CMP-PSV component has been described in the MDSA Patent.

16) Risk and Attack Detection Policies

In this example, CMP-RAA uses several approaches to detect attacks: Firstly, it interacts with CMP-PMR to analyze the frequency and nature of alerts/incidents, in this case incidents caused by repeated "access denied" accesses to the same resource (indicating DoS/DDoS attacks or hacking attempts on a machine), and by repeated "access denied" accesses from the same resource (indicating hacking attempts from a machine). Furthermore, CMP-RAA monitors the frequency of accesses for each link by producing logging rules (like access rules, but with a "log" action instead of "allow" or "deny") for CMP-PDPs on all PII-marked Protected SoS nodes. In addition, CMP-RAA produces logging rules that collect useful attributes about requestors (e.g. geolocation, task, identity) and resource (e.g. type of requested information, geolocation associated with the requested information). It builds a model of "normal behavior" over time based on the collected information, and flags an alarm if any of the collected information is outside the "normal behavior". In this example, CMP-RAA also uses signature-based risk and attack detection: For example, if the requestor provides the geospatial position of the requestor's device as part of the request, and the device's geospatial location does not match with the requestor's task's geography, then this could for example be interpreted as a suspicious inconsistency. Similarly, if the provided device geolocation moves inconsistency (e.g. suddenly moves halfway around the globe within a few seconds), then this could be interpreted as a suspicious inconsistency. In this example, Cognitive Modeling and Attack Tree Analysis are not used because they are known to those skilled in the art and would be very lengthy to describe step-by-step.

17) Agility (Changing/Updating)

The following sections illustrate how much of the MDS System can automatically update in the face of various changes. It is a particularly useful feature of the MDS System is that it can simplify the management of policies in the face of changes/updates. For example, the functional system description can be changed (e.g. interactions get reconfigured), or CMP-ASS/MS/CS are added/removed/modified.

As described earlier in the CMP-FDS component description, the CMP-MDS process can simply be repeated every tie the CMP-FDS changes, and changes to the machine-enforceable rules can be detected using "normalizing". For example, if Roadside Beacons are upgraded to carry out facial recognition, and are now providing facial information to the Analysis Server, Roadside Beacon nodes would become PII relevant, and there would be a new interaction. CMP-FDS can detect those changes, and CMP-MDS can re-run the rule generation process to produce updated rules (e.g. allowing the additional interaction).

The MDS System can also be changed, and in particular services CMP-ASS/CS/MS can be added, removed, or modified. For example, the scenario's CMP-CS2 (social proximity) is manually removed from the system by an administrator (e.g. due to data quality problems). In the scenario, every MDS System component includes a heartbeat feature that allows dependent components to detect any changes. Therefore, this triggers a change in the CMP-MMR metamodel and CMP-MDR metadata, which triggers CMP-MDS and other components to update. As depicted in FIG. 47B, CMP-MDS now refines the same high-level policy "(Proximity(requestor, resource)>80%)" to a different rule, using the refinement template (4750) to map "Proximity %" (4760) to the "Operational+Time" (4770) proximity branch instead. FIG. 47B illustrates the changed path through the rule refinement template. The policy element is now refined to:

(Proximity.operational (requestor, resource)>80%) AND
(Proximity.temporal (requestor, resource)>80%))

This policy element gets further refined to the following, using attribute refinement (and assuming that CMP-CS3 offers a wide range of temporal operators for time window comparisons, including the one used here):

( CMP-CS1 ( CMP-MS1 ( CMP-ASS1 ), ASS3-item-2 ) < 1 ) AND
( CMP-CS3 ( CMP-MS2 ( CMP-MS1 ( CMP-ASS1 ) ) ,
  ASS3-item-3 ), "CMP-
CS3.time-window-difference" ) < 20%

Figure 54:
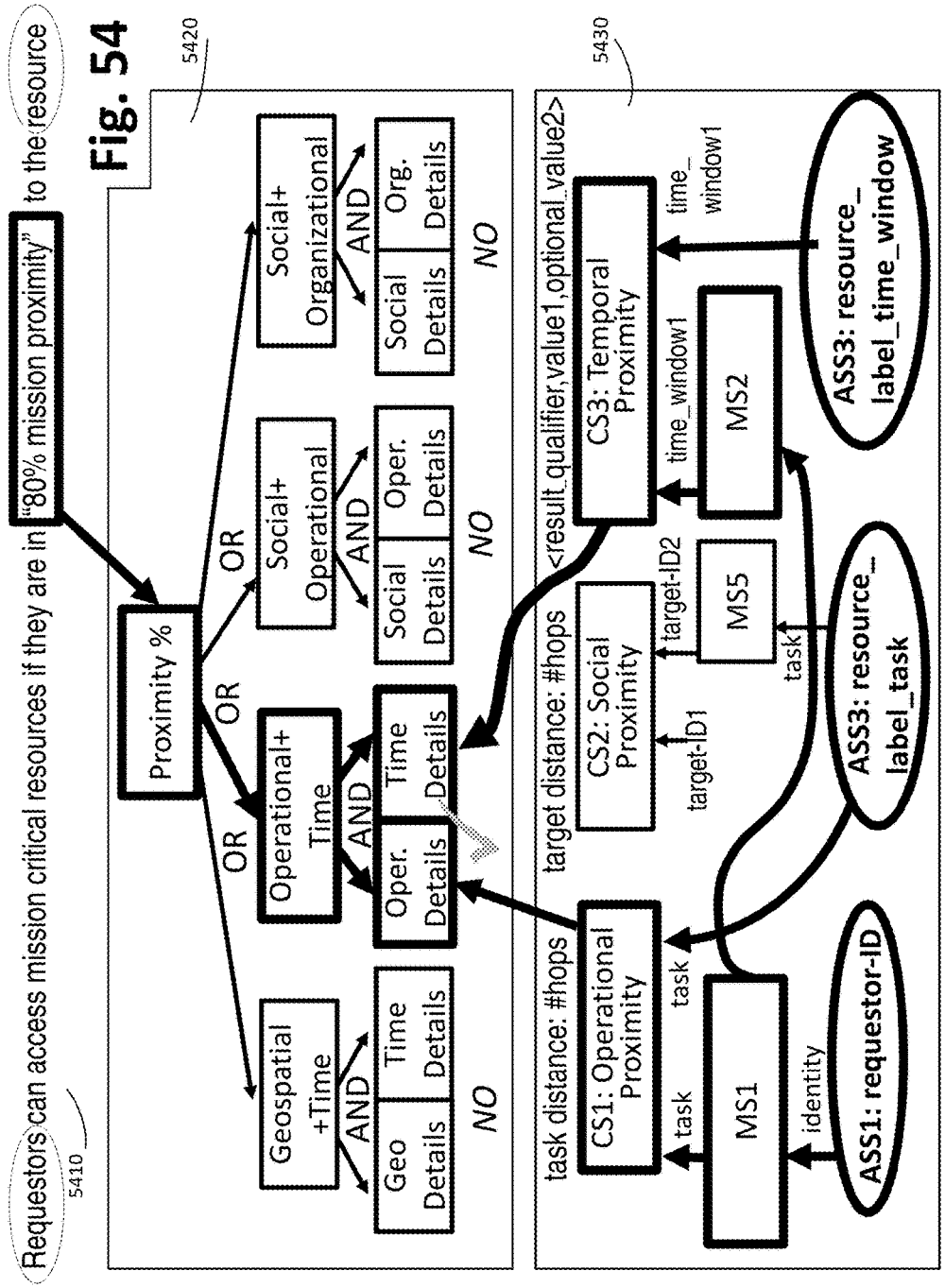
FIG. 54 illustrates diagram of another rule element refinement and attribute refinement of an example scenario according to an embodiment.

FIG. 54 intuitively illustrates a summary of the changed example, showing the high-level policy (5410) at the top, the already described rule refinement (5420) below, and the already described attribute refinement (5430) below that.

Furthermore, whenever CMP-PEPs, CMP-PDPs, CMP-ASS, CMP-CS, and CMP-MS are modified/added/removed at runtime, CMP-RSC (optionally) may repeat/update its configuration functionality. This is triggered by changes in the CMP-MMR and CMP-MDR, or by changes in CMP-FDS, that is, if PDP nodes come and go.

After this change, CMP-MDS pushes the new rule into CMP-PAP, which distributes the rule update to the affected CMP-PDPs Changes to models and metamodels (impacting esp. CMP-MMR and CMP-PAP) trigger the following automatic updates: When the security policy model changes (e.g. via edits in CMP-PE or CMP-MMR), CMP-MDS reads in the new policy model from CMP-MMR and generates new rules/configurations and transmits to CMP-PAP (which updates CMP-PDPs) & CMP-OSC configurations. When the security policy metamodel changes (e.g. because of manual CMP-MMR edits), CMP-MDS reads in the new metamodel from CMP-MMR, if necessary, loads needed model transformation templates into the workflow to be able to handle the new metamodel (or: manual customization of the model transformation workflow may be required), and generates new rules/configurations and transmits to CMP-PAP (which updates CMP-PDPs) & CMP-OSC configurations. Moreover, when "low level" rules are directly edited in CMP-PAP, these changes can simply be distributed to the relevant CMP-PDPs.

When CMP-ASS/CMP-CS/CMP-MS get added, modified or removed, CMP-MDR (and optionally CMP-MRR) are changed accordingly (automatically, through push/pull, discovery service; or manually). Furthermore, CMP-MDS reads in the new metamodel from CMP-MMR and CMP-MDR, and if necessary, loads needed model transformation templates into the workflow to be able to handle the CMP-ASS/CMP-CS/CMP-MS changes (or: manual customization of the model transformation workflow may be required). In addition, CMP-RSC, if necessary, reconfigures CMP-PEPs (based on CMP-MDR) to enable them to interact with the changed CMP-ASS/CMP-CS/CMP-MS. Finally, CMP-MDS generates new rules/configurations and transmits to CMP-PAP (which updates CMP-PDPs) & CMP-OSC configurations. An example of such a service change (removal of a social proximity calculation service) and the updated rule has been discussed in depth in the CMP-MDS rule generation section earlier.

It is obvious to anyone skilled in the art that the described examples of changes simply trigger the same process as if the MDS System was run for the first time (after installation/configuration/launching). A potential complexity is introduced if transmitted updates should only include the differences from the current state. In that case where only the differences to the prior versions need to be transmitted, change detection requires normalizing/sorting of rules and configurations, and storing prior normalized versions to compare with the new version. Change detection is described in depth in one of the inventors' prior patent applications (in a slightly different context) and applies here. If updates are fast, then it is also possible to simply distribute the entire newly generated rule set to the relevant CMP-PDPs, making the process practically identical with an initial run-through.

This simple embodiment illustrates a very simple implementation of PBAC MDS.

1) High-Level PBAC Policy

Using CMP-PE, the security policy administrator wishes to author the following high-level, undistorted PBAC policy, reflecting a mission sharing policy:

Mission sharing policy (cf. model layer OMG MDA PIM) "Share all mission data with users whose are in "80% mission proximity".

Figure 57:
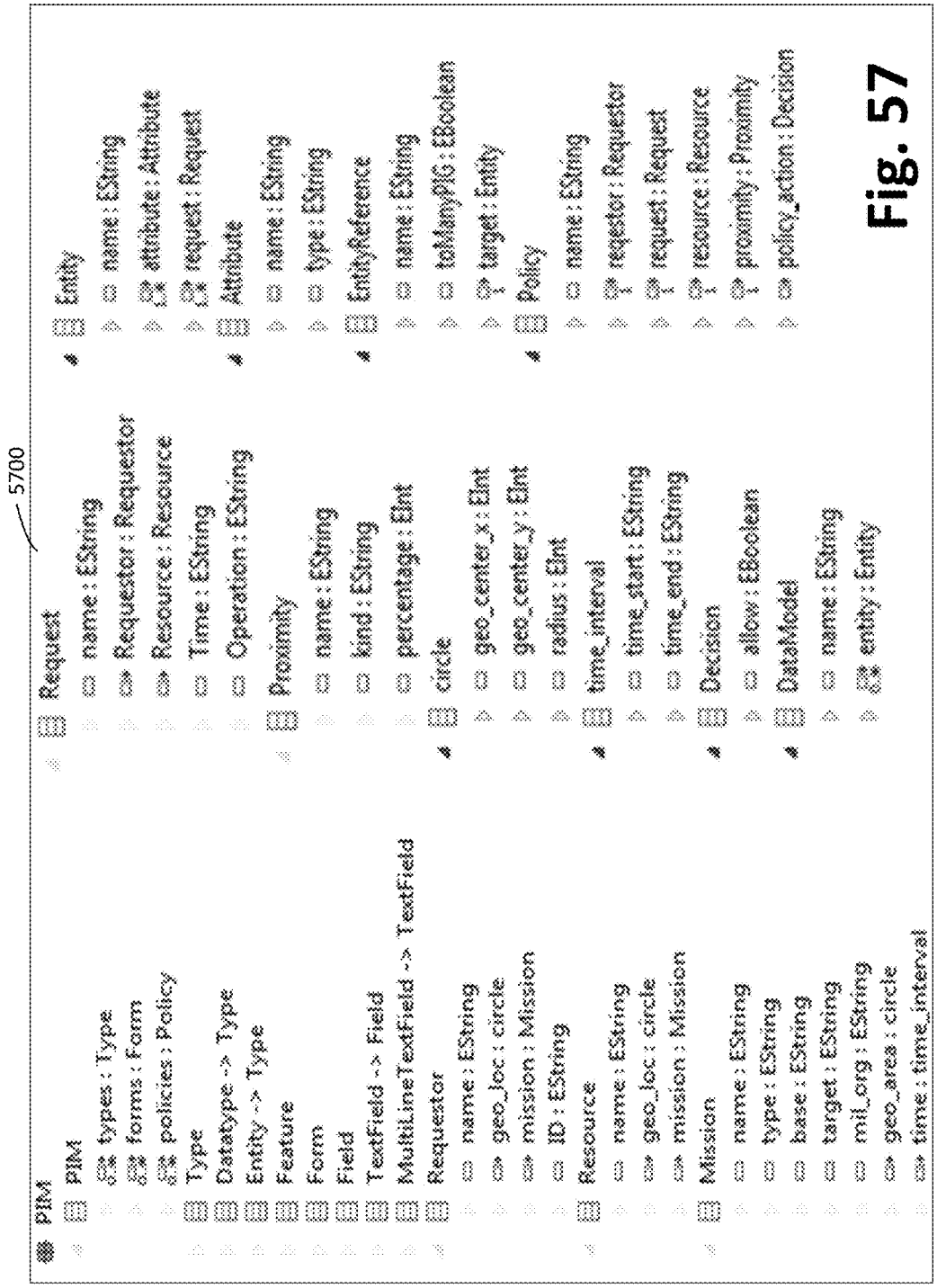
FIG. 57 illustrates a PBAC metamodel of an example scenario according to an embodiment.

A policy metamodel is defined that supports the specification of PBAC policies at that level of abstraction. FIG. 57 illustrates the metamodel (5700), in this example using Eclipse Sample Reflective Ecore Model Editor.

Figure 59:
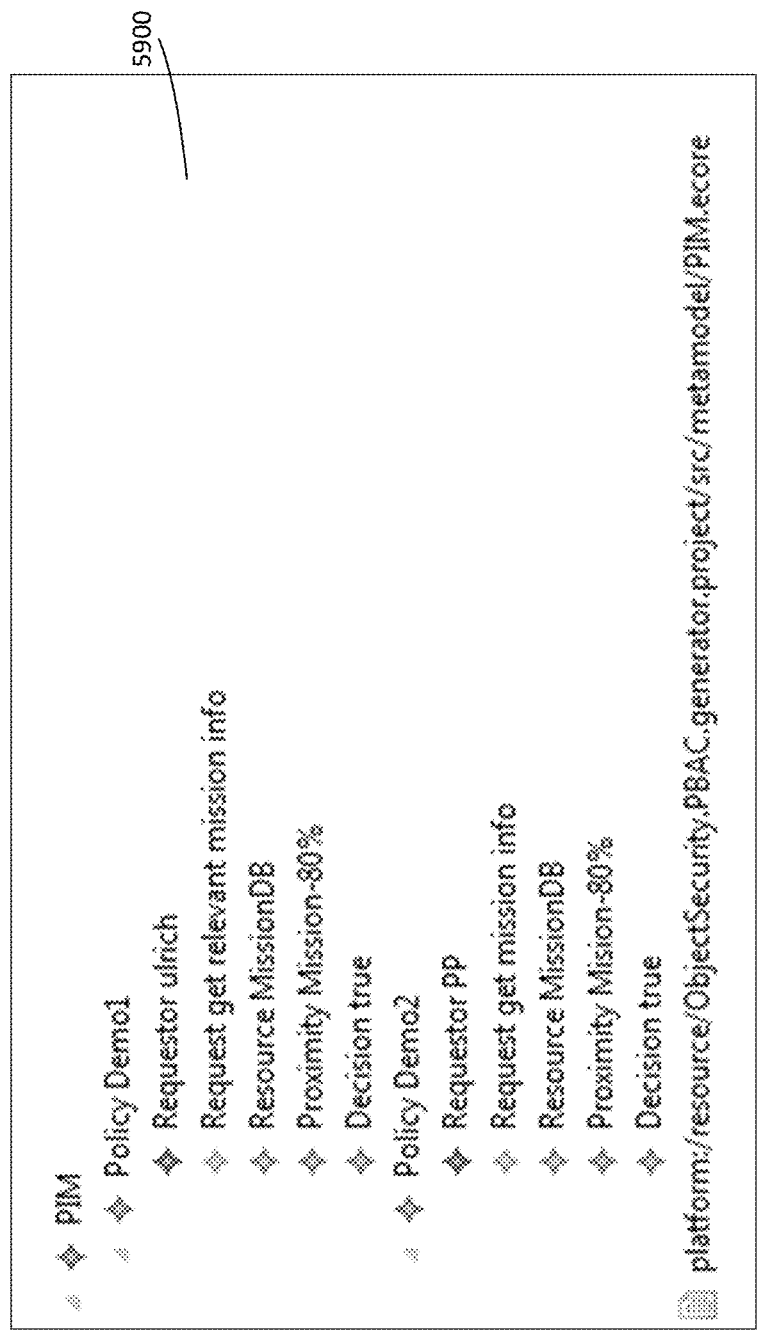
FIG. 59 illustrates a PBAC model of an example scenario according to an embodiment.

Based on this metamodel, a policy model with two sample policies are defined in the Eclipse Sample Reflective Ecore Model Editor (depicted in FIG. 59, showing model 5900). It is noted that there is no reason why two policies are defined instead of one, other than for illustrative purposes that there can be more than one policy.

2) Rule Refinement Templates

In this particular embodiment, an additional metamodel and model are defined to determine which combinations of available attribute sources can be used to implement the high-level policy. Two kinds of information are metamodeled and modeled: Firstly, available attribute sources. Secondly, policy rule templates to map from high level policy to required combinations of attribute sources.

Based on this information, the PBAC MDS System's CMP-MDS automatically selects the correct "mission proximity" policy model template and, based on the available attributes, generates a more detailed policy representation that reflects the mission sharing policy.

Mission sharing policy (cf. model layer OMG MDA PSM) Share all mission data with users for whom the following is true:

EITHER

1) BOTH mission areas overlap (need GIS calculation) (geo proximity) AND mission execution intervals overlap or occur within 24 hours of each other (need time calculation) (time proximity)

OR

Figure 58:
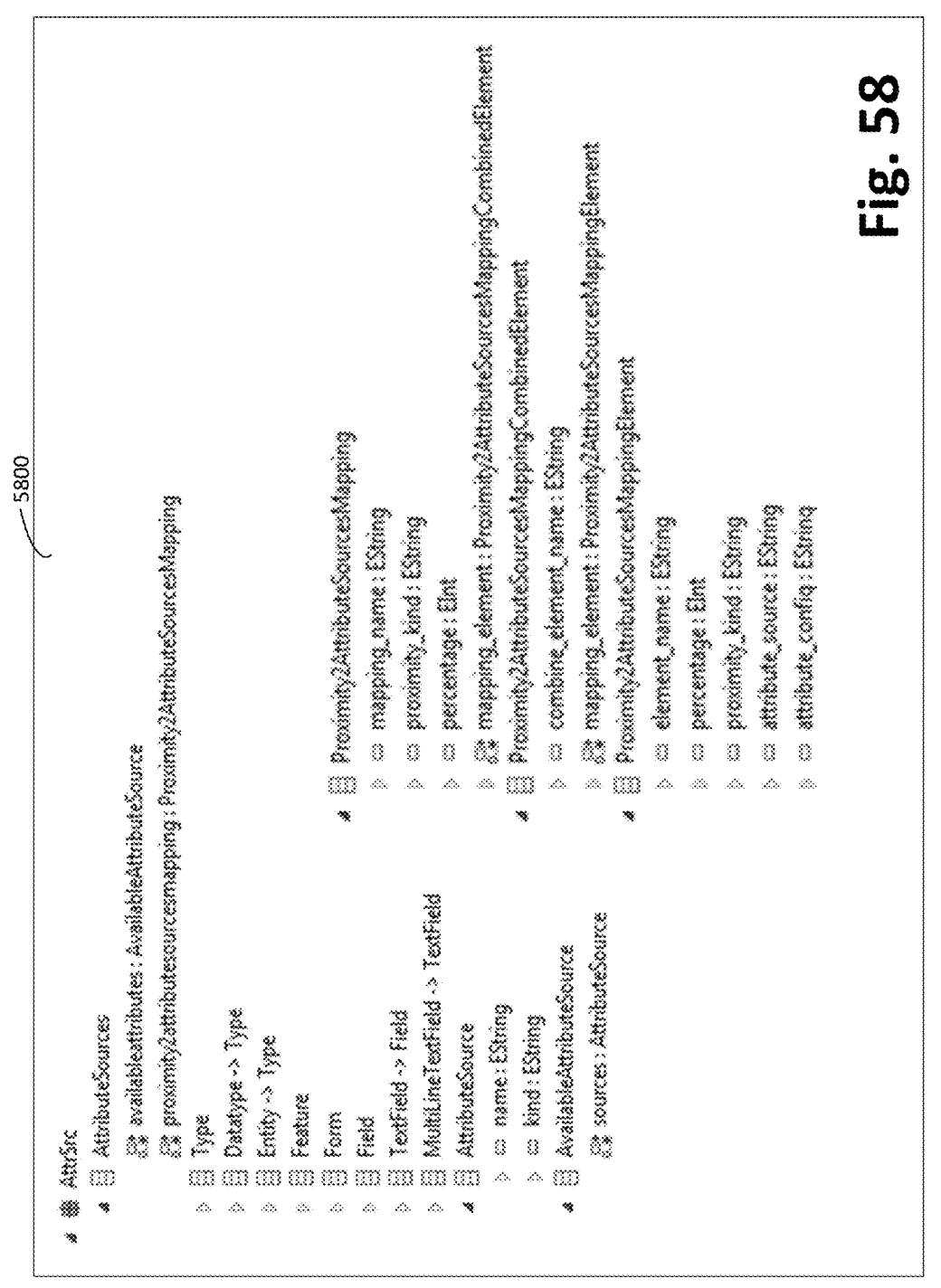
Figure 60:
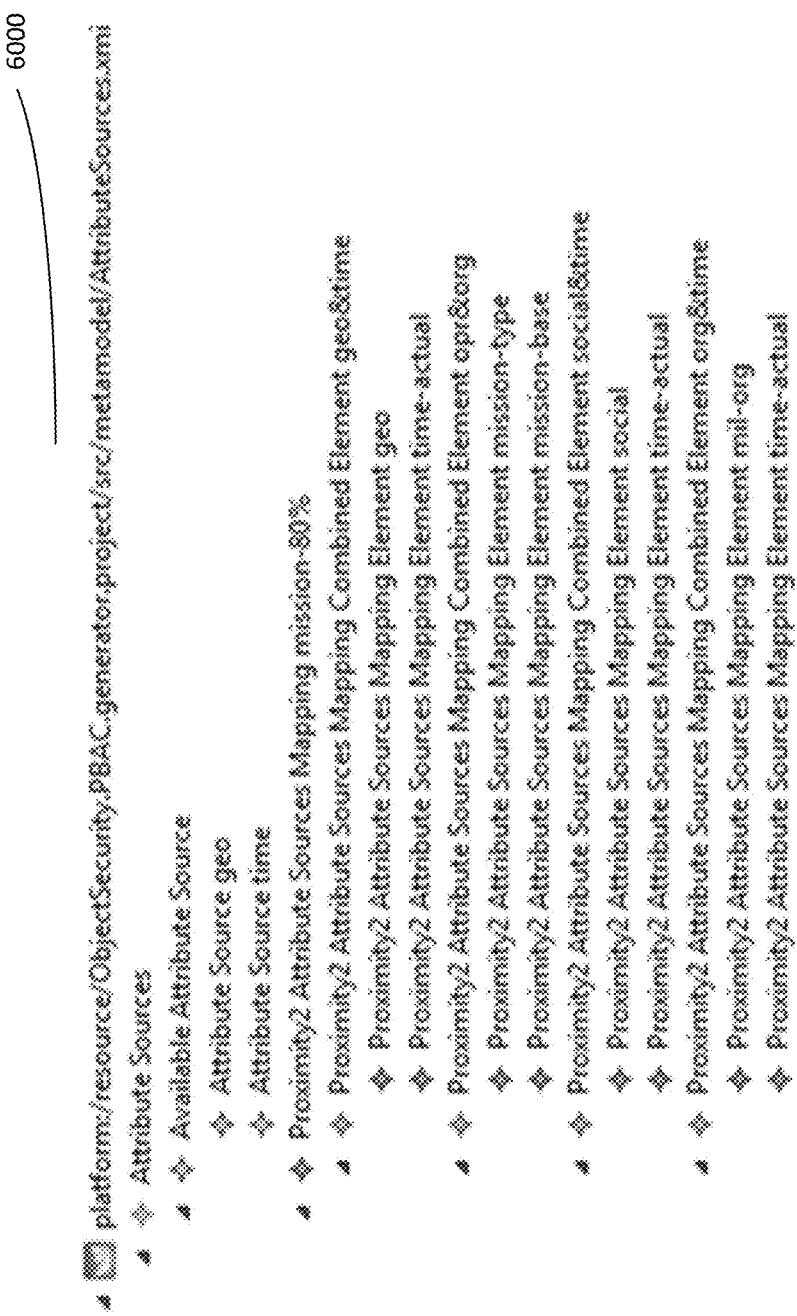
FIG. 60 illustrates a PBAC refinement template model of an example scenario according to an embodiment.

2) BOTH mission type is the same (String equivalence, or sub-kind check) (organizational proximity) AND mission base is the same (String equivalence) (organizational/geo proximity) The following metamodel (also depicted in FIG. 58, which shows metamodel 5800) captures the semantics of both the available attribute sources and the mappings from high-level PBAC proximity (kind and percentage) to the required attribute sources and configurations (e.g. "80%" means "within 24 h"):

Based on this metamodel, the model (depicted in FIG. 60, showing model 6000) is defined. It captures two different available attribute sources (geo, time) and four options to implement 80% mission proximity, with the corresponding detailed attribute source combinations and configurations. It is noted that only two mapping templates match.

It is noted that in this very basic example, the precise implementation conditions are only specified for exactly 80% mission proximity. There are several ways of adding more percentages, including:

Explicitly which attribute source configurations are specified by other percentages (for example, 70% mission proximity could be defined for time and geo sources as "within 72 h" and "at least 25% area overlap")

Define a formula that maps percentages to data source variables (for example, "time" source proximity is "100 h-%", meaning that 100% temporal proximity is within 0 h, and 1% temporal proximity is within 99 h).

3) Model Transformation Workflow

The PBAC MDS System's CMP-MDS component then generates the detailed, fine-grained technical access rules in OpenPMF PDL (not displayed, the file is long), a simple access control policy language implemented in ObjectSecurity's OpenPMF MDS/ABAC tool. In this very basic embodiment, Eclipse Modeling Workflow Engine (MWE) is used together with the model-to-text transformation language Xpand2 (using various templates and extensions).

The MWE workflow does the following: set up EMF for standalone execution, instantiate metamodels, load models and store them in their name slots, check the models, and finally generate the technical policy rules.

The rule generation templates and extensions (Xpand2 & Java) are quite complex and do the following:

1) Present the simple high-level policy in pseudo-notation:

```
*****************************************
*          HIGH LEVEL POLICY (PIM)       *
*****************************************
PBAC_policy_high_level Demo1
{
(proximity <client, target, Mission > == 80): allow;
}
```

This is simply done by inserting the relevant model elements (excerpt):

```
...
*****************************************
*          HIGH LEVEL POLICY (PIM)       *
*****************************************
PBAC_policy_high_level «this.name»
{
(proximity <client, target, «pmkind» > ==
«pmperc.percentage»): allow;
}
...
```

2) Present details about the low-level policy, selecting only combinations of attribute sources that are available in the runtime system (specified in the AvailableSources part of the model)

specified in at least one mapping whose "kind" matches the proximity dimension and percentage in the high-level policy

```
*******************************************
*           LOW LEVEL POLICY              *
*         (generated impl. "rules")       *
*******************************************
PBAC_policy_low_level Demo1
{
(client.name == ulrich) &&
(target.name == MissionDB) &&
PBAC impl. policy "mission-80%": combination of attributes: [geo, time]
1:source kind "geo" from source "geo-source" (named "geo"),
"80%"="geo_area_overlap")
2:source kind "time"from source "time-clock" (named "time-actual"),
"80%"="within_24h")
:allow = true;
PBAC_policy_low_level Demo2
{
(client.name == PP) &&
(target.name == MissionDB) &&
PBAC impl. policy "mission-80%": combination of attributes: [geo, time]
1:source kind "geo" from source "geo-source" (named "geo"),
"80%"="geo_area_overlap")
2:source kind "time" from source "time-clock" (named "time-actual"),
"80%"="within_24h")
:allow = true;
```

4) Automatic Reconfiguration: Model-Driven Security Policy Automation

To illustrate the flexibility/extensibility and manageability of PBAC (thanks to model-driven security), the demo's PBAC system is now reconfigured to have access to alternative attributes, for example the social network proximity of the targets of missions (e.g. criminals), and time.

Starting from the same high-level policy model (meta-modeled and modeled the same as earlier):

High-Level Mission sharing policy (model layer OMG MDA PIM):

Share all mission data with users whose are in "80% mission proximity"

PBAC's model-driven security can now generate a different more detailed policy for those different attribute and calculation sources:

Mission sharing policy (model layer OMG MDA PSM):

Share all mission data with users for whom the following is true:

EITHER

1) BOTH mission target (criminal) is within 2 hops of social proximity (social proximity) AND mission execution intervals overlap or occur within 48 hours of each other (time proximity)

OR

2) BOTH military organizations are within 1 hop proximity (above, below, and sister/lateral) (organizational proximity) AND mission execution intervals overlap or occur within 24 hours of each other (time proximity)

PBAC's model-driven security therefore generates different detailed, fine-grained technical access rules using the available attributes. This use case illustrates a main benefit of model-driven security for PBAC. (Another main benefit, the support of IT agility, will be illustrated in Phase II).

The rule generation Xpand2 templates and extensions (Xpand2 & Java) now do the following:

1) Present the same, "undistorted" simple high-level policy in pseudo-notation:

```
*******************************************
*           HIGH LEVEL POLICY (PIM)       *
*******************************************
PBAC_policy_high_level Demo1
{
(proximity <client, target, Mission > == 80): allow;
}
```

This is simply done by inserting the relevant model elements (excerpt):

```
...
*******************************************
*           HIGH LEVEL POLICY (PIM)       *
*******************************************
PBAC_policy_high_level «this.name»
{
(proximity <client, target, «pmkind» > == ;
«pmperc.percentage»): allow
}
...
```

2) Present details about the low-level policy:

```
*******************************************
*           LOW LEVEL POLICY              *
*         (generated impl. "rules")       *
*******************************************
PBAC_policy_low_level Demo1
{
(client.name == ulrich) &&
(target.name == MissionDB) &&
PBAC impl. policy "mission-80%": combination of attributes: [social, time]
1:source kind "social" from source "social-source" (named "social"), "80%"="social-2-hops")
2:source kind "time" from source "time-clock" (named "time-actual"),
"80%"="within_48h")
:allow = true;
PBAC_policy_low_level Demo2
{
(client.name == PP) &&
(target.name == MissionDB) &&
PBAC impl. policy "mission-80%": combination of attributes: [social, time]
1:source kind "social" from source "social-source" (named "social"), "80%"="social-2-hops")
2:source kind "time" from source "time-clock" (named "time-actual"),
"80%"="within_48h")
:allow = true;
```

Figure 61:
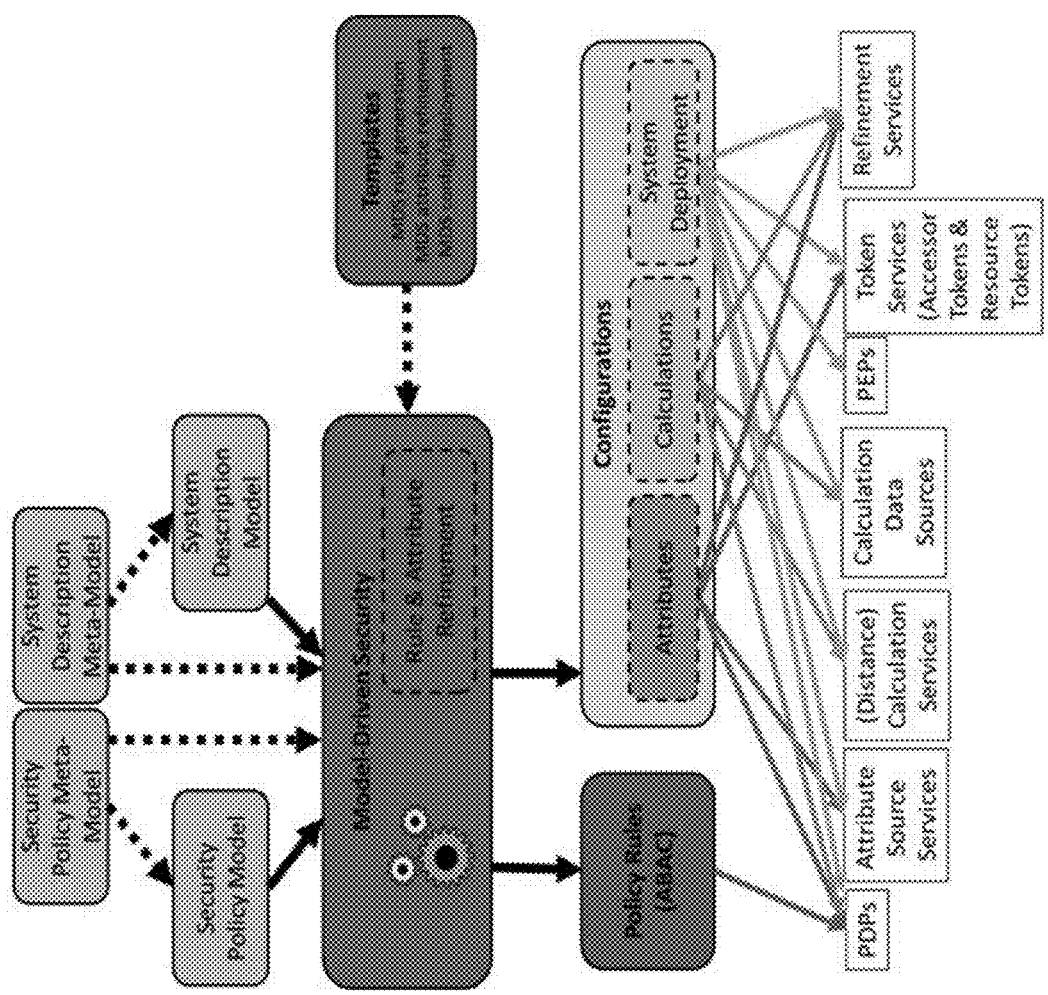
FIG. 61 illustrates an information flow diagram of a PBAC policy and configuration generation example according to an embodiment.
Figure 62:
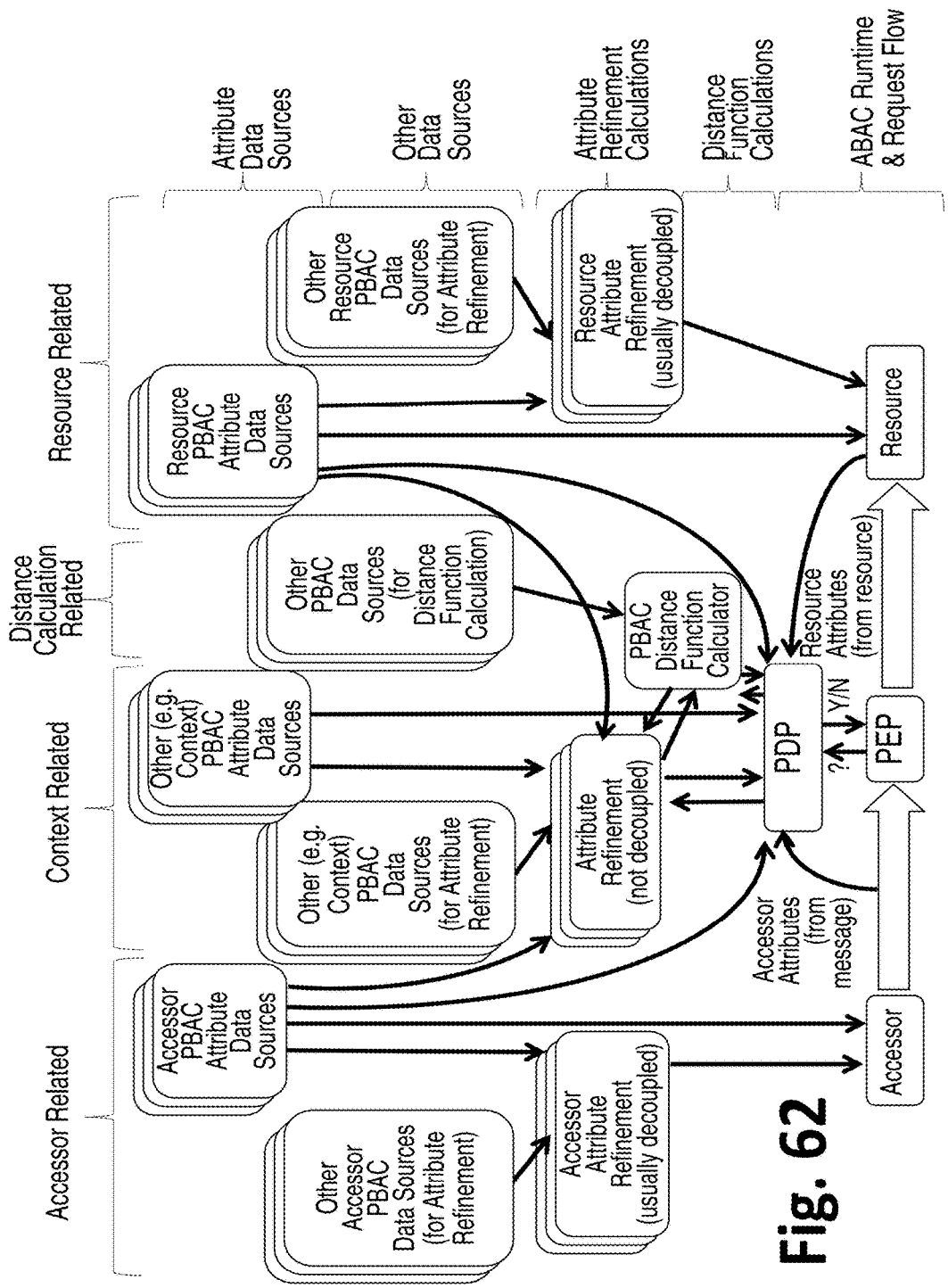
FIG. 62 illustrates an information flow diagram of a PBAC policy and configuration generation example according to an embodiment.
Figure 64A:
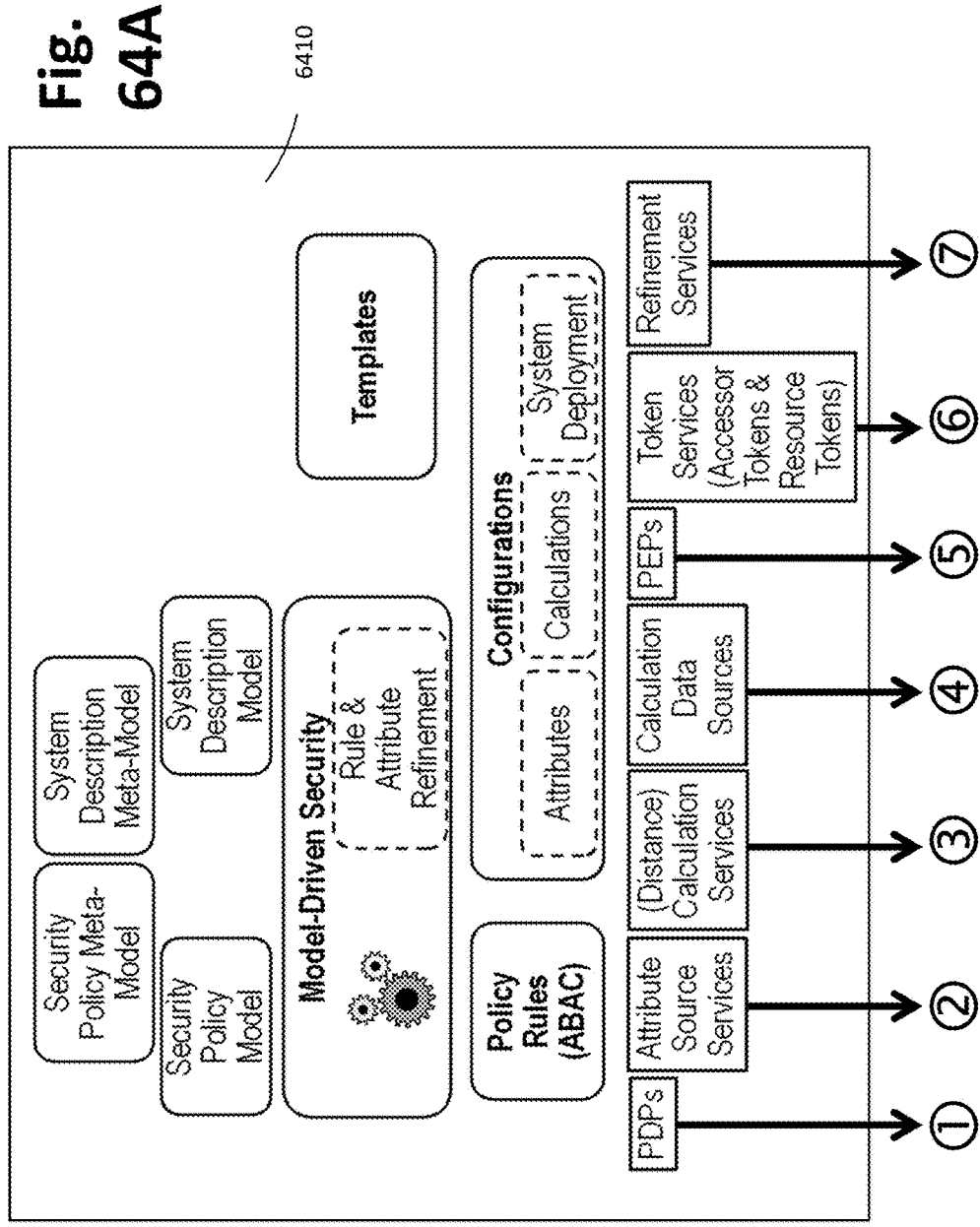
FIG. 64 illustrates an information flow diagram of a PBAC policy and configuration generation example according to an embodiment.
Figure 64B:
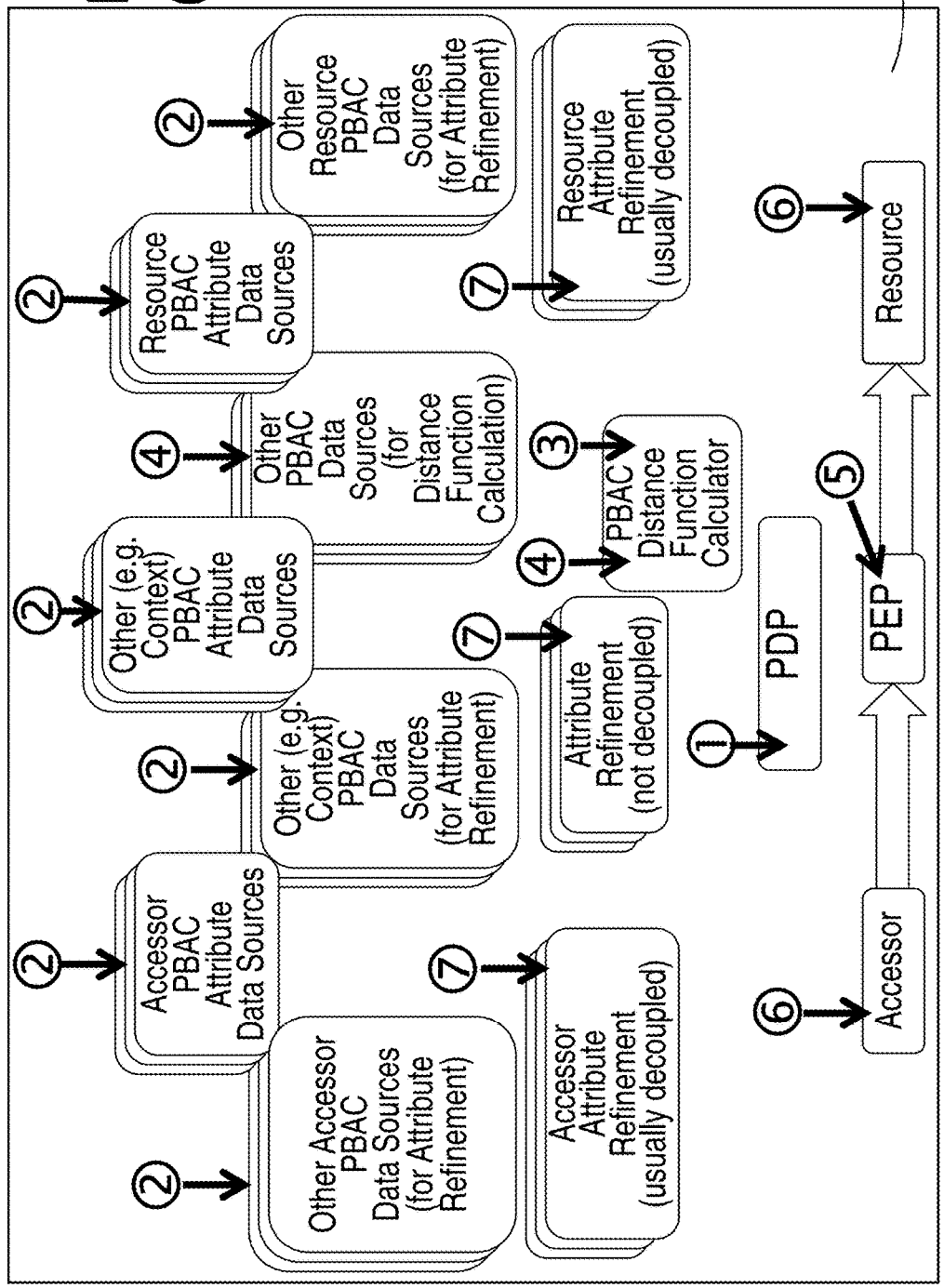

FIG. 61 depicts architectural concepts of more elaborate MDS System embodiments from a (visually) different angle, illustrating exemplary information flows between components. FIG. 62 depicts various kinds of MDS System data sources, refinements, and calculations, and how they are connected to the PDP and PEP. Finally, FIG. 64 shows both diagrams—FIG. 61 and FIG. 62 are connected: FIG. 64 illustrates a relationship between a box 6401, which represents operation shown in FIG. 61, and a box 6402, which represents operation shown in FIG. 62. The purpose is to illustrate how the information flows through from the top to the bottom.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated. In other words, the terminologies used to describe various embodiments according to the present application are in a plural form. However, such number of elements can be one or more depending on specific circumstance of the implementation of policies. Therefore, the form of the number of such elements is not intended to limit the number of the actual elements.

What is claimed is:

1. A method of managing implementation of policies in an information technologies system, the method comprising:
    receiving into a processor at least one policy function stored in at least one memory;
    receiving into the processor at least one refinement template from the at least one memory; and
    receiving into the processor at least one output policy function from the at least one memory,
    receiving into the processor a policy input indicating a high-level policy for the IT system, the policy input being compliant with the at least one policy function;
    based on the received policy input, automatically or semi-automatically generating via the processor a rule and/or configuration by:
        replacing at least one policy function in the policy input with the at received least one policy function, the generated rule and/or configuration being compliant with the received policy input; or
        replacing at least one value or value placeholder in the policy input with a corresponding value;
    distributing, via the processor, the rule and/or configuration to the at least one memory of the IT system or another at least one memory to thereby enable implementation of the policies;
    wherein the rule and/or configuration includes the at least one output policy function.

2. The method of claim 1, further comprising:
    calculating automatically or semi-automatically, based on the received at least one policy function, a refinement chain by determining a matching of a policy function input and policy function output combination based on the at least one refinement template,
    wherein the refinement chain maps between at least one policy function and at least one other policy function and forms at least one path for selection as refinement, and
    wherein the generated rule and/or configuration is generated by using the calculated refinement chain during the generation.

3. The method of claim 1, further comprising:
    calculating automatically or semi-automatically, based on the received at least one policy function, a refinement chain by determining a matching of a policy function input and policy function output combination based on the at least one refinement template; and
    if one or more refinement chains exist, storing information in the at least one memory about at least one refined policy function being part of the at least refinement chain and/or about how to refine the policy function,
    wherein the refinement chain maps between at least one policy function input and at least one policy function output and forms at least one path for selection as refinement.

4. The method of claim 1, wherein the at least one policy function relates to non-functional system characteristics for the IT system, the non-functional system characteristics including security, compliance, Quality of Service, and/or assurance.

5. The method of claim 1, wherein the at least one refinement template defines how to map between at least one input policy function and at least one output policy function or defines at least one refinement of at least one input policy function to at least one output policy function in a one-to-one, one-to-many, many-to-one, or many-to-many relationship.

6. The method of claim 1, wherein the at least one refinement template is stacked into multi-step refinement chains if inputs and outputs of the at least one refinement template match inputs and outputs of the multi-step refinement chains.

7. The method of claim 1, wherein generating the rule and/or configuration includes filling in a reference to a policy function implementation or filling in at least one output value provided by a policy function implementation.

8. The method of claim 1, wherein the generated rule and/or configuration is selectively distributed only to the at least one memory of the IT system or the another at least one memory where the generated rule and/or configuration is actually processed.

9. The method of claim 1, wherein the policy input is received into the processor in a format that is not machine-enforceable at an enforcement entity of the IT system.

10. An information technologies (IT) policy management system, comprising:
    at least one memory that stores at least one policy function; and
    a processor that is configured to:
        receive at least one refinement template from the at least one memory;
        receive at least one output policy function from the at least one memory;
        receive the at least one policy function, the at least one refinement template, and the at least one output policy function from the at least one memory;
        receive a policy input indicating a high-level policy for the IT system, the policy input being compliant with the at least one policy function;
        based on the received policy input, automatically or semi-automatically generates a rule and/or configuration by:
            replacing at least one policy function in the policy input with the at received least one policy function, the generated rule and/or configuration being compliant with the received policy input; or replacing at least one value or value placeholder in the policy input with a corresponding value; and distributes the rule and/or configuration to the at least one memory of the IT system or another at least one memory to thereby enable implementation of the policies, wherein the rule and/or configuration includes the at least one output policy function.

11. The system of claim 10, wherein the processor is further configured to calculate automatically or semi-automatically, based on the received at least one policy function, a refinement chain by determining a matching of a policy function input and policy function output combination based on the at least one refinement template, the refinement chain maps between at least one policy function and at least one other policy function and forms at least one path for selection as refinement, and the generated rule and/or configuration is generated by using the calculated refinement chain during the generation.

12. The system of claim 10, wherein the processor is further configured to calculate automatically or semi-automatically, based on the received at least one policy function, a refinement chain by determining a matching of a policy function input and policy function output combination based on the at least one refinement template; and if one or more refinement chains exist, storing information in the at least one memory about at least one refined policy function being part of the at least refinement chain and/or about how to refine the policy function, wherein the refinement chain maps between at least one policy function input and at least one policy function output and forms at least one path for selection as refinement.

13. The system of claim 10, wherein the at least one policy function relates to non-functional system characteristics for the IT system, the non-functional system characteristics including security, compliance, Quality of Service, and/or assurance.

14. The system of claim 10, wherein the at least one refinement template defines how to map between at least one input policy function and at least one output policy function or defines at least one refinement of at least one input policy function to at least one output policy function in a one-to-one, one-to-many, many-to-one, or many-to-many relationship.

15. The system of claim 10, wherein the at least one refinement template is stacked into multi-step refinement chains if inputs and outputs of the at least one refinement template match inputs and outputs of the multi-step refinement chains.

16. The system of claim 10, wherein generating the rule and/or configuration includes filling in a reference to a policy function implementation or filling in at least one output value provided by a policy function implementation.

17. The system of claim 10, wherein the generated rule and/or configuration is selectively distributed only to the at least one memory of the IT system or the another at least one memory where the generated rule and/or configuration is actually processed.

18. The system of claim 10, wherein the policy input is received into the processor in a format that is not machine-enforceable at an enforcement entity of the IT system.

* * * * *